United States Patent
Kudurshian et al.

(10) Patent No.: US 10,402,073 B2
(45) Date of Patent: Sep. 3, 2019

(54) DEVICES, METHODS, AND GRAPHICAL USER INTERFACES FOR INTERACTING WITH A CONTROL OBJECT WHILE DRAGGING ANOTHER OBJECT

(71) Applicant: Apple Inc., Cupertino, CA (US)

(72) Inventors: Aram D. Kudurshian, San Francisco, CA (US); Christopher P. Foss, San Francisco, CA (US); Gary I. Butcher, Los Gatos, CA (US); Patrick L. Coffman, San Francisco, CA (US); Jeffrey Traer Bernstein, San Francisco, CA (US); Nicole M. Wells, San Francisco, CA (US); Wayne C. Westerman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 659 days.

(21) Appl. No.: 14/869,703

(22) Filed: Sep. 29, 2015

(65) Prior Publication Data

US 2016/0259516 A1  Sep. 8, 2016

Related U.S. Application Data

(63) Continuation of application No. 14/868,078, filed on Sep. 28, 2015, now Pat. No. 10,095,396.

(Continued)

(51) Int. Cl.
*G06F 3/048* (2013.01)
*G06F 3/0484* (2013.01)
(Continued)

(52) U.S. Cl.
CPC .......... *G06F 3/04847* (2013.01); *G06F 3/016* (2013.01); *G06F 3/0486* (2013.01);
(Continued)

(58) Field of Classification Search
CPC ............... G06F 3/0482; G06F 3/04842; G06F 3/04812; G06F 3/017; G06F 3/0486;
(Continued)

(56) References Cited

U.S. PATENT DOCUMENTS

| 4,864,520 A | 9/1989 | Setoguchi et al. |
| 5,184,120 A | 2/1993 | Schultz |

(Continued)

FOREIGN PATENT DOCUMENTS

| AU | 2016100649 A4 | 6/2016 |
| CN | 1808362 A | 7/2006 |

(Continued)

OTHER PUBLICATIONS

Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.

(Continued)

*Primary Examiner* — Di Xiao
(74) *Attorney, Agent, or Firm* — Morgan, Lewis & Bockius LLP

(57) ABSTRACT

An electronic device displays a user interface of a first software application that includes one or more draggable objects and one or more control objects; and, detects a contact on a touch-sensitive surface at a first location while a focus selector is displayed over a first draggable object and a movement of the contact across the touch-sensitive surface to a second location that corresponds to a first control object. In accordance with a determination that the contact at the first location satisfies object selection criteria, the device moves the first draggable object to the first control object in accordance with the movement of the contact across the touch-sensitive surface to the first control object. In accordance with a determination that the contact at the second (Continued)

location satisfies first intensity criteria, the device performs a first predetermined operation that corresponds to activation of the first control object.

27 Claims, 74 Drawing Sheets

Related U.S. Application Data

(60) Provisional application No. 62/141,818, filed on Apr. 1, 2015, provisional application No. 62/129,958, filed on Mar. 8, 2015.

(51) Int. Cl.
    *G06F 3/0486*     (2013.01)
    *G06F 3/0488*     (2013.01)
    *G06F 3/01*     (2006.01)
    *G06F 3/0487*     (2013.01)

(52) U.S. Cl.
    CPC .......... *G06F 3/0487* (2013.01); *G06F 3/0488* (2013.01); *G06F 3/04883* (2013.01)

(58) Field of Classification Search
    CPC ............. G06F 3/04817; G06F 3/04883; G06F 3/0485; G06F 3/04847; G06F 3/0488
    See application file for complete search history.

(56) References Cited

U.S. PATENT DOCUMENTS

| | | |
|---|---|---|
| 5,374,787 A | 12/1994 | Miller et al. |
| 5,428,730 A | 6/1995 | Baker et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,710,896 A | 1/1998 | Seidl |
| 5,717,438 A | 2/1998 | Kim et al. |
| 5,793,360 A | 8/1998 | Fleck et al. |
| 5,793,377 A | 8/1998 | Moore |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,825,352 A | 10/1998 | Bisset et al. |
| 5,844,560 A | 12/1998 | Crutcher et al. |
| 5,872,922 A | 2/1999 | Hogan et al. |
| 5,946,647 A | 8/1999 | Miller et al. |
| 6,002,397 A | 12/1999 | Jaaskelainen, Jr. |
| 6,031,989 A | 2/2000 | Cordell |
| 6,088,019 A | 7/2000 | Rosenberg |
| 6,088,027 A | 7/2000 | Konar et al. |
| 6,111,575 A | 8/2000 | Martinez et al. |
| 6,121,960 A | 9/2000 | Carroll et al. |
| 6,208,329 B1 | 3/2001 | Ballare |
| 6,208,340 B1 | 3/2001 | Amin et al. |
| 6,219,034 B1 | 4/2001 | Elbing et al. |
| 6,243,080 B1 | 6/2001 | Molne |
| 6,252,594 B1 | 6/2001 | Xia et al. |
| 6,396,523 B1 | 5/2002 | Segal et al. |
| 6,429,846 B2 | 8/2002 | Rosenberg et al. |
| 6,448,977 B1 | 9/2002 | Braun et al. |
| 6,459,442 B1 | 10/2002 | Edwards et al. |
| 6,489,978 B1 | 12/2002 | Gong et al. |
| 6,512,530 B1 | 1/2003 | Rzepkowski et al. |
| 6,563,487 B2 | 5/2003 | Martin et al. |
| 6,567,102 B2 | 5/2003 | Kung |
| 6,583,798 B1 | 6/2003 | Hoek et al. |
| 6,590,568 B1 | 7/2003 | Astala et al. |
| 6,661,438 B1 | 12/2003 | Shiraishi et al. |
| 6,735,307 B1 | 5/2004 | Volckers |
| 6,750,890 B1 | 6/2004 | Sugimoto |
| 6,822,635 B2 | 11/2004 | Shahoian et al. |
| 6,906,697 B2 | 6/2005 | Rosenberg |
| 6,919,927 B1 | 7/2005 | Hyodo |
| 6,943,778 B1 | 9/2005 | Astala et al. |
| 7,138,983 B2 | 11/2006 | Wakai et al. |
| 7,312,791 B2 | 12/2007 | Hoshino et al. |
| 7,411,575 B2 | 8/2008 | Hill et al. |
| 7,471,284 B2 | 12/2008 | Bathiche et al. |
| 7,479,949 B2 | 1/2009 | Jobs et al. |
| 7,533,352 B2 | 5/2009 | Chew et al. |
| 7,552,397 B2 | 6/2009 | Holecek et al. |
| 7,577,530 B2 | 8/2009 | Vignalou-Marche |
| 7,614,008 B2 | 11/2009 | Ording |
| 7,619,616 B2 | 11/2009 | Rimas Ribikauskas et al. |
| 7,629,966 B2 | 12/2009 | Anson |
| 7,656,413 B2 | 2/2010 | Khan et al. |
| 7,683,889 B2 | 3/2010 | Rimas Ribikauskas et al. |
| 7,743,348 B2 | 6/2010 | Robbins et al. |
| 7,760,187 B2 | 7/2010 | Kennedy |
| 7,797,642 B1 | 9/2010 | Karam et al. |
| 7,801,950 B2 | 9/2010 | Eisenstadt et al. |
| 7,812,826 B2 | 10/2010 | Ording et al. |
| 7,890,862 B2 | 2/2011 | Kompe et al. |
| 7,903,090 B2 | 3/2011 | Soss et al. |
| 7,952,566 B2 | 5/2011 | Poupyrev et al. |
| 7,956,847 B2 | 6/2011 | Christie |
| 7,973,778 B2 | 7/2011 | Chen |
| 8,040,142 B1 | 10/2011 | Bokma et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,271,900 B2 | 9/2012 | Walizaka et al. |
| 8,325,398 B2 | 12/2012 | Satomi et al. |
| 8,363,020 B2 | 1/2013 | Li et al. |
| 8,390,583 B2 | 3/2013 | Forutanpour et al. |
| 8,423,089 B2 | 4/2013 | Song et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,482,535 B2 | 7/2013 | Pryor |
| 8,499,243 B2 * | 7/2013 | Yuki ................... G06F 3/04817 715/735 |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,698,765 B1 | 4/2014 | Keller |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,954,889 B2 | 2/2015 | Fujibayashi |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |

(56) References Cited

U.S. PATENT DOCUMENTS

| | | |
|---|---|---|
| 9,032,321 B1 | 5/2015 | Cohen et al. |
| 9,046,999 B1 | 6/2015 | Teller et al. |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,619,076 B2 | 4/2017 | Bernstein et al. |
| 9,671,943 B2 | 6/2017 | Van der Velden |
| 9,733,716 B2 | 8/2017 | Shaffer |
| 9,760,241 B1 | 9/2017 | Lewbel |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015064 A1 | 2/2002 | Robotham et al. |
| 2002/0042925 A1 | 4/2002 | Ebisu et al. |
| 2002/0109678 A1 | 8/2002 | Marmolin et al. |
| 2002/0140680 A1 | 10/2002 | Lu |
| 2002/0140740 A1 | 10/2002 | Chen |
| 2002/0180763 A1 | 12/2002 | Kung |
| 2002/0186257 A1 | 12/2002 | Cadiz et al. |
| 2003/0001869 A1 | 1/2003 | Nissen |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0122779 A1 | 7/2003 | Martin et al. |
| 2003/0128242 A1 | 7/2003 | Gordon |
| 2003/0151589 A1 | 8/2003 | Bensen et al. |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0015662 A1 | 1/2004 | Cummings |
| 2004/0021643 A1 | 2/2004 | Hoshino et al. |
| 2004/0056849 A1 | 3/2004 | Lohbihler et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0174399 A1 | 9/2004 | Wu et al. |
| 2004/0219969 A1 | 11/2004 | Casey et al. |
| 2004/0267877 A1 | 12/2004 | Shapiro et al. |
| 2005/0012723 A1 | 1/2005 | Pallakoff |
| 2005/0039141 A1 | 2/2005 | Burke et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0183017 A1 | 8/2005 | Cain |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0001650 A1 | 1/2006 | Robbins et al. |
| 2006/0001657 A1 | 1/2006 | Monney et al. |
| 2006/0022955 A1 | 2/2006 | Kennedy |
| 2006/0022956 A1 | 2/2006 | Lengeling et al. |
| 2006/0026536 A1 | 2/2006 | Hotelling et al. |
| 2006/0031776 A1 | 2/2006 | Glein et al. |
| 2006/0036971 A1 | 2/2006 | Mendel et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224989 A1 | 10/2006 | Pettiross et al. |
| 2006/0233248 A1 | 10/2006 | Rynderman et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0024595 A1 | 2/2007 | Baker et al. |
| 2007/0024646 A1 | 2/2007 | Saarinen et al. |
| 2007/0080953 A1 | 4/2007 | Lii |
| 2007/0113681 A1 | 5/2007 | Nishimura et al. |
| 2007/0120835 A1 | 5/2007 | Sato |
| 2007/0124699 A1 | 5/2007 | Michaels |
| 2007/0152959 A1 | 7/2007 | Peters |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0222768 A1 | 9/2007 | Geurts et al. |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0270182 A1 | 11/2007 | Gulliksson et al. |
| 2007/0294295 A1 | 12/2007 | Finkelstein et al. |
| 2007/0299923 A1 | 12/2007 | Skelly et al. |
| 2008/0001924 A1 | 1/2008 | dos los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |

(56) References Cited

U.S. PATENT DOCUMENTS

| | | |
|---|---|---|
| 2008/0066010 A1 | 3/2008 | Brodersen et al. |
| 2008/0094367 A1 | 4/2008 | Van De Ven et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0168395 A1 | 7/2008 | Ording et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204427 A1 | 8/2008 | Heesemans et al. |
| 2008/0219493 A1 | 9/2008 | Tadmor |
| 2008/0222569 A1 | 9/2008 | Champion et al. |
| 2008/0225007 A1 | 9/2008 | Nakadaira et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |
| 2008/0307359 A1 | 12/2008 | Louch et al. |
| 2008/0320419 A1 | 12/2008 | Matas et al. |
| 2009/0007017 A1 | 1/2009 | Anzures et al. |
| 2009/0037846 A1 | 2/2009 | Spalink et al. |
| 2009/0046110 A1 | 2/2009 | Sadler et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167704 A1 | 7/2009 | Terlizzi et al. |
| 2009/0169061 A1 | 7/2009 | Anderson et al. |
| 2009/0187824 A1 | 7/2009 | Hinckley et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293009 A1 | 11/2009 | Meserth et al. |
| 2009/0295739 A1 | 12/2009 | Nagara |
| 2009/0303187 A1 | 12/2009 | Pallakoff |
| 2009/0307583 A1 | 12/2009 | Tonisson |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0061637 A1 | 3/2010 | Mochizuki et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088639 A1 | 4/2010 | Yach et al. |
| 2010/0088654 A1 | 4/2010 | Henhoeffer |
| 2010/0110082 A1* | 5/2010 | Myrick .................. G06T 13/80 345/473 |
| 2010/0111434 A1 | 5/2010 | Madden |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0146507 A1 | 6/2010 | Kang et al. |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0225604 A1 | 9/2010 | Homma et al. |
| 2010/0231534 A1 | 9/2010 | Chaudhri et al. |
| 2010/0235726 A1 | 9/2010 | Ording et al. |
| 2010/0235746 A1 | 9/2010 | Anzures |
| 2010/0248787 A1 | 9/2010 | Smuga et al. |
| 2010/0251168 A1 | 9/2010 | Fujita et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0012851 A1 | 1/2011 | Ciesla et al. |
| 2011/0018695 A1 | 1/2011 | Bells et al. |
| 2011/0035145 A1 | 2/2011 | Yamasaki |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |

(56) References Cited

U.S. PATENT DOCUMENTS

| | | |
|---|---|---|
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0070342 A1 | 3/2011 | Wilkens |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0102340 A1 | 5/2011 | Martin et al. |
| 2011/0102829 A1 | 5/2011 | Jourdan |
| 2011/0107272 A1 | 5/2011 | Aquilar |
| 2011/0109617 A1 | 5/2011 | Snook et al. |
| 2011/0116716 A1 | 5/2011 | Kwon et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145752 A1 | 6/2011 | Fagans |
| 2011/0145753 A1 | 6/2011 | Prakash |
| 2011/0145759 A1 | 6/2011 | Leffert et al. |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0163978 A1 | 7/2011 | Park et al. |
| 2011/0164042 A1 | 7/2011 | Chaudhri |
| 2011/0167369 A1 | 7/2011 | van Os |
| 2011/0169765 A1 | 7/2011 | Aono |
| 2011/0175826 A1 | 7/2011 | Moore et al. |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0181751 A1 | 7/2011 | Mizumori |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0258537 A1 | 10/2011 | Rives et al. |
| 2011/0263298 A1 | 10/2011 | Park |
| 2011/0267530 A1 | 11/2011 | Chun |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0310049 A1 | 12/2011 | Homma et al. |
| 2012/0005622 A1 | 1/2012 | Park et al. |
| 2012/0007857 A1 | 1/2012 | Noda et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0013607 A1 | 1/2012 | Lee |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0144330 A1 | 6/2012 | Flint |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0158629 A1 | 6/2012 | Hinckley et al. |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0180001 A1 | 7/2012 | Griffin et al. |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0304108 A1 | 11/2012 | Jarrett et al. |

(56) References Cited

U.S. PATENT DOCUMENTS

| | | |
|---|---|---|
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0014057 A1 | 1/2013 | Reinpoldt et al. |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063364 A1 | 3/2013 | Moore |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbrook et al. |
| 2013/0074003 A1 | 3/2013 | Dolenc |
| 2013/0077804 A1 | 3/2013 | Glebe et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120280 A1 | 5/2013 | Kukulski |
| 2013/0120295 A1 | 5/2013 | Kim et al. |
| 2013/0120306 A1 | 5/2013 | Furukawa |
| 2013/0125039 A1 | 5/2013 | Murata |
| 2013/0135243 A1 | 5/2013 | Hirsch et al. |
| 2013/0135288 A1 | 5/2013 | King et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0194480 A1 | 8/2013 | Fukata et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222333 A1 | 8/2013 | Miles et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0293496 A1 | 11/2013 | Takamoto |
| 2013/0305184 A1 | 11/2013 | Kim et al. |
| 2013/0307790 A1 | 11/2013 | Konttori et al. |
| 2013/0307792 A1 | 11/2013 | Andres et al. |
| 2013/0314434 A1 | 11/2013 | Shetterly et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0335373 A1 | 12/2013 | Tomiyasu |
| 2013/0338847 A1 | 12/2013 | Lisseman et al. |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0062956 A1 | 3/2014 | Ishizone et al. |
| 2014/0063316 A1 | 3/2014 | Lee et al. |
| 2014/0063541 A1* | 3/2014 | Yamazaki ............ G06F 3/1204 358/1.15 |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0123080 A1 | 5/2014 | Gan |
| 2014/0139456 A1 | 5/2014 | Wigdor et al. |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0179377 A1 | 6/2014 | Song et al. |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |

(56) References Cited

U.S. PATENT DOCUMENTS

| | | |
|---|---|---|
| 2014/0223376 A1 | 8/2014 | Tarvainen et al. |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 * | 12/2014 | Matsuki ............... G02B 7/36 715/702 |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0067563 A1 | 5/2015 | Bernstein et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0085385 A1 | 3/2016 | Gao et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0124699 A1 | 5/2017 | Lane |
| 2017/0139565 A1 | 5/2017 | Choi |
| 2017/0315694 A1 | 11/2017 | Alonso Ruiz et al. |
| 2018/0024681 A1 | 1/2018 | Bernstein et al. |
| 2018/0188920 A1 | 7/2018 | Bernstein et al. |
| 2018/0275862 A1 | 9/2018 | Khoe et al. |
| 2018/0364883 A1 | 12/2018 | Khoe et al. |
| 2018/0364904 A1 | 12/2018 | Bernstein et al. |
| 2019/0004605 A1 | 1/2019 | Flint et al. |
| 2019/0018562 A1 | 1/2019 | Bernstein et al. |
| 2019/0042075 A1 | 2/2019 | Bernstein et al. |
| 2019/0042078 A1 | 2/2019 | Bernstein et al. |
| 2019/0065043 A1 | 2/2019 | Zambetti et al. |

(56) References Cited

U.S. PATENT DOCUMENTS

FOREIGN PATENT DOCUMENTS

| | | |
|---|---|---|
| CN | 101118469 A | 2/2008 |
| CN | 101202866 A | 6/2008 |
| CN | 101222704 A | 7/2008 |
| CN | 101241397 A | 8/2008 |
| CN | 101320303 A | 12/2008 |
| CN | 100524183 | 8/2009 |
| CN | 101498979 A | 8/2009 |
| CN | 101593077 A | 12/2009 |
| CN | 101604208 A | 12/2009 |
| CN | 101650615 A | 2/2010 |
| CN | 101809526 A | 8/2010 |
| CN | 101965549 A | 2/2011 |
| CN | 101998052 A | 3/2011 |
| CN | 102004593 A | 4/2011 |
| CN | 102112946 A | 6/2011 |
| CN | 102160021 A | 8/2011 |
| CN | 102214038 A | 10/2011 |
| CN | 102349038 A | 2/2012 |
| CN | 102385478 A | 3/2012 |
| CN | 102438092 A | 5/2012 |
| CN | 102460355 A | 5/2012 |
| CN | 102483677 A | 5/2012 |
| CN | 102646013 A | 8/2012 |
| CN | 102662571 A | 9/2012 |
| CN | 102662573 A | 9/2012 |
| CN | 102792255 A | 11/2012 |
| CN | 102841677 A | 12/2012 |
| CN | 103097992 A | 5/2013 |
| CN | 103186345 A | 7/2013 |
| CN | 103518176 A | 1/2014 |
| CN | 103793134 A | 5/2014 |
| CN | 103838465 A | 6/2014 |
| CN | 104024985 A | 9/2014 |
| CN | 104331239 A | 2/2015 |
| CN | 104392292 A | 3/2015 |
| CN | 101527745 A | 9/2015 |
| DE | 100 59 906 A1 | 6/2002 |
| EP | 0 859 307 A1 | 3/1998 |
| EP | 0 880 090 A2 | 11/1998 |
| EP | 1 028 583 A1 | 8/2000 |
| EP | 1 406 150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 077 490 A2 | 7/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 615 535 A1 | 7/2013 |
| EP | 2 631 737 A1 | 8/2013 |
| EP | 2 674 846 A2 | 12/2013 |
| EP | 2 708 985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 402 105 A | 12/2004 |
| JP | 58-182746 | 10/1983 |
| JP | H06-161647 A | 6/1994 |
| JP | H07-98769 A | 4/1995 |
| JP | H07-104915 | 4/1995 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2001-202192 A | 7/2001 |
| JP | 2001-222355 A | 8/2001 |
| JP | 2001-306207 A | 11/2001 |
| JP | 2002-044536 A | 2/2002 |
| JP | 2002-149312 A | 5/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-288208 A | 10/2004 |
| JP | 2005-031786 A | 2/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2005-352927 A | 12/2005 |
| JP | 2006-185443 A | 7/2006 |
| JP | 2007-116384 A | 5/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-516348 A | 5/2008 |
| JP | 2008-146453 A | 6/2008 |
| JP | 2008-191086 A | 8/2008 |
| JP | 2008-537615 | 9/2008 |
| JP | 2008 305174 A | 12/2008 |
| JP | 2009-500761 | 1/2009 |
| JP | 2009-110243 A | 5/2009 |
| JP | 2009-129171 A | 6/2009 |
| JP | 2009-211704 A | 9/2009 |
| JP | 2009-217543 A | 9/2009 |
| JP | 2009-294688 A | 12/2009 |
| JP | 2010-009321 A | 1/2010 |
| JP | 2010-503126 A | 1/2010 |
| JP | 2010-503130 A | 1/2010 |
| JP | 2010-05274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-198385 A | 9/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-170538 A | 9/2011 |
| JP | 2011-192179 A | 9/2011 |
| JP | 2011-192215 A | 9/2011 |
| JP | 2011-197848 A | 10/2011 |
| JP | 2011-221640 A | 11/2011 |
| JP | 2011-232947 A | 11/2011 |
| JP | 2011-242386 A | 12/2011 |

(56) References Cited

FOREIGN PATENT DOCUMENTS

| | | |
|---|---|---|
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053687 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-118825 A | 6/2012 |
| JP | 2012-118993 A | 6/2012 |
| JP | 2012-123564 A | 6/2012 |
| JP | 2012-128825 A | 7/2012 |
| JP | 2012-527685 A | 11/2012 |
| JP | 2013-030050 A | 2/2013 |
| JP | 2013-058149 A | 3/2013 |
| JP | 2013-080521 A | 5/2013 |
| JP | 2013-105410 A | 5/2013 |
| JP | 2013-529339 A | 7/2013 |
| JP | 2013-542488 A | 11/2013 |
| JP | 2014-504419 | 2/2014 |
| JP | 2014-130567 A | 7/2014 |
| JP | 2014-140112 A | 7/2014 |
| JP | 2014-519109 A | 8/2014 |
| JP | 2014-529137 A | 10/2014 |
| JP | 2015-099555 A | 5/2015 |
| JP | 2015-521315 A | 7/2015 |
| KR | 2006-0071353 A | 6/2006 |
| KR | 2008-0045143 A | 4/2008 |
| KR | 2008-0054346 A | 6/2008 |
| KR | 2010-0014095 A | 2/2010 |
| KR | 2010 0070841 A | 6/2010 |
| KR | 2010 0133246 A | 12/2010 |
| KR | 2011 0026176 A | 3/2011 |
| KR | 2011 0086501 A | 7/2011 |
| KR | 20120103670 A | 9/2012 |
| KR | 20120135723 A | 12/2012 |
| KR | 2013 0099647 A | 9/2013 |
| KR | 2014 0016495 A | 2/2014 |
| KR | 2014 0029720 A | 3/2014 |
| KR | 2014 0043760 A | 4/2014 |
| KR | 2014 0079110 A | 6/2014 |
| KR | 2014 0122000 A | 10/2014 |
| KR | 20150013263 A | 2/2015 |
| KR | 20150021977 A | 3/2015 |
| RU | 2007145218 A | 7/2009 |
| WO | WO 2005/106637 A2 | 11/2005 |
| WO | WO 2006/013485 A2 | 2/2006 |
| WO | WO 2006/042309 A1 | 4/2006 |
| WO | WO 2006/094308 A2 | 9/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/155981 A1 | 12/2009 |
| WO | WO 2009/158549 A2 | 12/2009 |
| WO | WO 2010/013876 A1 | 2/2010 |
| WO | WO 2010/032598 A1 | 2/2010 |
| WO | WO 2010/090010 A1 | 8/2010 |
| WO | WO 2010/122813 A1 | 10/2010 |
| WO | WO 2010/134729 A2 | 11/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/137946 A1 | 10/2012 |
| WO | WO 2012/150540 A2 | 11/2012 |
| WO | WO 2012/153555 A1 | 11/2012 |
| WO | WO 2013/022486 A1 | 2/2013 |
| WO | WO 2013/169299 A1 | 11/2013 |
| WO | WO 2013/169300 A1 | 11/2013 |
| WO | WO 2013/169302 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |

OTHER PUBLICATIONS

Anonymous, "Nokia 808 PureView screenshots", retrieved from Internet; no URL, Nov. 12, 2012, 8 pages.

Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.

Anonymous, "Notifications, Android 4.4 and Lower", Android Developers, https://developer.android.com/design/patterns/notifications_k.html, May 24, 2015, 9 pages.

Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.

Dzyre, "10 Android Notification Features You Can Fiddle With", http://www.hongkiat.com/blog/android-notification-features, Mar. 10, 2014, 10 pages.

Elliot, "Mac System 7", YouTube. Web. Mar. 8, 2017, http://www.youtube.com/watch?v=XLv22hfuuik, Aug. 3, 2011, 1 page.

Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.

Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.

Gardner, "Recenz—Recent Apps in One Tap", You Tube, https://www.youtube.com/watch?v-qailSHRgsTo, May 15, 2015, 1 page.

Gonzalo et al., "Zliding: Fluid Zooming and Sliding for High Precision Parameter Manipulation", Department of Computer Science, University of Toronto, Seattle, Washington, Oct. 23, 2005, 10 pages.

Grant, "Android's Notification Center", https://www.objc.io/issues/11-android/android-notifications, Apr. 30, 2014, 26 pages.

iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.

iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.

Kiener, "Force Touch on iPhone", https://www.youtube.com/watch?v=CEMmnsU5fC8, Aug. 4, 2015, 4 pages.

Kost, "LR3-Deselect All Images But One", Julieanne Kost's Blog, blogs.adobe.com/jkost/2011/12/lr3-deselect-all-images-but-one.html, Dec. 22, 2011, 1 page.

Kumar, "How to Enable Ripple Effect on Lock Screen of Galaxy S2", YouTube, http, http://www.youtube.com/watch?v+B9-4M5abLXA, Feb. 12, 2013, 3 pages.

(56) References Cited

OTHER PUBLICATIONS

Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Lumia—How to Personalize Your Start Screen", https://www.youtube.com/watch?v=6GI5Z3TrSEs, Nov. 11, 2014, 3 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Phonebuff, "How to Pair Bluetooth on the iPhone", https://www.youtube.com/watch?v=LudNwEar9A8, Feb. 8, 2012, 3 pages.
VGJFeIiz, "How to Master Android Lollipop Notifications in Four Minutes!", https://www.youtube.com/watch?v=S-zBRG7GJgs, Feb. 8, 2015, 5 pages.
Office Action, dated Mar. 15, 2017, received in U.S. Appl No. 14/535,671 (5448), 13 pages.
Office Action, dated Oct. 18, 2016, received in Australian Patent Application No. 2013368440 (5839AU), which corresponds with U.S. Appl. No. 14/536,426, 3 pages.
Notice of Allowance, dated Dec. 20, 2016, received in Australian Patent Application No. 2013368440 (5839AU), which corresponds with U.S. Appl. No. 14/536,426, 3 pages.
Office Action, dated Sep. 13, 2016, received in Japanese Patent Application No. 2015-547948 (5839JP), which corresponds with U.S. Appl. No. 14/536,426, 5 pages.
Office Action, dated Feb. 24, 2017, received in Korean Patent Application No. 10-2015-7018851 (5839KR), which corresponds with U.S. Appl. No. 14/536,426, 3 pages.
Office Action, dated Apr. 5, 2017, received in U.S. Appl. No. 14/536,367 (5841), 16 pages.
Certificate of Grant, dated Sep. 15, 2016, received in Australian Patent Australian Patent Application No. 2013259606 (5842AU), which corresponds with U.S. Appl. No. 14/536,426, 1 page.
Office Action, dated May 15, 2017, received in Australian Patent Application No. 2016216580 (5842AU02), which corresponds with U.S. Appl. No. 14/536,426, 3 pages.
Office Action, dated Jan. 20, 2017, received in European Patent Application No. 15183980.0 (5842EP01), which corresponds with U.S. Appl. No. 14/536,426, 5 pages.
Office Action, dated Feb. 6, 2017, received in Japanese Patent Application No. 2015-511644 (5842JP), which corresponds with U.S. Appl. No. 14/536,426, 6 pages.
Office Action, dated Mar. 9, 2017, received in U.S. Appl. No. 14/536,464 (5843), 21 pages.
Office Action, dated Jan. 3, 2017, received in Australian Patent Application No. 2016201451 (5845AU01), which corresponds with U.S. Appl. No. 14/608,926, 3 pages.
Office Action, dated May 4, 2017, received in Chinese Patent Application No. 201380068414.1 (5845CN), which corresponds with U.S. Appl. No. 14/608,926, 5 pages.
Office Action, dated Nov. 11, 2016, received in European Patent Application No. 13795392.3 (5845EP), which corresponds with U.S. Appl. No. 14/608,926, 6 pages.
Notice of Allowance, dated Jan. 17, 2017, received in Japanese Patent Application No. 2015-549392 (5845JP), which corresponds with U.S. Appl. No. 14/608,926, 2 pages.
Patent, dated Feb. 17, 2017, received in Japanese Patent Application No. 2015-549392 (5845JP), which corresponds with U.S. Appl. No. 14/608,926, 3 pages.
Notice of Allowance, dated Mar. 31, 2017, received in Korean Patent Application No. 2015-7018853 (5845KR), which corresponds with U.S. Appl. No. 14/608,926, 4 pages.
Office Action, dated Dec. 1, 2016, received in Chinese Patent Application No. 2013800362059 (5846CN), which corresponds with U.S. Appl. No. 14/536,646, 3 pages.
Notice of Allowance, dated Jan. 4, 2017, received in European Patent Application No. 13724102.2 (5846EP), which corresponds with U.S. Appl. No. 14/536,646, 5 pages.
Patent, dated May 26, 2017, received in European Patent Application No. 13724102.2 (5846EP), which corresponds with U.S. Appl. No. 14/536,646, 1 page.
Notice of Allowance, dated Dec. 22, 2016, received in Japanese Patent Application No. 2015-511645 (5846JP), which corresponds with U.S. Appl. No. 14/536,646, 2 pages.
Office Action, dated Apr. 3, 2017, received in U.S. Appl. No. 14/536,141 (5847), 11 pages.
Office Action, dated Mar. 3, 2017, received in Chinese Patent Application No. 201380035893.7 (5847CN), which corresponds with U.S. Appl. No. 14/536,646, 8 pages.
Office Action, dated Aug. 31, 2016, received in European Patent Application No. 13726053.5 (5847EP), which corresponds with U.S. Appl. No. 14/536,141, 10 pages.
Office Action, dated Oct. 25, 2016, received in Japanese Patent Application No. 2015-511646 (5847JP), which corresponds with U.S. Appl. No. 14/536,141, 6 pages.
Office Action, dated Dec. 8, 2016, received in U.S. Appl. No. 14/608,942 (5848), 9 pages.
Notice of Allowance, dated May 12, 2017, received in U.S. Appl. No. 14/608,942 (5848), 10 pages.
Office Action, dated Mar. 29, 2017, received in Australian patent Application No. 2016201303 (5848AU01), which corresponds with U.S. Appl. No. 14/608,942, 3 pages.
Office Action, dated Oct. 7, 2016, received in European Patent Application No. 13798464.7 (5848EP), which corresponds with U.S. Appl. No. 14/608,942, 7 pages.
Notice of Allowance, dated May 12, 2017, received in Japanese Patent Application No. 2015-549393, (5848JP) which corresponds with U.S. Appl. No. 14/608,942, 5 pages.
Office Action, dated Feb. 24, 2017, received in Korean Patent Application No. 2015-7018448 (5848KR), which corresponds with U.S. Appl. No. 14/608,942, 4 pages.
Notice of Allowance, dated Feb. 1, 2017, received in U.S. Appl. No. 14/536,203 (5850), 9 pages.
Certificate of Grant, dated Oct. 21, 2016, received in Australian Patent Application No. 2013259630 (5850AU), which corresponds with U.S. Appl. No. 14/536,203, 3 pages.
Certificate of Patent, dated Sep. 9, 2016, received in Japanese Patent Application No. 2015-511650 (5850JP), which corresponds with U.S. Appl. No. 14/536,203, 3 pages.
Notice of Allowance, dated Sep. 1, 2016, received in Korean Patent Application No. 2014-7034520 (5850KR), which corresponds with U.S. Appl. No. 14/536,203, 5 pages.
Office Action, dated Feb. 6, 2017, received in Korean Patent Application No. 2016-7033834 (5850KR01), which corresponds with U.S. Appl. No. 14/536,203, 4 pages.
Office Action, dated Oct. 20, 2016, received in U.S. Appl. No. 14/536,247 (5852), 10 pages.
Final Office Action, dated Mar. 24, 2017, received in U.S. Appl. No. 14/536,247 (5852), 14 pages.
Office Action, dated Mar. 24, 2017, received in U.S. Appl. No. 14/536,267 (5853), 12 pages.
Certificate of Grant, dated Oct. 21, 2016, received in Australian Patent Application No. 2013259637 (5853AU), which corresponds with U.S. Appl. No. 14/536,267, 3 pages.
Office Action, dated Mar. 24, 2017, received in Australian Patent Application No. 2016204411 (5853AU01), which corresponds with U.S. Appl. No. 14/536,267, 3 pages.
Office Action, dated Dec. 9, 2016, received in Chinese Patent Application No. 2016120601564130 (5853CN), which corresponds with U.S. Appl. No. 14/536,267, 4 pages.
Notice of Allowance, dated Sep. 26, 2016, received in Japanese Patent Application No. 2015-511652 (5853JP), which corresponds with U.S. Appl. No. 14/536,267, 5 pages.
Office Action, dated Mar. 3, 2017, received in Japanese Patent Application No. 2016-125839 (5853JP01), which corresponds with U.S. Appl. No. 14/536,267, 6 pages.

(56) References Cited

OTHER PUBLICATIONS

Notice of Allowance, dated Sep. 1, 2016, received in Korean Patent Application No. 2014-7034530 (5853KR), which corresponds with U.S. Appl. No. 14/536,267, 3 pages.
Office Action, dated Jan. 5, 2017, received in Korean Patent Application No. 2016-7029533 (5853KR01), which corresponds with U.S. Appl. No. 14/536,267, 2 pages.
Office Action, dated Apr. 7, 2017, received in U.S. Appl. No. 14/536,291 (5854), 11 pages.
Innovation Patent, dated Sep. 1, 2016, received in Australian Patent Application No. 2016101481 (5854AU02), which corresponds with U.S. Appl. No. 14/536,291, 1 page.
Office Action, dated Sep. 29, 2016, received in Australian Patent Application No. 2016101481 (5854AU02), which corresponds with U.S. Appl. No. 14/536,291, 3 pages.
Office Action, dated Mar. 23, 2017, received in European Patent Application No. 13724107.1 (5854EP), which corresponds with U.S. Appl. No. 14/536,291, 8 pages.
Final Office Action, dated Dec. 22, 2016, received in Japanese Patent Application No. 2015-511655 (5854JP), which corresponds with U.S. Appl. No. 14/536,291, 3 pages.
Notice of Allowance, dated Jan. 18, 2017, received in Australian Patent Application No. 2013368445 (5855AU), which corresponds with U. S. Appl. No. 14/608,985, 3 pages.
Office Action, dated May 19, 2017, received in Chinese Patent Application No. 201380068399.0 (5855CN), which corresponds with U.S. Appl. No. 14/608,985, 5 pages.
Office Action, dated Feb. 27, 2017, received in European Patent Application No. 13811032.5 (5855EP), which corresponds with U.S. Appl. No. 14/608,985, 6 pages.
Notice of Allowance, dated Jan. 24, 2017, received in Japanese Patent Application No. 2015-550384 (5855JP), which corresponds with U.S. Appl. No. 14/608,985, 5 pages.
Patent, dated Feb. 24, 2017, received in Japanese Patent Application No. 2015-550384 (5855JP), which corresponds with U.S. Appl. No. 14/608,985, 2 pages.
Office Action, dated Nov. 4, 2016, received in Korean Patent Application No. 10-2015-7019984 (5855KR), which corresponds with U.S. Appl. No. 14/608,985, 8 pages.
Office Action, dated Mar. 24, 2017, received in U.S. Appl. No. 14/609,006 (5856), 13 pages.
Office Action, dated Apr. 19, 2017, received in U.S. Appl. No. 14/536,296 (5857), 12 pages.
Office Action, dated Jan. 19, 2017, received in U.S. Appl. No. 14/609,042 (5859), 12 pages.
Notice of Allowance, dated Feb. 27, 2017, received in U.S. Appl. No. 14/864,737 (7246), 9 pages.
Office Action, dated May 15, 2017, received in Japanese Patent Application No. 2016-558331 (7246JP), which corresponds with U.S. Appl. No. 14/864,737, 5 pages.
Office Action, dated May 18, 2017, received in Dutch Patent Application No. 2016452 (7246NL), which corresponds with U.S. Appl. No. 14/864,737, 22 pages.
Notice of Allowance, dated Oct. 24, 2016, received in U.S. Appl. No. 14/866,981 (7247), 7 pages.
Notice of Allowance, dated Feb. 10, 2017, received in U.S. Appl. No. 14/866,981 (7247), 5 pages.
Patent, dated Nov. 2, 2016, received in Australian Patent Application No. 2016100254 (7247AU), which corresponds with U.S. Appl. No. 14/866,981, 1 page.
Patent, dated Sep. 28, 2016, received in Chinese Patent Application No. 201620176169.7 (7247CN01), which corresponds with U.S. Appl. No. 14/866,981, 4 pages.
Office Action, dated Dec. 5, 2016, received in Danish Patent Application No. 201500575 (7247DK), which corresponds with U.S. Appl. No. 14/866,981, 3 pages.
Office Action, dated Jul. 5, 2016, received in Chinese Patent Application No. 201620186008.6 (7265CN01), which corresponds with U.S. Appl. No. 14/866,159, 3 pages.

Office Action, dated Sep. 27, 2016, received in Danish Patent Application No. 201500574 (7265DK), which corresponds with U.S. Appl. No. 14/866,159, 4 pages.
Office Action, dated Mar. 14, 2017, received in Danish Patent Application No. 201500574 (7265DK), which corresponds with U.S. Appl. No. 14/866,159, 5 pages.
Office Action, dated Oct. 12, 2016, received in Australian Patent Application No. 2016101201 (7267AU01), which corresponds with U.S. Appl. No. 14/686,078, 3 pages.
Notice of Allowance, dated Oct. 1, 2016, received in Chinese Patent Application No. 201620175847.8 (7267CN01), which corresponds with U.S. Appl. No. 14/686,078, 1 page.
Office Action, dated Sep. 2, 2016, received in Danish Patent Application No. 201500588 (7267DK), which corresponds with U.S. Appl. No. 14/868,078, 4 pages.
Notice of Allowance, dated Jan. 30, 2017, received in received in Danish Patent Application No. 201500588 (7267DK), which corresponds with U.S. Appl. No. 14/868,078, 2 pages.
Notice of Allowance, dated May 2, 2017, received in received in Danish Patent Application No. 201500588 (7267DK), which corresponds with U.S. Appl. No. 14/868,078, 2 pages.
Office Action, dated May 18, 2017, received in Dutch Patent Application No. 2016376 (7267NL), which corresponds with U.S. Appl. No. 14/868,078, 15 pages.
Notice of Allowance, dated Nov. 14, 2016, received in U.S. Appl. No. 14/863,432 (7270), 7 pages.
Notice of Allowance, dated Apr. 27, 2017, received in U.S. Appl. No. 14/863,432 (7270), 7 pages.
Notice of Allowance, dated Jan. 12, 2017, received in Chinese Patent Application No. 201620470063.8 (7270CN01), which corresponds with U.S. Appl. No. 14/863,432, 1 page.
Office Action and Additional Search Report, dated Oct. 7, 2016, received in Danish Patent Application No. 201500582 (7270DK), which corresponds with U.S. Appl. No. 14/863,432, 6 pages.
Office Action, dated May 18, 2017, received in Dutch Patent Application No. 2016801 (7270NL), which corresponds with U.S. Appl. No. 14/863,432, 34 pages.
Office Action, dated Oct. 13, 2016, received in U.S. Appl. No. 14/866,511 (7294), 27 pages.
Final Office Action, dated Jan. 27, 2017, received in U.S. Appl. No. 14/866,511 (7294), 26 pages.
Notice of Allowance, dated Jan. 12, 2017, received in Chinese Patent Application No. 201620470281.1 (7294CN01), which corresponds with U.S. Appl. No. 14/866,511, 1 page.
Patent, dated Jan. 23, 2017, received in Danish Patent Application No. 201500576 (7294DK), which corresponds with U.S. Appl. No. 14/866,511, 3 pages.
Office Action, dated Jun. 9, 2017, received in Japanese Patent Application No. 2016558214 (7294JP), which corresponds with U.S. Appl. No. 14/866,511, 6 pages.
Final Office Action, dated Sep. 16, 2016, received in U.S. Appl. No. 14/866,489 (7298), 24 pages.
Notice of Allowance, dated Apr. 27, 2017, received in U.S. Appl. No. 16/866,489 (7298), 27 pages.
Final Office Action, dated Sep. 2, 2016, received in U.S. Appl. No. 14/869,899 (7309), 22 pages.
Notice of Allowance, dated Feb. 28, 2017, received in U.S. Appl. No. 14/869,899 (7309), 9 pages.
Innovation Patent, dated Aug. 25, 2016, received in Australian Patent Application No. 2016101438 (7309AU), which corresponds with U.S. Appl. No. 14/869,899, 1 page.
Certificate of Examination, dated Oct. 11, 2016, received in Australian Patent Application No. 2016101438 (7309AU), which corresponds with U.S. Appl. No. 14/869,899, 1 page.
Office Action, dated Oct. 7, 2016, received in Danish Patent Application No. 201500592 (7309DK), which corresponds with U.S. Appl. No. 14/869,899, 6 pages.
Office Action, dated Nov. 22, 2016, received in Danish Patent Application No. 201670594 (7309DK01), which corresponds with U.S. Appl. No. 14/869,899, 9 pages.
Office Action, dated Apr. 13, 2017, received in U.S. Appl. No. 14/866,992 (7310), 34 pages.

(56) References Cited

OTHER PUBLICATIONS

Innovation Patent, dated Sep. 22, 2016, received in Australian Patent Application No. 2016101418 (7310AU), which corresponds with U.S. Appl. No. 14/866,992, 1 page.
Office Action, dated Nov. 22, 2016, received in Australian Patent Application No. 2016101418 (7310AU), which corresponds with U.S. Appl. No. 14/866,992, 7 pages.
Office Action, dated Feb. 7, 2017, received in Australian Patent Application No. 2016101418 (7310AU), which corresponds with U.S. Appl. No. 14/866,992, 5 pages.
Office Action, dated Feb. 6, 2017, received in Danish Patent Application No. 201500593 (7310DK), which corresponds with U.S. Appl. No. 14/866,992, 4 pages.
Notice of Allowance, dated Jan. 4, 2017, received in U.S. Appl. No. 14/845,217 (7314), 5 pages.
Office Action, dated May 2, 2017, received in U.S. Appl. No. 14/856,517 (7317), 34 pages.
Office Action, dated May 18, 2017, received in U.S. Appl. No. 14/856,519 (7318), 35 pages.
Office Action, dated Jun. 9, 2017, received in U.S. Appl. No. 14/856,520 (7319), 36 pages.
Notice of Allowance, dated Oct. 24, 2016, received in U.S. Appl. No. 14/857,645 (7321), 6 pages.
Office Action, dated Mar. 31, 2017, received in U.S. Appl. No. 14/857,700 (7324), 14 pages.
Notice of Allowance, dated Dec. 28, 2016, received in U.S. Appl. No. 14/864,580 (7330), 8 pages.
Notice of Allowance, dated Nov. 8, 2016, received in Chinese Patent Application No. 201620470247.4 (7330CN01), which corresponds with U.S. Appl. No. 14/864,580, 3 pages.
Certificate of Registration, dated Oct. 14, 2016, received in German Patent Application No. 20201600003234.9 (7330DE), which corresponds with U.S. Appl. No. 14/864,580, 3 pages.
Office Action, dated Oct. 7, 2016, received in Danish Patent Application No. 201500584 (7330DK), which corresponds with U.S. Appl. No. 14/864,580, 3 pages.
Office Action, dated May 5, 2017, received in Danish Patent Application No. 201500584 (7330DK), which corresponds with U.S. Appl. No. 14/864,580, 3 pages.
Notice of Allowance, dated Nov. 23, 2016, received in U.S. Appl. No. 14/864,601 (7331), 12 pages.
Notice of Allowance, dated Apr. 20, 2017, received in U.S. Appl. No. 14/864,601 (7331), 13 pages.
Notice of Allowance, dated Jan. 31, 2017, received in U.S. Appl. No. 14/864,627 (7332), 7 pages.
Office Action, dated Oct. 7, 2016, received in Danish Patent Application No. 201500585 (7332DK), which corresponds with U.S. Appl. No. 14/864,627, 3 pages.
Office Action, dated May 4, 2017, received in Danish Patent Application No. 201500585 (7332DK), which corresponds with U.S. Appl. No. 14/864,627, 4 pages.
Certificate of Examination, dated Dec. 8, 2016, received in Australian Patent Application No. 2016100292 (7334AU), which corresponds with U.S. Appl. No. 14/866,361, 1 page.
Office Action, dated Oct. 28, 2016, received in Danish Patent Application No. 201500579 (7334DK), which corresponds with U.S. Appl. No. 14/866,361, 3 pages.
Office Action, dated Oct. 19, 2016, received in Chinese Patent Application No. 2016201470246.X (7335CN01), which corresponds with U.S. Appl. No. 14/866,987, 4 pages.
Patent, dated May 3, 2017, received in Chinese Patent Application No. 2016201470246.X (7335CN01), which corresponds with U.S. Appl. No. 14/866,987, 2 pages.
Patent, dated Sep. 19, 2016, received in German Patent Application No. 202016002908.9 (7335DE), which corresponds with U.S. Appl. No. 14/866,987, 3 pages.
Notice of Allowance, dated Nov. 1, 2016, received in Danish Patent Application No. 201500587 (7335DK), which corresponds with U.S. Appl. No. 14/866,987, 2 pages.

Office Action and Search Report, dated Sep. 9, 2016, received in Danish Patent Application No. 201670463 (7335DK01), which corresponds with U.S. Appl. No. 14/866,987, 7 pages.
Office Action, dated Jan. 31, 2017, received in Danish Patent Application No. 201670463 (7335DK01), which corresponds with U.S. Appl. No. 14/866,987, 3 pages.
Office Action, dated Apr. 19, 2017, received in Danish Patent Application No. 201670463 (7335DK01), which corresponds with U.S. Appl. No. 14/866,987, 3 pages.
Notice of Allowance, dated Nov. 1, 2016, received in Danish Patent Application No. 201500589 (7336DK), which corresponds with U.S. Appl. No. 14/866,989, 2 pages.
Final Office Action, dated Nov. 4, 2016, received in U.S. Appl. No. 14/871,236 (7337), 24 pages.
Notice of Allowance, dated Feb. 28, 2017, received in U.S. Appl. No. 14/871,236 (7337), 9 pages.
Innovation Patent, dated Aug. 25, 2016, received in Australian Patent Application No. 2016101433 (7337AU), which corresponds with U.S. Appl. No. 14/871,236, 1 page.
Office Action, dated Oct. 14, 2016, received in Australian Patent Application No. 2016101433 (7337AU), which corresponds with U.S. Appl. No. 14/871,236, 3 pages.
Office Action and Additional Search Report, dated Sep. 30, 2016, received in Danish Patent Application No. 201500595 (7337DK), which corresponds with U.S. Appl. No. 14/871,236, 10 pages.
Innovation Patent, dated Aug. 25, 2016, received in Australian Patent Application No. 2016101436 (7339AU), which corresponds with U.S. Appl. No. 14/871,236, 1 pages.
Office Action, dated Oct. 31, 2016, received in Australian Patent Application No. 2016101438 (7339AU), which corresponds with U.S. Appl. No. 14/871,236, 6 pages.
Office Action, dated Oct. 17, 2016, received in Australian Patent Application No. 2016203040 (7341AU), which corresponds with U.S. Appl. No. 14/871,227, 7 pages.
Office Action, dated Oct. 18, 2016, received in Australian Patent Application No. 2016101431 (7341AU01), which corresponds with U.S. Appl. No. 14/871,227, 3 pages.
Office Action, dated Apr. 13, 2017, received in Australian Patent Application No. 2016101431 (7341AU01), which corresponds with U.S. Appl. No. 14/871,227, 4 pages.
Patent, dated Sep. 26, 2016, received in Danish Patent Application No. 201500597 (7341DK), which corresponds with U.S. Appl. No. 14/871,227, 7 pages.
Office Action, dated Mar. 24, 2017, received in Japanese Patent Application No. 2016-533201 (7341JP), which corresponds with U.S. Appl. No. 14/871,227, 6 pages.
Office Action, dated Oct. 14, 2016, received in Australian Patent Application No. 2016101437 (7342AU), which corresponds with U.S. Appl. No. 14/871,336, 2 pages.
Office Action, dated Apr. 11, 2017, received in Australian Patent Application No. 2016101437 (7342AU), which corresponds with U.S. Appl. No. 14/871,336, 4 pages.
Office Action, dated Oct. 18, 2016, received in Danish Patent Application No. 201500601 (7342DK), which corresponds with U.S. Appl. No. 14/871,336, 3 pages.
Notice of Allowance, dated Mar. 23, 2017, received in Danish Patent Application No. 201500601 (7342DK), which corresponds with U.S. Appl. No. 14/871,336, 2 pages.
Innovation Patent, dated Aug. 25, 2016, received in Australian Patent Application No. 2016101435 (7343AU), which corresponds with U.S. Appl. No. 14/871,462, 1 page.
Office Action, dated Oct. 4, 2016, received in Australian Patent Application No. 2016101435 (7343AU), which corresponds with U.S. Appl. No. 14/871,462, 3 pages.
Office Action, dated Oct. 4, 2016, received in Australian Patent Application No. 2016231505 (7343AU01), which corresponds with U.S. Appl. No. 14/871,462, 3 pages.
Office Action, dated Apr. 20, 2017, received in Chinese Patent Application No. 201621044346.2 (7343CN01), which corresponds with U.S. Appl. No. 14/871,462, 3 pages.
Grant, dated Aug. 30, 2016, received in Danish Patent Application No. 201500600 (7343DK), which corresponds with U.S. Appl. No. 14/871,462, 2 pages.

(56) References Cited

OTHER PUBLICATIONS

Office Action, dated Mar. 13, 2017, received in Japanese Patent Application No. 2016-183289 (7343JP), which corresponds with U.S. Appl. No. 14/871,462, 5 pages.
Final Office Action, dated Sep. 28, 2016, received in U.S. Appl. No. 14/867,823 (7344), 31 pages.
Office Action, dated May 11, 2017, received in U.S. Appl. No. 14/867,823 (7344), 42 pages.
Office Action, dated Sep. 7, 2016, received in Danish Patent Application No. 201500594 (7344DK), which corresponds with U.S. Appl. No. 14/867,823, 4 pages.
Office Action, dated May 15, 2017, received in Danish Patent Application No. 201500594 (7344DK), which corresponds with U.S. Appl. No. 14/867,823, 4 pages.
Final Office Action, dated Nov. 2, 2016, received in U.S. Appl. No. 14/867,892 (7345), 48 pages.
Office Action, dated Sep. 14, 2016, received in Danish Patent Application No. 201500598 (7345DK), which corresponds with U.S. Appl. No. 14/867,892, 4 pages.
Office Action, dated May 4, 2017, received in Danish Patent Application No. 201500598 (7345DK), which corresponds with U.S. Appl. No. 14/867,892, 4 pages.
Office Action, dated Mar. 1, 2017, received in U.S. Appl. No. 14/869,855 (7347), 14 pages.
Office Action, dated Feb. 9, 2017, received in U.S. Appl. No. 14/869,873 (7348), 17 pages.
Office Action, dated Jul. 5, 2016, received in Chinese Patent Application No. 201620176221.9 (73520N01), which corresponds with U.S. Appl. No. 14/867,990, 4 pages.
Office Action, dated Oct. 25, 2016, received in Chinese Patent Application No. 201620176221.9 (7352CN01), which corresponds with U.S. Appl. No. 14/867,990, 7 pages.
Office Action, dated Sep. 26, 2016, received in Danish Patent Application No. 201500581 (7352DK), which corresponds with U.S. Appl. No. 14/867,990, 5 pages.
Office Action, dated May 3, 2017, received in Danish Patent Application No. 201500581 (7352DK), which corresponds with U.S. Appl. No. 14/867,990, 5 pages.
Office Action, dated Nov. 25, 2016, received in U.S. Appl. No. 15/081,771 (7398), 17 pages.
Final Office Action, dated Jun. 2, 2017, received in U.S. Appl. No. 15/081,771 (7398), 17 pages.
Final Office Action, dated May 1, 2017, received in U.S. Appl. No. 15/136,782 (7399), 18 pages.
Office Action, dated May 23, 2017, received in Danish Patent Application No. 201770190 (7399DK), which corresponds with U.S. Appl. No. 15/136,782, 7 pages.
Office Action, dated Jan. 20, 2017, received in U.S. Appl. No. 15/231,745 (7403), 21 pages.
Office Action and Search Report, dated Oct. 17, 2016, received in Danish Patent Application No. 201670587 (7403DK), which corresponds with U.S. Appl. No. 15/231,745, 9 pages.
Office Action (Search Report), dated Dec. 14, 2016, received in Danish Patent Application No. 201670590 (7403DK01), which corresponds with U.S. Appl. No. 15/231,745, 9 pages.
Office Action (Search Report), dated Nov. 10, 2016, received in Danish Patent Application No. 201670591 (7403DK02), which corresponds with U.S. Appl. No. 15/231,745, 12 pages.
Office Action and Search Report, dated Oct. 26, 2016, received in Danish Patent Application No. 201670592 (7403DK03), which corresponds with U.S. Appl. No. 15/231,745, 8 pages.
Office Action, dated Jan. 5, 2017, received in Danish Patent Application No. 201670592 (7403DK03), which corresponds with U.S. Appl. No. 15/231,745, 3 pages.
Office Action and Search Report, dated Oct. 12, 2016, received in Danish Patent Application No. 201670593 (7403DK04), which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.

Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Jun. 8, 2017, received in European Patent Application No. 16189425.8, which corresponds with U.S. Appl. No. 14/866,989, 8 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
MacKenzie et al., "The Tactile Touchpad", Chi '97 Extended Abstracts on Human Factors in Computing Systems Looking to the Future, Chi '97, Mar. 22, 1997, 5 pages.
YouTube, "Android Lollipop Lock-Screen Notification Tips", https://www.youtube.com/watch?v=LZTxHBOwzIU, Nov. 13, 2014, 3 pages.
Final Office Action, dated Feb. 22, 2018, received in U.S. Appl. No. 14/608,895 (5839), 20 pages.
Office Action, dated Mar. 9, 2018, received in European Patent Application No. 13795391.5 (5839EP), which corresponds with U.S. Appl. No. 14/536,426, 4 pages.
Final Office Action, dated Feb. 26, 2018, received in U.S. Appl. No. 14/536,235 (5840), 13 pages.
Office Action, dated Mar. 9, 2018, received in European Patent Application No. 15183980.0 (5842EP01), which corresponds with U.S. Appl. No. 14/536,426, 5 pages.
Patent, dated Jan. 12, 2018, received in Japanese Patent Application No. 2015-511644 (5842JP), which corresponds with U.S. Appl. No. 14/536,426, 3 pages.
Office Action, dated Feb. 12, 2018, received in U.S. Appl. No. 14/536,464 (5843), 33 pages.
Notice of Allowance, dated Feb. 8, 2018, received in Chinese Patent Application No. 201380068414.1 (5845CN), which corresponds with U.S. Appl. No. 14/608,926, 2 pages.
Oral Summons, dated Feb. 13, 2017, received in European Patent Application No. 13795392.3 (5845EP), which corresponds with U.S. Appl. No. 14/608,926, 11 pages.
Office Action, dated Feb. 2, 2018, received in Chinese Patent Application No. 201380035893.7 (5847CN), which corresponds with U.S. Appl. No. 14/536,141, 5 pages.
Office Action, dated Mar. 7, 2018, received in Australian patent Application No. 2016201303 (5848AU01), which corresponds with U.S. Appl. No. 14/608,942, 3 pages.

(56) References Cited

OTHER PUBLICATIONS

Notice of Allowance, dated Feb. 28, 2018, received in U.S. Appl. No. 14/536,166 (5849), 5 pages.
Patent, dated Feb. 16, 2018, received in Japanese Patent Application No. 2016173113 (5850JP01), which corresponds with U.S. Appl. No. 14/536,203, 3 pages.
Patent, dated Jan. 23, 2018, received in Korean Patent Application No. 2016-7033834 (5850KR01), which corresponds with U.S. Appl. No. 14/536,203, 4 pages.
Notice of Acceptance, dated Feb. 27, 2018, received in Australian Patent Application No. 2016204411 (5853AU01), which corresponds with U.S. Appl. No. 14/536,267, 3 pages.
Notice of Allowance, dated Jan. 29, 2018, received in Chinese Patent Application No. 201380035968.1 (5853CN), which corresponds with U.S. Appl. No. 14/536,267, 3 pages.
Office Action, dated Jan. 25, 2018, received in European Patent Application No. 13724106.3 (5853EP), which corresponds with U.S. Appl. No. 14/536,267, 5 pages.
Office Action, dated Mar. 20, 2018, received in U.S. Appl. No. 14/609,006 (5856), 13 pages.
Notice of Allowance, dated Mar. 14, 2018, received in U.S. Appl. No. 14/536,296 (5857), 8 pages.
Office Action, dated Feb. 14, 2018, received in Korean Patent Application No. 2017-7030129 (7246KR), which corresponds with U.S. Appl. No. 14/864,737, 17 pages.
Patent, Nov. 16, 2017, received in Dutch Patent Application No. 2016375 (7247NL), which corresponds with U.S. Appl. No. 14/866,981, 2 pages.
Notice of Allowance, dated Mar. 21, 2018, received in Danish Patent Application No. 201500574 (7265DK), which corresponds with U.S. Appl. No. 14/866,159, 2 pages.
Certificate of Grant, dated Jan. 3, 2018, received in Australian Patent Application No. 2016229421 (7267AU02), which corresponds with U.S. Appl. No. 14/868,078, 1 page.
Office Action, dated Jan. 29, 2018, received in Danish Patent Application No. 201500592 (7309DK), which corresponds with U.S. Appl. No. 14/869,899, 2 pages.
Office Action, dated Jan. 29, 2018, received in U.S. Appl. No. 14/866,992 (7310), 44 pages.
Office Action, dated Feb. 12, 2018, received in U.S. Appl. No. 15/009,661 (7311), 36 pages.
Office Action, dated Mar. 13, 2018, received in U.S. Appl. No. 15/009,688 (7313), 10 pages.
Notice of Allowance, dated Jan. 31, 2018, received in U.S. Appl. No. 14/856,519 (7318), 9 pages.
Final Office Action, dated Nov. 16, 2017, received in U.S. Appl. No. 14/856,520 (7319), 41 pages.
Notice of Allowance, dated Feb. 9, 2018, received in U.S. Appl. No. 14/856,522 (7320), 9 pages.
Notice of Allowance, dated Feb. 12, 2018, received in U.S. Appl. No. 14/857,700 (7324), 13 pages.
Notice of Allowance, dated Mar. 16, 2018, received in Danish Patent Application No. 201500579 (7334DK), which corresponds with U.S. Appl. No. 14/866,361, 2 pages.
Notice of Allowance, dated Mar. 6, 2018, received in Japanese Patent Application No. 2017-126445 (7335JP01), which corresponds with U.S. Appl. No. 14/866,987, 5 pages.
Office Action, dated Feb. 26, 2018, received in Australian Patent Application No. 2017201079 (7336AU02), which corresponds with U.S. Appl. No. 14/866,989, 6 pages.
Notice of Allowance, dated Feb. 5, 2018, received in Japanese Patent Application No. 2016-233450 (7336JP), which corresponds with U.S. Appl. No. 14/866,989, 5 pages.
Office Action, dated Jan. 29, 2018, received in Danish Patent Application No. 201500595 (7337DK), which corresponds with U.S. Appl. No. 14/871,236, 2 pages.
Final Office Action, dated Mar. 9, 2018, received in U.S. Appl. No. 14/870,754 (7338), 19 pages.
Patent, dated Jan. 29, 2018, received in Danish Patent Application No. 201500596 (7339DK), which corresponds with U.S. Appl. No. 14/870,882, 4 pages.
Final Office Action, dated Feb. 16, 2018, received in U.S. Appl. No. 14/870,988 (7340), 18 pages.
Patent, dated Feb. 9, 2018, received in Japanese Patent Application No. 2016-533201 (7341JP), which corresponds with U.S. Appl. No. 14/871,227, 4 pages.
Office Action, dated Feb. 20, 2018, received in Korean Patent Application No. 2016-7019816 (7341KR), which corresponds with U.S. Appl. No. 14/871,227, 8 pages.
Final Office Action, dated Mar. 15, 2018, received in U.S. Appl. No. 14/871,336 (7342), 23 pages.
Patent, dated Oct. 30, 2017, Danish Patent Application No. 201500601 (7342DK), which corresponds with U.S. Appl. No. 14/871,336, 5 pages.
Office Action, dated Jan. 23, 2018, received in Danish Patent Application No. 201500594 (7344DK), which corresponds with U.S. Appl. No. 14/867,823, 8 pages.
Notice of Allowance, dated Jan. 26, 2018, received in Danish Patent Application No. 201500598 (7345DK), which corresponds with U.S. Appl. No. 14/867,892, 2 pages.
Office Action, dated Feb. 28, 2018, received in U.S. Appl. No. 14/869,261 (7346), 26 pages.
Office Action, dated Feb. 19, 2018, received in Danish Patent Application No. 201500581 (7352DK), which corresponds with U.S. Appl. No. 14/867,990, 4 pages.
Office Action, dated Feb. 1, 2018, received in Australian Patent Application No. 2017202058 (7398AU), which corresponds with U.S. Appl. No. 15/081,771, 4 pages.
Office Action, dated Jan. 26, 2018, received in Japanese Patent Application No. 2017-086460 (7398JP), which corresponds with U.S. Appl. No. 15/081,771, 6 pages.
Notice of Allowance, dated Mar. 19, 2018, received in Danish Patent Application No. 201770190 (7399DK), which corresponds with U.S. Appl. No. 15/136,782, 2 pages.
Office Action, dated Feb. 22, 2018, received in Danish Patent Application No. 201670587 (7403DK), which corresponds with U.S. Appl. No. 15/231,745, 4 pages.
Office Action, dated Jan. 30, 2018, received in Danish Patent Application No. 201670592 (7403DK03), which corresponds with U.S. Appl. No. 15/231,745, 2 pages.
Notice of Acceptance, dated Mar. 2, 2018, received in Australian Patent Application No. 2018200705 (7429AU), which corresponds with U.S. Appl. No. 15/272,327, 3 pages.
Notice of Acceptance, dated Mar. 2, 2018, received in Australian Patent Application No. 2016304832 (7432AU), which corresponds with U.S. Appl. No. 15/272,345, 3 pages.
Office Action, dated Feb. 7, 2018, received in Danish Patent Application No. 201770709 (7479DK01), 2 pages.
Office Action, dated Mar. 7, 2018, received in U.S. Appl. No. 15/482,618 (7491), 7 pages.
Search Report, dated Feb. 15, 2018, received in Dutch Patent Application No. 2019215 (7329NL), which corresponds with U.S. Appl. No. 14/864,529, 13 pages.
Search Report, dated Feb. 15, 2018, received in Dutch Patent Application No. 2019214 (7331NL), which corresponds with U.S. Appl. No. 14/864,601, 12 pages.
Extended European Search Report, dated Mar. 2, 2018, received in European Patent Application No. 17206374.5 (7431EP), which corresponds with U.S. Appl. No. 15/272,343, 11 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Brownlee, "Android 5.0 Lollipop Feature Review!", https//www.youtube.com/watch?v=pEDQ1z1PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Sood, "MultitaskingGestures", http://cydia.saurik.com/package/org.thebigboxx.multitaskinggestures/, Mar. 3, 2014, 2 pages.

(56) References Cited

OTHER PUBLICATIONS

VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "How to Master Android Lollipop Notifications in Four Minutes?", Video Gadgets Journal (VGJFelix), https://www.youtube.com/watch48 v=S-zBRG7GGJgs, Feb. 8, 2015, 4 pages.
YouTube, "Multitasking Gestures: Zephyr Like Gestures on iOS", https://www.youtube.com/watch?v=Jcod-f7Lw0l, Jan. 27, 2014, 3 pages.
YouTube, "Recentz—Recent Apps in A Tap", https://www.youtube.com/watch?v=qailSHRgsTo, May 15, 2015, 1 page.
YouTube, "HTC One Favorite Camera Features", http://www.youtube.com/watch?v=sUYHfcjl4RU, Apr. 28, 2013, 3 pages.
Office Action, dated Nov. 30, 2017, received in U.S. Appl. No. 14/535,671 (5448), 21 pages.
Office Action, dated Jun. 29, 2017, received in U.S. Appl. No. 14/608,895 (5839), 30 pages.
Certificate of Grant, dated Apr. 29, 2017, received in Australian Patent Application No. 2013368440 (5839AU), which corresponds with U.S. Appl. No. 14/536,426, 3 pages.
Office Action, dated Nov. 6, 2017, received in Chinese Patent Application No. 201380068493.6 (5839CN), which corresponds with U.S. Appl. No. 14/608,895, 5 pages.
Patent, dated May 12, 2017, received in Japanese Patent Application No. 2015-547948 (5839JP), which corresponds with U.S. Appl. No. 14/536,426, 3 pages.
Patent, dated May 26, 2017, received in Korean Patent Application No. 2015-7018851 (5839KR), which corresponds with U.S. Appl. No. 14/536,426, 3 pages.
Office Action, dated Jul. 26, 2017, received in U.S. Appl. No. 14/536,235 (5840), 14 pages.
Notice of Allowance, dated Nov. 30, 2017, received in U.S. Appl. No. 14/543,367 (5841), 9 pages.
Office action, dated Aug. 3, 2017, received in U.S. Appl. No. 14/536,426 (5842), 10 pages.
Office Action, dated Sep. 16, 2017, received in Chinese Patent Application No. 201380035982.1 (5842CN), which corresponds with U.S. Appl. No. 14/536,426, 5 pages.
Office Action, dated Sep. 20. 2017, received in Chinese Patent Application No. 201510566550.4 (5842CN01), which corresponds with U.S. Appl. No. 14/536,426, 11 pages.
Office Action, dated Aug. 21, 2017, received in European Patent Application No. 15183980.0 (5842EP01), which corresponds with U.S. Appl. No. 14/536,426, 3 pages.
Certificate of Grant, dated Nov. 10, 2017, received in Hong Kong Patent Application No. 15107535,0 (5842HK), which corresponds with U.S. Appl. No. 14/536,426, 2 pages.
Notice of Allowance, dated Dec. 8, 2017, received in Japanese Patent Application No. 2015-511644 (5842JP), which corresponds with U.S. Appl. No. 14/536,426, 6 pages.
Final Office Action, dated Aug. 25, 2017, received in U.S. Appl. No. 14/536,464 (5843), 30 pages.
Office Action, dated Sep. 25, 2017, received in U.S. Appl. No. 14/536,644 (5844), 29 pages.
Office Action, dated Oct. 19, 2017, received in U.S. Appl. No. 14/608,926 (5845) 14 pages.
Notice of Acceptance, dated Dec. 20, 2017, received in Australian Patent Application No. 2016201451 (5845AU01), which corresponds with U.S. Appl. No. 14/608,926, 3 pages.
Office Action, dated Jul. 4, 2017, received in European Patent Application No. 13795392.3 (5845EP), which corresponds with U.S. Appl. No. 14/608,926, 4 pages.
Patent, dated Jun. 30, 2017, received in Korean Patent Application No. 2015-7018853 (5845KR), which corresponds with U.S. Appl. No. 14/608,926, 3 pages.
Office Action, dated Aug. 22, 2017, received in Korean Patent Application No. 2017-7018250 (5845KR01), which corresponds with U.S. Appl. No. 14/608,926, 2 pages.
Notice of Allowance, dated Dec. 29, 2017, received in Korean Patent Application No. 2017-7018250 (5845KR01), which corresponds with U.S. Appl. No. 14/608,926, 3 pages.
Notice of Allowance, dated Oct. 9, 2017, received in Chinese Patent Application No. 2013800362059 (5846CN), which corresponds with U.S. Appl. No. 14/536,646, 3 pages.
Office Action, dated Oct. 19, 2017, received in U.S. Appl. No. 14/536,646 (5846), 2 pages.
Notice of Allowance, dated Sep. 20, 2017, received in U.S. Appl. No. 14/536,141 (5847), 10 pages.
Office Action, dated Jul. 21, 2017, received in Australian Patent Application No. 2016262773 (5847AU01), which corresponds with U.S. Appl. No. 14/536,141, 3 pages.
Notice of Allowance, dated Jun. 30, 2017, received in Japanese Patent Application No. 2015-511646 (5847JP), which corresponds with U.S. Appl. No. 14/536,141, 5 pages.
Patent, dated Jul. 28, 2017, received in Japanese Patent Application No. 2015-511646 (5847JP), which corresponds with U.S. Appl. No. 14/536,141, 3 pages.
Office Action, dated Jun. 16, 2017, received in Chinese Patent Application No. 201380068295.X (5848CN), which corresponds with U.S. Appl. No. 14/608,942, 6 pages.
Patent, dated Jun. 16, 2017, received in Japanese Patent Application No. 2015-549393, (5848JP) which corresponds with U.S. Appl. No. 14/608,942, 3 pages.
Office Action, dated Jul. 17, 2017, received in U.S. Appl. No. 14/536,166 (5849), 19 pages.
Office Action, dated Jul. 4, 2017, received in Australian Patent Application No. 2016238917 (5850AU01), which corresponds with U.S. Appl. No. 14/536,203, 5 pages.
Office Action, dated Oct. 25, 2017, received in Chinese Patent Application No. 201380035977.0 (5858CN), which corresponds with U.S. Appl. No. 14/536,203, 5 pages.
Office Action, dated Dec. 6, 2017, received in European Patent Application No. 13724104.8 (5850EP), which corresponds with U.S. Appl. No. 14/536,203, 9 pages.
Office Action, dated Jun. 23, 2017, received in Japanese Patent Application No. 2016173113 (5850JP01), which corresponds with U.S. Appl. No. 14/536,203, 5 pages.
Notice of Allowance, dated Jan. 12, 2018, received in Japanese Patent Application No. 2016173113 (5850JP01), which corresponds with U.S. Appl. No. 14/536,203, 5 pages.
Notice of Allowance, dated Oct. 30, 2017, receivd in Korean Patent Application No. 2016-7033834 (5850KR01), which corresponds with U.S. Appl. No. 14/536,203, 5 pages.
Office Action, dated Oct. 20, 2017, received in U.S. Appl. No. 14/608,965 (5851), 14 pages.
Office action, dated Oct. 11, 2017, received in Chinese Patent Application No. 201380074060.1 (3851CN), which corresponds with U.S. Appl. No. 14/608,965, 5 pages.
Notice of Allowance, dated Nov. 22, 2017, received in U.S. Appl. No. 14/536,247 (5352), 6 pages.
Notice of Allowance, dated Nov. 9, 2017, received in U.S. Appl. No. 14/536,267 (5853), 8 pages.
Office Action, dated Sep. 13, 2017, received in European Patent Application No. 14177863.4 (5853EP01), which corresponds with U.S. Appl. No. 14/536,267, 6 pages.
Notice of Allowance, dated Nov. 17, 2017, received in Japanese Patent Application No. 2016-125839 (5853JP01), which corresponds with U.S. Appl. No. 14/536,267, 5 pages.
Notice of Allowance, dated Sep. 1, 2017, received in Korean Patent Application No. 2016-7029533 (5853KR01), which corresponds with U.S. Appl. No. 14/536,267, 4 pages.
Patent, dated Dec. 1, 2017, received in Korean Patent Application No. 2016-7029533 (5853KR01), which corresponds with U.S. Appl. No. 14/536,267, 2 pages.
Notice of Allowance, dated Dec. 1, 2017, received in U.S. Appl. No. 14/536,291 (5854), 19 pages.
Office Action, dated Jul. 21, 2017, received in Australian Patent Application No. 2016216658 (5854AU01), which corresponds with U.S. Appl. No. 14/536,291, 3 pages.

(56) References Cited

OTHER PUBLICATIONS

Office Action, dated Oct. 23, 2017, received in Chinese Patent Application No. 201380035986.X (5854CN), which corresponds with U.S. Appl. No. 14/536,291, 9 pages.
Office Action, dated Oct. 19, 2017, received in U.S. Appl. No. 14/608,985 (5855), 13 pages.
Patent, dated May 18, 2017, received in Australian Patent Application No. 2013368445 (5855AU), which corresponds with U.S. Appl. No. 14/608,985, 1 page.
Notice of Allowance, dated Sep. 19, 2017, received in Chinese Patent Application No. 201380068399.0 (5855CN), which corresponds with U.S. Appl. No. 14/608,985, 3 pages.
Patent, dated Dec. 8, 2017, received in Chinese Patent Application No. 201380068399.0 (5855CN), which corresponds with U.S. Appl. No. 14/608,985, 4 pages.
Summons, dated Oct. 6, 2017, received in European Patent Application No. 13811032.5 (5855EP), which corresponds with U.S. Appl. No. 14/608,985, 6 pages.
Notice of Allowance, dated Sep. 19, 2017, received in Korean Patent Application No. 2015-7019984 (5855KR), which corresponds with U.S. Appl. No. 14/608,985, 4 pages.
Patent, dated Dec. 19, 2017, received in Korean Patent Application No. 2015-7019984 (5855KR), which correspds with U.S. Appl. No. 14/608,985, 3 pages.
Final Office Action, dated Sep. 21, 2017, received in U.S. Appl. No. 14/609,006 (5856), 17 pages.
Final Office Action, dated Nov. 2, 2017, received in U.S. Appl. No. 14/536,296 (5857), 13 pages.
Office Action, dated Nov. 1, 2017, received in U.S. Appl. No. 14/536,648 (5858), 22 pages.
Office Action, dated Jul. 21, 2017, received in Australian Patent Application No. 2016247194 (5858AU), which corresponds with U.S. Appl. No. 14/536,648, 3 pages.
Notice of Allowance, dated Jul. 10, 2017, received in U.S. Appl. No. 14/609,042 (5859), 8 pages.
Notice of Allowance, dated Jun. 19, 2017, received in U.S. Appl. No. 14/864,737 (7246), 8 pages.
Notice of Allowance, dated Jun. 23, 2017, received in Japanese Patent Application No. 2016-558331 (7246JP), which corresponds with U.S. Appl. No. 14/864,737, 5 pages.
Patent, dated Jul. 28, 2017, received in Japanese Patent Application No. 2016-558331 (7246JP), which corresponds with U.S. Appl. No. 14/864,737, 3 pages.
Patent, dated Jul. 12, 2017, received in Dutch Patent Application No. 2016452 (7246NL), which corresponds with U.S. Appl. No. 14/864,737, 2 pages.
Office Action, dated Jul. 7, 2017, received in Danish Patent Application No. 201500575 (7247DK) 4 pages.
Office Action, dated Dec. 15, 2017, received in U.S. Appl. No. 14/866,159 (7265), 35 pages.
Office Action, dated Jul. 6, 2017, received in Danish Patent Application No. 201500574 (7265DK), which corresponds with U.S. Appl. No. 14/866,159, 3 pages.
Office Action, dated Jan. 10, 2018, received in Danish Patent Application No. 201500574 (7265DK), which corresponds with U.S. Appl. No. 14/866,159, 2 pages.
Patent, dated Sep. 7, 2017, received in Dutch Patent Application No. 2016377 (7265NL), which corresponds with U.S. Appl. No. 14/866,159, 4 pages.
Office Action, dated Oct. 6, 2017, received in U.S. Appl. No. 14/868,078 (7267), 40 pages.
Notice of Allowance, dated Sep. 1, 2017, received in Australian Patent Application No. 2016229421 (7267AU02), which corresponds with U.S. Appl. No. 14/868,078, 3 pages.
Patent, dated Sep. 11, 2017, received in Danish Patent Application No. 201500588 (7267DK), which corresponds with U.S. Appl. No. 14/868,078, 5 pages.
Patent, dated Jul. 12, 2017, received in Dutch Patent Application No, 2016376 (7267NL), which corresponds with U.S. Appl. No. 14/868,078, 2 pages.
Notice of Allowance, dated Sep. 18, 2017, received in U.S. Appl. No. 14/863,432 (7270), 8 pages.
Office Action, dated Jun. 12, 2017, received in Danish Patent Application No. 201500582 (7270DK), which corresponds with U.S. Appl. No. 14/863,432, 5 pages.
Grant, dated Jul. 21, 2017, received in Dutch Patent Application No. 2016801 (7270NL), which corresponds with U.S. Appl. No. 14/871,227, 8 pages.
Notice of Allowance, dated Oct. 4, 2017, received in U.S. Appl. No. 14/866,511 (7294), 37 pages.
Office Action, dated Nov. 24, 2017, received in European Patent Application No. 16727900.9 (7294EP), which corresponds with U.S. Appl. No. 14/866,511, 5 pages.
Notice of Allowance, dated Jul. 14, 2017, received in Japanese Patent Application No. 2016558214 (7294JP), which corresponds with U.S. Appl. No. 14/866,511, 5 pages.
Patent, dated Aug. 18, 2017, received in Japanese Patent Application No. 2016558214 (7294JP), which corresponds with U.S. Appl. No. 14/866,511, 3 pages.
Notice of Allowance, dated Apr. 27, 2017, received in U.S. Appl. No. 14/866,489 (7298), 27 pages.
Notice of Allowance, dated Jul. 6, 2017, received in U.S. Appl. No. 14/866,489 (7298), 12 pages.
Office Action, dated Jul. 3, 2017, received in Danish Patent Application No. 201500592 (7309DK), which corresponds with U.S. Appl. No. 14/869,899, 5 pages.
Office Action, dated Dec. 14, 2017, received in Danish Patent Application No. 201670594 (7309DK01), which corresponds with U.S. Appl. No. 14/869,899, 3 pages.
Final Office Action, dated Oct. 3, 2017, received in U.S. Appl. No. 14/866,992 (7310), 37 pages.
Office Action, dated Jan. 19, 2018, received in Australian Patent Application No, 201761478 (7310AU02), which corresponds with U.S. Appl. No. 14/866,992, 6 pages.
Office Action, dated Sep. 5, 2017, received in Danish Patent Application No. 201500593 (7310DK), which corresponds with U.S. Appl. No. 14/866,992, 6 pages.
Office Action, dated Jan. 18, 2018, received in U.S. Appl. No. 15/009,676 (7312), 21 Pages.
Final Office Action, dated Oct. 4, 2017, received in U.S. Appl. No. 14/856,517 (7317), 33 pages.
Final Office Action, dated Nov. 15, 2017, received in U.S. Appl. No. 14/856,519 (7318), 31 pages.
Office Action, dated Jun. 30, 2017, received in U.S. Appl. No. 14/856,522 (7320), 22 pages.
Notice of Allowance, dated Jun. 16, 2017, received in in U.S. Appl. No. 14/857,645 (7321), 5 pages.
Office Action, dated Nov. 30, 2017, received in U.S. Appl. No. 14/857,636 (7322), 19 pages.
Office Action, dated Jan. 17, 2018, received in Australian Patent Application No. 2017202816 (7322AU), which corresponds with U.S. Appl. No. 14/857,636, 3 pages.
Office Action, dated Sep. 22, 2017, received in Japanese Patent Application No. 2017-029201 (7322JP), which corresponds with U.S. Appl. No. 14/857,636 8 pages.
Office Action, dated Dec. 1, 2017, received in U.S. Appl. No. 14/857,663 (7323), 15 pages.
Final Office Action, dated Oct. 11, 2017, received in U.S. Appl. No. 14/857,700 (7324), 13 pages.
Office Action, dated Dec. 15, 2017, received in Danish Patent Application No. 201500584 (7330DK), which corresponds with U.S. Appl. No. 14/864,580, 4 pages.
Office Action, dated Dec. 15, 2017, received in Danish Patent Application No. 201500585 (7332DK), which corresponds with U.S. Appl. No. 14/864,627, 5 pages.
Office Action, dated Jun. 15, 2017, received in Danish Patent Application No. 201500579 (7334DK), which corresponds with U.S. Appl. No. 14/866,361, 2 pages.
Office Action, dated Jan. 4, 2018, received in Danish Patent Application No. 201500579 (7334DK), which corresponds with U.S. Appl. No. 14/866,361, 2 pages.
Office Action, dated Jan. 22, 2018, received in U.S. Appl. No. 14/866,987 (7335), 22 pages.

(56) References Cited

OTHER PUBLICATIONS

Notice of Allowance, dated Sep. 29, 2017, received in Danish Patent Application No. 201670463 (7335DK01), which corresponds with U.S. Appl. No. 14/866,987, 2 pages.
Patent, dated Nov. 6, 2017, received in Danish Patent Application No. 201670463 (7335DK01), which corresponds with U.S. Appl. No. 14/866,987, 6 pages.
Notice of Allowance, dated Sep. 22, 2017, received in Japanese Patent Application No. 2016-233449 (7335JP), which corresponds with U.S. Appl. No. 14/866,987, 5 pages.
Patent, dated Oct. 27, 2017, received in Japanese Patent Application No. 2016-233449 (7335JP), which corresponds with U.S. Appl. No. 14/866,987, 3 pages.
Office Action, dated Jul. 31, 2017, received in Japanese Patent Application No. 2017126445 (7335JP01), which corresponds with U.S. Appl. No. 14/866,987, 6 pages.
Office Action, dated Nov. 29, 2017, received in U.S. Appl. No. 14/866,989 (7336), 31 pages.
Office Action, dated Jun. 16, 2017, received in Japanese Patent Application No. 2016-233450 (7336JP), which corresponds with U.S. Appl. No. 14/866,989, 6 pages.
Office Action, dated Jun. 15, 2017, received in Danish Patent Application No. 201500595 (7337DK), which corresponds with U.S. Appl. No. 14/871,236, 4 pages.
Office Action, dated Sep. 1, 2017, received in U.S. Appl. No. 14/870,754 (7338), 22 pages.
Office Action, dated Nov. 14, 2017, received in U.S. Appl. No. 14/870,882 (7339), 25 pages.
Notice of Allowance, dated Oct. 31, 2017, received in Danish Patent Application No. 201500596 (7339DK), which corresponds with U.S. Appl. No. 14/870,882, 2 pages.
Office Action, dated Sep. 1, 2017, received in U.S. Appl. No. 14/870,988 (7340), 14 pages.
Office Action, dated Nov. 22, 2017, received in U.S. Appl. No. 14/871,227 (7341), 24 pages.
Office Action, dated Oct. 16, 2017, received in Australian Patent Application No. 2016203040 (7341AU), which corresponds with U.S. Appl. No. 14/871,227, 5 pages.
Office Action, dated Aug. 4, 2017, received in Japanese Patent Application No. 2016-533201 (7341JP), which corresponds with U.S. Appl. No. 14/871,227, 6 pages.
Notice of Allowance, dated Jan. 4, 2018, received in Japanese Applicaton No. 2016-533201 (7341JP), which corresponds with U.S. Appl. No. 14/871,227, 4 pages.
Office Action, dated Oct. 26, 2017, received in U.S. Appl. No. 14/871,336 (7342), 22 pages.
Office Action, dated Oct. 16, 2017, received in U.S. Appl. No. 14/871,462 (7343), 26 pages.
Office Action, dated Sep. 29, 2017, received in Australian Patent Application No. 2016231505 (7343AU01), which corresponds with U.S. Appl. No. 14/871,462, 5 pages.
Innovation Patent, dated Oct. 11, 2017, received in Australian Patent Application No. 2016231505 (7343AU01), which corresponds with U.S. Appl. No. 14/871,462, 1 page.
Office Action, dated Nov. 13, 2017, received in Japanese Patent Application No. 2016-183289 (7343JP), which corresponds with U.S. Appl. No. 14/871,462, 5 pages.
Final Office Action, dated Nov. 29, 2017, received in U.S. Appl. No. 14/867,823 (7344), 47 pages.
Office Action, dated Jul. 6, 2017, received in U.S. Appl. No. 14/867,892 (7345), 55 pages.
Final Office Action, dated Dec. 14, 2017, received in U.S. Appl. No. 14/867,892 (7345), 53 pages.
Office Action, dated Oct. 31, 2017, received in Danish Patent Application No, 201500598 (7345DK), which corresponds with U.S. Appl. No. 14/867,892, 2 pages.
Final Office Action, dated Oct. 10, 2017, received in U.S. Appl. No. 14/869,855 (7347), 16 pages.
Final Office Action, dated Aug. 18, 2017, received in U.S. Appl. No. 14/869,873 (7348), 20 pages.
Office Action, dated Jan. 18, 2018, received in U.S. Appl. No. 14/869,873 (7348), 25 pages.
Office Action, dated Jan. 11, 2018, received in U.S. Appl. No. 14/869,997 (7351), 17 pages.
Notice of Allowance, dated Jan. 17, 2018, received in U.S. Appl. No. 14/867,990 (7352), 12 pages.
Office Action, dated Dec. 12, 2017, received in U.S. Appl. No. 15/009,668 (7389), 32 pages.
Notice of Allowance, dated Dec. 4, 2017, received in U.S. Appl. No. 15/081,771 (7398), 10 pages.
Office Action, dated Aug. 29, 2017, received in Korean Patent Application No. 2017-7014536 (7398KR), which corresponds with U.S. Appl. No. 15/081,771, 5 pages.
Notice of Allowance, dated Oct. 20, 2017, received in U.S. Appl. No. 15/136,782 (7399), 9 pages.
Office Action, dated Jan. 8, 2018, received in Danish Patent Application No. 201770190 (4399DK), which corresponds with U.S. Appl. No. 15/136,782, 2 pages.
Notice of Allowance, dated Jul. 6, 2017, received in U.S. Appl. No. 15/231,745 (7403), 18 pages.
Office Action, dated Jun. 29, 2017, received in Danish Patent Application No. 201670587 (7403DK), which corresponds with U.S. Appl. No. 15/231,745, 4 pages.
Office Action, dated Jul. 6, 2017, received in Danish Patent Application No. 201670590 (7403DK01), which corresponds with U.S. Appl. No. 15/231,745, 3 pages.
Office Action, dated Jan. 10, 2018, received in Danish Patent Application No. 201670590 (7403DK01), which corresponds with U.S. Appl. No. 15/231,745, 2 pages.
Patent, dated Oct. 30, 2017, received in Danish Patent Application No. 201670593 (7403DK04), which corresponds with U.S. Appl. No. 15/231,745, 3 pages.
Office Action, dated Jul. 27, 2017, received in Australian Patent Application No. 2017100535 (7430AU), which corresponds with U.S. Appl. No. 15/272,341, 4 pages.
Office Action, dated Aug. 4, 2017, received in Danish Patent Application No. 201770377 (7479DK), 9 pages.
Office Action, dated Oct. 16, 2017, received in Danish Patent Application No. 201770710 (7479DK02), 10 pages.
Office Action, dated Aug. 30, 2017, received in U.S. Appl. No. 15/655,749 (7506), 22 pages.
Office Action, dated Oct. 31, 2017, received in U.S. Appl. No. 15/723,069 (7512), 7 pages.
Notice of Allowance, dated Dec. 21, 2017, received in U.S. Appl. No. 15/723,069 (7512), 7 pages.
Extended European Search Report, dated Nov. 24, 2017, received in European Patent Application No. 17186744.3 (5854EP01), which corresponds with U.S. Appl. No. 14/536,291, 10 pages.
Search Report, dated Apr. 13, 2017, received in Dutch Patent Application No. 2016452 (7246NL), which corresponds with U.S. Appl. No. 14/864,737, 22 pages.
Search Report, dated Jun. 22, 2017, received in Dutch Patent Application No. 2016375 (7247NL), which corresponds with U.S. Appl. No. 14/866,981, 17 pages.
Search Report, dated Jun. 19, 2017, received in Dutch Patent Application No. 2016377 (7265NL), which corresponds with U.S. Appl. No. 14/866,159, 13 pages.
Extended European Search Report, dated Oct. 17, 2017, received in European Patent Application No. 17184437.6 (7267EP01), Which corresponds with U.S. Appl. No. 14/868,078, 8 pages.
Search Report, dated Apr. 13, 2017, received in Dutch Patent Application No. 2016376 (7267NL), which corresponds with U.S. Appl. No. 14/868,078, 15 pages.
Search Report, dated Apr. 18, 2017, received in Dutch Patent Application No. 2016801 (7270NL), which corresponds with U.S. Appl. No. 14/863,432, 34 pages.
Extended European Search Report, dated Oct. 10, 2017, received in European Patent Application No. 17188507.2 (7334EP), which corresponds with U.S. Appl. No. 14/866,361, 9 pages.
Extended European Search Report, dated Jun. 22, 2017, received in European Patent Application No. 16189421.7 (7335EP), which corresponds with U.S. Appl. No. 14/866,987, 7 pages.

(56) References Cited

OTHER PUBLICATIONS

Extended European Search Report, dated Sep. 11, 2017, received in European Patent Application No. 17163309.2 (7335EP01), which corresponds with U.S. Appl. No. 14/866,987, 8 pages.
Extended European Search Report, dated Jun. 8, 2017, received in European Patent Application No. 16189425.8 (7336EP), which corresponds with U.S. Appl. No. 14/866,989, 8 pages.
Extended European Search Report, dated Jul. 25, 2017, received in European Patent Application No. 17171972.7 (7339EP), which corresponds with U.S. Appl. No. 14/870,882, 12 pages.
Extended European Search Report, dated Jul. 25, 2017, received in European Patent Application No. 17172266.3 (7342EP), which corresponds with U.S. Appl. No. 14/871,336, 9 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Azundris, "A Fire in the Sky," http://web.archive.org/web/20140722062639/http://blog.azundrix.com/archives/168-A-fire-in-the-sky.html, Jul. 22, 2014, 8 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
IBM et al., "Pressure-Sensitive Icons", IBM Technical Disclosure Bulletin, vol. 33, No. 1B, Jun. 1, 1990, 3 pages.
iCIMS Recruiting Software, "Blackberry Playbook Review," http://www.tested.com/tech.tablets/5749-blackberry-playbook-review/, 2015, 11 pages.

Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.
McRitchie, "Internet Explorer Right-Click Menus," http://web.archive.org/web-201405020/http:/dmcritchie.mvps.org/ie/rightie6.htm, May 2, 2014, 10 pages.
Laurie, "The Power of the Right Click," http://vlaurie.com/right-click/customize-context-menu.html, 2002-2016, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics the Sandpaper System for Synthesizing Texture for a Force-Feedback Display," Massachusetts Institute of Technology, Jun. 1978, 217 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
O'Hara, et al., "Pressure-Sensitive Icons", ip.com Journal, ip.com Inc., West Henrietta, NY, US, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technoligies Pre-Event Buffer & Fail Safe Feature," http://vvww.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspowerusercom/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.

(56) References Cited

OTHER PUBLICATIONS

Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https://en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
YouTube, "Blackberry Playbook bezel interaction," https://www.youtube.com/watch?v=YGkzFqnOwXI, Jan. 10, 2011, 2 pages.
Office Action, dated Dec. 18, 2015, received in Australian Patent Application No. 2013368440 (5839AU), which corresponds with U.S. Appl. No. 14/536,426, 3 pages.
Office Action, dated Apr. 5, 2016, received in Korean Patent Application No. 10-2015-7018851 (5839KR), which corresponds with U.S. Appl. No. 14/536,426, 7 pages.
Office Action, dated Jul. 21, 2016, received in European Patent Application No. 13795391.5 (5839EP), which corresponds with U.S. Appl. No. 14/536,426, 9 pages.
Office Action, dated Dec. 17, 2015, received in U.S. Appl. No. 14/536,426 (5842), 28 pages.
Final Office Action, dated May 6, 2016, received in U.S. Appl. No. 14/536,426 (5842), 23 pages.
Office Action, dated Jul. 15, 2015, received in Australian Patent Application No. 2013259606 (5842AU), which corresponds with U.S. Appl. No. 14/536,426, 3 pages.
Notice of Allowance, dated May 23, 2016, received in Australian Patent Application No. 2013259606 (5842AU), which corresponds with U.S. Appl. No. 14/536,426, 3 pages.
Office Action, dated Nov. 18, 2015, received in Australian Patent Application No. 2015101231 (5842AU01), which corresponds with U.S. Appl. No. 14/536,426, 3 pages.
Decision to Grant, dated Jul. 14, 2016, received in European Patent Application No. 13724100.6 (5842EP), which corresponds with U.S. Appl. No. 14/536,426, 1 page.
Office Action, dated Mar. 4, 2016, received in Japanese Patent Application No. 2015-511644 (5842JP), which corresponds with U.S. Appl. No. 14/536,426, 3 pages.
Office Action, dated Feb. 1, 2016, received in Australian Patent Application No. 2013368441 (5845AU), which corresponds with U.S. Appl. No. 14/608,926, 3 pages.
Notice of Allowance, dated Mar. 30, 2016, received in Australian Patent Application No. 2013368441 (5845AU), which corresponds with U.S. Appl. No. 14/608,926, 1 page.
Certificate of Grant, dated Jul. 29, 2016, received in Australian Patent Application No. 2013368441 (5845AU), which corresponds with U.S. Appl. No. 14/608,926, 1 page.
Office Action, dated Apr. 21, 2016, received in European Patent Application No. 13795392.3 (5845EP), which corresponds with U.S. Appl. No. 14/608,926, 6 pages.
Office Action, dated May 6, 2016, received in European Patent Application No. 13795392.3 (5845EP), which corresponds with U.S. Appl. No. 14/608,926, 6 pages.
Office Action, dated Mar. 14, 2016, received in Japanese Patent Application No. 2015-549392 (5845JP), which corresponds with U.S. Appl. No. 14/608,926, 4 pages.
Office Action, dated May 12, 2016, received in Korean Patent Application No. 10-2015-7018853, (5845KR), which corresponds with U.S. Appl. No. 14/608,926, 4 pages.
Office Action, dated Jul. 17, 2015, received in Australian Patent Application No. 2013259613 (5846AU), which corresponds with U.S. Appl. No. 14/536,646, 5 pages.
Office Action, dated May 31, 2016, received in Australian Patent Application No. 2013259613 (5846AU), which corresponds with U.S. Appl. No. 14/536,646, 4 pages.

Notice of Allowance, dated Jul. 5, 2016, received in Australian Patent Application No. 2013259613 (5846AU), which corresponds with U.S. Appl. No. 14/536,646, 3 pages.
Office Action, dated Nov. 12, 2015, received in European Patent Application No. 13724102.2 (5846EP), which corresponds with U.S. Appl. No. 14/536,646, 6 pages.
Office Action, dated May 31, 2016, received in European Patent Application No. 13724102.2 (5846EP), which corresponds with U.S. Appl. No. 14/536,646, 5 pages.
Office Action, dated Feb. 29, 2016, received in Japanese Patent Application No. 2015-511645 (5846JP), which corresponds with U.S. Appl. No. 14/536,646, 5 pages.
Office Action, dated Aug. 27, 2015, received in Australian Patent Application No. 2013259614 (5847AU), which corresponds with U.S. Appl. No. 14/536,141, 4 pages.
Notice of Allowance, dated Aug. 15, 2016, received in Australian Patent Application No. 2013259614 (5847AU), which corresponds with U.S. Appl. No. 14/536,141, 1 page.
Office Action, dated Jan. 7, 2016, received in European Patent Application No. 13726053.5 (5847EP), which corresponds with U.S. Appl. No. 14/536,141, 10 pages.
Office Action, dated Feb. 29, 2016, received in Japanese Patent Application No. 2015-511646 (5847JP), which corresponds with U.S. Appl. No. 14/536,141, 3 pages.
Office Action, dated Jan. 29, 2016, received in Australian Patent Application No. 2013368443 (5848AU), which corresponds with U.S. Appl. No. 14/536,141, 3 pages.
Notice of Allowance, dated Mar. 11, 2016, received in Australian Patent Application No. 2013368443 (5848AU), which corresponds with U.S. Appl. No. 14/536,141, 2 pages.
Certificate of Grant, dated Jul. 7, 2016, received in Australian Patent Application No. 2013368443 (5848AU), which corresponds with U.S. Appl. No. 14/536,141, 3 pages.
Office Action, dated Jul. 4, 2016, received in Japanese Patent Application No. 2015-549393, (5848JP) which corresponds with U.S. Appl. No. 14/536,141, 4 pages.
Office Action, dated Apr. 5, 2016, received in Korean Patent Application No. 10-2015-7018448 (5848KR), which corresponds with U.S. Appl. No. 14/536,141, 6 pages.
Office Action, dated Aug. 1, 2016, received in U.S. Appl. No. 14/536,203 (5850), 14 pages.
Office Action, dated Jul. 9, 2015, received in Australian Patent Application No. 2013259630 (5850AU), which corresponds with U.S. Appl. No. 14/536,203, 3 pages.
Notice of Allowance, dated Jun. 15, 2016, received in Australian Patent Applicatin No. 2013259630 (5850AU), which corresponds with U.S. Appl. No. 14/536,203, 3 pages.
Office Action, dated Nov. 11, 2015, received in European Patent Application No. 13724104.8 (5850EP), which corresponds with U.S. Appl. No. 14/536,203, 5 pages.
Office Action, dated May 31, 2016, received in European Patent Application No. 13724104.8 (5850EP), which corresponds with U.S. Appl. No. 14/536,203, 5 pages.
Office Action, dated Feb. 15, 2016, received in Japanese Patent Application No. 2015-511650 (5850JP), which corresponds with U.S. Appl. No. 14/536,203, 5 pages.
Notice of Allowance, dated Aug. 5, 2016, received in Japanese Patent Application No. 2015-511650 (5850JP), which corresponds with U.S. Appl. No. 14/536,203, 4 pages.
Office Action, dated Dec. 4, 2015, received in Korean Patent Application No. 2014-7034520 (5850KR), which corresponds with U.S. Appl. No. 14/536,203, 4 pages.
Office Action, dated Jul. 22, 2016, received in European Office Action No. 13798465.4 (5851EP), which corresponds with U.S. Appl. No. 14/608,965, 8 pages.
Office Action, dated Aug. 10, 2015, received in Australian Patent Application No. 2013259637 (5853AU), which corresponds with U.S. Appl. No. 14/536,267, 3 pages.
Notice of Allowance, dated Jun. 28, 2016, received in Australian Patent Application No. 2013259637 (5853AU), which corresponds with U.S. Appl. No. 14/536,267, 3 pages.

(56) References Cited

OTHER PUBLICATIONS

Office Action, dated Jan. 29, 2016, received in Japanese Patent Application No. 2015-511652 (5853JP), which corresponds with U.S. Appl. No. 14/536,267, 3 pages.
Office Action, dated Dec. 4, 2015, received in Korean Patent Application No. 2014-7034530 (5853KR), which corresponds with U.S. Appl. No. 14/536,267, 3 pages.
Office Action, dated Aug. 18, 2015, received in Australian Patent Application No. 2013259642 (5854AU), which corresponds with U.S. Appl. No. 14/536,291, 3 pages.
Office Action, dated Jul. 25, 2016, received in Australian Patent Application No. 2013259642 (5854AU), which corresponds with U.S. Appl. No. 14/536,291, 3 pages.
Office Action, dated Aug. 10, 2016, received in Australian Patent Application No. 2013259642 (5854AU), which corresponds with U.S. Appl. No. 14/536,291, 4 pages.
Office Action, dated Jan. 7, 2016, received in European Patent Application No. 13724107.1 (5854EP), which corresponds with U.S. Appl. No. 14/536,291, 11 pages.
Office Action, dated Mar. 8, 2016, received in Japanese Patent Application No. 2015-511655 (5854JP), which corresponds with U.S. Appl. No. 14/536,291, 4 pages.
Office Action, dated Jan. 15, 2016, received in Australian Patent Application No. 2013368445 (5855AU), which corresponds with U.S. Appl. No. 14/608,985, 3 pages.
Office Action, dated Jul. 25, 2016, received in Japanese Patent Application No. 13811032.5 (5855EP), which corresponds with U.S. Appl. No. 14/608,985, 8 pages.
Office Action, dated Apr. 25, 2016, received in Japanese Patent Application No. 2015-550384 (5855JP), which corresponds with U.S. Appl. No. 14/608,985, 4 pages.
Office Action, dated Mar. 31, 2016, received in U.S. Appl. No. 14/864,737 (7246), 17 pages.
Notice of Allowance, dated Jul. 1, 2016, received in Chinese Patent Application No. 201620214376.7 (7246CN01), which correresponds with U.S. Appl. No. 14/864,737, 3 pages.
Patent, dated Aug. 3, 2016, received in Chinese Patent Application No. 201620214376.7 (7246CN01), which corresponds with U.S. Appl. No. 14/864,737, 5 pages.
Certificate of Registration, dated Jun. 20, 2016, received in German Patent Application No. 202016001845.1 (7246DE), which corresponds with U.S. Appl. No. 14/864,737, 3 pages.
Office Action, dated Apr. 5, 2016, received in Danish Patent Application No. 201500577 (7246DK), which corresponds with U.S. Appl. No. 14/864,737, 7 pages.
Intention to Grant, dated Aug. 2, 2016, received in Danish Patent Application No. 201500577 (7246DK), which corresponds with U.S. Appl. No. 14/864,737, 2 pages.
Office Action, dated Jun. 27, 2016, received in U.S. Appl. No. 14/866,981 (7247), 22 pages.
Office Action, dated May 10, 2016, received in Australian Patent Application No. 2016100254 (7247AU), which corresponds with U.S. Appl. No. 14/866,981, 6 pages.
Notice of Allowance, dated Jul. 27, 2016, received in Chinese Patent Application No. 201620176169.7 (7247CN01), which corresponds with U.S. Appl. No. 14/866,981, 3 pages.
Certificate of Registration, dated Jun. 20, 2016, received in German Patent Application No. 202016001514.2 (7247DE), which corresponds with U.S. Appl. No. 14/864,737, 3 pages.
Office Action, dated Mar. 18, 2016, received in Danish Patent Application No. 2016100254 (7247DK), which corresponds with U.S. Appl. No. 14/866,981, 9 pages.
Office Action, dated May 19, 2016, received in Australian Patent Application No. 2016100251 (7265AU), which corresponds with U.S. Appl. No. 14,866,159, 5 pages.
Certificate of Registration, dated Jun. 16, 2016, received in German Patent No. 202016001483.9 (7265DE), which corresponds with U.S. Appl. No. 14,866,159, 3 pages.

Office Action, dated Mar. 9, 2016, received in Danish Patent Application No. 201500574 (7265DK), which corresponds with U.S. Appl. No. 14/866,159, 11 pages.
Innovation Patent Certificate, dated Aug. 4, 2016, received in Australian Patent Application No. 2016101201 (7267AU01), which corresponds with U.S. Appl. No. 14/686,078, 1 page.
Certificate of Registration, dated Jun. 30, 2016, received in German Patent Application No. 20201600156.9 (7267DE), which corresponds with U.S. Appl. No. 14/868,078, 3 pages.
Office Action, dated Mar. 30, 2016, received in Australian Patent Application No. 201500588 (7267DK), which corresponds with U.S. Appl. No. 14/868,078, 9 pages.
Office Action, dated May 9, 2016, received in U.S. Appl. No. 14/863,432 (7270), 26 pages.
Office Action, dated Apr. 4, 2016, received in Danish Patent Application No. 201500582 (7270DK), which corresponds with U.S. Appl. No. 14/863,432, 10 pages.
Patent, dated Aug. 8, 2016, received in Australian Patent Application 2016100653 (7294AU), corresponds with U.S. Appl. No. 14/866,511, 1 page.
Office Action, dated Mar. 22, 2016, received in Danish Patent Application No. 201500576 (7294DK), which corresponds with U.S. Appl. No. 14/866,511, 10 pages.
Notice of Allowance, dated Jun. 8, 2016, received in Danish Patent Application No. 201500576 (7294DK), which corresponds with U.S. Appl. No. 14/866,511, 2 pages.
Office Action, dated May 10, 2016, received in U.S. Appl. No. 14/866,489 (7298), 15 pages.
Office Action, dated Mar. 28, 2016, received in U.S. Appl. No. 14/869,899 (7309), 17 pages.
Office Action, dated Jun. 28, 2016, received in U.S. Appl. No. 14/869,899 (7309), 5 pages.
Office Action, dated Feb. 3, 2016, received in Danish Patent Application No. 201500592 (7309), which corresponds with U.S. Appl. No. 14/869,899, 9 pages.
Office Action, dated. Mar. 4, 2016, received in U.S. Appl. No. 14/866,992 (7310), 30 pages.
Final Office Action, dated Jul. 29, 2016, received in U.S. Appl. No. 14/866,992 (7310), 35 pages.
Office Action, dated Mar. 18, 2016, received in Danish Patent Application No. 201500593 (7310DK), which corresponds with U.S. Appl. No. 14/866,992, 10 pages.
Office Action, dated Jun. 27, 2016, received in Danish Patent Application No. 201500593 (7310DK), which corresponds with U.S. Appl. No. 14/866,992, 7 pages.
Office Action, dated Nov. 30, 2015, received in U.S. Appl. No. 14/845,217 (7314), 24 pages.
Final Office Action, dated Apr. 22, 2016, received in U.S. Appl. No. 14/845,217 (7314), 36 pages.
Office Action, dated Feb. 3, 2016, received in U.S. Appl. No. 14/856,517 (7317), 36 pages.
Final Office Action, dated Jul. 13, 2016, received in U.S. Appl. No. 14/856,517 (7317), 30 pages.
Office Action, dated Feb. 11, 2016, received in U.S. Appl. No. 14/856,519 (7318), 34 pages.
Final Office Action, dated Jul. 15, 2016, received in U.S. Appl. No. 14/856,519 (7318), 31 pages.
Office Action, dated Feb. 1, 2016, received in U.S. Appl. No. 14/857,645 (7321), 15 pages.
Final Office Action, dated Jun. 16, 2016, received in U.S. Appl. No. 14/857,645 (7321), 12 pages.
Office Action, dated Jan. 25, 2016, received in U.S. Appl. No. 14,864,580 (7330), 29 pages.
Notice of Allowance, dated May 23, 2016, received in U.S. Appl. No. 14/864,580 (7330), 9 pages.
Corrected Notice of Allowability, dated Jun. 16, 2016, received in U.S. Appl. No. 14/864,580 (7330), 2 pages.
Notice of Allowance, dated Aug. 4, 2016, received in U.S. Appl. No. 14/864,580 (7330), 9 pages.
Office Action, dated Apr. 8, 2016, received in Danish Patent Application No. 201500584 (7330DK), which corresponds with U.S. Appl. No. 14/864,580, 9 pages.

(56) References Cited

OTHER PUBLICATIONS

Office Action, dated Apr. 19, 2016, received in U.S. Appl. No. 14/864,627 (7332), 9 pages.
Office Action, dated Apr. 8, 2016, received in Danish Patent Application No. 201500585 (7332DK), which corresponds with U.S. Appl. No. 14/864,627, 9 pages.
Office Action, dated Mar. 29, 2016, received in U.S. Appl. No. 14/866,361 (7334), 22 pages.
Notice of Allowance, dated Jul. 19, 2016, received in U.S. Appl. No. 14/866,361 (7334), 8 pages.
Office Action, dated Jun. 10, 2016, received in Australian Patent Application No. 2016100292 (7334AU), which corresponds with U.S. Appl. No. 14/866,361, 4 pages.
Notice of Allowance/Grant, dated Jul. 1, 2016, received in Chinese Patent Application No. 201620251706.X (7334CN01), which corresponds with U.S. Appl. No. 14/866,361, 3 pages.
Letters Patent, dated Aug. 3, 2016, received in Chinese Patent Application No. 201620251706.X (7334CN01), which corresponds with U.S. Appl. No. 14/866,361, 3 pages.
Certificate of Registration, dated Jun. 24, 2016, received in German Patent Application No. 202016001819.2 (7334DE), which corresponds with U.S. Appl. No. 14/866,361, 3 pages.
Office Action, dated Apr. 7, 2016, received in Danish Patent Application No. 201500579 (7334DK), which corresponds with U.S. Appl. No. 14/866,361, 10 pages.
Patent, dated Aug. 8, 2016, received in Australian Patent Application No. 2016100649 (7335AU), which corresponds with U.S. Appl. No. 14/866,987, 1 page.
Office Action, dated Mar. 22, 2016, received in Danish Patent Application No. 201500587 (7335DK), which corresponds with U.S. Appl. No. 14/866,987, 8 pages.
Notice of Allowance, dated Jun. 10, 2016, received in Danish Patent Application No. 201500587 (7335DK), which corresponds with U.S. Appl. No. 14/866,987, 2 pages.
Certificate of Exam, dated Jul. 21, 2016, received in Australian Patent Application No. 2016100652 (7336AU), which corresponds with U.S. Appl. No. 14/866,989, 1 page.
Office Action, dated Apr. 1, 2016, received in Danish Patent Application No. 201500589 (7336DK), which corresponds with U.S. Appl. No. 14/866,989, 8 pages.
Notice of Allowance, dated Jun. 10, 2016, received in Danish Patent Application No. 201500589 (7336DK), which corresponds with U.S. Appl. No. 14/866,989, 2 pages.
Office Action, dated Apr. 11, 2016, received in U.S. Appl. No. 14/871,236 (7337), 23 pages.
Office Action, dated Jun. 28, 2016, received in U.S. Appl. No. 14/871,236 (7337), 21 pages.
Office Action, dated Apr. 8, 2016, received in Danish Patent Application No. 201500595 (7337DK), which corresponds with U.S. Appl. No. 14/871,236, 12 pages.
Office Action, dated May 26, 2016, received in Danish Patent Application No. 201500595 (7337DK), which corresponds with U.S. Appl. No. 14/871,236, 14 pages.
Office Action, dated Apr. 6, 2016, received in Danish Patent Application No. 201500596 (7339DK), which corresponds with U.S. Appl. No. 14/870,882, 7 pages.
Office Action, dated Jun. 9, 2016, received in Danish Patent Application No. 201500596 (7339DK), which corresponds with U.S. Appl. No. 14/870,882, 9 pages.
Office Action, dated Apr. 7, 2016, received in Danish Patent Application No. 201500597 (7341DK), which corresponds with U.S. Appl. No. 14/871,227, 7 pages.
Notice of Allowance, dated Jun. 21, 2016, received in Danish Patent Application No. 201500597 (7341DK), which corresponds with U.S. Appl. No. 14/871,227, 2 pages.
Office Action, dated Apr. 18, 2016, received in Danish Patent Application No. 201500601 (7342DK), which corresponds with U.S. Appl. No. 14/871,336, 8 pages.
Notice of Allowance, dated Apr. 18, 2016, received in Danish Patent Application No. 201500600 (7343DK), which corresponds with U.S. Appl. No. 14/871,462, 7 pages.
Office Action, dated Apr. 29, 2016, received in U.S. Appl. No. 14/867,823 (7344), 28 pages.
Office Action, dated Mar. 18, 2016, received in Danish Patent Application No. 201500594 (7344DK), which corresponds with U.S. Appl. No. 14/867,823, 10 pages.
Office Action, dated May 10, 2016, received in U.S. Appl. No. 14/867,892 (7345), 28 pages.
Office Action, dated Mar. 21, 2016, received in Danish Patent Application No. 201500598 (7345DK), which corresponds with U.S. Appl. No. 14/867,892, 9 pages.
Office Action, dated May 23, 2016, received in Australian Patent Application No. 2016100253 (7352AU), which corresponds with U.S. Appl. No. 14/867,990, 5 pages.
Office Action, dated Mar. 18, 2016, received in Danish Patent Application No. 201500581 (7352DK), which corresponds with U.S. Appl. No. 14/867,990, 9 pages.
Certificate of Registration, dated Jun. 16, 2016, received in German Patent No. 202016001489.8 (7352DE), which corresponds with U.S. Appl. No. 14/867,990, 3 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.

(56) References Cited

OTHER PUBLICATIONS

International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14,536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.

International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
Office Action, dated Mar. 28, 2018, received in Chinese Patent Application No. 201380068295.X (5848CN), which corresponds with U.S. Appl. No. 14/608,942, 5 pages.
Notice of Allowance, dated Apr. 4, 2018, received in Chinese Patent Application No. 201380035977.0 (5850CN), which corresdponds with U.S. Appl. No. 14/536,203, 3 pages.
Oral Proceedings, dated Mar. 7, 2018, received in European Office Action No. 13798465.4 (5851EP), which corresponds with U.S. Appl. No. 14/608,965, 5 pages.
Decision to grant, dated Mar. 29, 2018, received in European Patent Application No. 16710871.1 (7246EP), which corresponds with U.S. Appl. No. 14/864,737, 2 pages.
Office Action, dated Mar. 26, 2018, received in Australian Patent Application No. 2016304890 (7310AU01), which corresponds with U.S. Appl. No. 14/866,992, 3 pages.
Notice of Allowance, dated Apr. 9, 2018, received in U.S. Appl. No. 14/857,700 (7324), 7 pages.
Patent, dated Mar. 9, 2018, received in Japanese Patent Application No. 2016-233450 (7336JP), which corresponds with U.S. Appl. No. 14/866,989, 4 pages.
Office Action, dated Apr. 2, 2018, received in Japanese Patent Application No. 2018-020324 (7342JP), which corresponds with U.S. Appl. No. 14/874,336, 4 pages.
Notice of Allowance, dated Apr. 18, 2018, received in U.S. Appl. No. 14/867,823 (7344), 10 pages.
Notice of Allowance, dated Mar. 30, 3018, received in U.S. Appl. No. 14/867,990 (7352), 5 pages.
Office Action, dated Apr. 11, 2018, received in anish Patent Application No. 201670591 (7403DK02), which corresponds with U.S. Appl. No. 15/231,745, 3 pages.
Notice of Allowance, dated Mar. 27, 2018, received in Danish Patent Application No. 201670592 (7403DK03), which corresponds with U.S. Appl. No. 15/231,745, 2 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", http://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Easton-Ellett, "Three Free Cydia Utilities to Remove iOS Notification Badges", http://www.ijailbreak.com/cydia/thre-free-cydia-utilities-to-remove-ios-notification-badges, Apr. 14, 2012, 2 pages.
iPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mahdi, Confero now available in Cydia, brings a new way to manage Notification badges [Jailbreak Tweak], http://www.iphonehacks.com/2015/01/confero/tweak-mangae-notification-badges.html, Jan. 1, 2015, 2 pages.
Oh, et al., "Moving Objects with 2D Input Devices in CAD Systems and Destop Virtual Environments", Proceedings of Graphics Interface 2005, 8 pages, May 2005.

(56) References Cited

OTHER PUBLICATIONS

Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Stewart, et al., "Characteristics of Pressure-Based Input for Mobile Devices", Proceedings of the SIGCHI Conference on Human Factors in Computing Systems, Apr. 2010, 10 pages.
Notice of Allowance, dated Jun. 26, 2018, received in U.S. Appl. No. 14/608,895 (5839), 9 pages.
Notice of Allowance, dated May 16, 2018, received in U.S. Appl. No. 14/536,367 (5841), 5 pages.
Office Action, dated May 8, 2018, received in Australian Patent Application No. 2016216580 (5842AU02), which corresponds with U.S. Appl. No. 14/536,426, 5 pages.
Notice of Allowance, dated May 17, 2018, received in Australian Patent Application No. 2016216580 (5842AU02), which corresonds with U.S. Appl. No. 14/536,426, 3 pages.
Notice of Allowance, dated May 10, 2018, received in Chinese Patent Application No. 201380035982.1 (5842CN), which corresponds with U.S. Appl. No. 14/536,426, 2 pages.
Final Office Action, dated Jun. 22, 2018, received in U.S. Appl. No. 14/536,464 (5843), 32 pages.
Final Office Action, dated May 3, 2018, received in U.S. Appl. No. 14/536,644 (5844), 28 pages.
Final Office Action, dated Jun. 6, 2018, received in U.S. Appl. No. 14/608,926 (5845), 19 pages.
Certificate of Grant, dated May 3, 2018, received in Australian Patent Application No. 2016201451 (5845AU01), which corresponds with U.S. Appl. No. 14/608,926, 1 page.
Patent, dated May 4, 2018, received in Chinese Patent Application No. 201380068414.1 (5845CN), which corresponds with U.S. Appl. No. 14/608,926, 4 pages.
Patent, dated Apr. 27, 2018, received in Japanese Patent Application No. 2017-024234 (5845JP01), which corresponds with U.S. Appl. No. 14/608,926, 3 pages.
Office Action, dated Apr. 9, 2018, received in European Patent Application No. 13726053.5 (5547EP), which corresponds with U.S. Appl. No. 14/536,141, 9 pages.
Office Action, dated Jul. 2, 2018, received in U.S. Appl. No. 14/608,965 (5851), 16 pages.
Notice of Allowance, dated Jun. 1, 2018, received in U.S. Appl. No. 14/536,267 (5853), 5 pages.
Patent, dated Apr. 20, 2018, received in Chinese Patent Application No. 201380035968.1 (5853CN), which corresponds with U.S. Appl. No. 14/536,267, 4 pages.
Office Action, dated Jun. 13, 2018, received in Chinese Patent Application No. 201810332044.2 (5853CN02), which corresponds with U.S. Appl. No. 14/536,267, 2 pages.
Intention to Grant, dated Jun. 27, 2018, received in European Patent Application No. 13724106.3 (5853EP), which corresponds with U.S. Appl. No. 14/536,267, 5 pages.
Notice of Allowance, dated Mar. 20, 2018, received in U.S. Appl. No. 14/536,291 (5854), 5 pages.
Office Action, dated Jun. 29, 2018, received in Japanese Patent Application No. 2017-083027 (5854JP01), which corresponds with U.S. Appl. No. 14/536,291, 5 pages.
Notice of Allowance, dated Apr. 20, 2018, received in U.S. Appl. No. 14/608,985 (5855), 5 pages.
Office Action, dated Apr. 27, 2018, received in Japanese Patent Application No. 2017-008764 (5858JP), which corresponds with U.S. Appl. No. 14/536,648, 5 pages.
Office Action, dated Apr. 16, 2018, received in Australian Patent Application No. 2016233792 (7246AU01), which corresponds with U.S. Appl. No. 14/864,737, 2 pages.
Grant Certificate, dated Apr. 25, 2018, received in European Patent Application No. 16710871.1 (7246EP), which corresponds with U.S. Appl. No. 14/864,737, 2 pages.
Notice of Allowance, dated May 18, 2018, received in U.S. Appl. No. 14/866,159 (7265), 8 pages.
Office Action, dated Jun. 5, 2018, received in Chinese Patent Application No. 201610137839.9 (7265CN), which corresponds with U.S. Appl. No. 14/866,159, 11 pages.
Patent, dated May 22, 2018, received in Danish Patent Application No. 201500574 (7265DK), which corresponds with U.S. Appl. No. 14/866,159, 2 pages.
Notice of Allowance, dated May 24, 2018, received in U.S. Appl. No. 14/868,078 (7267), 6 pages.
Office Action, dated Apr. 25, 2018, received in European Patent Application No. 16708916.8 (7267EP), which corresponds with U.S. Appl. No. 14/868,078, 6 pages.
Office Action, dated May 24, 2018, received iin European Patent Application No. 16727900.9 (7294EP), which corresponds with U.S. Appl. No. 14/866,511, 7 pages.
Notice of Allowance, dated Apr. 24, 2018. received in Danish Patent Application No. 201500592 (7309DK), which corresponds with U.S. Appl. No. 14/869,899, 2 pages.
Patent, dated May 28, 2018, received in Danish Patent Application No. 201500592 (7309DK), which corresponds with U.S. Appl. No. 14/869,899, 2 pages.
Office Action, dated May 1, 2018, received in Danish Patent Application No. 201670594 (7309DK01), which corresponds with U.S. Appl. No. 14/869,899, 2 pages.
Notice of Allowance, dated Jun. 29, 2018, received in U.S. Appl. No. 14/856,517 (7317), 11 pages.
Notice of Allowance, dated May 2, 2018, received in U.S. Appl. No. 14/856,519 (7318), 10 pages.
Office Action, dated Jun. 25, 2018, received in Japanese Patent Application No. 2017-029201 (4322JP), which corresponds with U.S. Appl. No. 14/857,636, 4 pages.
Notice of Allowance, dated Apr. 19, 2018, received in U.S. Appl. No. 14/865,529 (7329), 11 pages.
Grant of Patent, dated Apr. 16, 2018, received in Dutch Patent Application No. 2019215 (7329NL), 2 pages.
Patent, dated May 22, 2018, received in Danish Patent Application No. 201500579 (7334DK), which corresponds with U.S. Appl. No. 14/866,361, 2 pages.
Office Action, dated Jun. 11, 2018, received in European Patent Application No. 17188507.2 (7334EP), which corresponds with U.S. Appl. No. 14/866,361, 10 pages.
Office Action, dated May 7, 2018, received in European Patent Application No. 16189421.7 (7335EP), which corresponds with U.S. Appl. No. 14/866,987, 5 pages.
Patent, dated Apr. 6, 2018, received in Japanese Patent Application No. 2017-126445 (7335JP01), which corresponds with U.S. Appl. No. 14/866,987, 3 pages.
Final Office Action, dated Jul. 3, 2018, received in U.S. Appl. No. 14/866,989 (7336), 17 pages.
Notice of Allowance, dated Apr. 26, 2018, received in Danish Patent Application No. 201500595 (7337DK), which corresponds with U.S. Appl. No. 14/871,236, 2 pages.
Patent, dated Jun. 18, 2018, received in Danish Patent Application No. 201500595 (7337DK), which corresponds with U.S. Appl. No. 14/871,236, 3 pages.
Notice of Allowance, dated Jul. 2, 2018, received in U.S. Appl. No. 14/870,754 (7338), 9 pages.
Final Office Action, dated Apr. 20, 2018, received in U.S. Appl. No. 14/870,882 (7339), 7 pages.
Notice of Allowance, dated Jul. 12, 2018, received in U.S. Appl. No. 14/870,882 (7339), 5 pages.
Notice of Allowance, dated Jun. 11, 2018, received in U.S. Appl. No. 14/871,227 (7341) 11 pages.
Office Action, dated Apr. 24, 2018, received in U.S. Appl. No. 14/867,892 (7345), 63 pages.
Notice of Allowance, dated May 31, 2018, received in U.S. Appl. No. 14/869,855 (7347), 10 pages.
Final Office Action, dated May 23, 2018, received in U.S. Appl. 14/869,873 (7348), 18 pages.
Final Office Action, dated Jul. 3, 2018, received in U.S. Appl. No. 15/009,668 (7389), 19 pages.
Notice of Allowance, dated Jun. 28, 2018, received in Korean Patent Application No. 2017-7014536 (7398KR), which corresponds with U.S. Appl. No. 15/081,771, 4 pages

(56) References Cited

OTHER PUBLICATIONS

Office Action, dated May 4, 2018, received in Australian Patent Application No. 2018202855 (7399AU), which corresponds with U.S. Appl. No. 15/136,782, 3 pages.c.
Patent, dated May 22, 2018, received in Danish Patent Application No. 201770190 (7399DK), which corresponds with U.S. Appl. No. 15/136,782, 2 pages.
Office Action, dated Jun. 1, 2018, received in Japanese Patent Application No. 2018-062161 (7399JP), which corresponds with U.S. Appl. No. 15/136,782, 5 pages.
Patent, dated May 28, 2018, received in Danish Patent Application No. 201670590 (7403DK01), which corresponds with U.S. Appl. No. 15/231,745, 2 pages.
Patent, dated May 28, 2018, received in Danish Patent Applicatioon No. 201670592 (7403DK03), which corresponds with U.S. Appl. No. 15/231,745, 2 pages.
Office Action, dated Apr. 20, 2018, received in European Patent Application No. 16756862.5 (7432EP), which corresponds with U.S. Appl. No. 15/272,345, 15 pages.
Office Action, dated Apr. 23, 2018, received in U.S. Appl. No. 15/499,691 (7495), 29 pages.
Final Office Action, dated May 10, 2018, received in U.S. Appl. No. 15/655,749 (7506), 19 pages.
International Preliminary Report on Patentability, dated Sep. 12, 2017, received in International Patent Application No. PCT/US2016/021400 (7309WO), which corresponds with U.S. Appl. No. 14/869,899, 39 pages.
International Preliminary Report on Patentability, dated Feb. 13, 2018, received in International Patent Application No. PCT/US2016/046407 (7313WO), which corresponds with U.S. Appl. No. 15/009,688, 20 pages.
Extended European Search Report, dated May 30, 2018, received in International Patent Application No. 18155939.4 (7429EP), which corresponds with U.S. Appl. No. 15/272,327, 8 pages.
Anonymous, "Acer Liquid Z5 Duo User's Manual", https://global-download.acer.com, Feb. 21, 2014, 65 pages.
Jauregui et al, "Design and Evaluation of 3D Cursors and Motion Parallax for the Exploration of Desktop Virtual Environments", IEEE Symposium on 3D User Interface 2012, Mar. 4, 2012, 8 pages.
Neuburg, "Detailed Explanation iOS SDK", Oreilly Japan, Dec. 22, 2014, vol. 4, p. 175-186, 15 pages.
Nickinson, "How to use Do Not Disturb on the HTC One M8", Android Central (Year: 2014), Apr. 7, 2014, 9 pages.
Ogino, iOS 7 Design Standard, Japan, Impress Japan Corporation, Nov. 21, 2013, 1st edition, pp. 58-59.
Plaisant et al, "Touchscreen Toggle Design", Proceedings of CHI '92, pp. 667-668, May 3-7, 1992, 2 pages.
Rubino et al., "How to Enable 'Living Images' on your Nokia Lumia with Windows Phone 8.1", https://www.youtube.com/watch?v=RX7vpoFy1Dg, Jun. 6, 2014, 5 pages.
Tweak, UltimateiDeviceVids, Cydia Tweak: Quick Center—Add 3-Touch Shortcuts to ControlCenter, https://www.youtube.com/watch?v=8rHOFpGvZFM, Mar. 22, 2016, 2 pages.
Tweak, "iCrackUriDevice, iOS 9.0.2 Jailbreak & 9.2.1-9.3 Support: QuickCenter 3D Touch Cydia Tweak!", https://www.youtube.com/watch?v=op-OBr3O_Fkl, Mar. 6, 2016, 3 pages.
UpDown-G, "Using Multiple Selection Mode in Android 4.0 / Getting Started", https://techbooster.org/android/13946, Mar. 7, 2012, 7 pages.
Notice of Allowance, dated Sep. 5, 2018, received in U.S. Appl. No. 14/535,671 (5448), 5 pages.
Patent, dated Dec. 25, 2018, received in Chinese Patent Application No. 201380068493.6 (5839CN), which corresponds with U.S. Appl. No. 14/608,895, 4 pages.
Certificate of Grant, dated Dec. 26, 2018, received in European Patent Application No. 13795391.5 (5839EP), which corresponds with U.S. Appl. No. 14/536,426, 4 pages.
Patent, dated Oct. 23, 2018, received in Chinese Patent Application No. 201510566550.4 (5842CN01), which corresponds with U.S. Appl. No. 14/536,426, 4 pages.
Decision to Grant, dated Jan. 10, 2019, received in European Patent Application No. 15183980.0 (5842EP01), which corresponds with U.S. Appl. No. 14/536,426, 4 pages.
Office Action, dated Nov. 6, 2018, received in Japanese Patent Application No. 2018-000753 (5842JP01), which corresponds with U.S. Appl. No. 14/536,426, 8 pages.
Office Action, dated Nov. 2, 2018, received in U.S. Appl. 14/536,644 (5844), 24 pages.
Patent, dated Oct. 23, 2018, received in Chinese Patent Application No. 201380035893.7 (5847CN), which corresponds with U.S. Appl. No. 14/536,141, 4 pages.
Notice of Allowance, dated Jan. 15, 2019, received in Korean Patent Application No. 2015-7018448 (5848KR), which corresponds with U.S. Appl. No. 14/608,942, 5 pages.
Certificate of Grant, dated Nov. 1, 2018, received in Australian Patent Application No. 2016238917 (5850AU01), which corresponds with U.S. Appl. No. 14/536,203, 1 page.
Decision to Grant, dated Oct. 24, 2018, received in European Patent Application No. 13724104.8 (5850EP), which corresponds with U.S. Appl. No. 14/536,203, 5 pages.
Office Action, dated Oct. 19, 2018, received in Japanese Patent Application No. 2018-022394 (5850JP02), which corresponds with U.S. Appl. No. 14/536,203, 4 pages.
Final Office Action, dated Jan. 10, 2019, received in U.S. Appl. No. 14/608,965 (5851), 17 pages.
Office action, dated Nov. 1, 2018, received in Chinese Patent Application No. 201380074060.1 (5851CN), which corresponds with U.S. Appl. No. 14/608,965, 3 pages.
Office Action, dated Nov. 28, 2018, received in Chinese Patent Application No. 201610537334.1 (5853CN01), which corresponds with U.S. Appl. No. 14/536,267, 5 pages.
Grant Certificate, dated Nov. 14, 2018, received in European Patent Application No. 13724106.3 (5853EP), which corresponds with U.S. Appl. No. 14/536,267, 3 pages. 4 pages.
Decision to Grant, dated Nov. 29, 2018, received in European Patent Application No. 16177863.4 (5853EP01), which corresponds with U.S. Appl. No. 14/536,267, 4 pages.
Patent, dated Dec. 26, 2018, received in European Patent Application No. 16177863.4 (5853EP01), which corresponds with U.S. Appl. No. 14/536,267, 4 pages.
Office Action, dated Feb. 4, 2019, received in Japanese Patent Application No. 2017-237035 (5853JP02), which corresponds with U.S. Appl. No. 14/536,267, 7 pages.
Patent, dated Oct. 24, 2016, received in Korean Patent Application No. 2014-7034530 (5853KR), which corresponds with U.S. Appl. No. 14/536,267, 4 pages.
Office Action, dated Jan. 29, 2018, received in Korean Patent Application No. 2017-7034838 (5853KR02), which corresponds with U.S. Appl. No. 14/536,267, 4 pages.
Notice of Allowance, dated Dec. 3, 2018, received in Korean Patent Application No. 2017-7034838 (5853KR02), which corresponds with U.S. Appl. No. 14/536,267, 5 pages.
Patent, dated Nov. 30, 2018, received in Australian Patent Application No. 2016216658 (5854AU01), which corresponds with U.S. App. No. 14/536,291, 4 pages.
Intention to Grant, dated Jan. 8, 2019, received in European Patent Application No. 17186744.3 (5854EP01), which corresponds with U.S. Appl. No. 14/536,291, 7 pages.
Notice of Allowance, dated Jan. 15, 2019, received in Japanese Patent Application No. 2017-083027 (5854JP01), which corresponds with U.S. Appl. No. 14/536,291, 5 pages.
Intention to Grant, dated Jan. 16, 2019, received in European Patent Application No. 13811032.5 (5855EP), which corresponds with U.S. Appl. No. 14/608,985, 9 pages.
Office Action, dated Jan. 2, 2019, received in U.S. Appl. No. 14/536,648 (5858) 12 pages.
Notice of Allowance, dated Feb. 4, 2019, received in Japanese Patent Application No. 2017-008764 (5858JP), which corresponds with U.S. Appl. No. 14/536,648, 5 pages.
Notice of Allowance, dated Dec. 17, 2018, received in Korean Patent Application No. 2017-7008614 (5859KR), which corresponds with U.S. Appl. No. 14/609,042, 5 pages.

(56) References Cited

OTHER PUBLICATIONS

Patent, dated Dec. 26, 2018, received in Korean Patent Application No. 2017-7030129 (7246KR), which corresponds with U.S. Appl. No. 14/864,737, 4 pages.
Office Action, dated Nov. 5, 2018, received in Chinese Patent Application No. 201610131415.1 (7247CN), which corresponds with U.S. Appl. No. 14/866,981, 6 pages.
Notice of Allowance, dated Dec. 6, 2018, received in Chinese Patent Application No. 201610137839.9 (7265CN), which corresponds with U.S. Appl. No. 14/866,159, 3 pages.
Office Action, dated Aug. 20, 2018, received in Chinese Patent Application No. 01610130348.1 (7267CN), which corresponds with U.S. Appl. No. 14/868,078, 6 pages.
Office Action, dated Oct. 25, 2018, received in European Patent Application No. 17184437.6 (7267EP01), which corresponds with U.S. Appl. No. 14/868,078, 6 pages.
Office Action, dated Dec. 4, 2018, received in Chinese Patent Application No. 201610342313.4 (7270CN), which corresponds with U.S. Appl. No. 14/863,432, 5 pages.
Office Action, dated Dec. 5, 2018, received in Chinese Patent Application No. 201610342264.4 (7294CN), which corresponds with U.S. Appl. No. 14/866,511, 4 pages.
Office Action, dated Jan. 2, 2019, received in European Patent Application No. 16727900.9 (7294EP), which corresponds with U.S. Appl. No. 14/866,511, 5 pages.
Office Action, dated Jan. 11, 2019, received in Japanese Patent Application No. 2018-506425 (7310JP), which corresponds with U.S. Appl. No. 14/866,992, 6 pages.
Notice of Allowance, dated Nov. 15, 2018, received in U.S. Appl. No. 15/009,676 (7312), 6 pages.
Notice of Allowance, dated Nov. 6, 2018, received in U.S. Appl. No. 15/009,688 (7313), 10 pages.
Office Action, dated Nov. 20, 2018, received in U.S. Appl. No. 14/856,520 (7319), 36 pages.
Office Action, dated Jan. 15, 2019, received in Australian Patent Application No. 2017202816 (7322AU), which corresponds with U.S. Appl. No. 14/857,636, 3 pages.
Office Action, dated Nov. 28, 2018, received in Korean Patent Application No. 20177036645 (7322KR), which corresponds with U.S. Appl. No. 14/857,636, 6 pages.
Office Action, dated Nov. 7, 2018, received in Chinese Patent Application No. 201610342151.4 (7330CN), which corresponds with U.S. Appl. No. 14/864,580, 3 pages.
Office Action, dated Feb. 4, 2019, received in European Patent Application No. 16730554.9 (7331EP), which corresponds with U.S. Appl. No. 14/864,601, 10 pages.
Notice of Allowance, dated Dec. 10, 2018, received in Japanese Patent Application No. 2017-561375 (7331JP), which corresponds with U.S. Appl. No. 14/864,601, 5 pages.
Patent, dated Jan. 11, 2019, received in Japanese Patent Application No. 2017-561375 (7331JP), which corresponds with U.S. Appl. No. 14/864,601, 3 pages.
Office Action, dated Jan. 25, 2019, received in Korean Patent Application No. 2017-7033756 (7331KR), which corresponds with U.S. Appl. No. 14/864,601, 8 pages.
Office Action, dated Oct. 19, 2018, received in Chinese Patent Application No. 201610189298.4 (7334CN), which corresponds with U.S. Appl. No. 14/866,361, 6 pages.
Office Action, dated Jan. 30, 2019, received in European Patent Application No. 17188507.2 (7334EP), which corresponds with U.S. Appl. No. 14/866,361, 13 pages.
Notice of Allowance, dated Jan. 30, 2019, received in Korean Patent Application No. 2018-7013039 (7334KR), which corresponds with U.S. Appl. No. 14/866,361, 5 pages.
Office Action, dated Dec. 4, 2018, received in Chinese Patent Application No. 201610342336.5 (7335CN), which corresponds with U.S. Appl. No. 14/866,987, 5 pages.
Office Action, dated Dec. 11, 2018, received in European Patent Application No. 16189421.7 (7335EP), which corresponds with U.S. Appl. No. 14/866,987, 6 pages.
Notice of Allowance, dated Jan. 17, 2019, received in U.S. Appl. No. 14/866,989 (7336), 8 pages.
Notice of Allowance, dated Dec. 3, 2018, received in U.S. Appl. No. 14/870,754 (7338), 8 pages.
Notice of Allowance, dated Dec. 5, 2018, received in U.S. Appl. No. 14/870,882 (7339), 8 pages.
Office Action, dated Feb. 11, 2019, received in European Patent Application No. 17171972.7 (7339EP), which corresponds with U.S. Appl. No. 14/870,882, 7 pages.
Notice of Acceptance, dated Oct. 30, 2018, received in Australian Patent Application No. 2016203040 (7341AU), which corresponds with U.S. Appl. No. 14/871,227, 4 pages.
Patent, dated Nov. 28, 2018, received in European Patent No. 16711743.1 (7341EP), which corresponds with U.S. Appl. No. 14/871,227, 1 page.
Patent, dated Dec. 28, 2018, received in Korean Patent Application No. 2016-7019816 (7341KR), which corresponds with U.S. Appl. No. 14/871,227, 8 pages.
Office Action, dated Nov. 5, 2018, received in U.S. Appl. No. 14/871,336 (7342), 24 pages.
Notice of Allowance, dated Feb. 5, 2019, received in U.S. Appl. No. 14/871,336 (7342), 10 pages.
Patent, dated Nov. 16, 2018, received in Japanese Patent Application No. 2018-020324 (7342JP), which corresponds with U.S. Appl. No. 14/871,336, 4 pages.
Final Office Action, dated Oct. 26, 2018, received in U.S. Appl. No. 14/869,703 (7353), 19 pages.
Office Action, dated Jan. 10, 2019, received in U.S. Appl. No. 15/009,668 (7389), 17 pages.
Notice of Acceptance, dated Jan. 24, 2019, received in Australian Patent Application No. 2017202058 (7398AU), which corresponds with U.S. Appl. No. 15/081,771, 3 pages.
Office Action, dated Nov. 12, 2018, received in Japanese Patent Application No. 2018-062161 (7399JP), which corresponds with U.S. Appl. No. 15/136,782, 5 pages.
Office Action, dated Oct. 31, 2018, received in Korean Patent Application No. 2018-7020659 (7399KR), which corresponds with U.S. Appl. No. 15/136,782, 5 pages.
Office Action, dated Dec. 18, 2018, received in Danish Patent Application No. 201670587 (7403DK), which corresponds with U.S. Appl. No. 15/231,745, 4 pages.
Office Action, dated Nov. 23, 2018, received in Danish Patent Application No. 201670591 (7403DK02), which corresponds with U.S. Appl. No. 15/231,745, 7 pages.
Notice of Allowance, dated Oct. 4, 2018, received in U.S. Appl. No. 15/272,327 (7429), 46 pages.
Office Action, dated Oct. 26, 2018, received in U.S. Appl. No. 15/272,341 (7430), 22 pages.
Office Action, dated Jan. 8, 2019, received in European Patent Application No. 17206374.5 (7431EP), which corresponds with U.S. Appl. No. 15/272,343, 5 pages.
Office Action, dated Nov. 13, 2018, received in European Patent Application No. 16756862.5 (7432EP), which corresponds with U.S. Appl. No. 15/272,345, 5 pages.
Decision to Grant, dated Jan. 31, 2019, received in European Patent Application No. 16756862.5 (7432EP), which corresponds with U.S. Appl. No. 15/272,345, 5 pages.
Notice of Allowance, dated Aug. 15, 2018, received in U.S. Appl. No. 15/482,618 (7491), 7 pages.
Notice of Allowance, dated Oct. 12, 2018, received in U.S. Appl. No. 15/499,693 (7495), 8 pages.
Office Action, dated Jan. 24, 2019, received in U.S. Appl. No. 15/655,749 (7506), 25 pages.
Extended European Search Report, dated Dec. 5, 2018, received in European Patent Application No. 18194127.9 (5848EP01), which corresponds with U.S. Appl. 14/608,942, 8 pages.
Extended European Search Report, dated Oct. 30, 2018, received in European Patent Application No. 18183789.9 (5853EP02), which corresponds with U.S. Appl. No. 14/536,267, 11 pages.
Anonymous, "Android—What Should Status Bar Toggle Button Behavior Be?", https://ux.stackechange.com/questions/34814, Jan. 15, 2015, 2 pages.

(56) References Cited

OTHER PUBLICATIONS

Anonymous, "Event Handling Guide for iOS", https://github.com/Ionfee88/iOSDevelopeLibrary/raw/master/EventHandlingiPhoneOS.pdf, Mar. 9, 2015, 74 pages.
Anonymous, "Event Handling Guide for iOS—GitHub", https://github.com/Ionfee88/iOSDevelopeLibrary/blob/master/EventHandlingiPhoneOS.pdf, Apr. 15, 2015, 3 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Bilibili, "Android 5.0 Lollipop", https://www.bilibili.com/video/av1636064?from=search&seid=3128140235778895126, Oct. 19, 2014, 3 pages.
Dachis, "All the Awesome Things You Can Do With a Long Press on Your iPhone, iPad, or iPad Touch", www.lifehacker.com, Jan. 25, 2012, 4 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.
McGarry, "Everything You Can Do With Force Touch on Apple Watch", Macworld, www.macworld.com, May 6, 2015, 4 pages.
YouTube, "How to Use 3D Touch Multitasking on iPhone", https://www.youtube.com/watch?v=kDq05uRdrCg, Sep. 29, 2015, 1 page.
Office Action, dated Oct. 9, 2018, received in Chinese Patent Application No. 201380068493.6 (5839CN), which corresponds with U.S. Appl. No. 14/608,895, 3 pages.
Intention to Grant, dated Jul. 6, 2018, received in European Patent Application No. 13795391.5 (5839EP), which corresponds with U.S. Appl. No. 14/536,426, 5 pages.
Office Action, dated Oct. 5, 2018, received in Korean Patent Application No. 2018-7028236 (5839KR01), which corresponds with U.S. Appl. No. 14/608,895, 6 pages.
Notice of Allowance, dated Aug. 15, 2018, received in U.S. Appl. No. 14/536,235 (5840), 5 pages.
Certificate of Grant, dated Sep. 13, 2018, received in Australian Patent Application No. 2016216580 (5842AU02), which corresponds with U.S. Appl. No. 14/536,426, 1 page.
Patent, dated Aug. 17, 2018, received in Chinese Patent Application No. 201380035982.1 (5842CN), which corresponds with U.S. Appl. No. 14/536,426, 4 pages.
Notice of Allowance, dated Aug. 8, 2018, received in Chinese Patent Application No. 201510566550.4 (5842CN01), which corresponds with U.S. Appl. No. 14/536,426, 3 pages.
Intention to Grant, dated Aug. 14, 2018, received in European Patent Application No. 15183980.0 (5842EP01), which corresponds with U.S. Appl. No. 14/536,426, 5 pages.
Notice of Allowance, dated Aug. 9, 2018 received in U.S. Appl. No. 14/536,646 (5846), 5 pages.
Notice of Acceptance, dated Jul. 19, 2018, received in Australian Patent Application No. 2016262773 (5847AU01), which corresponds with U.S. Appl. No. 14/536,141, 3 pages.
Notice of Allowance, dated Aug. 31, 2018, received in Chinese Patent Application No. 201380035893.7 (5847CN), which corresponds with U.S. Appl. No. 14/536,141, 6 pages.
Office Action, dated Aug. 13, 2018, recived in Japanese Patent Application No. 2017-141953 (5847JP01), which corresponds with U.S. Appl. No. 14/536,141, 6 pages.
Certificate of Grant, dated Jul. 5, 2018, received in Australian patent Application No. 2016201303 (5848AU01), which corresponds with U.S. Appl. No. 14/608,942, 4 pages.
Office Action, dated Oct. 8, 2018, received in Chinese Patent Application No. 201380068295.X (5848CN), which corresponds with U.S. Appl. No. 14/608,942, 5 pages.
Decision to Grant, dated Sep. 13, 2018, received in European Patent Application No. 13798464.7 (5848EP), which corresponds with U.S. Appl. No. 14/608,942, 2 pages.
Notice of Acceptance, dated Jul. 19, 2018, received in Australian Patent Application No. 2016238917 (5850AU01), which corresponds with U.S. Appl. No. 14/536,203, 3 pages.
Patent, dated Jul. 6, 2018, received in Chinese Patent Application No. 201380035977.0 (5850CN), which corresponds with U.S. Appl. No. 14/536,203, 4 pages.
Office action, dated Aug. 1, 2018, received in Chinese Patent Application No. 201380074060.1 (5841CN), which corresponds with U.S. Appl. No. 14/608,965, 5 pages.
Decision to Grant, dated Sep. 6, 2018, received in European Office Action No. 13798465.4 (5851EP), which corresponds with U.S. Appl. No. 14/608,965, 2 pages.
Certificate of Grant, dated Jun. 28, 2018, received in Australian Patent Application No. 2016204411 (5853AU01), which corresponds with U.S. Appl. No.14/536,267, 4 pages.
Decision to Grant, dated Oct. 18, 2018, received in European Patent Application No. 13724106.3 (5853EP), which corresponds with U.S. Appl. No. 14/536,267, 3 pages.
Notice of Acceptance, dated Jul. 19, 2018, received in Australian Patent Application No. 2016216658 (5854AU01), which corresponds with U.S. Appl. No. 14/536,291, 3 pages.
Certificate of Grant, dated Jun. 29, 2018, received in Hong Kong Patent Application No. 15112851.6 (5855HK), which corresponds with U.S. Appl. No. 14/608,985, 2 pages.
Office Action, dated Oct. 11, 2018, received in U.S. Appl. No. 14/609,006 (5856), 12 pages.
Final Office Action, dated Aug. 7, 2018, received in U.S. Appl. No. 14/536,648 (5858), 14 pages.
Notice of Acceptance, dated Jul. 19, 2018, received in Australian Patent Application No. 2016247194 (5858AU), which corresponds with U.S. Appl. No. 14/536,648, 3 pages.
Office Action, dated Aug. 24, 2018, received in Japanese Patent Application No. 2017-113598 (5859JP), which corresponds with U.S. Appl. No. 14/609,042, 6 pages.
Office Action, dated Sep. 11, 2018, received in Chinese Patent Application No. 201610159295.6 (7246CN), which corresponds with U.S. Appl. No. 14/864,737, 6 pages.
Notice of Acceptance, dated Aug. 23, 2018, received in Australian Patent Application No. 2018204611 (7309AU01), which corresponds with U.S. Appl. No. 14/869,899, 3 pages.
Office Action, dated Oct. 9, 2018, received in Danish Patent Application No. 201670594 (7309DK01), which corresponds with U.S. Appl. No. 14/869,899, 2 pages.
Office Action, dated Sep. 21, 2018, received in Japanese Patent Application No. 2018-100827 (7309JP), which corresponds with U.S. Appl. No. 14/869,899, 4 pages.
Office Action, dated Oct. 5, 2018, received in Korean Patent Application No. 2018-7017213 (7309KR), which corresponds with U.S. Appl. No. 14/869,899, 3 pages.
Final Office Action, dated Aug. 28, 2018, received in U.S. Appl. No. 14/866,992 (7310), 52 pages.
Office Action, dated Oct. 12, 2018, received in European Patent Application No. 16758008.3 (7310EP), which corresponds with U.S. Appl. No. 14/866,992, 11 pages.
Final Office Action, dated Sep. 19, 2018, received in U.S. Appl. No. 15/009,661 (7311), 28 pages.
Notice of Allowance, dated Aug. 3, 2018, received in U.S. Appl. No. 15/009,676 (7312), 6 pages.
Notice of Allowance, dated Aug. 16, 2018, received in U.S. Appl. No. 14/857,636 (7322), 5 pages.
Notice of Allowance, dated Aug. 16, 2018, received in U.S. Appl. No. 14/857,663 (7323), 5 pages.
Notice of Allowance, dated Oct. 9. 2018. received in U.S. Appl. No. 14/864,529 (7329), 11 pages.
Office Action, dated Aug. 31, 2018, received in Australian Patent Application No. 2016276030 (7311AU), which corresponds with U.S. Appl. No. 14/864,601, 3 pages.
Office Action, dated Oct. 12, 2018, received in Japanese Patent Application No. 2017-141962 (7334JP), which corresponds with U.S. Appl. No. 14/866,361, 6 pages.
Office Action, dated Sep. 14, 2018, received in Korean Patent Application No. 2018-7013039 (7334KR), which corresponds with U.S. Appl. No. 14/866,361, 2 pages.
Final Office Action, dated Oct. 11, 2018, received in U.S. Appl. No. 14/866,987 (7335), 20 pages.

(56) References Cited

OTHER PUBLICATIONS

Office Action, dated Sep. 19, 2018, received in Chinese Patent Application No. 201610342314.9 (7336CN), which corresponds with U.S. Appl. No. 14/866,989, 6 pages.
Office Action, dated Jul. 19, 2018, received in Russian Patent Application No. 2017131408 (7337RU), which corresponds with U.S. Appl. No. 14/871,236, 8 pages.
Notice of Allowance, dated Aug. 27, 2018, received in U.S. Appl. No. 14/870,988 (7340), 11 pages.
Office Action, dated Oct. 11, 2018, received in Australian Patent Application No. 2017245442 (7341AU02), which corresponds with U.S. Appl. No. 14/871,227, 4 pages.
Intent to Grant, dated Sep. 17, 2018, received in European Patent No. 16711743.1 (7341EP), which corresponds with U.S. Appl. No. 14/871,227, 5 pages.
Notice of Allowance, dated Oct. 1, 2018, received in Korean Patent Application No. 2016-7019816 (7341KR), which corresponds with U.S. Appl. No. 14/871,227, 6 pages.
Notice of Allowance, dated Oct. 12, 2018, received in Japanese Patent Application No. 2018-020324 (7342JP), which corresponds with U.S. Appl. No. 14/871,336, 5 pages.
Notice of Allowance, dated Aug. 7, 2018, received in U.S. Appl. No. 14/867,823 (7344), 8 pages.
Final Office Action, dated Oct. 17, 2018, received in U.S. Appl. No. 14/867,892 (7345), 48 pages.
Final Office Action, dated Oct. 4, 2018, received in U.S. Appl. No. 14/869,361 (7346), 28 pages.
Notice of Allowance, dated Jul. 30, 2018, received in U.S. Appl. No. 14/869,873, (7348), 8 pages.
Office Action, dated Sep. 7, 2018, received in U.S. Appl. No. 14/869,997 (7351), 23 pages.
Office Action, dated Oct. 12, 2018, received in Japanese Patent Application No. 2017-086460 (7398JP), which corresponds with U.S. Appl. No. 15/081,771, 5 pages.
Patent, dated Sep. 28, 2018, received in Korean Patent Application No. 2017-7014536 (7398KR), which corresponds with U.S. Appl. No. 15/081,771, 3 pages.
Notice of Acceptance, dated Sep. 10, 2018, received in Australian Patent Application No. 2018202855 (7399AU), which corresponds with U.S. Appl. No. 15/136,782, 3 pages.
Certificate of Grant, dated Jun. 28, 2018, received in Australian Patent Application No. 2018200705 (7429AU), which corresponds with U.S. Appl. No. 15/272,327, 4 pages.
Office Action, dated Sep. 14, 2018, received in European Patent Application No. 15155939.4 (7429EP), which corresponds with U.S. Appl. No. 15/272,327, 5 pages.
Notice of Allowance, dated Jul. 30, 2018, received in Japanese Patent Application No. 2018-506989 (7429JP), which corresponds with U.S. Appl. No. 15/272,327, 4 pages.
Patent, dated Aug. 31, 2018, received in Japanese Patent Application No. 2018-506989 (7429JP), which corresponds with U.S. Appl. No. 15/272,327, 3 pages.
Notice of Allowance, dated Sep. 20, 2018, received in U.S. Appl. No. 15/272,343 (7431), 44 pages.
Office Action, dated Oct. 15, 2018, received in U.S. Appl. No. 15/272,345 (7432). 31 pages.
Certificate of Grant, dated Jun. 28, 2018, received in Australian Patent Application No. 2016304832 (7432AU), which corresponds with U.S. Appl. No. 15/272,345, 4 pages.
Extended European Search Report, dated Jul. 30, 2018, received in European Patent Application No. 18180503.7 (5842EP02), which corresponds with U.S. Appl. No. 14/536,426, 7 pages.
Extended European Search Report, dated Aug. 17, 2018, received in European Patent Application No. 18175195.9 (7309EP01), which corresponds with U.S. Appl. No. 14/869,899, 13 pages.
Extended European Search Report, dated Aug. 2, 2018, received in European Patent Application No. 18168941.5 (7337EP), which corresponds with U.S. Appl. No. 14/871,236, 11 pages.

Extended European Search Report, dated Aug. 24, 2018, received in European Patent Application No. 18171453.6 (7339EP), which corresponds with U.S. Appl. No. 15/136,782, 9 pages.
Final Office Action, dated Mar. 25, 2019, received in U.S. Appl. No. 15/272,341 (7430), 25 pages.
Office Action, dated Mar. 7, 2019, received in European Patent Application No. 13726053.5 (5847EP), which corresponds with U.S. Appl. No. 14/536,141, 5 pages.
Patent, dated Mar. 8, 2019, received in Korean Patent Application No. 2015-7018448 (5848KR), which corresponds with U.S. Appl. No. 14/608,942, 4 pages.
Intention to Grant, dated Mar. 18, 2019, received in European Patent Application No. 13724104.8 (5850EP), which corresponds with U.S. Appl. No. 14/536,203, 9 pages.
Office Action, dated Mar. 15, 2019, received in Australian Patent Application No. 2018204236 (5853AU02), which corresponds with U.S. Appl. No. 14/5326,267, 5 pages.
Patent, dated Mar. 4, 2019, received in Korean Patent Application No. 2017-7034838 (5853KR02), which corresponds with U.S. Appl. No. 14/536,267, 4 pages.
Patent, dated Feb. 22, 2019, received in Japanese Patent Application No. 2017-083027 (5854JP01), which corresponds with U.S. Appl. No. 14/536,291, 3 pages.
Patent, dated Mar. 1, 2019, received in Japanese Patent Application No. 2017-008764 (5858JP), which corresponds with U.S. Appl. No. 14/536,648, 3 pages.
Patent, dated Mar. 8, 2019, received in Korean Patent Application No. 2017-7008614 (5859KR), which corresponds with U.S. Appl. No. 14/609,042, 4 pages.
Notice of Acceptance, dated Mar. 12, 2019, received in Australian Patent Application No. 2016233792 (7246AU01), which corresponds with U.S. Appl. No. 14/864,737, 5 pages.
Notice of Acceptance, dated Mar. 12, 2019, received in Australian Patent Application No. 2016304890 (7310AU01), which corresponds with U.S. Appl. No. 14/866,992, 5 pages.
Certificate of Grant, datd Feb. 21, 2019, received in Australian Patent Application No. 2016276030 (7331AU), which corresponds with U.S. Appl. No. 14/864,601, 4 pages.
Certificate of Grant, dated Feb. 28, 2019, received in Australian Patent Application No. 2016203040 (7341AU), which corresponds with U.S. Appl. No. 14/871,227, 1 page.
Office Action, dated Mar. 22, 2019, received in Australian Patent Application No. 2018204234 (7429AU01), which corresponds with U.S. Appl. No. 15/272,327, 7 pages.
Intention to Grant, dated Mar. 19, 2019, received in European Patent Application No. 15155939.4 (7429EP), which corresponds with U.S. Appl. No. 15/272,327, 6 pages.
Patent, dated Feb. 27, 2019, received in European Patent Application No. 16756862.5 (7432EP), which corresponds with U.S. Appl. No. 15/272,345, 3 pages.
Patent, dated Feb. 6, 2019, received in European Patent Application No. 15183980.0 (5842EP01), which corresponds with U.S. Appl. No. 14/536,426, 4 pages.
Office Action, dated Feb. 22, 2019, received in Japanese Patent Application No. 2018-079290 (5845JP02), which corresponds with U.S. Appl. No. 14/608,926, 7 pages.
Patent, dated Feb. 19, 2019, received in Chinese Patent Application No. 201610137839.9 (7265CN), which corresponds with U.S. Appl. No. 14/866,159, 6pages.
Office Action, daed Feb. 7, 2019, received in Australian Patent Application No, 2017258967 (7267AU03), which corresponds with U.S. Appl. No. 14/868,078, 3 pages.
Office Action, dated Feb. 26, 2019, received in Chinese Patent Application No. 01610130348.1 (7267CN), which corresponds with U.S. Appl. No. 14/868,078, 4 pages.
Patent, dated Feb. 26, 2019, received in Danish Patent Application No. 201670594 (7309DK01), which corresponds with U.S. Appl. No. 14/869,899, 3 pages.
Notice of Allowance, dated Mar. 1, 2019, received in Japanese Patent Application No. 2018-100827 (7309JP), which corresponds with U.S. Appl. No. 14/869,899, 5 pages.

(56) References Cited

OTHER PUBLICATIONS

Notice of Acceptance, dated Feb. 14, 2019, received in Australian Patent Application No. 2017201079 (7336AU02), which corresponds with U.S. Appl. No. 14/866,989, 3 pages.
Office Action, dated Feb. 25, 2019, received in Chinese Patent Application No. 201610342314.9 (7336CN), which corresponds with U.S. Appl. No. 14/866,989, 3 pages.
Patent, dated Feb. 15, 2019, received in Russian Patent Application No. 2017131408 (7337RU), which corresponds with U.S. Appl. No. 14/871,236, 2 pages.
Office Action, dated Feb. 12, 2019, received in European Patent Application No. 17172266.3 (7342EP), which corresponds with U.S. Appl. No. 14/871,336, 6 pages.
Office Action, dated Feb. 27, 2019, received in U.S. Appl. No. 14/869,361 (7346), 28 pages.
Certificate of Grant, dated Jan. 17, 2019, received in Australian Patent Application No. 2018202855 (7399AU), which corresponds with U.S. Appl. No. 15/136,782, 4 pages.
Notice of Allowance, dated Feb. 18, 2019, received in Japanese Patent Application No. 2018-062161 (7399JP), which corresponds with U.S. Appl. No. 15/136,782, 5 pages.
Notice of Allowance, dated Feb. 25, 2019, received in Korean Patent Application No. 2018-7020659 (7399KR), which corresponds with U.S. Appl. No. 15/136,782, 5 pages.
Extended European Search Report, dated Mar. 8, 2019, received in European Patent Application No. 18205283.7 (7398EP), which corresponds with U.S. Appl. No. 15/081,771, 15 pages.

* cited by examiner

600

602 Display, on the display, a user interface of a first software application that includes one or more draggable objects and one or more control objects distinct from the one or more draggable objects While displaying the user interface of the first software application:

604 Detect a contact on the touch-sensitive surface at a first location while a focus selector is displayed over a first draggable object of the one or more draggable objects displayed on the display

606 After detecting the contact on the touch-sensitive surface at the first location, detect a movement of the contact across the touch-sensitive surface to a second location that corresponds to a first control object of the one or more control objects displayed on the display In response to detecting movement of the contact from the first location to the second location In accordance with a determination that the contact at the first location does not satisfy the object selection criteria:

608 Move the focus selector to the first control object in accordance with the movement of the contact across the touch-sensitive surface to the first control object without moving the first draggable object to the first control object

610 In accordance with a determination that the contact at the second location satisfies the second intensity criteria, perform the first predetermined operation that corresponds to activation of the first control object without moving the first draggable object to the first control object In accordance with a determination that the contact at the first location satisfies object selection criteria:

In accordance with a determination that the contact at the first location satisfies object selection criteria:

(A)

612 Move the first draggable object to the first control object in accordance with the movement of the contact across the touch-sensitive surface to the first control object In response to moving the first draggable object to the first control object:

614 In accordance with a determination that the first software application is configured to perform the first predetermined operation in response to detecting a contact at the second location that satisfies the first intensity criteria, visually distinguish the first control object prior to determining that the contact satisfies the first intensity criteria

616 Detect a movement of the contact across the touch-sensitive surface to a fourth location that corresponds to a second control object of the one or more control objects

618 In accordance with a determination that the first software application is not configured to perform a predetermined operation in response to detecting a contact at the fourth location that satisfies the first intensity criteria, forego visually distinguishing the second control object

620 In accordance with a determination that the contact at the second location satisfies first intensity criteria, perform a first predetermined operation that corresponds to activation of the first control object (B)

Figure 6B

In accordance with a determination that the contact at the first location satisfies object selection criteria:

(A)

620 In accordance with a determination that the contact at the second location satisfies first intensity criteria, perform a first predetermined operation that corresponds to activation of the first control object (B)

622 The user interface includes multiple distinct portions, a first portion of the multiple distinct portions includes the first control object, and performing the first predetermined operation that corresponds to activation of the first control object includes changing a second portion, distinct from the first portion, of the multiple distinct portions

624 The first software application is a calendar application, the user interface of the first software application includes multiple time-period user interface elements in the first portion, the one or more draggable objects are one or more calendar entry objects, a respective time-period user interface element of the multiple time-period user interface elements corresponds to a predefined unit of time, the second portion of the user interface of the first software application, prior to the determination that the contact at the second location satisfies the first intensity criteria, includes a calendar view that corresponds to a first unit of time, and changing the second portion includes replacing the calendar view that corresponds to a first unit of time with a calendar view that corresponds to a second unit of time that is distinct from the first unit of time

626 The first software application is a file system navigation application, the user interface of the first software application includes multiple file view control objects in the first portion, the one or more draggable objects are one or more of file icons and/or folder icons, a respective file view control object of the multiple file view control objects corresponds to a distinct file view type, the second portion of the user interface, prior to the determination that the contact at the second location satisfies the first intensity criteria, includes a file view of a first file view type, and changing the second portion includes replacing the file view of the first file view type with a file view of a second file view type that is distinct from the file view of the first file view type (C)

Figure 6C

In accordance with a determination that the contact at the first location satisfies object selection criteria:

(A)

620 In accordance with a determination that the contact at the second location satisfies first intensity criteria, perform a first predetermined operation that corresponds to activation of the first control object (B)

(C)

Subsequent to moving the first draggable object to the first control object and changing the second portion:

628 Detect a movement of the contact across the touch-sensitive surface to a third location that corresponds to the changed second portion on the display

630 Move the first draggable object to a location, in the changed second portion, that corresponds to the third location on the touch-sensitive surface in accordance with the movement of the contact across the touch-sensitive surface to the third location

632 In accordance with a determination that the contact at the third location does not satisfy the object selection criteria, drop the first draggable object at the location, in the changed second portion, that corresponds to the third location on the touch-sensitive surface

634 The object selection criteria include second intensity criteria

Figure 6D

While displaying the user interface of the first software application:

Ⓐ

736 The second tactile output includes an audible component that is louder than an audible component of the first tactile output 738 The first tactile output has a first tactile output intensity and the second tactile output has a second tactile output intensity that is greater than the first tactile output intensity

802 Display, on the display, a user interface that includes:
a first region that is configured to initiate a first display operation in response to an input that satisfies first activation criteria and initiate a second display operation in response to an input that satisfies second activation criteria distinct from the first activation criteria, and
a second region that is distinct from the first region. The second region is configured to initiate a third display operation in response to an input that satisfies the first activation criteria and the second region is not configured to initiate any display operation in response to an input that satisfies the second activation criteria.

> 804 The first activation criteria include first intensity criteria

> 806 The second activation criteria include second intensity criteria distinct from the first intensity criteria > 808 The first region is a region that includes a user interface control and the second region is a region that does not include any user interface control > 810 The user interface includes a plurality of regions that are configured to perform display operations in response to inputs that satisfy the second activation criteria, and regions of the user interface that are outside of the plurality of regions are not configured to perform display operations to inputs that satisfy the second activation criteria While displaying the user interface:

(A)

812 Detect a first input that includes a contact detected on the touch-sensitive surface. The contact included in the first input is associated with the first region of the user interface.

902 The device is configured to provide a first tactile output in response to detecting that first activation criteria have been met, the first activation criteria including a criterion that is met when an intensity of a contact on the touch-sensitive surface increases above a first intensity threshold

↓

904 The device is configured to provide a second tactile output in response to detecting that second activation criteria have been met, the second activation criteria including a criterion that is met when an intensity of a contact on the touch-sensitive surface increases above a second intensity threshold, distinct from the first intensity threshold

↓

906 Display, on the display, a settings user interface that includes one or more control objects. The settings user interface is configured to adjust operations of the device that use:
the one or more sensors that detect intensity of contacts with the touch-sensitive surface, and/or
the one or more tactile output generators.

↓

908 While displaying the settings user interface, detect an input for a first control object of the one or more control objects

| 910 The first control object is a discrete control object that corresponds to a particular setting |

| 912 The first control object is a continuous control object that corresponds to three or more settings |

↓

In accordance with the detected input for the first control object:

(A)

914 Change the second intensity threshold

↓

916 Change the second tactile output

Figure 9A

- 932 The time-based criterion includes a reduced-sensitivity time period that occurs after the time at which the first activation criteria are satisfied, and during the reduced-sensitivity time period, the second intensity threshold is increased

- 934 The device is configured to respond to the satisfaction of the first activation criteria with a first type of operation, and the device is configured to respond to the satisfaction of the second activation criteria with a second type of operation that is different from the first type of operation

- 924 The first intensity threshold is lower than the second intensity threshold, the second activation criteria includes a time-based criterion that is dependent upon a time at which the first activation criteria is met, and the method includes, in accordance with the detected input for the first control object, change the time-based criterion
  - 936 The second intensity threshold includes one or more of: a first offset that decreases over time; and a second offset that changes over time based on an intensity of a contact on the touch-sensitive surface.
  - 938 The time-based criterion includes an intensity offset for a user that is determined based on multiple separate inputs on the touch-sensitive surface by the user
    - 940 The intensity offset for the user is determined based on one or more of: peak intensities of a first predefined number of separate click inputs on the touch-sensitive surface by the user, and peak intensities of a second predefined number of separate drag inputs on the touch-sensitive surface by the user

Figure 9C

DEVICES, METHODS, AND GRAPHICAL USER INTERFACES FOR INTERACTING WITH A CONTROL OBJECT WHILE DRAGGING ANOTHER OBJECT

RELATED APPLICATIONS

This application is a continuation of U.S. application Ser. No. 14/868,078, filed Sep. 28, 2015, which claims priority to U.S. Provisional Application Ser. No. 62/141,818, filed Apr. 1, 2015, entitled "Devices, Methods, And Graphical User Interfaces For Interacting With A Control Object While Dragging Another Object," and U.S. Provisional Application Ser. No. 62/129,958, filed Mar. 8, 2015, entitled "Devices, Methods, And Graphical User Interfaces For Interacting With A Control Object While Dragging Another Object," both of which are incorporated by reference herein in their entireties.

TECHNICAL FIELD

This relates generally to electronic devices with touch-sensitive surfaces, including but not limited to electronic devices with touch-sensitive surfaces that perform various display operations in conjunction with receiving and/or generating tactile information.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to perform display operations on a user interface of a display.

Exemplary display operations include adjusting the position of one or more user interface objects, activating buttons or opening files/applications represented by user interface objects, as well as changing the view of one or more portions of a user interface. Exemplary user interface objects include files, folders, calendar entries, icons, and control elements such as buttons and other graphics. A user will, in some circumstances, need to perform display operations involving user interface objects in a file management program (e.g., Finder from Apple Inc. of Cupertino, Calif.), a calendaring program (e.g., iCal from Apple Inc. of Cupertino, Calif.), an image management application (e.g., Aperture, iPhoto, or Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But existing methods for performing these display operations are cumbersome and inefficient, and can take multiple steps. For example, if a user wishes to change a view while dragging one or more user interface objects, the user needs to release the one or more user interface objects and change a view of a portion of a user interface, and then pick up the one or more user interface objects again to move the one or more user interface objects to the changed view. This sequence of steps is complex and takes additional time.

SUMMARY

Accordingly, there is a need for electronic devices with faster, more efficient methods and interfaces for performing various display operations. Such methods and interfaces optionally complement or replace conventional methods for performing various display operations. In addition, when tactile outputs are used to provide feedback to users, there is a need for methods and interfaces for adjusting tactile outputs. Such methods and interfaces optionally complement or replace conventional methods for providing tactile outputs. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, and one or more sensors to detect intensity of contacts with the touch-sensitive surface. The method includes: displaying, on the display, a user interface of a first software application that includes one or more draggable objects and one or more control objects distinct from the one or more draggable objects; and, while displaying the user interface of the first software application: detecting a contact on the touch-sensitive surface at a first location while a focus selector is displayed over a first draggable object of the one or more draggable objects displayed on the display; after detecting the contact on the touch-sensitive surface at the first location, detecting a movement of the contact across the touch-sensitive surface to a second location that corresponds to a first control object of the one or more control objects displayed on the display; and, in response to detecting movement of the contact from the first location to the second location, in accordance with a determination that the contact at the first location satisfies object selection criteria: moving the first draggable object to the first control object in accordance with the movement of the contact across the touch-sensitive surface to the first control object; and, in accordance with a determination that the contact at the second location satisfies first intensity criteria, performing a first predetermined operation that corresponds to activation of the first control object.

In accordance with some embodiments, a method is performed at an electronic device with a display, a touch-sensitive surface, and one or more sensors to detect intensity of contacts with the touch-sensitive surface. The method includes: displaying, on the display, a user interface of a first software application; and, while displaying the user interface of the first software application, detecting a first input that includes a contact detected on the touch-sensitive surface. The contact included in the first input is associated with a respective region of the user interface of the first software application that is associated with a first operation and a second operation. The method also includes, in response to detecting the first input: in accordance with a determination that a first tactile output setting is active for the first input, performing the first operation without generating a tactile output; and, in accordance with a determination that a second tactile output setting is active for the first input, forgoing performing the first operation. The method further includes detecting a second input that includes a contact detected on the touch-sensitive surface. The contact included in the second input is associated with the respective region of the user interface of the first software application that is associated with the first operation and the second operation and the second input is different from the first input. The method includes, in response to detecting the second input: in accordance with a determination that the second tactile output setting is active for the second input, performing the first operation in conjunction with generating a first tactile output associated with the first operation; and, in accordance with a determination that the first tactile output setting is active for the second input, performing the second operation.

In accordance with some embodiments, a method is performed at an electronic device with a display, a touch-sensitive surface, and one or more sensors to detect intensity of contacts with the touch-sensitive surface. The method includes: displaying, on the display, a user interface that includes: a first region that is configured to initiate a first display operation in response to an input that satisfies first activation criteria and initiate a second display operation in response to an input that satisfies second activation criteria distinct from the first activation criteria; and, a second region that is distinct from the first region and is configured to initiate a third display operation in response to an input that satisfies the first activation criteria and the second region is not configured to initiate any display operation in response to an input that satisfies the second activation criteria. The method also includes, while displaying the user interface, detecting a first input that includes a contact detected on the touch-sensitive surface. The contact included in the first input is associated with the first region of the user interface. The method further includes, in response to detecting the first input: in accordance with a determination that the first input satisfies the first activation criteria, performing the first display operation; and, in accordance with a determination that the first input satisfies the second activation criteria, performing the second display operation and concurrently generating a tactile output of a first type while performing the second display operation. The method includes detecting a second input that includes a contact detected on the touch-sensitive surface. The second input is distinct from the first input and the contact included in the second input is associated with the second region of the user interface. The method also includes, in response to detecting the second input: in accordance with a determination that the second input satisfies the first activation criteria, performing the third display operation; and, in accordance with a determination that the second input satisfies the second activation criteria, generating a tactile output of a second type.

In accordance with some embodiments, a method is performed at an electronic device with a display, a touch-sensitive surface, one or more sensors to detect intensity of contacts with the touch-sensitive surface, and one or more tactile output generators. The device is configured to provide a first tactile output in response to detecting that first activation criteria have been met, the first activation criteria including a criterion that is met when an intensity of a contact on the touch-sensitive surface increases above a first intensity threshold. The device is configured to provide a second tactile output in response to detecting that second activation criteria have been met, the second activation criteria including a criterion that is met when an intensity of a contact on the touch-sensitive surface increases above a second intensity threshold, distinct from the first intensity threshold. The method includes displaying, on the display, a settings user interface that includes one or more control objects. The settings user interface is configured to adjust operations of the device that use: the one or more sensors that detect intensity of contacts with the touch-sensitive surface, and/or the one or more tactile output generators. The method also includes, while displaying the settings user interface, detecting an input for a first control object of the one or more control objects; and, in accordance with the detected input for the first control object: changing the second intensity threshold and changing the second tactile output.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display of a user interface of a first software application that includes one or more draggable objects and one or more control objects distinct from the one or more draggable objects; and, while enabling display of the user interface of the first software application: detect a contact on the touch-sensitive surface unit at a first location while a focus selector is displayed over a first draggable object of the one or more draggable objects displayed on the display unit; after detecting the contact on the touch-sensitive surface at the first location, detect a movement of the contact across the touch-sensitive surface unit to a second location that corresponds to a first control object of the one or more control objects displayed on the display unit; and, in response to detecting movement of the contact from the first location to the second location, in accordance with a determination that the contact at the first location satisfies object selection criteria: move the first draggable object to the first control object in accordance with the movement of the contact across the touch-sensitive surface unit to the first control object; and, in accordance with a determination that the contact at the second location satisfies first intensity criteria, perform a first predetermined operation that corresponds to activation of the first control object.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display of a user interface of a first software application; and, while enabling display of the user interface of the first software application: detect a first input that includes a contact detected on the touch-sensitive surface unit, wherein the contact included in the first input is associated with a respective region of the user interface of the first software application that is associated with a first operation and a second operation; in response to detecting the first input: in accordance with a determination that a first tactile output setting is active for the first input, perform the first operation without generating a tactile output; and in accordance with a determination that a second tactile output setting is active for the first input, forgo performing the first operation. The processing unit is also configured to: detect a second input that includes a contact detected on the touch-sensitive surface unit, wherein the contact included in the second input is associated with the respective region of the user interface of the first software application that is associated with the first operation and the second operation and the second input is different from the first input; and, in response to detecting the second input: in accordance with a determination that the second tactile output setting is active for the second input, perform the first operation in conjunction with generating a first tactile output associated with the first operation; and, in accordance with a determination that the first tactile output setting is active for the second input, perform the second operation.

In accordance with some embodiments, an electronic device includes a display unit configured to display a user interface, a touch-sensitive surface unit to receive contacts, one or more sensor units to detect intensity of contacts with the touch-sensitive surface unit; one or more tactile output units; and a processing unit coupled with the display unit, the touch-sensitive surface unit, the one or more sensor units, and the one or more tactile output units. The processing unit is configured to: enable display of a user interface that includes: a first region that is configured to initiate a first display operation in response to an input that satisfies first activation criteria and initiate a second display operation in response to an input that satisfies second activation criteria distinct from the first activation criteria; and a second region that is distinct from the first region, wherein the second region is configured to initiate a third display operation in response to an input that satisfies the first activation criteria and the second region is not configured to initiate any display operation in response to an input that satisfies the second activation criteria; and, while enabling display of the user interface: detect a first input that includes a contact detected on the touch-sensitive surface unit, wherein the contact included in the first input is associated with the first region of the user interface; and, in response to detecting the first input: in accordance with a determination that the first input satisfies the first activation criteria, perform the first display operation; and, in accordance with a determination that the first input satisfies the second activation criteria, perform the second display operation and concurrently generate a tactile output of a first type while performing the second display operation; detect a second input that includes a contact detected on the touch-sensitive surface, wherein the second input is distinct from the first input and the contact included in the second input is associated with the second region of the user interface; and, in response to detecting the second input: in accordance with a determination that the second input satisfies the first activation criteria, perform the third display operation; and, in accordance with a determination that the second input satisfies the second activation criteria, generate a tactile output of a second type.

In accordance with some embodiments, an electronic device includes a display unit configured to display a user interface, a touch-sensitive surface unit to receive contacts, one or more sensor units to detect intensity of contacts with the touch-sensitive surface unit, one or more tactile output generators, and a processing unit coupled with the display unit, the touch-sensitive surface unit, the one or more sensor units, and the one or more tactile output units. The one or more tactile output units are configured to: provide a first tactile output in response to detecting that first activation criteria have been met, the first activation criteria including a criterion that is met when an intensity of a contact on the touch-sensitive surface unit increases above a first intensity threshold; and provide a second tactile output in response to detecting that second activation criteria have been met, the second activation criteria including a criterion that is met when an intensity of a contact on the touch-sensitive surface unit increases above a second intensity threshold, distinct from the first intensity threshold. The processing unit is configured to: enable display, of a settings user interface that includes one or more control objects, wherein the settings user interface is configured to adjust operations of the device that use: the one or more sensors that detect intensity of contacts with the touch-sensitive surface unit, and/or the one or more tactile output generators. The processing unit is also configured to, while enabling display of the settings user interface, detect an input for a first control object of the one or more control objects; and, in accordance with the detected input for the first control object: change the second intensity threshold; and change the second tactile output.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for performing various display operations in conjunction with receiving and/or generating tactile information, thereby increasing the effectiveness, efficiency, and user satisfaction with such devices. Such methods and interfaces may complement or replace conventional methods for performing various display operations in conjunction with receiving and/or generating tactile information.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6E are flow diagrams illustrating a method of enabling interaction with one or more control objects in a user interface, in accordance with some embodiments.

FIGS. 7A-7D are flow diagrams illustrating a method of performing operations in conjunction with generating tactile outputs, in accordance with some embodiments.

FIGS. 8A-8F are flow diagrams illustrating a method of providing tactile outputs based on one or more regions of a user interface in accordance with some embodiments.

FIGS. 9A-9C are flow diagrams illustrating a method of performing operations in conjunction with configuring tactile outputs in accordance with some embodiments.

DESCRIPTION OF EMBODIMENTS

Many electronic devices have graphical user interfaces with draggable user interface objects (e.g., files, folders, calendar entries, and icons) and control user interface objects (e.g., buttons, switches, sliders, and other controls). When a user selects a calendar entry for today in a month view and moves it to a different date and time, the user may need to drag the calendar entry to the different date and drop the calendar entry, switch to a day view, and then drag the calendar entry again and drop it on a new time. Alternatively, the user may open the calendar entry and manually type in the new date and time. In the embodiments described below, an improved method for performing operations (e.g., moving a calendar entry) is achieved by displaying a user interface that includes a draggable object (e.g., a calendar entry) and control objects (e.g., view buttons). While the draggable object is being dragged, one of the control objects is activated to change the view (e.g., from the month view to the day view), and the draggable object is dropped into a user-specified location (e.g., a user-specified time slot). This method allows for interaction with control objects while dragging a draggable object, thereby eliminating the need for extra, separate steps for interacting with control objects. This method, which uses a single contact to both drag an object and interact with a control object, is optionally be used in other applications as well.

Figure 9B:
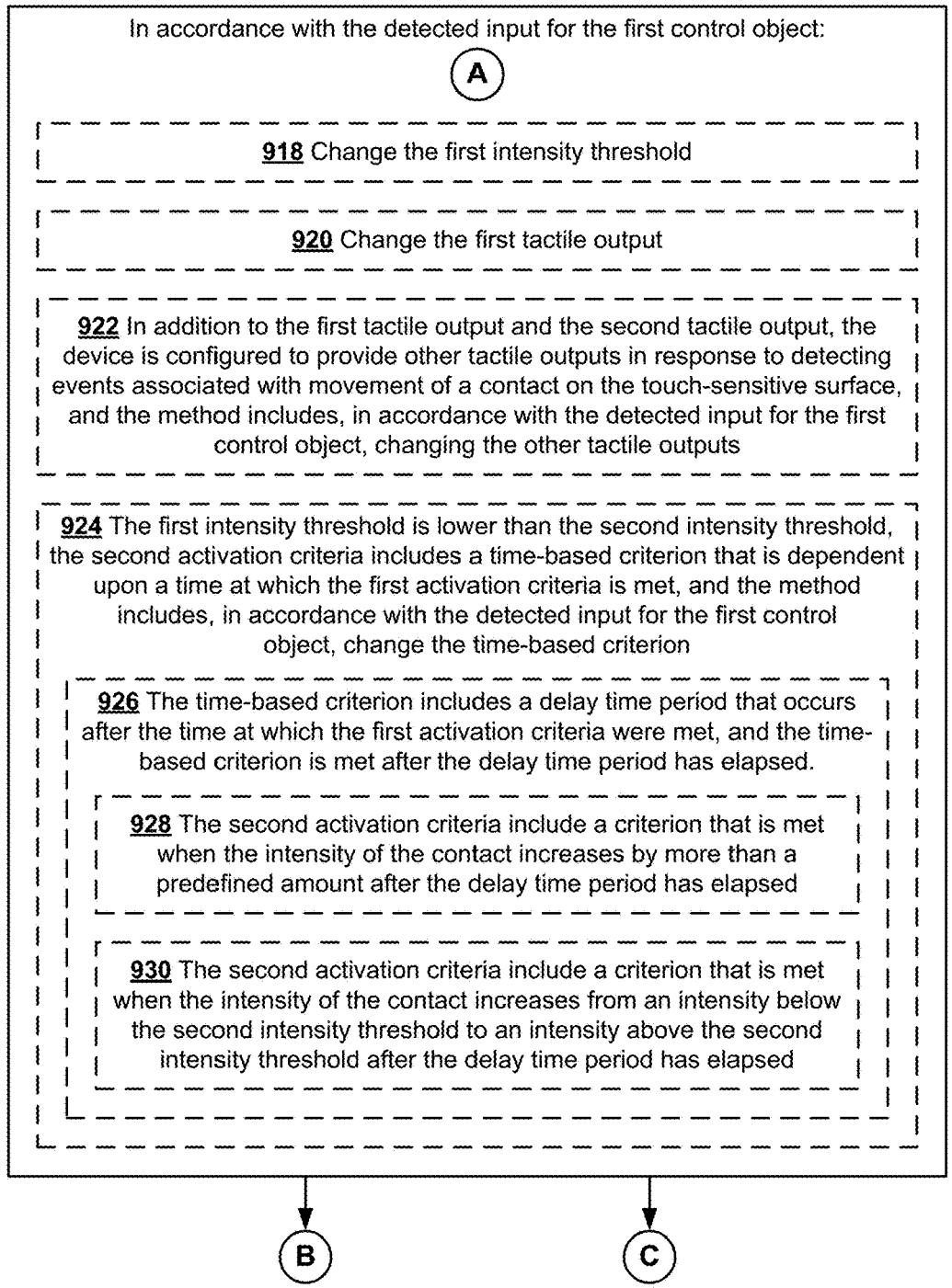

Below, FIGS. 1A-1B, 2, and 3 provide a description of exemplary devices. FIGS. 4A-4B, and 5A-5NN, illustrate exemplary user interfaces for processing touch inputs. FIGS. 5OO-5QQ are exemplary intensity diagrams. FIGS. 6A-6E illustrate a flow diagram of a method of enabling interaction with one or more control objects in a user interface. FIGS. 7A-7D illustrate a flow diagram of a method of performing operations in conjunction with generating tactile outputs. FIGS. 8A-8F illustrate a flow diagram of a method of providing tactile outputs based on one or more regions of a user interface. FIGS. 9A-9C illustrate a flow diagram of a method of configuring tactile outputs and activation criteria. The user interfaces in FIGS. 5A-5NN and the intensity diagrams in FIGS. 5OO-5QQ are used to illustrate the processes in FIGS. 6A-6E, 7A-7D, 8A-8F, and 9A-9C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
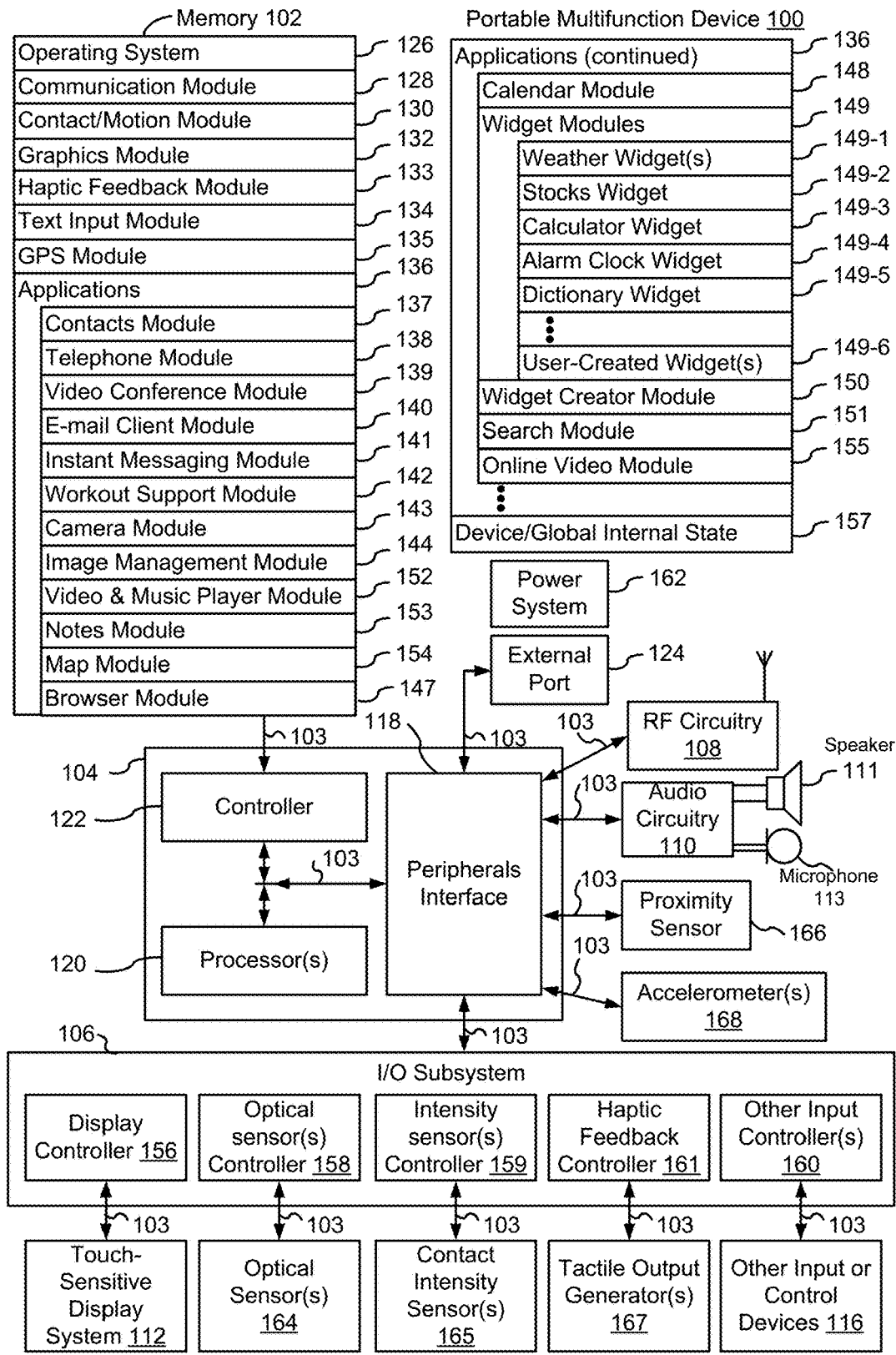
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
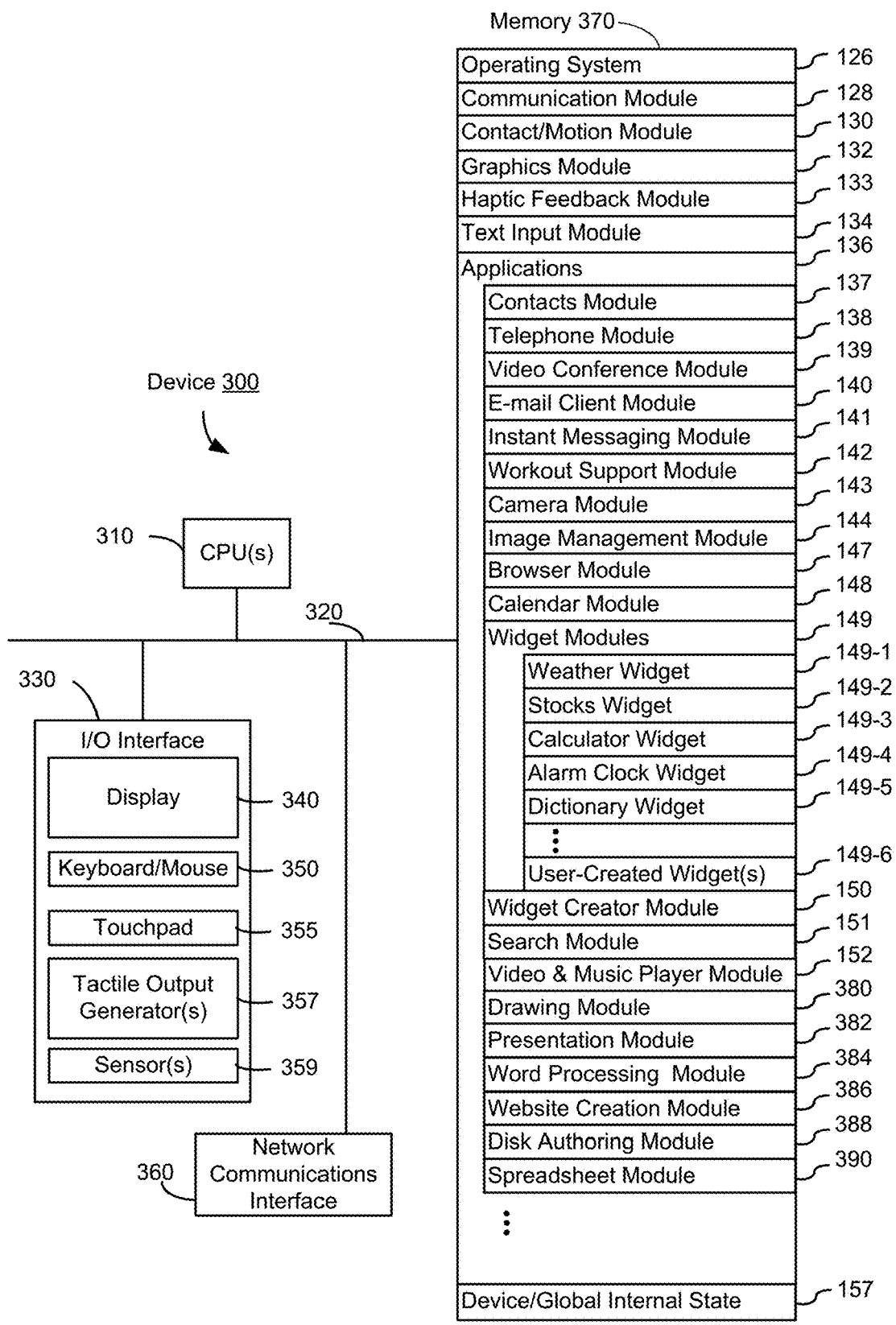
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
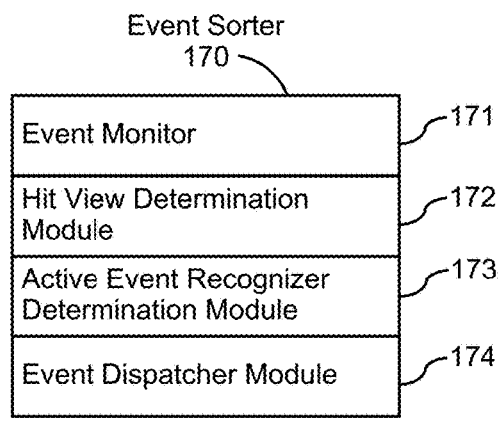
FIG. 1B is a block diagram illustrating exemplary components for event handling in accordance with some embodiments.
Figure 1B:
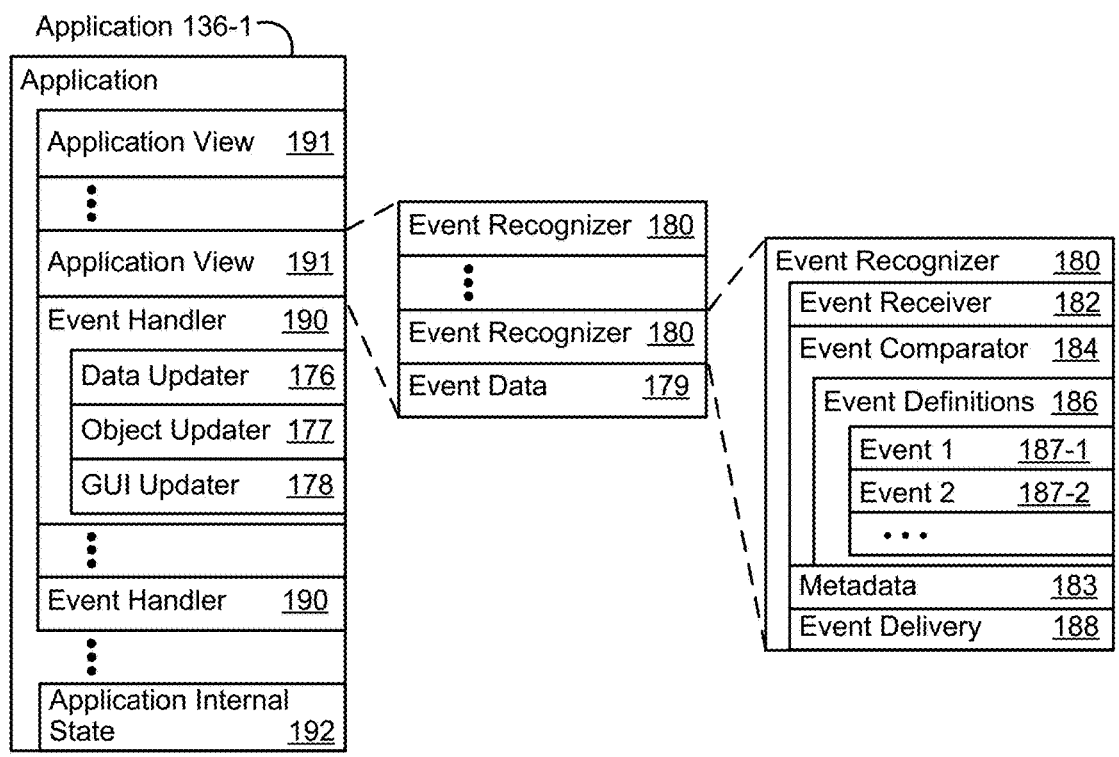

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
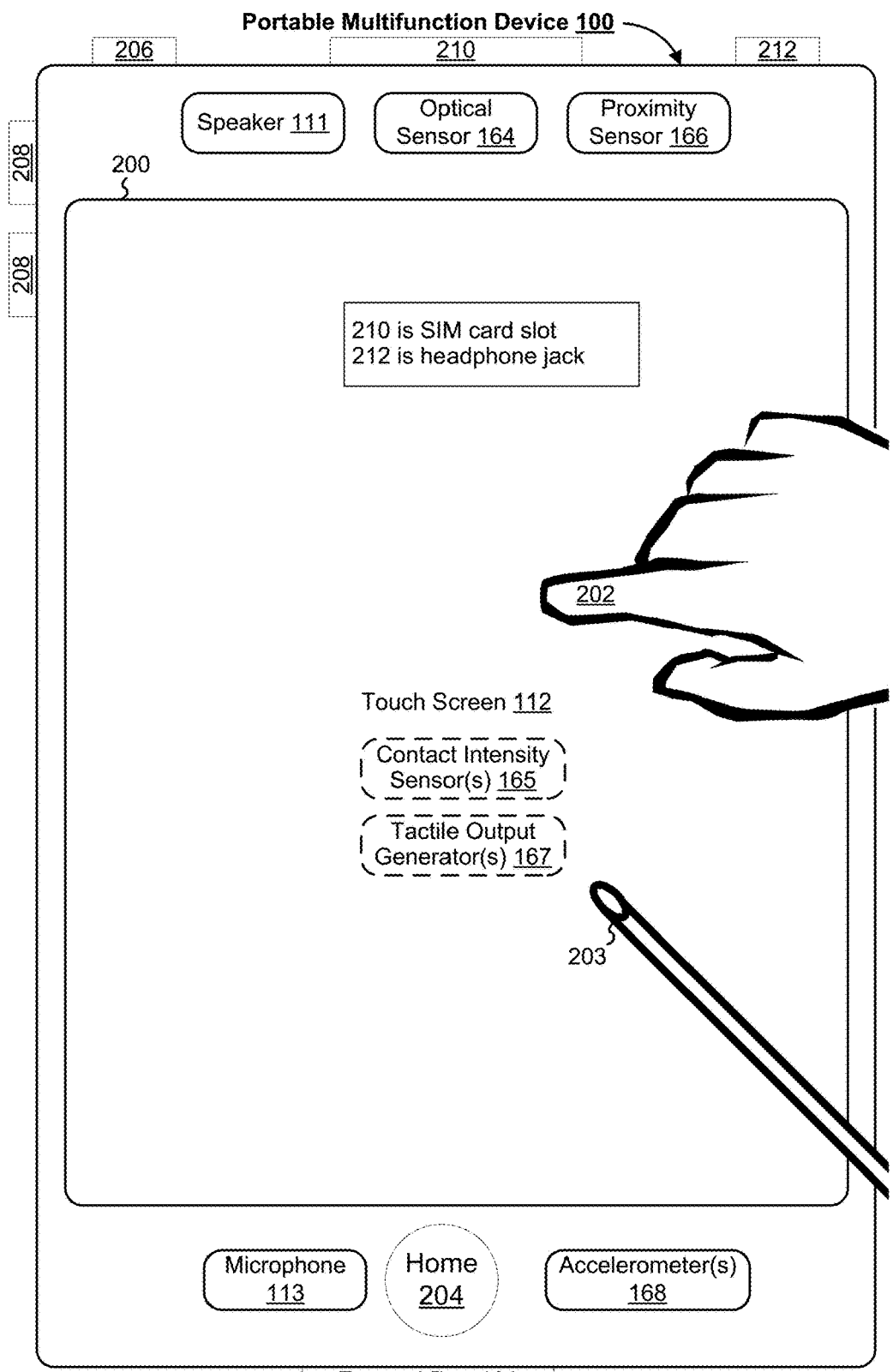
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
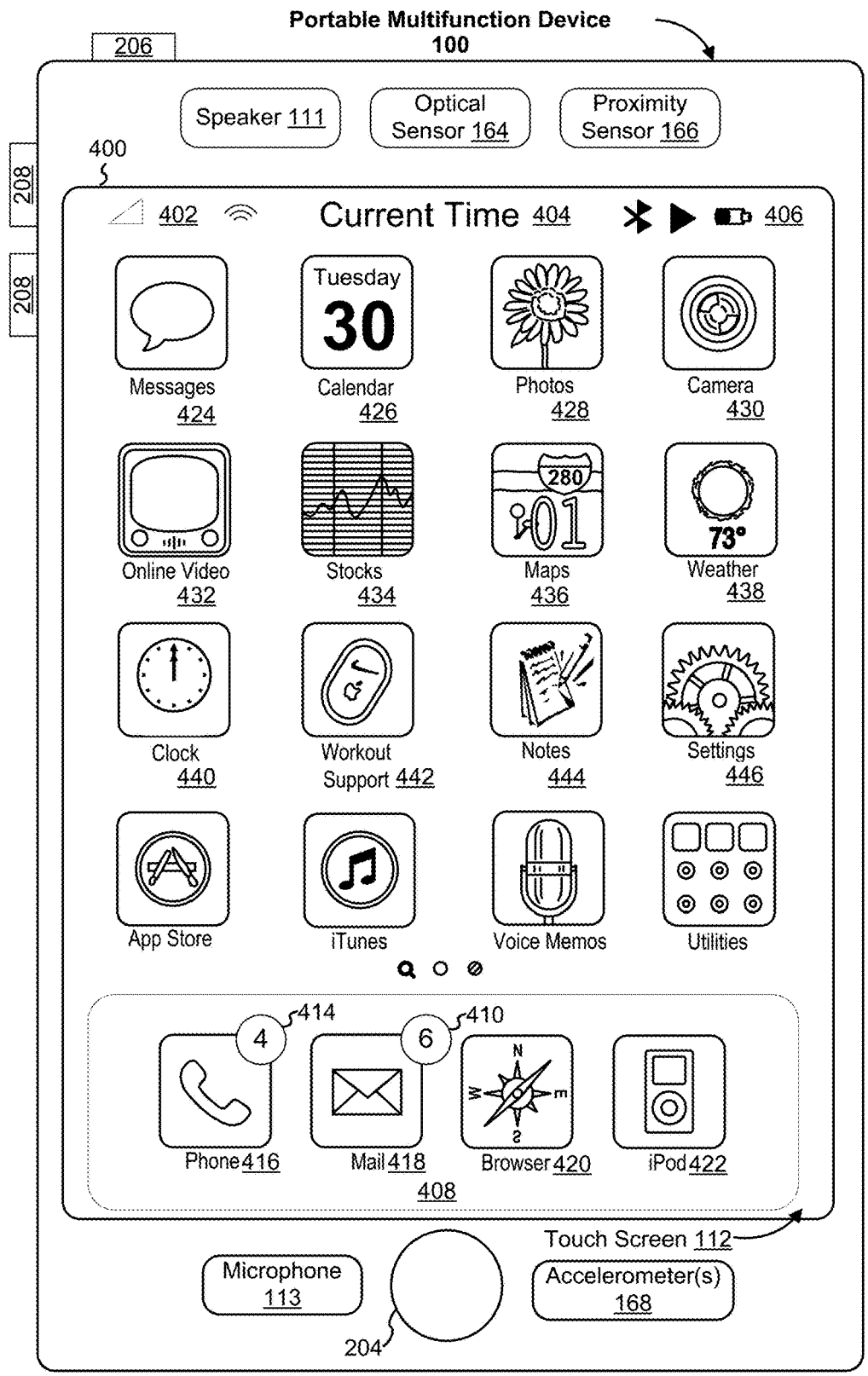
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
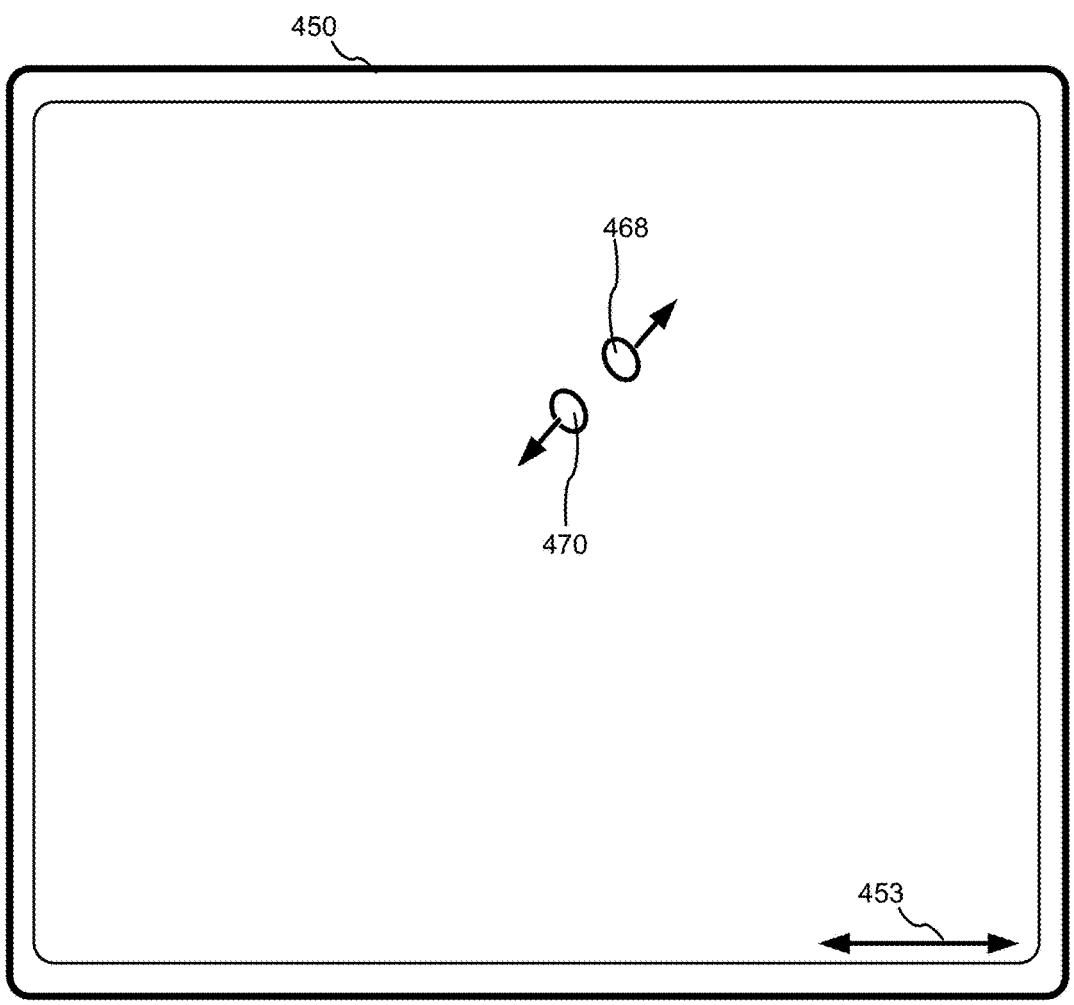
FIG. 4B illustrates an exemplary user interface for a multifunction device with a touch-sensitive surface that is separate from the display in accordance with some embodiments.
Figure 4B:
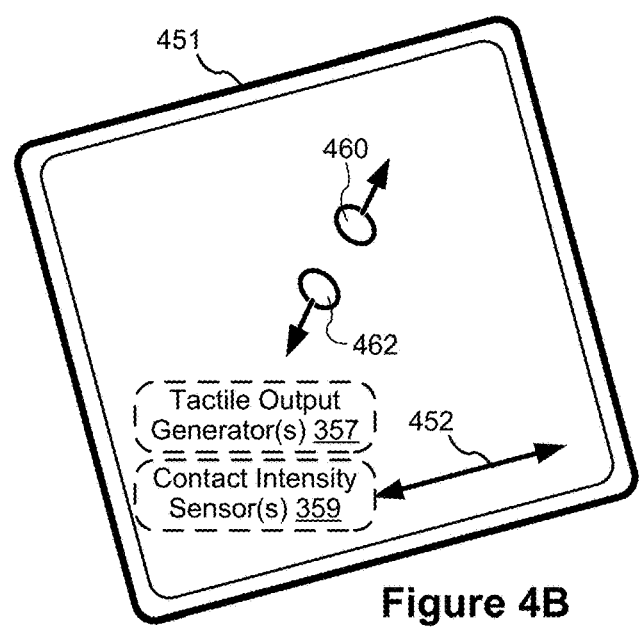

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a drag gesture is, optionally, replaced with a mouse click (e.g., instead of a contact) followed by movement of the cursor along the path of the drag gesture (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein (e.g., FIGS. 5A-5NN) optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
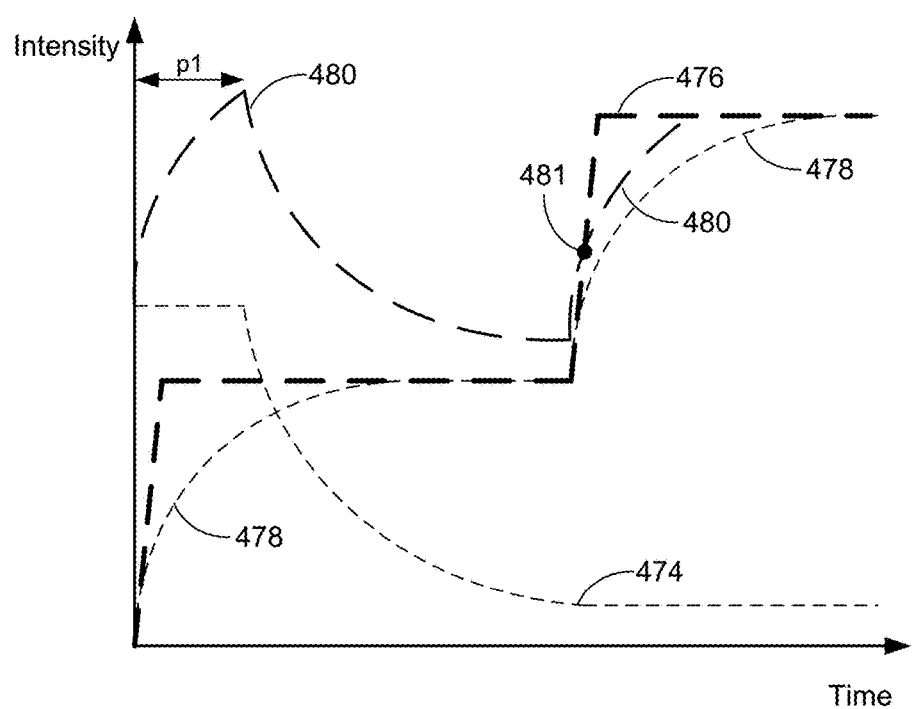
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
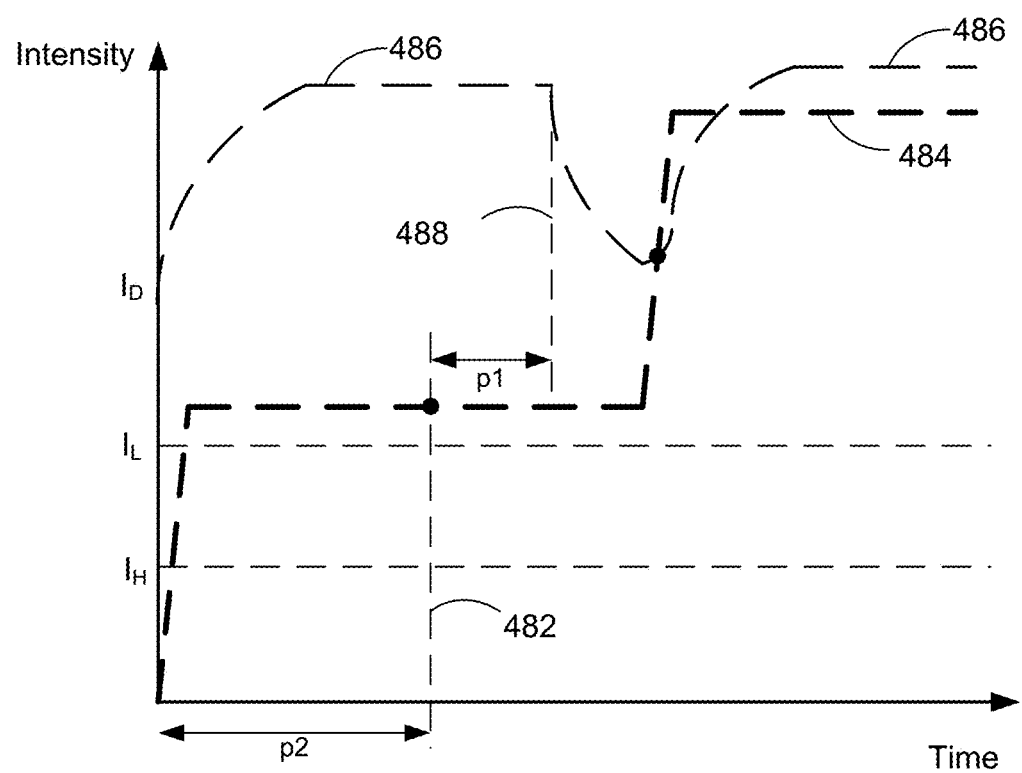

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
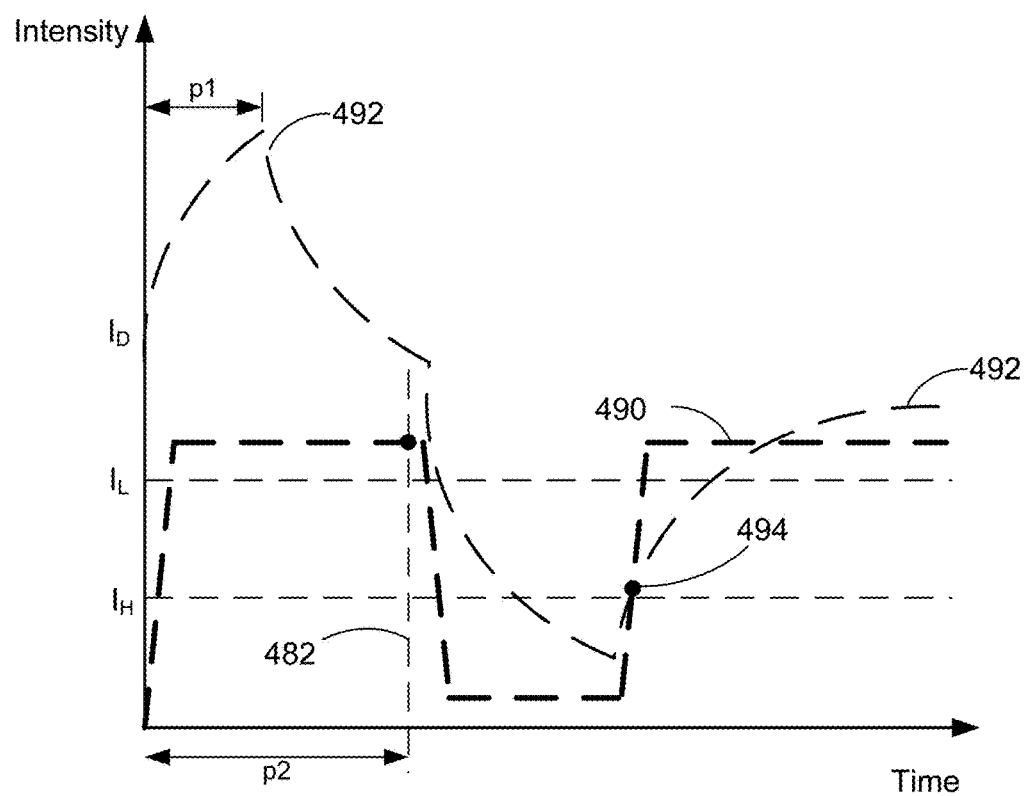

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$. See FIGS. 5OO-5QQ and the discussion thereof below for additional description of dynamic intensity thresholds and their uses.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

Figure 5A:
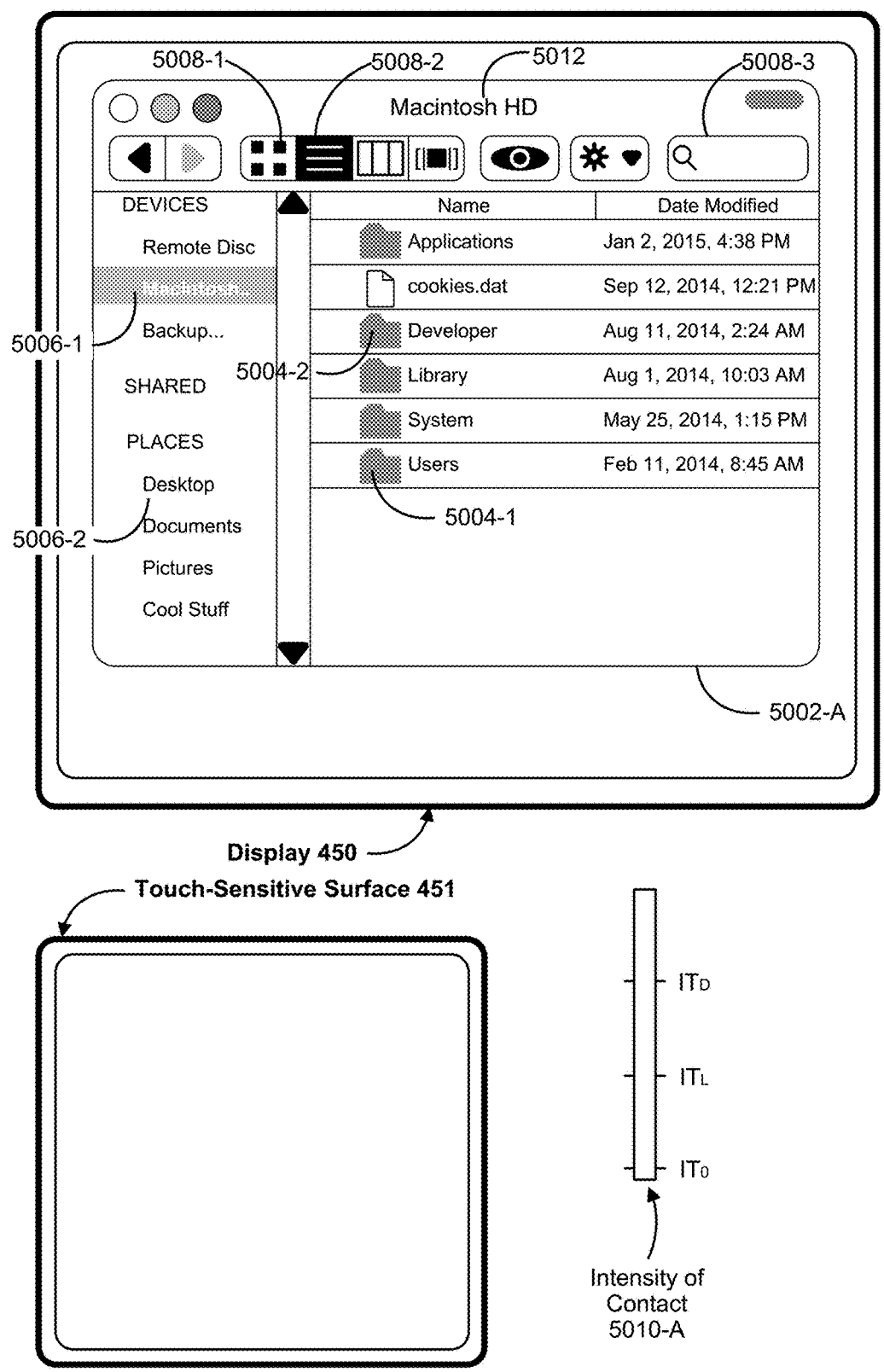
FIGS. 5A-5NN illustrate exemplary user interfaces for processing touch inputs in accordance with some embodiments.
Figure 5B:
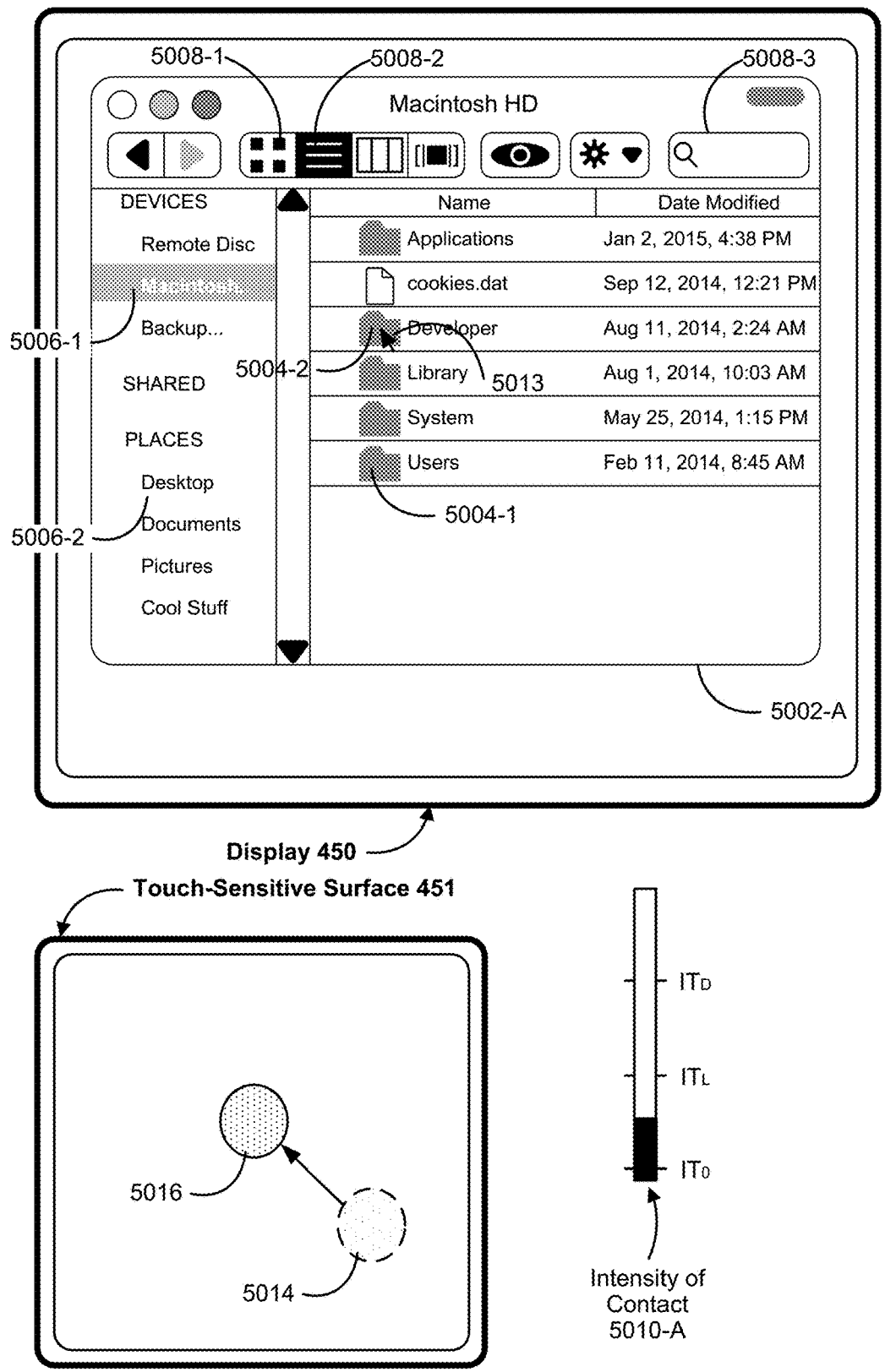
FIGS. 5OO-5QQ are exemplary intensity diagrams in accordance with some embodiments.
Figure 5C:
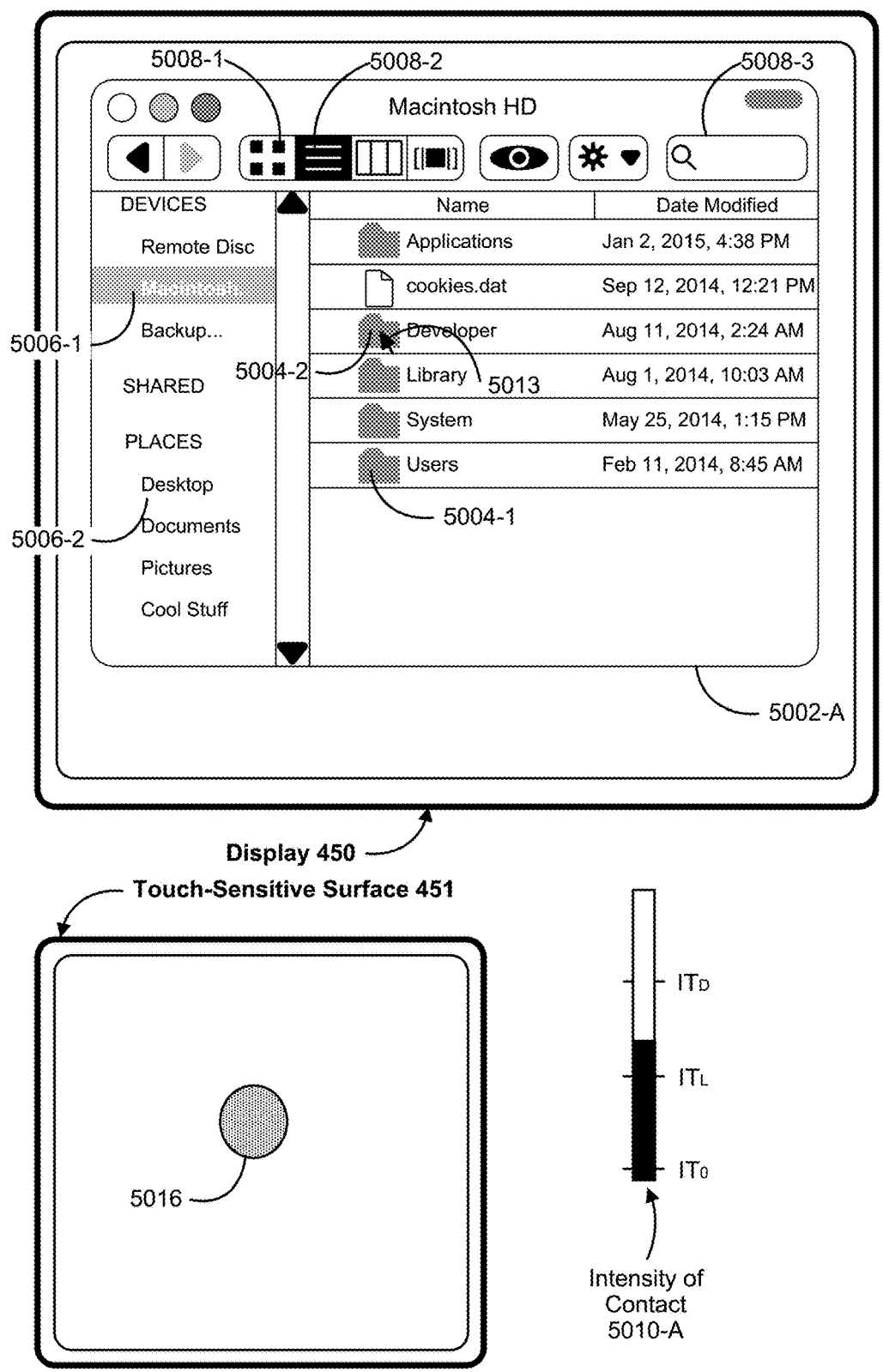
Figure 5D:
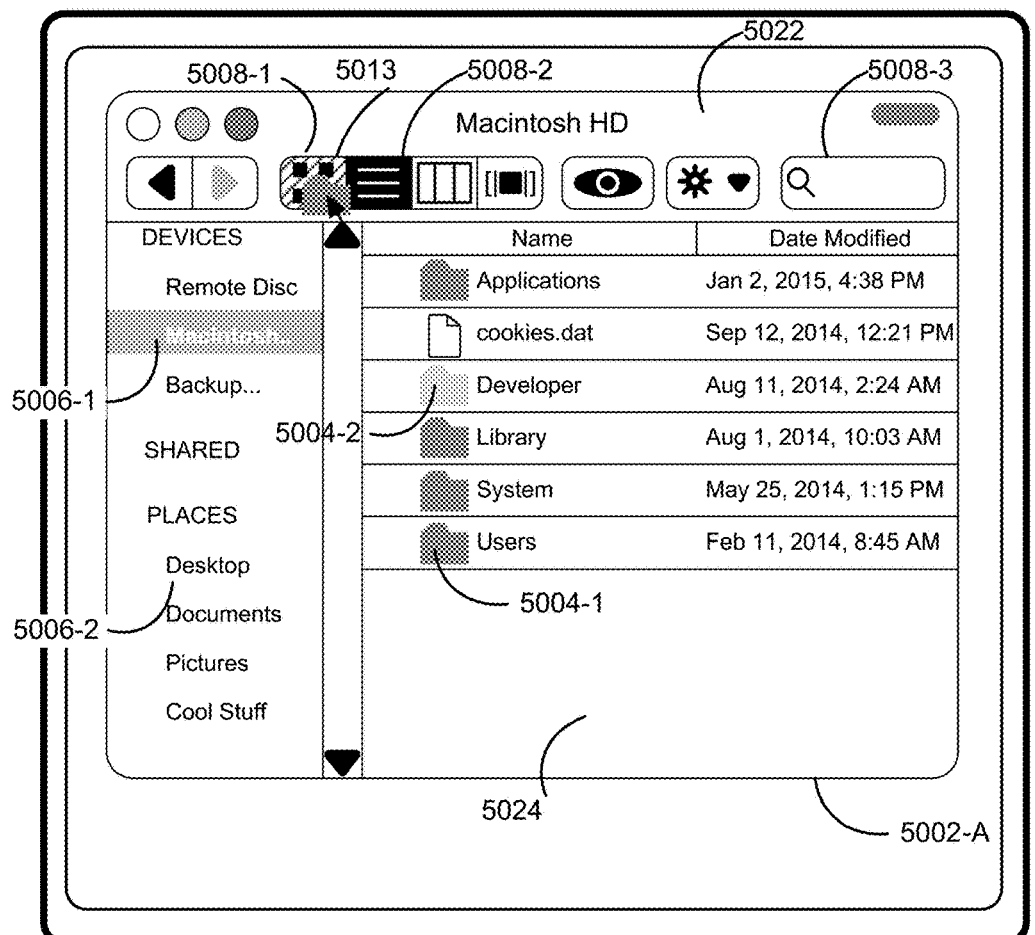
Figure 5D:
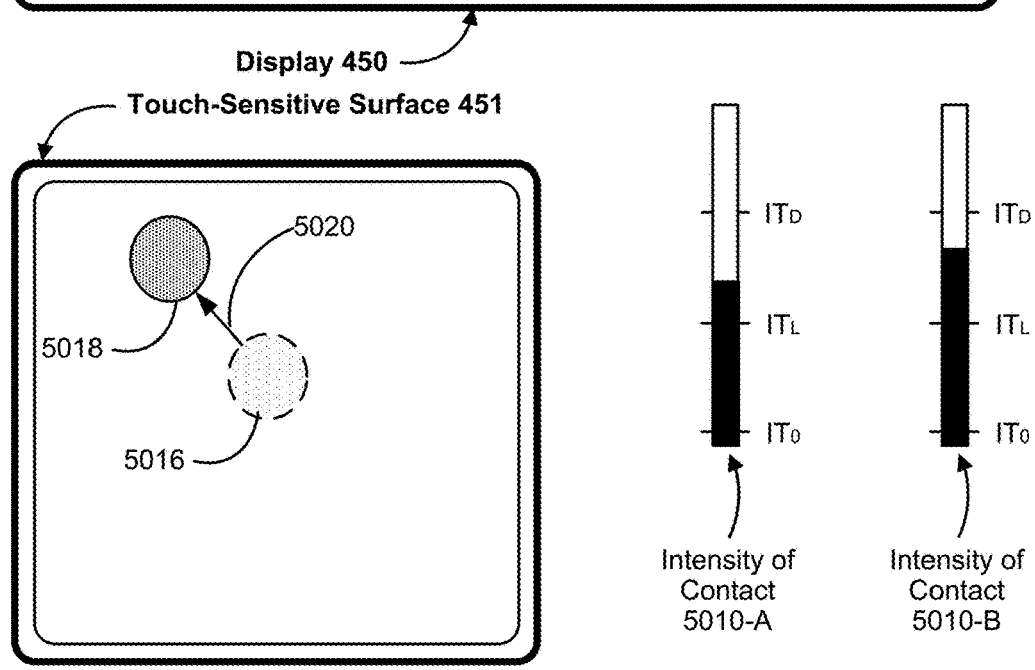
Figure 5E:
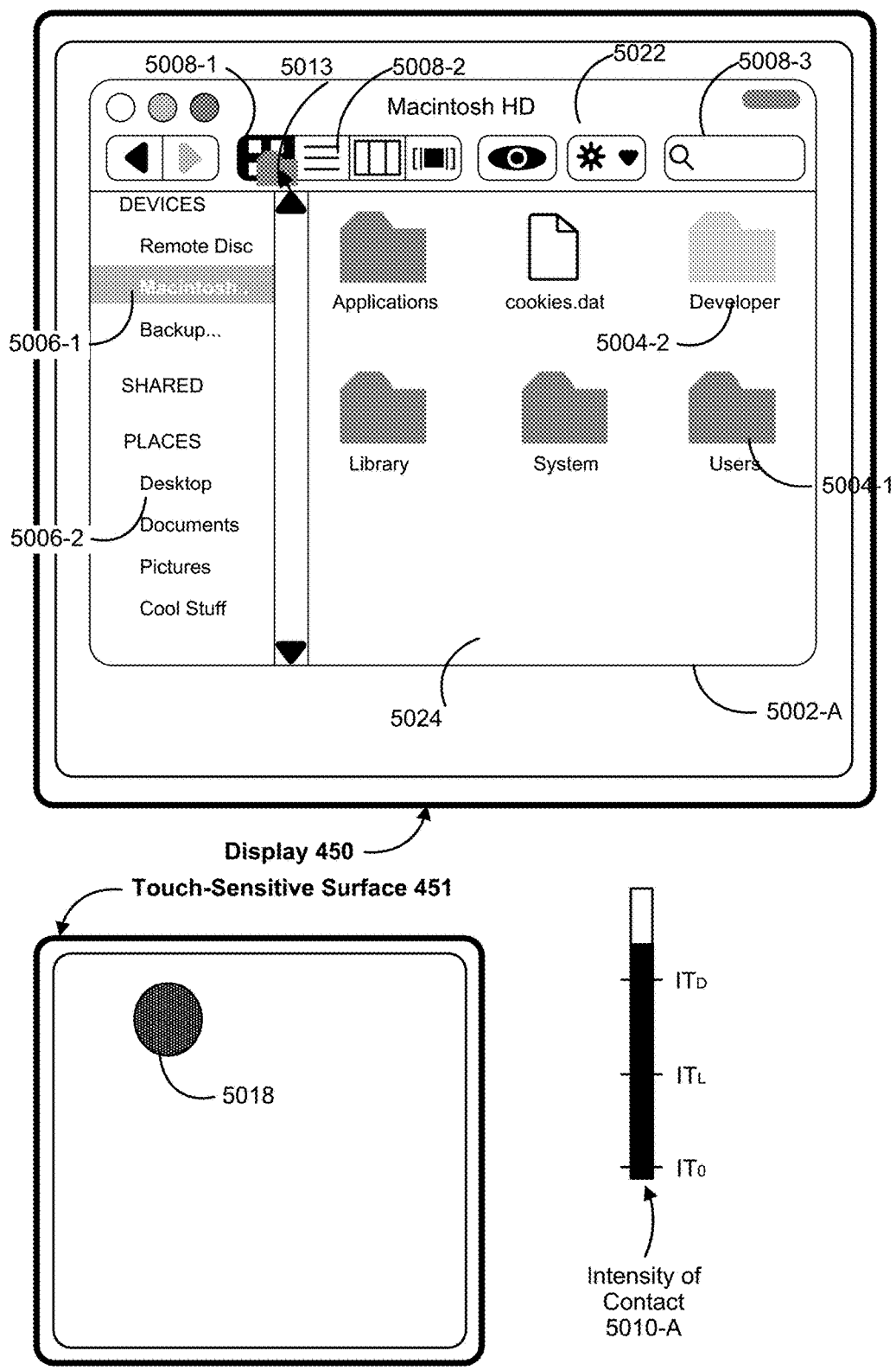
Figure 5F:
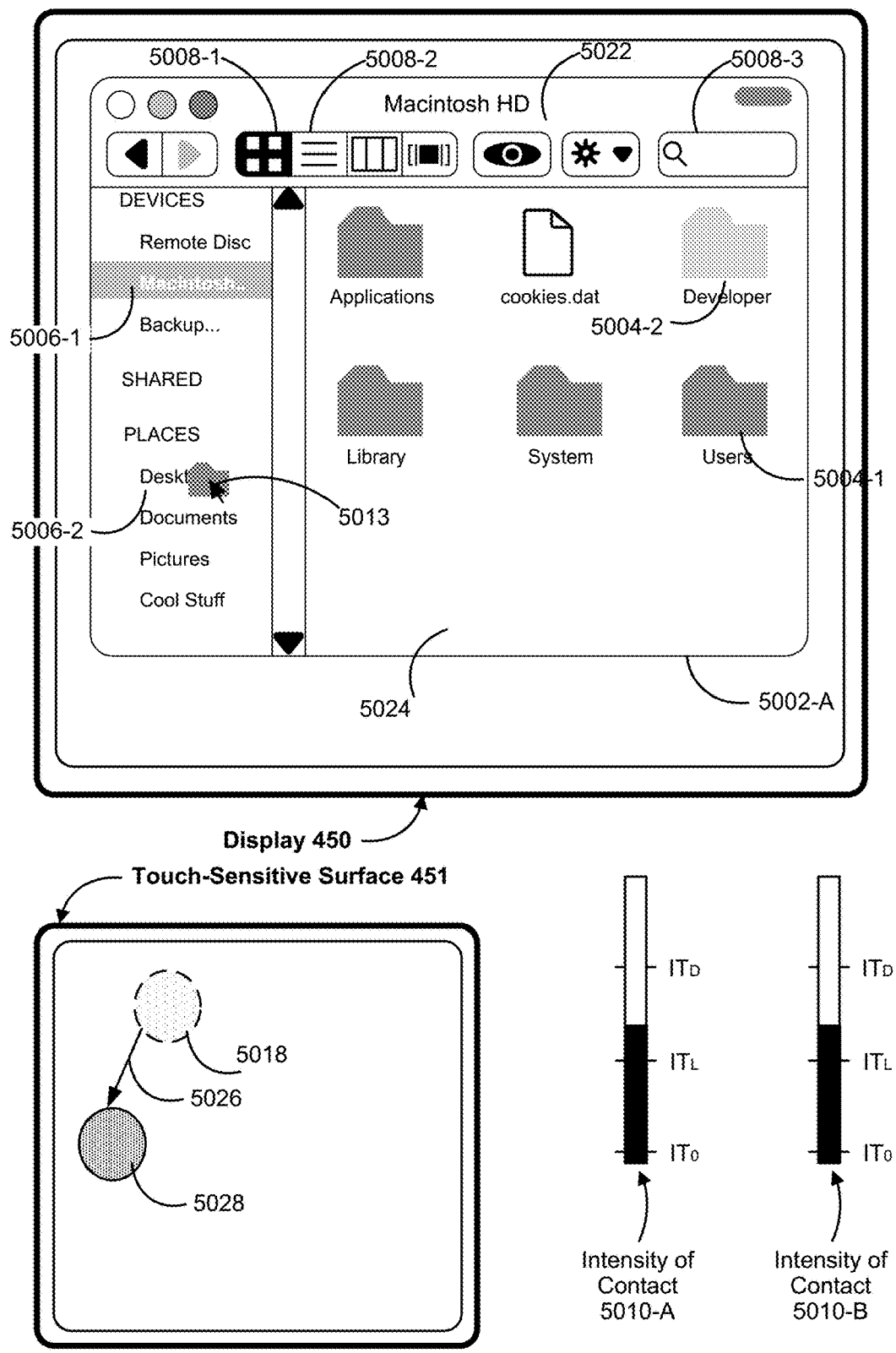
Figure 5G:
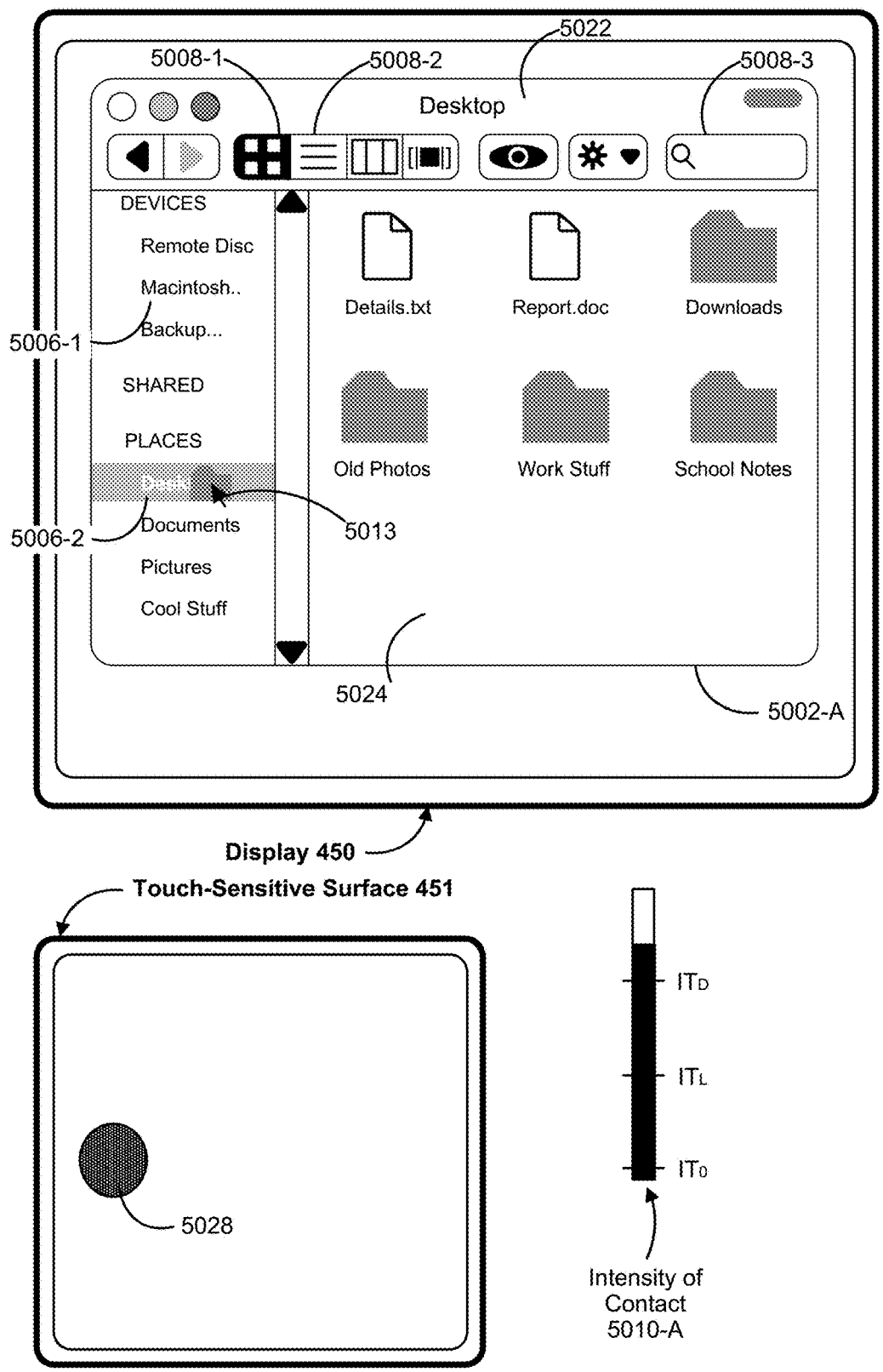
Figure 5H:
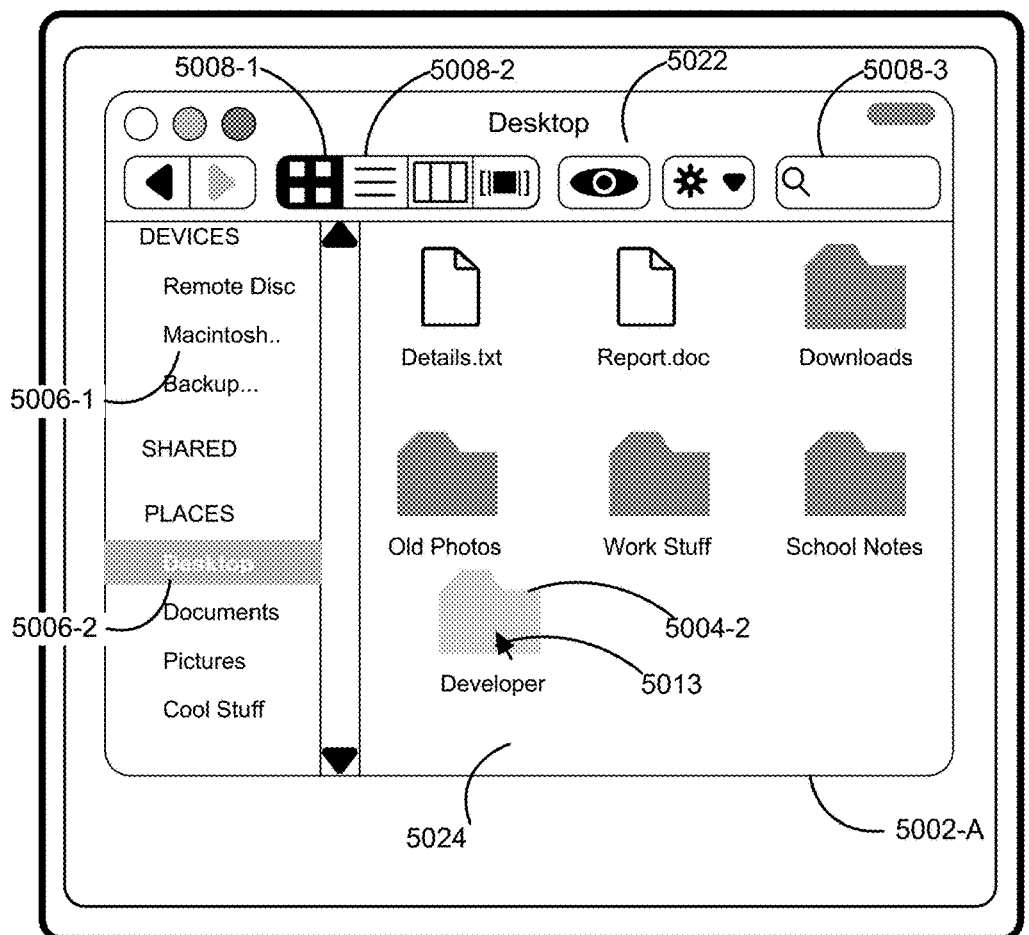
Figure 5H:
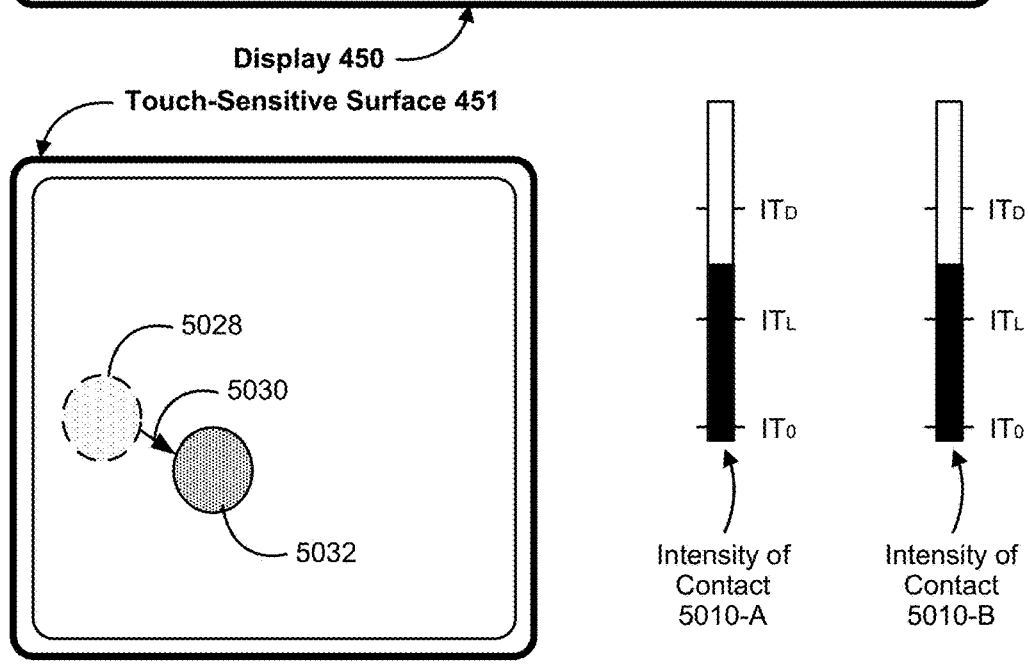
Figure 5I:
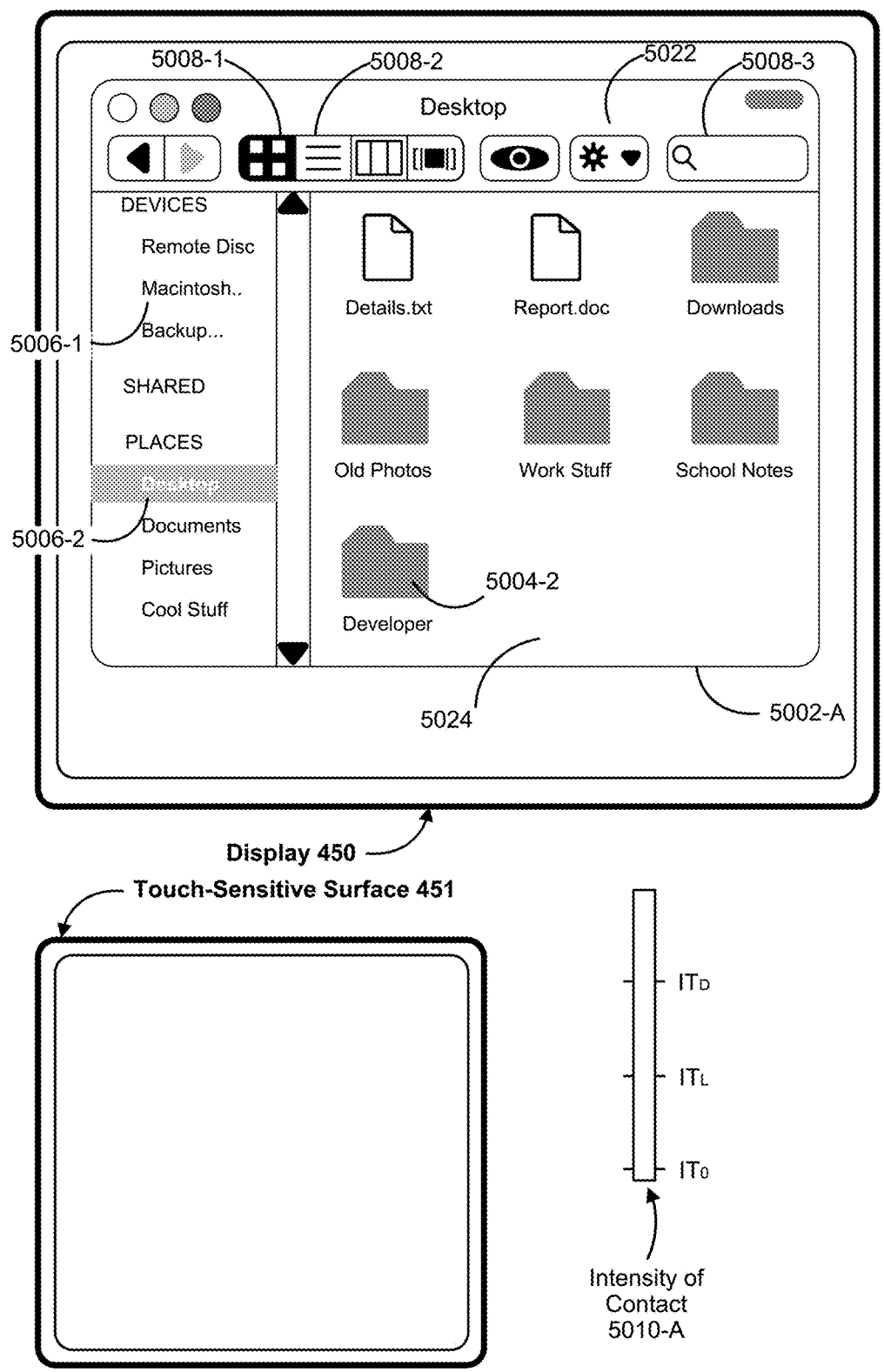
Figure 5J:
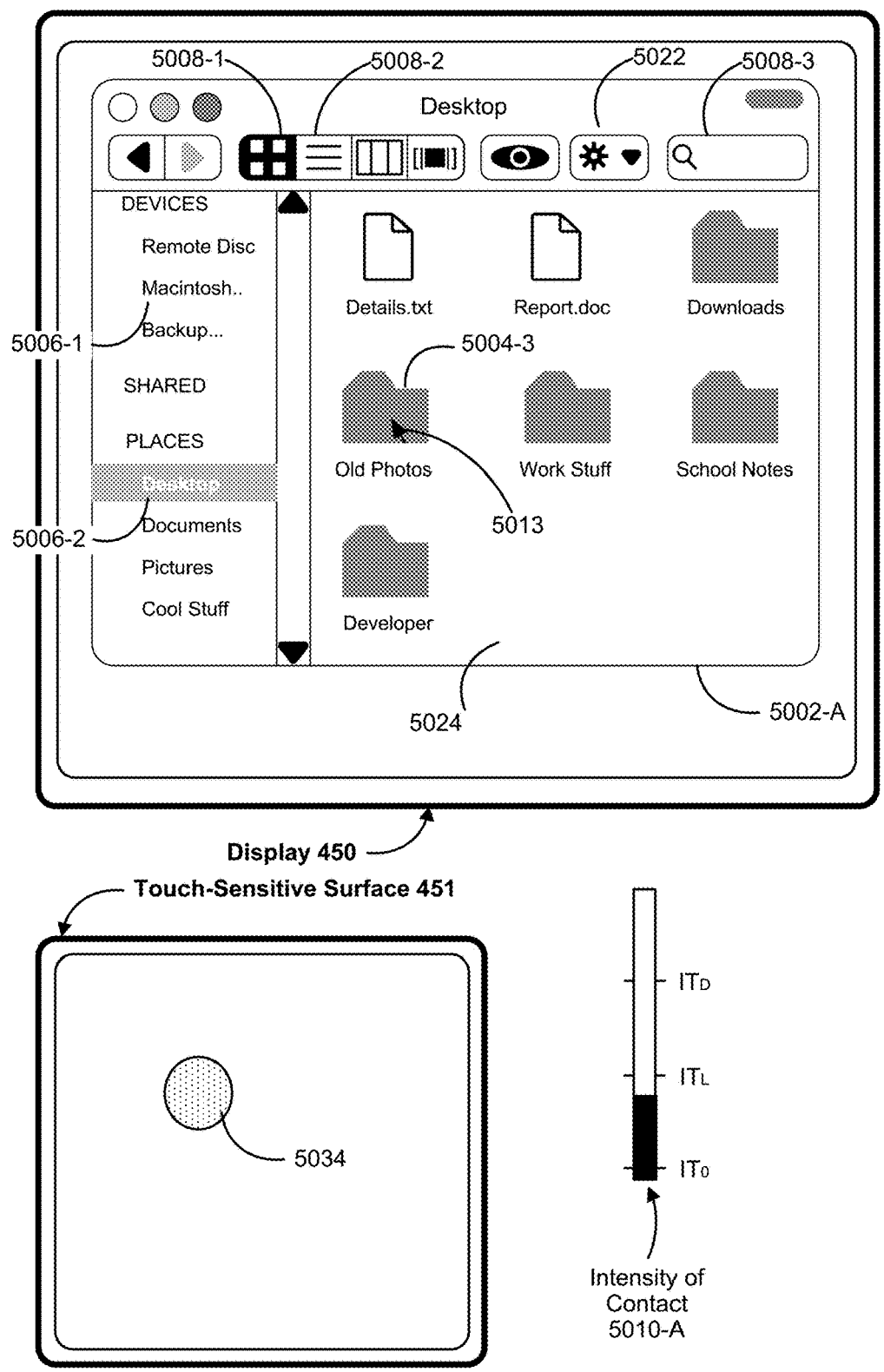
Figure 5K:
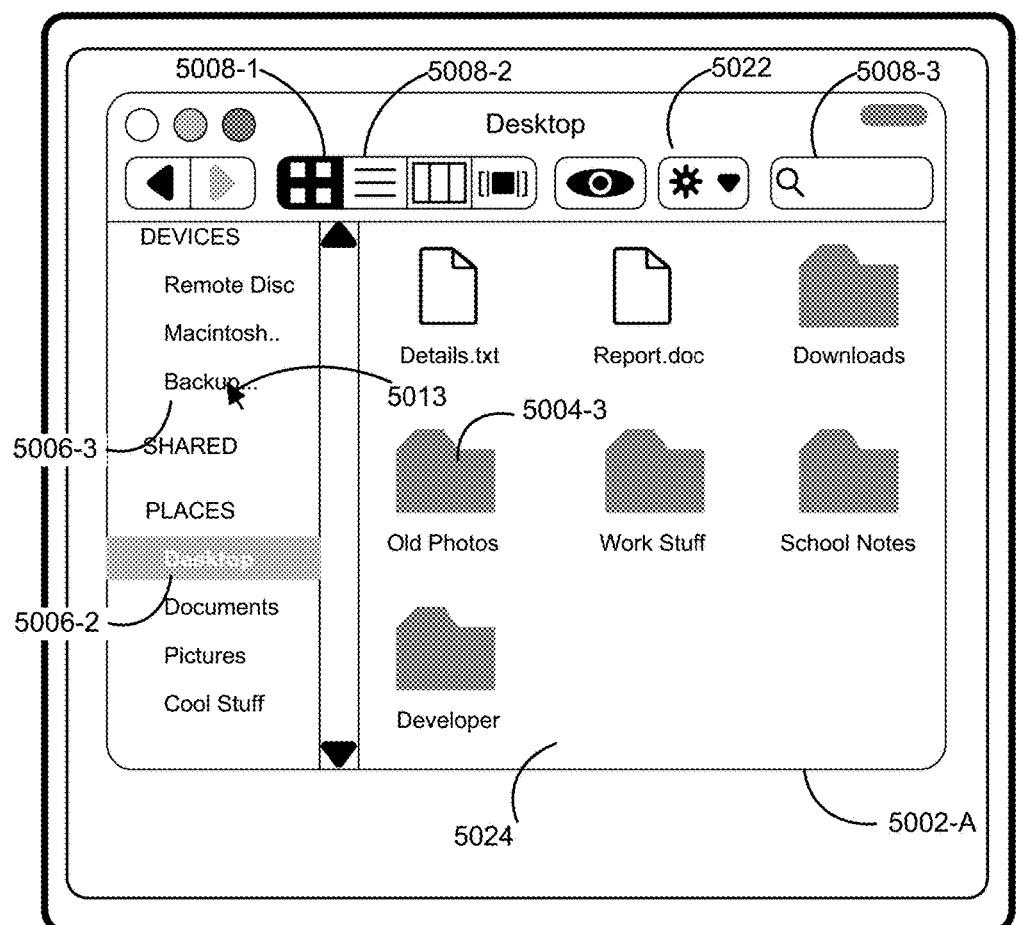
Figure 5K:
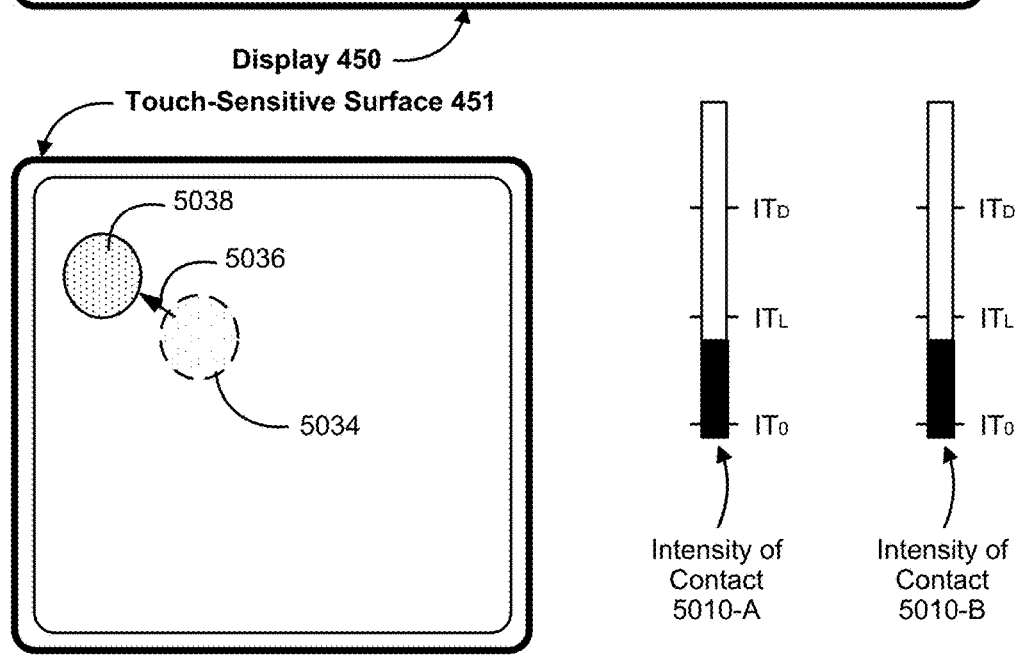
Figure 5L:
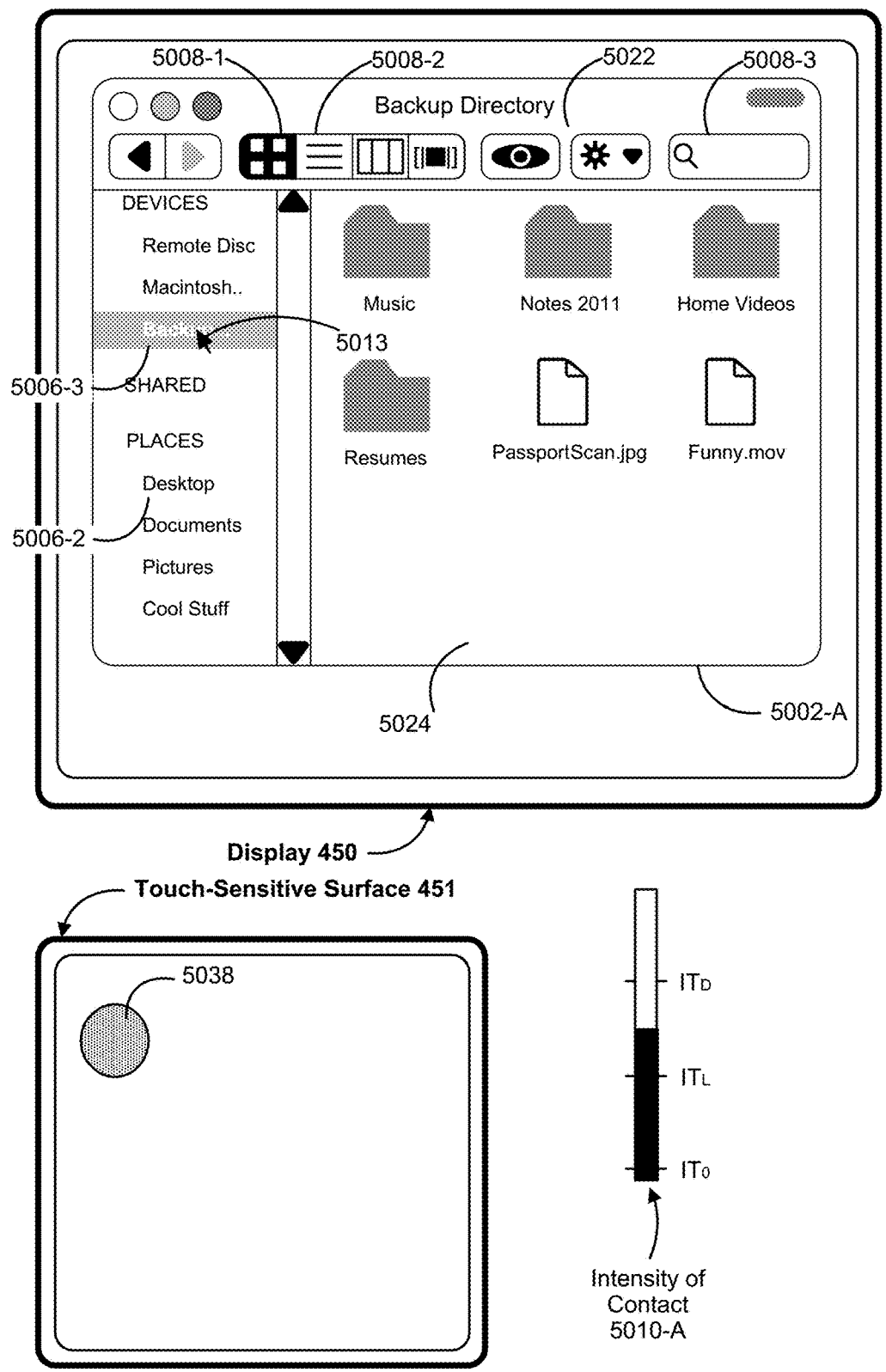
Figure 5M:
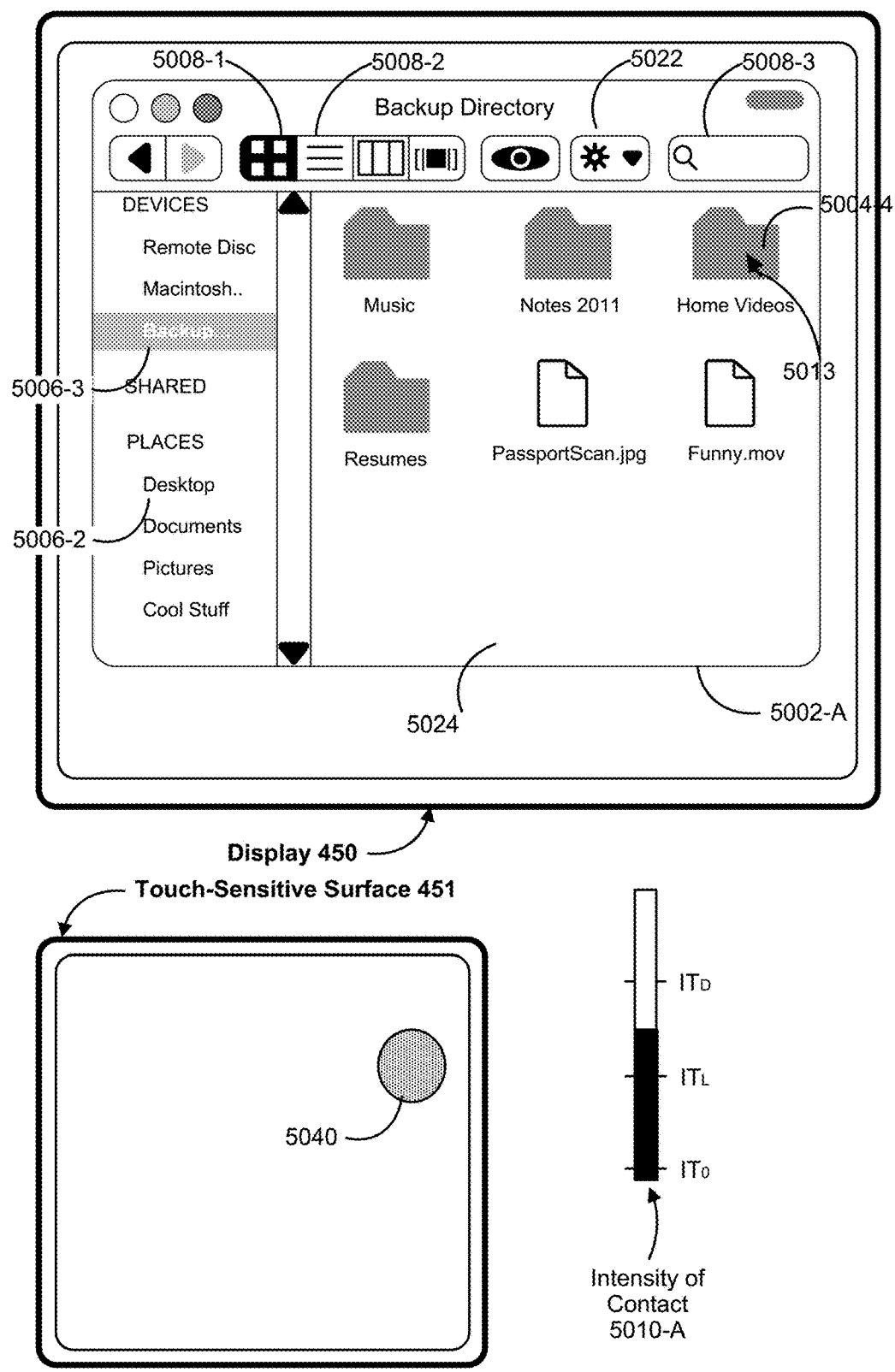
Figure 5N:
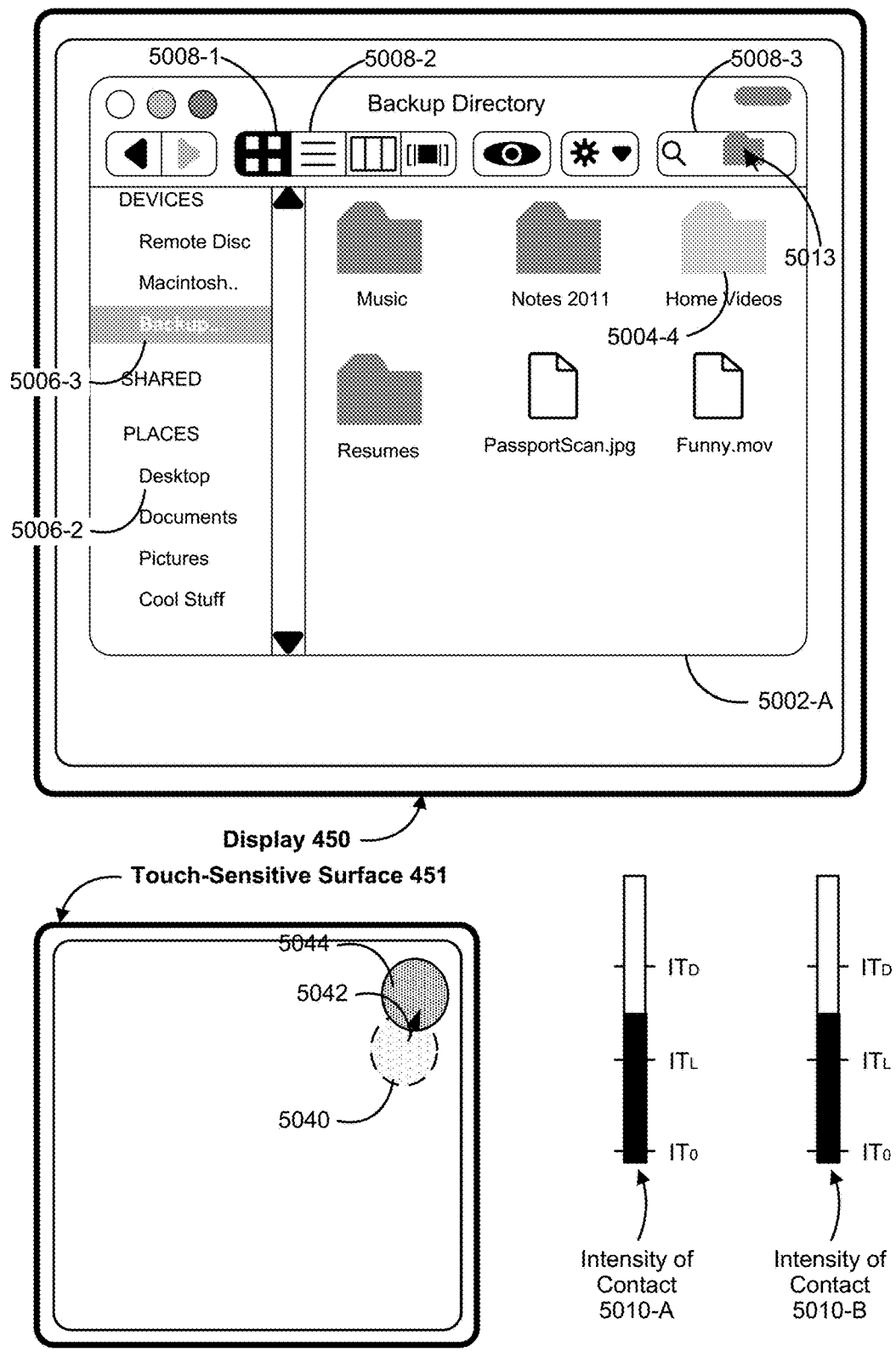
Figure 5O:
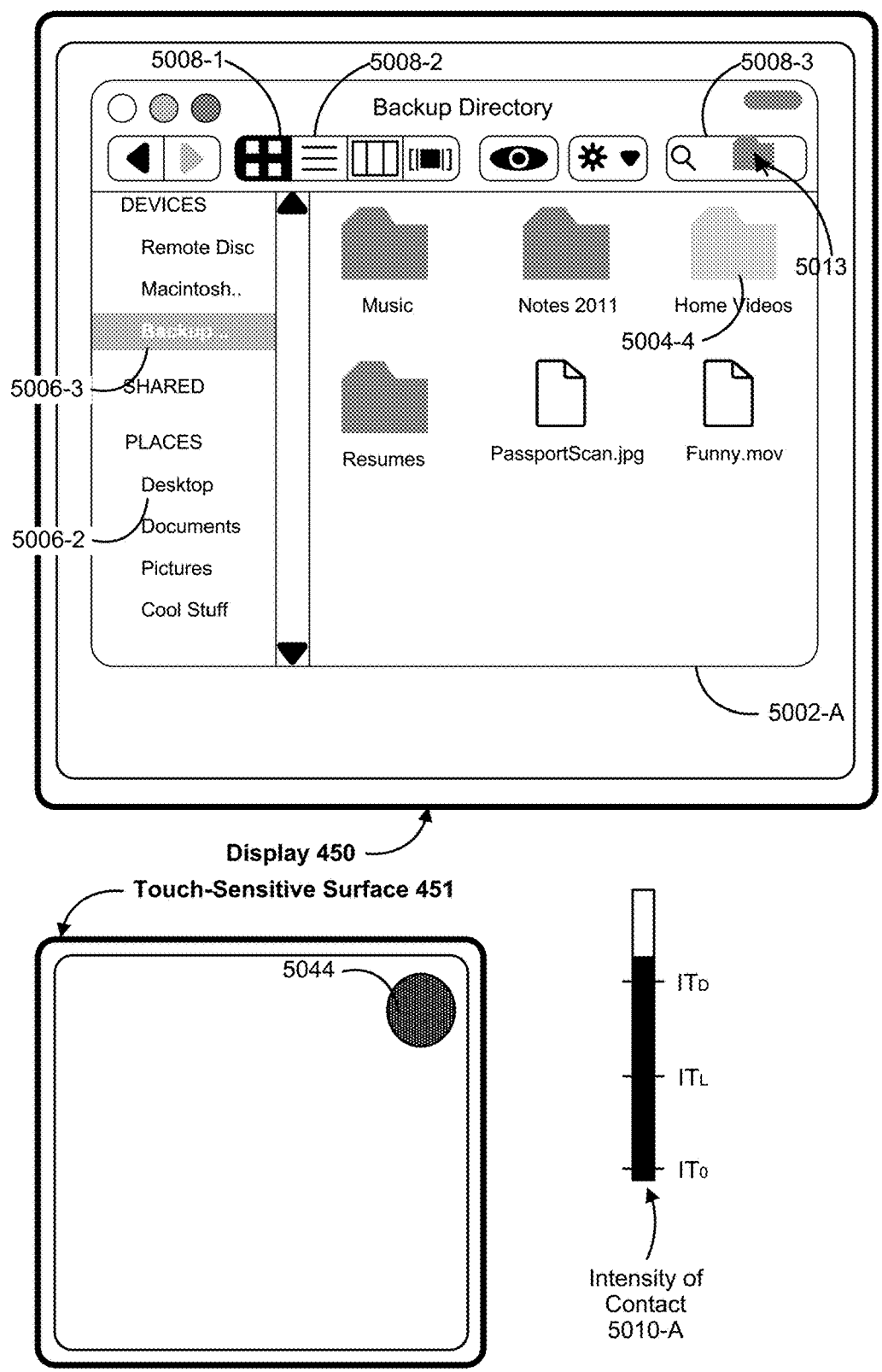

FIGS. 5A-5NN illustrate exemplary user interfaces for processing touch inputs in accordance with some embodiments. The user interfaces in these figures are used to illustrate the processes described below, including the processes in FIGS. 6A-6E, 7A-7D, 8A-8F, and 9A-9C. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A.

FIG. 5A illustrates user interface 5002-A for a file navigation application displayed on display 450. In some embodiments, user interface 5002-A is used to manage, view, access and/or organize files residing on the device (e.g., device 100 or device 300). FIG. 5A also illustrates various control objects, such as directory control objects 5006, and file view control objects 5008. In FIG. 5A, user interface 5002 includes files displayed under a list view. File view control object 5008-2, which corresponds to a list view option, is displayed in a visually distinguished manner from other file view control objects (e.g., object 5008-1), to indicate to the user of the device that user interface 5002-A includes the list view option, of the file view options, has been selected. User interface 5002-A illustrates that the contents of the "Macintosh HD" directory are being displayed, as indicated by title 5012 and directory control object 5006-1 being displayed in a visually distinct manner from other directory control objects, such as object 5006-2.

User interface 5002 also shows several icons representing files and folders. These file and folder icons are exemplary draggable objects 5004. In some embodiments, draggable objects 5004 can be moved from one location in a user interface, such as user interface 5002-A, to another location. In some embodiments, draggable objects refer to user interface objects that are configured to be moved independently (e.g., draggable objects 5004 can be moved without moving user interface 5002-A, although draggable objects 5004 may also be moved by moving user interface 5002-A). In some embodiments, control objects such as directory control objects 5006 or file view control objects 5008 cannot be moved independently (e.g., certain control objects 5006 cannot be around within user interface 5002-A). In some embodiments, draggable objects refer to user interface objects that are configured to be moved individually (e.g., a draggable object 5004 can be moved without moving any other user interface objects, such as another draggable object or a control object). In some embodiments, a control object is configured to initiate, when selected or activated, a predefined operation (e.g., changing a view of a user interface) other than displaying content of a draggable object (e.g., a file or a photo) or launching an application that corresponds to the draggable object. FIG. 5A illustrates the state of display 450 and touch-sensitive surface 451 before an input is detected on touch-sensitive surface 451. Intensity diagram 5010-A illustrates the absence of any contact intensity detected on touch-sensitive surface 451.

FIG. 5B illustrates a focus selector 5013 (e.g., a cursor), displayed in user interface 5002-A, over draggable object 5004-2. In FIG. 5B, the location of exemplary input that includes contact 5016 on touch-sensitive surface 451 corresponds to the location of the focus selector 5013 in user interface 5002-A. In some embodiments, focus selector was displayed over a different area in user interface 5002-A at a location that corresponds to the location of contact 5014 on touch-sensitive surface 451, before the focus selector 5013 is moved in response to the movement of a contact from the location 5014 to the location 5016.

Contact 5016 is shown to exhibit "minimal" contact with touch-sensitive surface 451. Intensity diagram 5010-A illustrates a detected intensity between thresholds $IT_0$ and $IT_L$, corresponding to the minimal contact detected, of contact 5016. In some embodiments, a minimal contact with touch-sensitive surface 451 is characterized as any contact detected to have an intensity between thresholds $IT_0$ and $IT_L$. In some embodiments, contact 5014 also exhibited minimal contact with touch-sensitive surface 451. In some embodiments, contact 5014 and contact 5016 are part of one continuously detected user interaction (e.g., dragging or tracing gesture) with touch-sensitive surface 451. As used herein, "minimal contact" refers to a contact having intensity within a certain intensity range, and does not necessarily indicate that intensity of a minimal contact is at a minimum. For example, a contact with touch-sensitive surface 451 may have an intensity below the intensity range for a minimal contact (e.g., intensity below $IT_0$).

FIG. 5C illustrates an increase in intensity detected at contact 5016. Intensity diagram 5010-A illustrates an increase in detected intensity from an intensity below $IT_L$ to an intensity above $IT_L$. In some embodiments, the detected increase in intensity at the location of contact 5016 is considered to be a distinct input from the minimal contact detected at contact 5016 in FIG. 5B. For example, FIG. 5B showed a minimal contact input, while FIG. 5C illustrates a "light press" user input at contact 5016.

In some embodiments, detecting a contact intensity above intensity threshold $IT_L$ while focus selector 5013 is displayed over draggable object 504-2 results in the satisfaction of one or more object selection criteria. For example, if a light press input is detected on touch-sensitive surface 451 while a cursor is over a file folder, the file folder is selected. In some embodiments, the detected contact intensity must be between $IT_L$ and $IT_D$, in order to satisfy the one or more object selection criteria. In some embodiments, detected contact intensity above $IT_L$ is sufficient to satisfy the one or more object selection criteria without regard to whether or not the detected contact intensity is above or below $IT_D$.

FIG. 5D illustrates a detected movement 5020 of a user interaction with touch-sensitive surface 451 from contact 5016 to contact 5018. Intensity diagram 5010-A shows the detected intensity of the user interaction at contact 5016 before movement 5020 was initiated. Intensity diagram 5010-B shows the detected intensity of the user interaction at contact 5018 after movement 5020 has concluded. Both contacts have a detected intensity above intensity threshold $IT_L$, and below intensity threshold $IT_D$. In some embodiments, the detected contact intensity must be between $IT_L$ and $IT_D$, in order to satisfy the one or more object selection criteria. In some embodiments, detected contact intensity above $IT_L$ is sufficient to satisfy the one or more object selection criteria without regard to whether or not the detected contact intensity is above or below $IT_D$.

FIG. 5D also illustrates that in some embodiments, the detected intensity level can fluctuate across a single user interaction, or from contact to contact (e.g., during the movement of a user input from 5016 to 5018). In some embodiments, if the fluctuation in detected intensity causes the detected intensity to exceed $IT_D$ or fall below $IT_L$, the one or more object selection criteria will not be satisfied. In some embodiments, if the fluctuation in detected intensity causes the detected intensity to fall below $IT_L$, the one or more object selection criteria will not be satisfied. FIG. 5D shows focus selector 5013 in a new position within user interface 5002-A, corresponding to the location of contact 5018 and/or movement 5020 detected on touch-sensitive surface 451.

In some embodiments, user interface 5002-A is said to have one or more regions, where a respective region is associated with one or more operations or display operations. For example, user interface 5002-A shows at least region 5024 and region 5022. In this example, region 5024 contains one or more draggable objects 5004, and region 5022 contains one or more control objects 5008. In some embodiments, a region contains one or more regions (e.g., sub-regions). For example, each draggable object 5004 within region 5024 is considered to be a respective region or sub-region. In some embodiments, a region is characterized by the display operations which the region is configured to initiate (e.g., changing a file view, changing a calendar view, showing a menu, and changing color or opacity of an object). In some embodiments, a region is characterized by the contents of the region (e.g., containing one or more draggable objects, or containing one or more control objects).

FIG. 5D illustrates draggable object 5004-2 in a visually distinct manner from other draggable objects 5004 (e.g., draggable object 5004-1), to indicate that draggable object 5004-2 is selected. In some embodiments, focus selector 5013 is displayed in conjunction with a representation of the selected object (e.g., a representation of object 5004-2), when an object is selected. Focus selector 5013 is being displayed over file view control object 5008-1.

FIG. 5D also illustrates that file view control object 5008-1 is visually distinguished in response to focus selector 5013 being displayed over file view control object 5008-1 (and prior to detecting that intensity of the contact satisfies intensity threshold $IT_D$). This visual distinction indicates that file view control object 5008-1 is configured to perform a predefined display operation (e.g., displaying contents of the directory in an icon view).

FIG. 5E illustrates detection of an increase in intensity at contact 5018. Intensity diagram 5010-A shows a detected intensity level exceeding intensity threshold $IT_D$. In some embodiments, the detected increase in intensity at the location of contact 5018 is considered to be a distinct input from the contact detected at contact 5018 in FIG. 5D. For example, FIG. 5D showed a "light press" input, while FIG. 5E illustrates a "deep press" user input at contact 5018.

In response to detecting the increase (or a change) in intensity at contact 5018, file view control object 5008-1 is activated, and in some embodiments, as shown in FIG. 5E, it is displayed in a visually distinct manner to indicate that file view control object 5008-1 is activated. In this example, file view control object 5008-1 is an icon-view control object, and a display operation is performed to switch the display of the contents of region 5024 from being shown in a list view to being shown in this icon view. In some embodiments, draggable object 5004-2 is still shown in a visually distinct manner from the other displayed draggable objects, to indicate that draggable object 5004-2 is selected. In some embodiments, detecting that contact 5018 continues to maintain intensity above threshold $IT_D$ does not cause any further display operation to be performed. In some embodiments, detecting a reduction in intensity to a level below threshold $IT_D$ but above $IT_L$ at contact 5018, maintains selection of draggable object 5004-2 but does not cause any further display operation to be performed.

FIG. 5F illustrates movement of focus selector 5013 (and optionally a representation of selected object 5004-2), in user interface 5002-A from the location corresponding to file view control object 5008-1 to directory control object 5006-2 (e.g., Desktop). FIG. 5F shows that a movement 5026 of a user interaction on touch-sensitive surface 451 is detected from contact 5018 to contact 5028. Intensity diagram 5010-A shows the detected intensity of the user interaction at contact 5018 before movement 5026 was initiated. Intensity diagram 5010-B shows the detected intensity of the user interaction at contact 5028 after movement 5026 has concluded. Both contacts have a detected intensity above intensity threshold $IT_L$, and below $IT_D$. In some embodiments, the detected contact intensity must be between $IT_L$ and $IT_D$, in order to satisfy the one or more object selection criteria. In some embodiments, detected contact intensity above $IT_L$ is sufficient to satisfy the one or more object selection criteria without regard to whether or not the detected contact intensity is above or below $IT_D$.

FIG. 5G illustrates detection of an increase in intensity at contact 5018. Intensity diagram 5010-A shows a detected intensity level exceeding intensity threshold $IT_D$. In some embodiments, the detected increase in intensity at the location of contact 5028 is considered to be a distinct input from the contact detected at contact 5028 in FIG. 5F. For example, FIG. 5F showed a "light press" input, while FIG. 5G illustrates a "deep press" user input at contact 5028.

In response to detecting the increase (or a change) in intensity at contact 5028, directory control object 5006-2 is activated, and in some embodiments, as shown in FIG. 5G, it is displayed in a visually distinct manner to indicate that it is activated. In this example, directory control object 5006-2 corresponds to a file directory called "Desktop", and a display operation is performed to switch the display of the contents of region 5024 from showing the contents of the "Macintosh HD" directory, to the contents of the "Desktop" directory. In some embodiments, draggable object 5004-2 is still selected, but is not shown in user interface 5002-A because it is still located in a directory that is not being displayed in region 5024 anymore (e.g., in Macintosh HD directory). In some embodiments, detecting that contact 5028 continues to maintain intensity above threshold $IT_D$ at does not cause any further display operation to be performed. In some embodiments, detecting a reduction in intensity to a level below threshold $IT_D$ but above $IT_L$ at contact 5028, maintains selection of draggable object 5004-2 but does not cause any further display operation to be performed.

FIG. 5H illustrates movement of focus selector 5013 (and optionally a representation of selected object 5004-2), in user interface 5002-A from the location corresponding to directory control object 5006-2 to region 5024. FIG. 5H shows that a movement 5030 of a user interaction on touch-sensitive surface 451 is detected from contact 5028 to contact 5032. Intensity diagram 5010-A shows the detected intensity of the user interaction at contact 5028 before movement 5030 was initiated. Intensity diagram 5010-B shows the detected intensity of the user interaction at contact 5032 after movement 5030 has concluded. Both contacts have a detected intensity above intensity threshold $IT_L$, and below $IT_D$. As described above, in some embodiments, the detected contact intensity must be between $IT_L$ and $IT_D$, in order to satisfy the one or more object selection criteria. In some embodiments, detected contact intensity above $IT_L$ is sufficient to satisfy the one or more object selection criteria without regard to whether or not the detected contact intensity is above or below $IT_D$.

FIG. 5H also shows that in some embodiments, displaying the movement of focus selector 5013 from the region corresponding to directory control object 5006-2 to region 5024, while object 5004-2 is selected, includes displaying a representation of selected draggable object 5004-2. In some embodiments, selected draggable object 5004-2 is displayed in a visually distinct manner from other draggable objects in user interface 5002-A as long as draggable object 5004-2 is still selected.

FIG. 5I illustrates no contact being detected on touch-sensitive surface 451. Intensity diagram 5010-A indicates the absence of any intensity as well. In response to detecting a decrease in intensity below threshold $IT_L$ (or, optionally failing to meet object selection criteria for one or more other reasons), user interface 5002-A shows de-selection of draggable object 5004-2, and re-location of draggable object 5004-2 to the Desktop directory. In some embodiments, draggable object 5004-2 is no longer displayed in a visually distinct manner from other draggable objects in user interface 5002-A, when it is de-selected.

FIG. 5J illustrates a user interaction detected on touch-sensitive surface 451, at contact 5034. For example, the user interaction is a minimal contact, as described above. Intensity diagram 5010-A shows a detected intensity level below threshold $IT_L$. In response to detecting the minimal contact at contact 5034, focus selector 5013 is shown over draggable object 5004-3.

FIG. 5K illustrates movement of focus selector 5013, in response to detecting movement 5036 on touch-sensitive surface 451, from contact 5034 to 5038. In this example, intensity diagram 5010-A illustrates that the detected intensity of contact 5034 is below threshold $IT_L$ and intensity diagram 5010-B illustrates that the detected intensity of contact 5038 is also below threshold $IT_L$. In response to detecting that the intensity level of contact 5034 is below threshold $IT_L$, when focus selector 5013 moves from being displayed over draggable object 5004-3 in FIG. 5J, to being displayed over directory control object 5006-3, draggable object 5004-3 is not selected.

FIG. 5L illustrates detection of an increase in intensity at contact 5038. Intensity diagram 5010-A shows a detected intensity level exceeding intensity threshold $IT_L$. In some embodiments, the detected increase in intensity at the location of contact 5038 is considered to be a distinct input from the contact detected at contact 5038 in FIG. 5K. For example, FIG. 5K showed a "minimal contact" input, while FIG. 5L illustrates a "light press" user input at contact 5038.

FIG. 5L also shows focus selector 5013 displayed over directory control object 506-3. In response to detecting the increase in intensity at contact 5038, directory control object 506-3 is activated, and in some embodiments, as shown in FIG. 5L, it is displayed in a visually distinct manner to indicate that it is activated. In this example, directory control object 5006-3 corresponds to a file directory called "Backup Directory", and a display operation is performed to switch the display of the contents of region 5024 from showing the contents of the "Desktop" directory, to the contents of the "Backup Directory" directory. In some embodiments, detecting maintained intensity above threshold $IT_L$ at contact 5038 does not cause any further display operation to be performed. In some embodiments, directory control object 506-3 is configured to perform a display operation in user interface 5002-A in response to detecting a change in detected intensity at contact 5038 (e.g., a response to a deep press input).

FIG. 5M illustrates detection of a user interaction with touch-sensitive surface 451 including contact 5040. In this example, intensity diagram 5010-A shows a detected intensity level exceeding intensity threshold $IT_L$. Focus selector 5013 is displayed over draggable object 5004-4 while the intensity level of contact 5040 is detected to exceed intensity threshold $IT_L$. In this example, one or more object selection criteria are satisfied while focus selector 5013 is displayed over draggable object 5004-4, and object 5004-4 is selected.

FIG. 5N illustrates movement of focus selector 5013 (and optionally a representation of selected object 5004-4), in user interface 5002-A from the location corresponding to draggable object 5004-4 to control object 5008-3 (e.g., a search field). FIG. 5N shows that a movement 5042 of a user interaction on touch-sensitive surface 451 is detected from contact 5040 to contact 5044. Intensity diagram 5010-A shows the detected intensity of the user interaction at contact 5040 before movement 5042 was initiated. Intensity diagram 5010-B shows the detected intensity of the user interaction at contact 5044 after movement 5042 has concluded. Both contacts have a detected intensity above intensity threshold $IT_L$, and below $IT_D$. As described above, in some embodiments, the detected contact intensity must be between $IT_L$ and $IT_D$, in order to satisfy the one or more object selection criteria. In some embodiments, detected contact intensity above $IT_L$ is sufficient to satisfy the one or more object selection criteria without regard to whether or not the detected contact intensity is above or below $IT_D$.

FIG. 5O illustrates detection of an increase in intensity at contact 5044. Intensity diagram 5010-A shows a detected intensity level exceeding intensity threshold $IT_D$. In some embodiments, the detected increase in intensity at the location of contact 5044 is considered to be a distinct input from the contact detected at contact 5044 in FIG. 5N. For example, FIG. 5N showed a "light press" input, while FIG. 5O illustrates a "deep press" user input at contact 5044. In this example, the device (or user interface 5002-A) is not configured to perform a display operation in response to detection of the "deep press" input while focus selector 5013 is displayed over control object 5008-3.

Figure 5P:
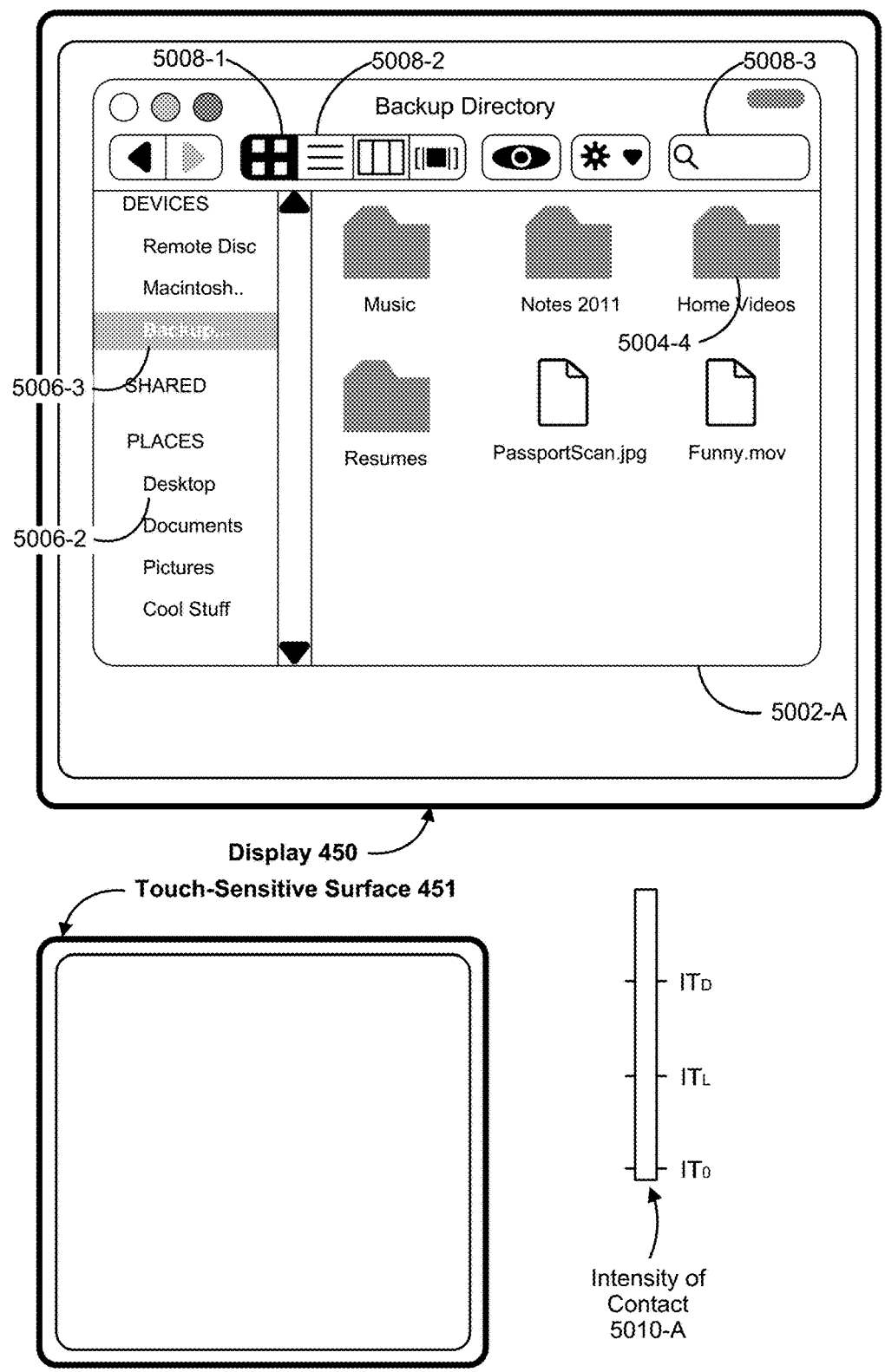

FIG. 5P illustrates no contact being detected on touch-sensitive surface 451. Intensity diagram 5010-A indicates the absence of any intensity as well. In response to detecting a decrease in intensity below threshold $IT_L$ (or, optionally failing to meet object selection criteria for one or more other reasons) regardless of whether or not a contact is detected on touch-sensitive surface 451, user interface 5002-A shows de-selection of draggable object 5004-4, and continued display of object 5004-4 in the "Backup Directory" directory. In some embodiments, draggable object 5004-4 is no longer displayed in a visually distinct manner from other draggable objects in user interface 5002-A, when it is de-selected. In this example, control object 5008-3 is not configured to perform an operation involving placement of a draggable object 5004 over it. For example, dragging a folder from a directory to a search field and releasing it does not result in performance of any operations associated with the search field.

Figure 5Q:
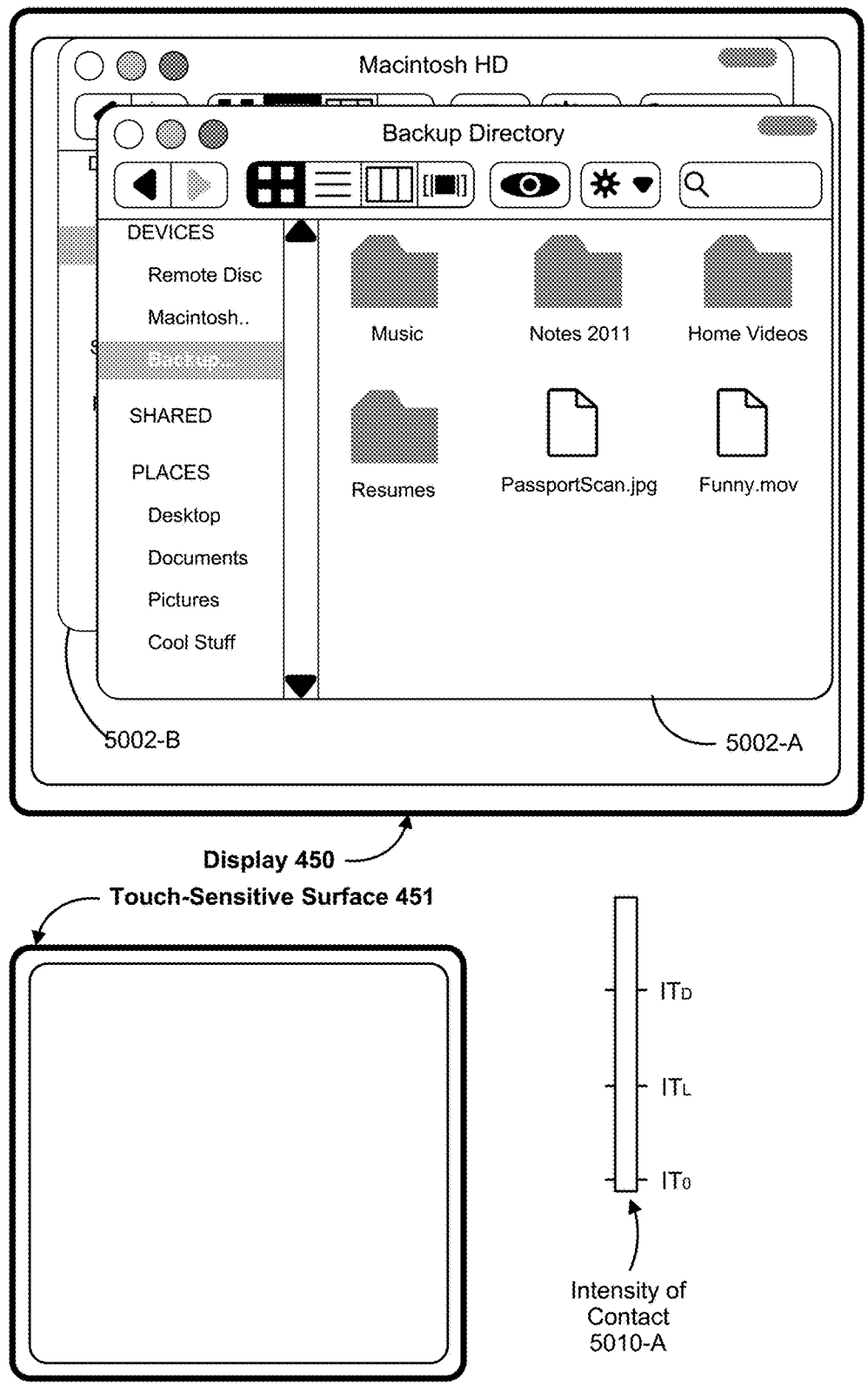

FIG. 5Q illustrates user interfaces of two applications or two instances of applications displayed on display 450. User interface 5002-A corresponds to an instance of a file management program (e.g., Finder from Apple Inc. of Cupertino, Calif.), and user interface 5002-B corresponds to another instance of the same file management program. While FIG. 5Q illustrates user interfaces corresponding to two instances of one application, it will be understood that in some embodiments user interface 5002-A corresponds to a first software application and user interface 5002-B corresponds to a second software application, distinct from the first software application (e.g., user interface 5002-A corresponds to an image management application and user interface 5002-B corresponds to a word processing application).

Figure 5R:
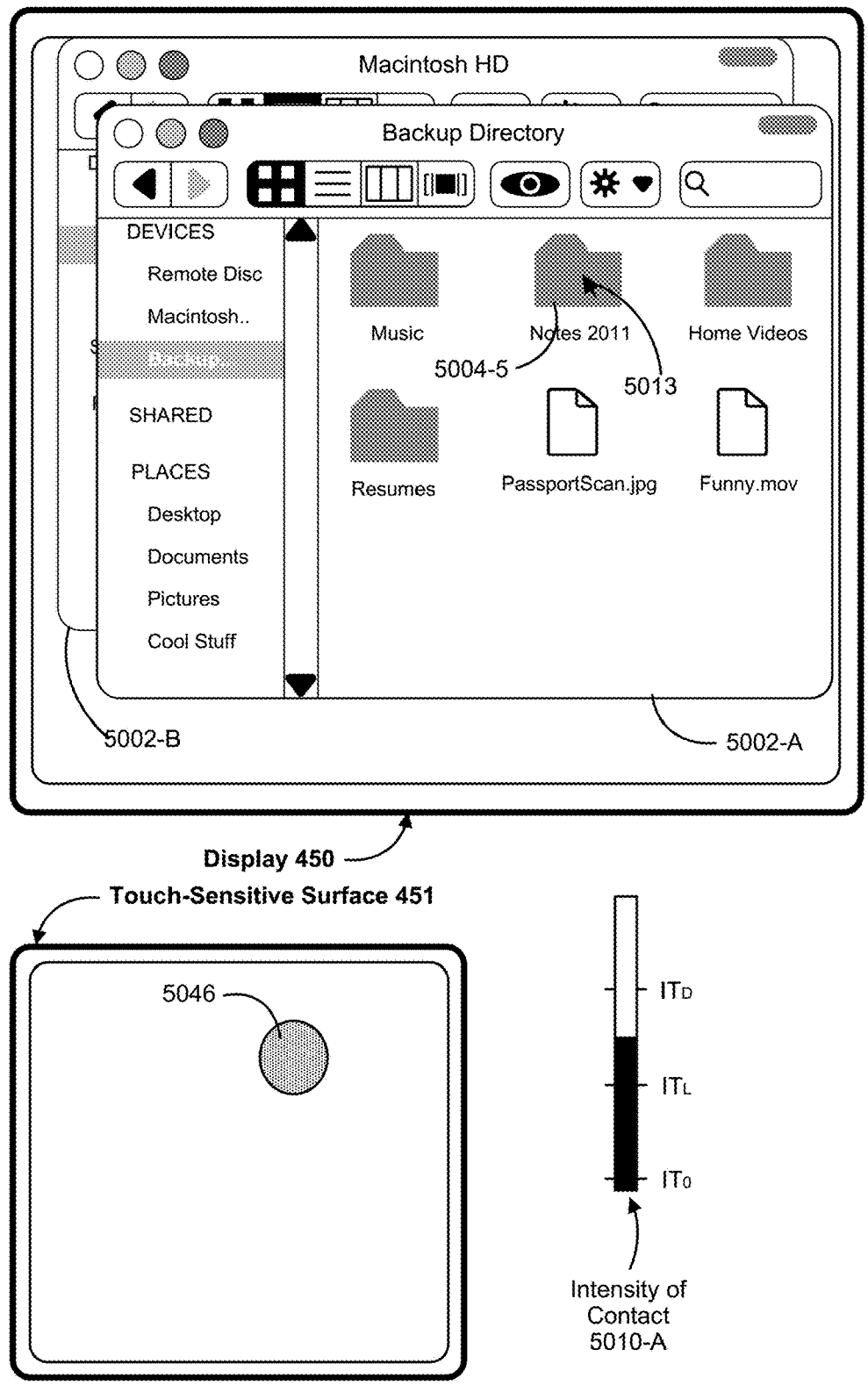

FIG. 5R illustrates detection of a user interaction (e.g., a light press input) on touch-sensitive surface 451, including contact 5046. Intensity diagram 5010-A shows a detected intensity level above threshold $IT_L$. In response to detecting the user interaction at contact 5046, focus selector 5013 is shown over draggable object 5004-5. In this example, one or more object selection criteria are satisfied while focus selector 5013 is displayed over draggable object 5004-5, and object 5004-5 is selected.

Figure 5S:
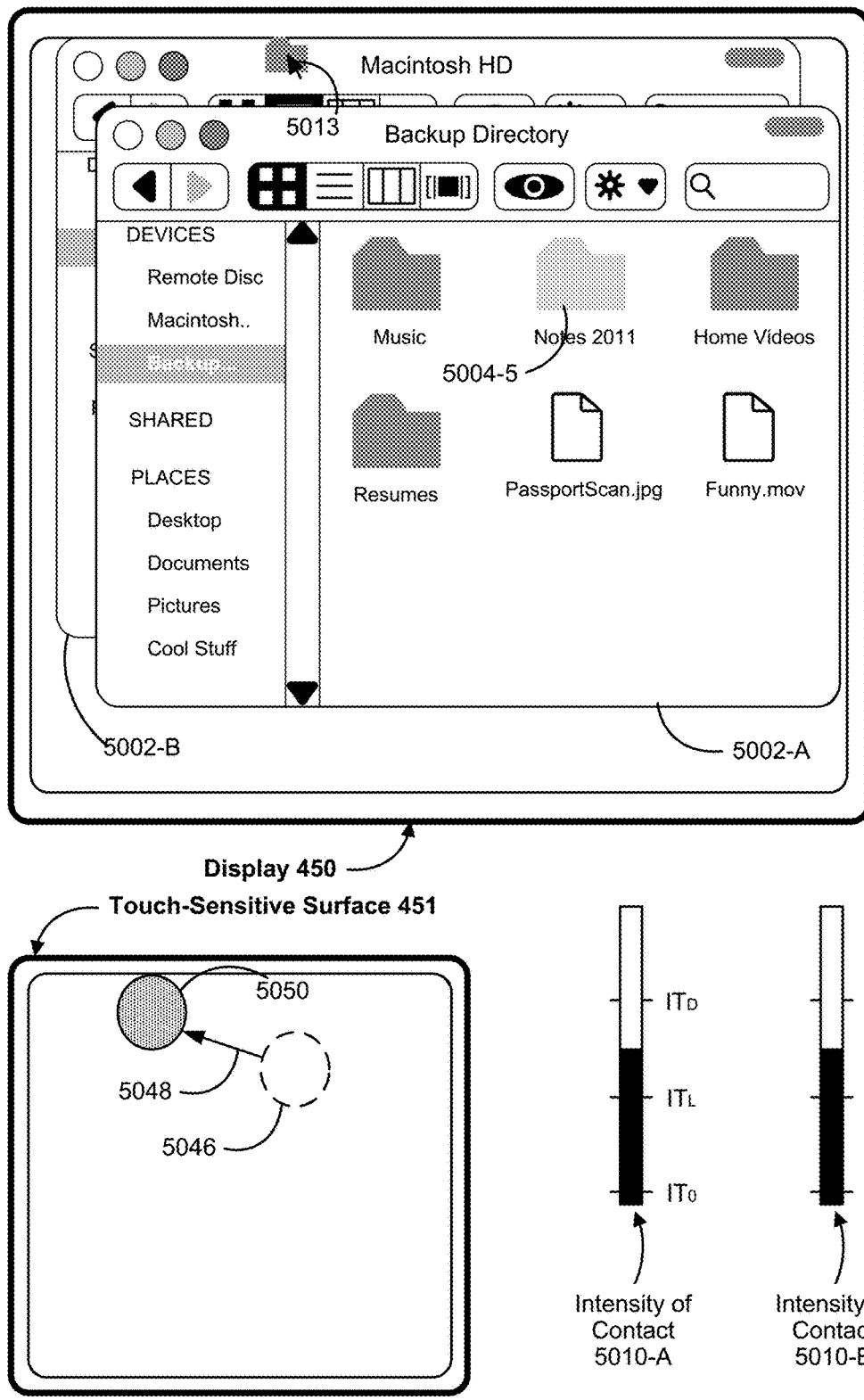

FIG. 5S illustrates movement of focus selector 5013 (and optionally a representation of selected object 5004-5), in user interface 5002-A from the location corresponding to draggable object 5004-5 to a visible portion of user interface 5002-B. FIG. 5S shows that a movement 5048 of a user interaction on touch-sensitive surface 451 is detected from contact 5046 to contact 5050. Intensity diagram 5010-A shows the detected intensity of the user interaction at contact 5046 before movement 5048 was initiated. Intensity diagram 5010-B shows the detected intensity of the user interaction at contact 5050 after movement 5048 has concluded. Both contacts have a detected intensity above intensity threshold $IT_L$, and below $IT_D$. As described above, in some embodiments, the detected contact intensity must be between $IT_L$ and $IT_D$, in order to satisfy the one or more object selection criteria. In some embodiments, detected contact intensity above $IT_L$ is sufficient to satisfy the one or more object selection criteria without regard to whether or not the detected contact intensity is above or below $IT_D$.

Figure 5T:
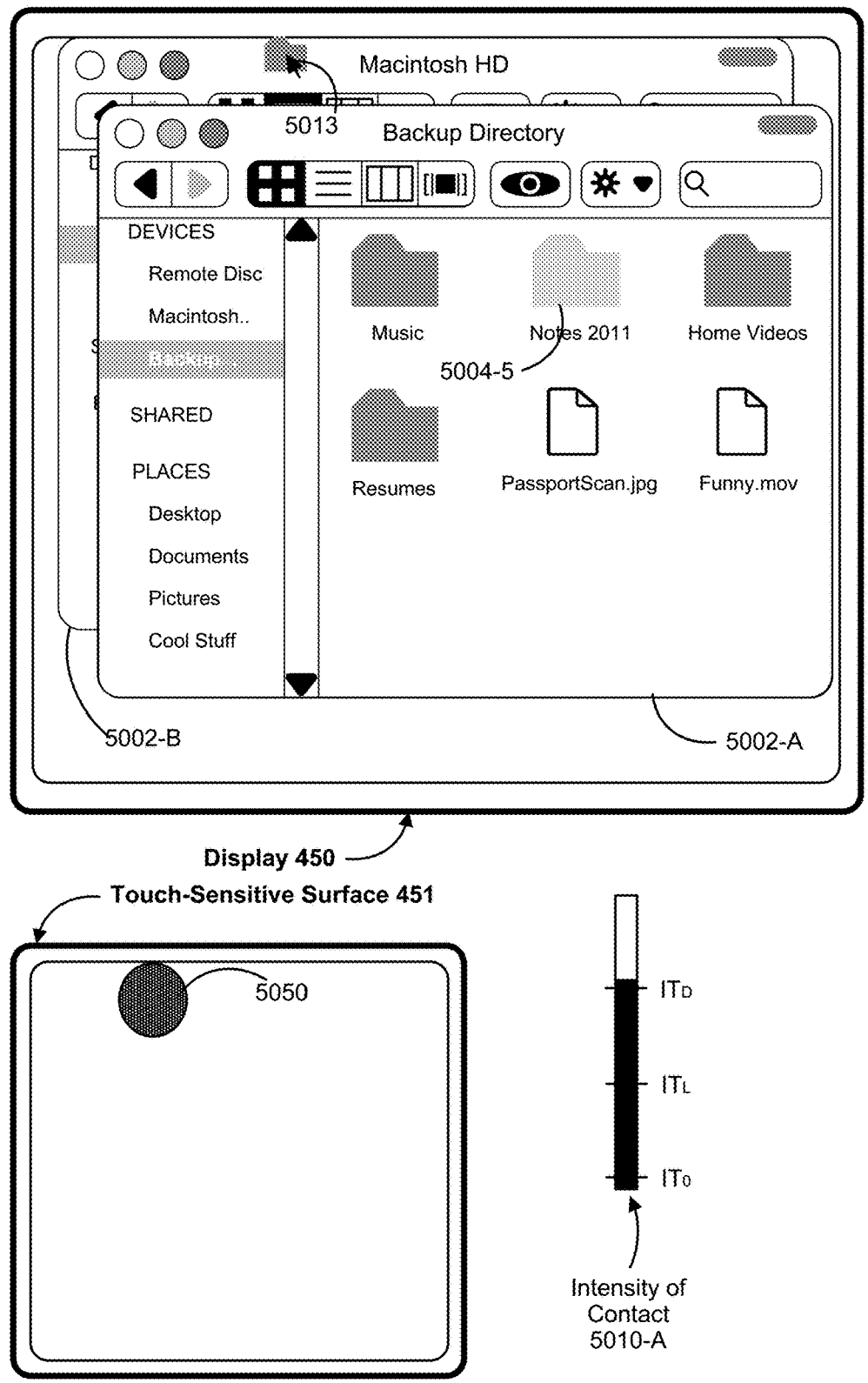

FIG. 5T illustrates detection of an increase in intensity at contact 5050 in accordance with some embodiments. Intensity diagram 5010-A shows a detected intensity level exceeding intensity threshold $IT_D$. In some embodiments, the detected increase in intensity at the location of contact 5050 is considered to be a distinct input from the contact detected at contact 5050 in FIG. 5S. In this example, the focus selector 5013 is displayed over at least a portion of user interface 5002-B when the increase in intensity is detected. In some embodiments, user interface 5002-B is displayed in a visually distinct way from other displayed user interfaces in display 450 (e.g., user interface 5002-A), in response to detecting focus selector 5013 over at least a portion of user interface 5002-B, or in response to detecting focus selector 5013 over at least a portion of user interface 5002-B while the intensity of contact 5050 is above threshold $IT_L$, or in response to detecting focus selector 5013 over at least a portion of user interface 5002-B while the intensity of contact 5050 is above threshold $IT_D$. For example, user interface 5002-B is displayed with a glowing border to indicate that the focus selector was successfully moved over to at least a portion of user interface 5002-B. In some embodiments, user interface 5002-B is displayed in a visually distinct manner to indicate the ability to perform an operation in response to detecting an intensity of contact 5050 above threshold $IT_D$.

Figure 5U:
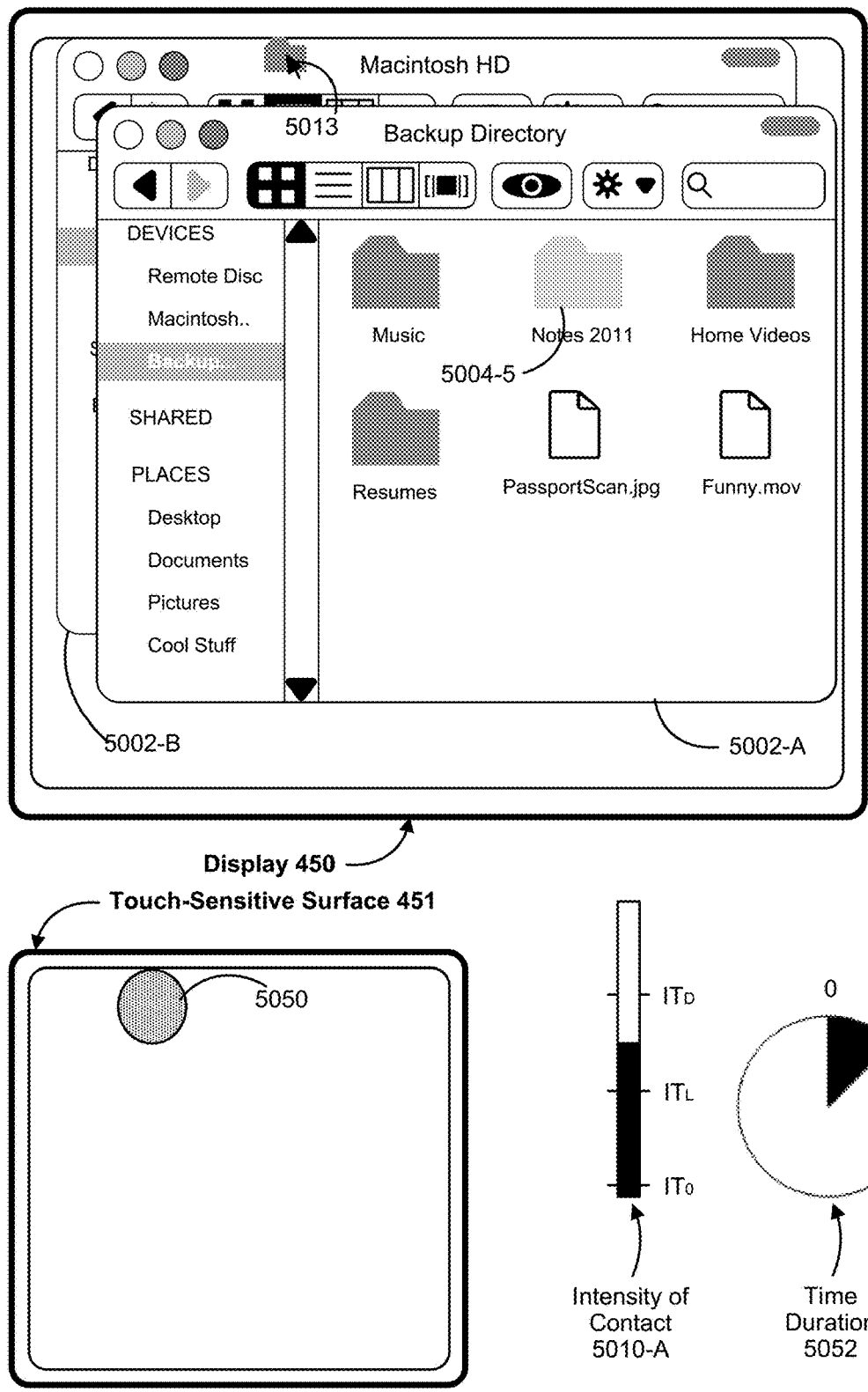

FIG. 5U illustrates some embodiments, where contact 5050 is detected to have an intensity level maintained at a particular level or range (e.g., between threshold $IT_L$ and threshold $IT_D$) for at least a predetermined amount of time, while the focus selector 5013 is displayed over at least a portion of user interface 5002-B. For example, a predetermined time duration threshold of 2 seconds is met by detecting a "light press" input for a time duration 5052 of 2.5 seconds at a location on touch-sensitive surface 451, corresponding to a visible portion of user interface 5002-B.

Figure 5V:
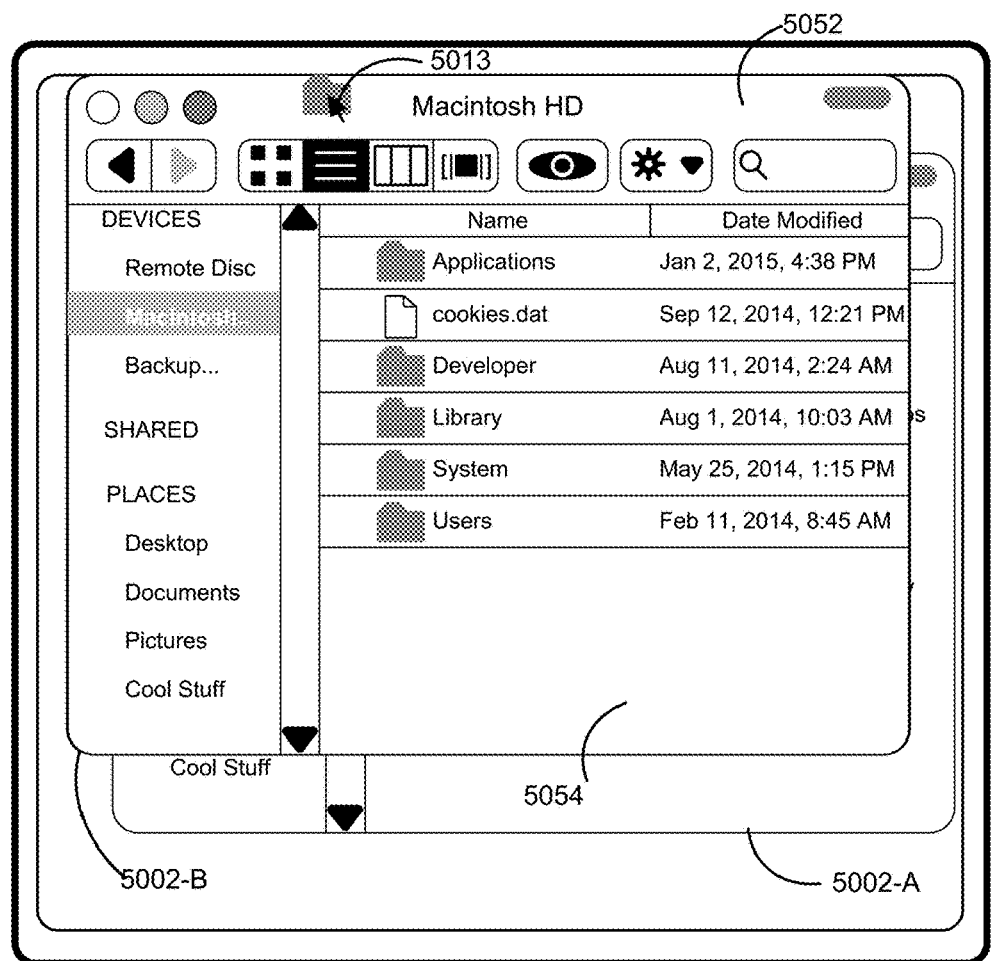
Figure 5V:
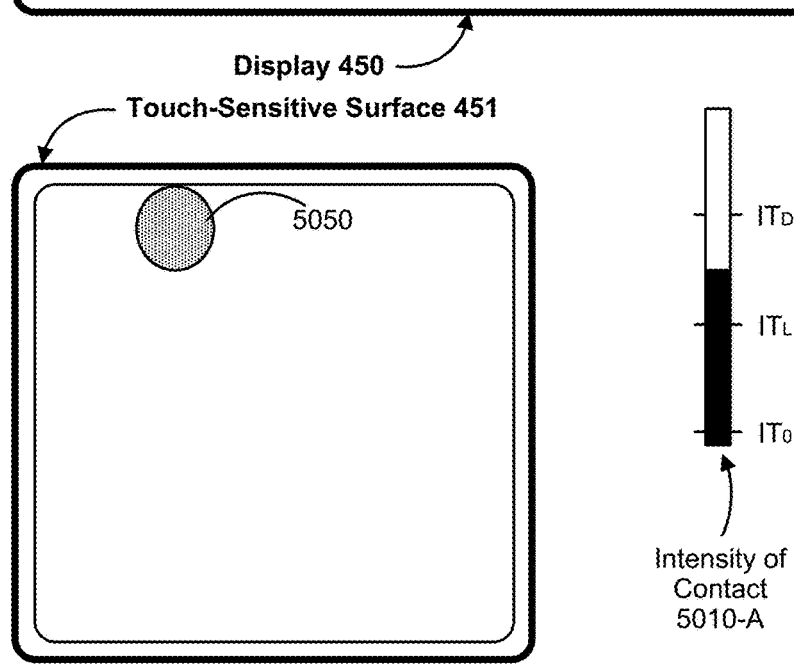

FIG. 5V illustrates a display operation performed in response to the activities of either FIG. 5T or FIG. 5U. In FIG. 5V, user interface 5002-B is displayed in front of user interface 5002-A, allowing the user of the device to see the contents of user interface 5002-B. In some embodiments, after the display operation is performed to display user interface 5002-B over user interface 5002-A, the intensity level of contact 5050 is detected to have decreased from being above threshold $IT_D$ to being between threshold $IT_L$, and threshold $IT_D$. In some embodiments, the detected contact intensity of contact 5050 is maintained at a level between $IT_L$ and $IT_D$, in order to satisfy the one or more object selection criteria.

In some embodiments, draggable object 5004-5 is still selected, but is not shown in user interface 5002-B because object 5004-5 is still located in a directory that is being displayed in user interface 5002-A (e.g., Backup Directory), and user interface 5002-B is displaying the contents of a different directory (e.g., Macintosh HD). In some embodiments, detecting maintained intensity above threshold $IT_D$ at contact 5050 does not cause any further display operation to be performed. In some embodiments, detecting a reduction in intensity to a level below threshold $IT_D$ but above $IT_L$ at contact 5050, maintains selection of draggable object 5004-5 but does not cause any further display operation to be performed.

Figure 5W:
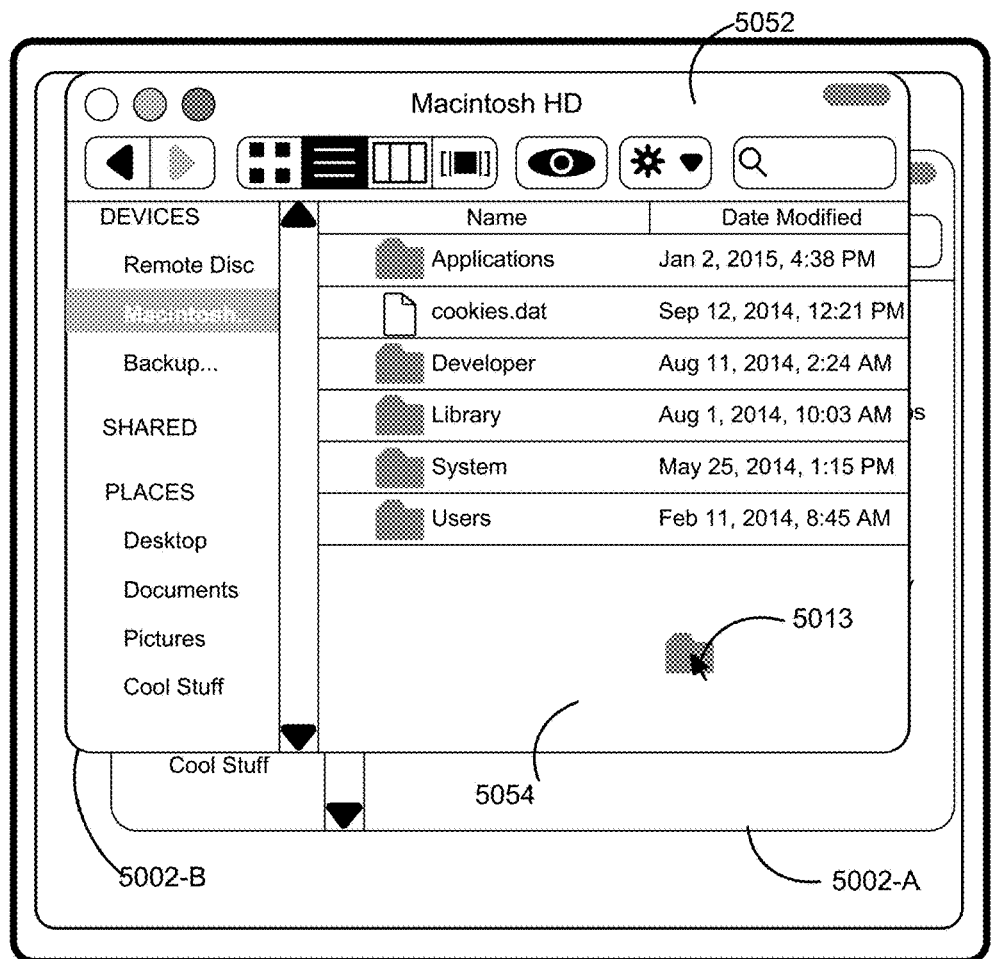
Figure 5W:
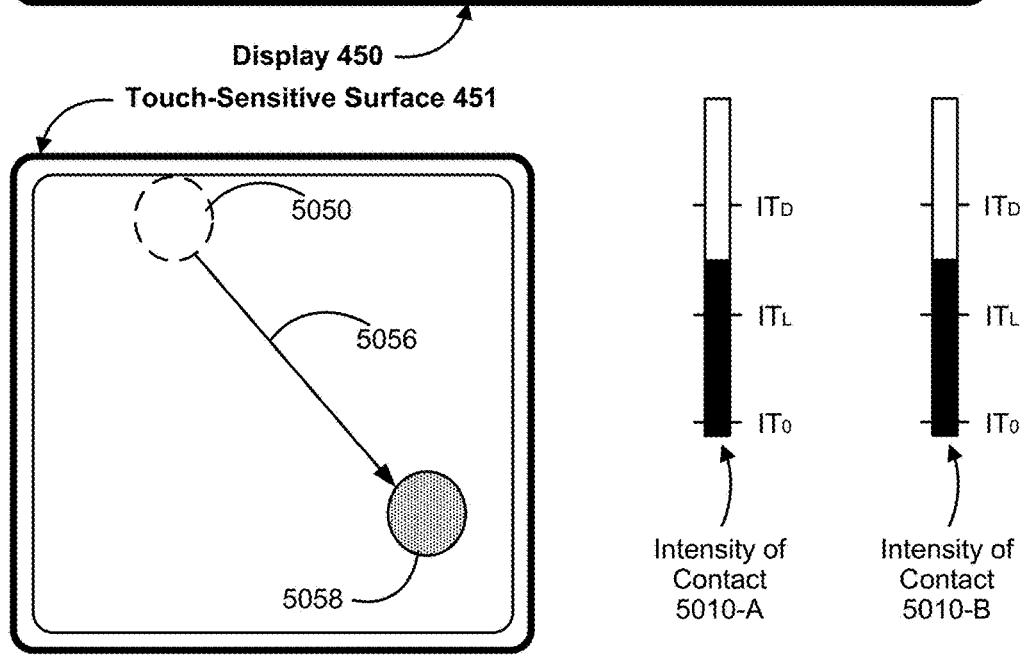

FIG. 5W illustrates movement of focus selector 5013 (and optionally a representation of selected object 5004-5), in user interface 5002-B from region 5052 of the user interface to region 5054. FIG. 5W shows that a movement 5056 of a user interaction on touch-sensitive surface 451 is detected from contact 5050 to contact 5058. Intensity diagram 5010-A shows the detected intensity of the user interaction at contact 5050 before movement 5056 was initiated. Intensity diagram 5010-B shows the detected intensity of the user interaction at contact 5058 after movement 5056 has concluded. Both contacts have a detected intensity above intensity threshold $IT_L$, and below $IT_D$. As described above, in some embodiments, the detected contact intensity must be between $IT_L$ and $IT_D$, in order to satisfy the one or more object selection criteria. In some embodiments, detected contact intensity above $IT_L$ is sufficient to satisfy the one or more object selection criteria without regard to whether or not the detected contact intensity is above or below $IT_D$.

Figure 5X:
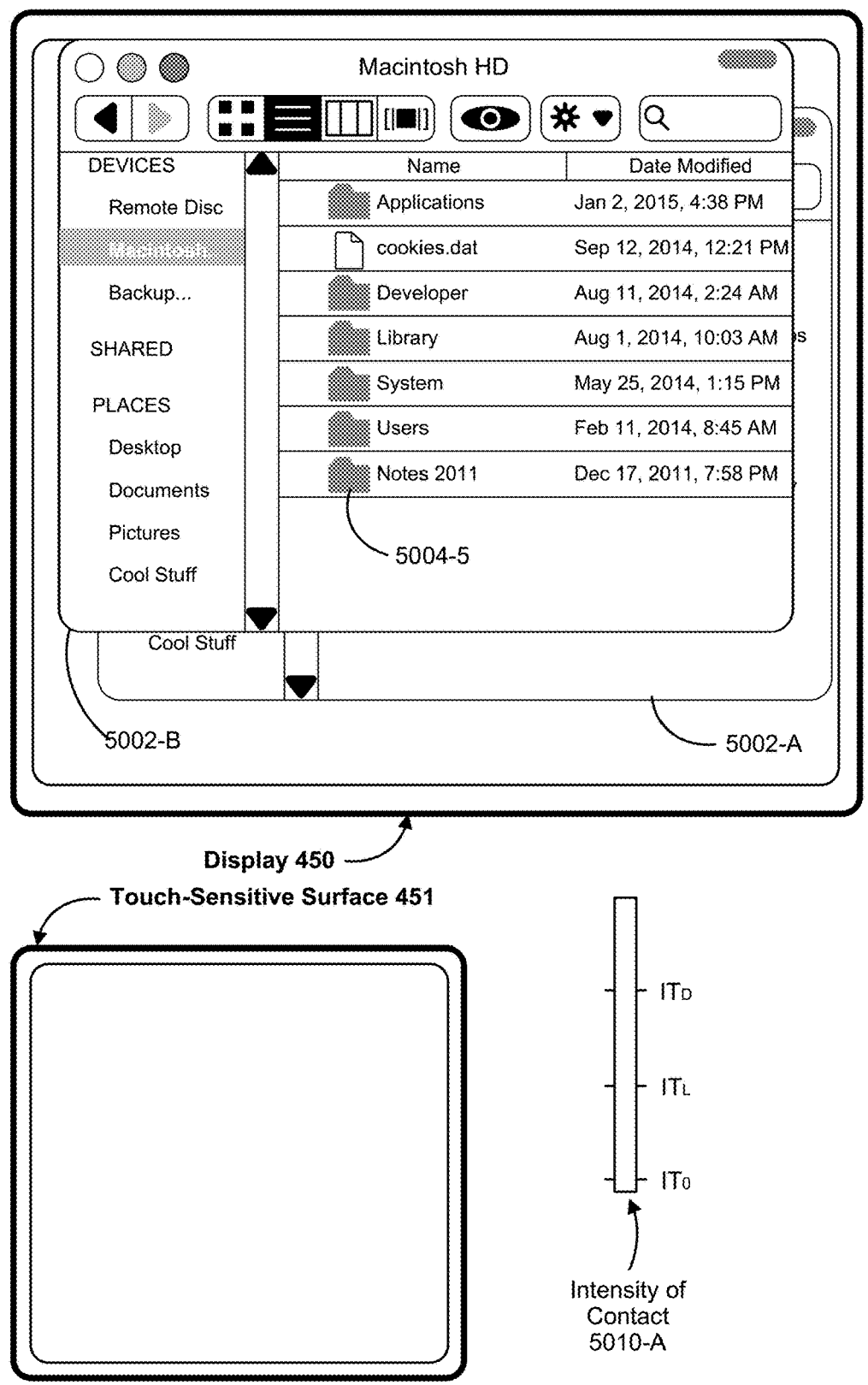

FIG. 5X illustrates no contact being detected on touch-sensitive surface 451. Intensity diagram 5010-A indicates the absence of any intensity as well. In response to detecting a decrease in intensity below threshold $IT_L$ (or, optionally failing to meet object selection criteria for one or more other reasons) regardless of whether or not a contact remains on touch-sensitive surface 451, user interface 5002-B shows de-selection of draggable object 5004-5, and re-location of draggable object 5004-5 to the "Macintosh HD" directory displayed in user interface 5002-B. In some embodiments, draggable object 5004-5 is no longer displayed in a visually distinct manner from other draggable objects in user interface 5002-B, when it is de-selected.

Figure 5Y:
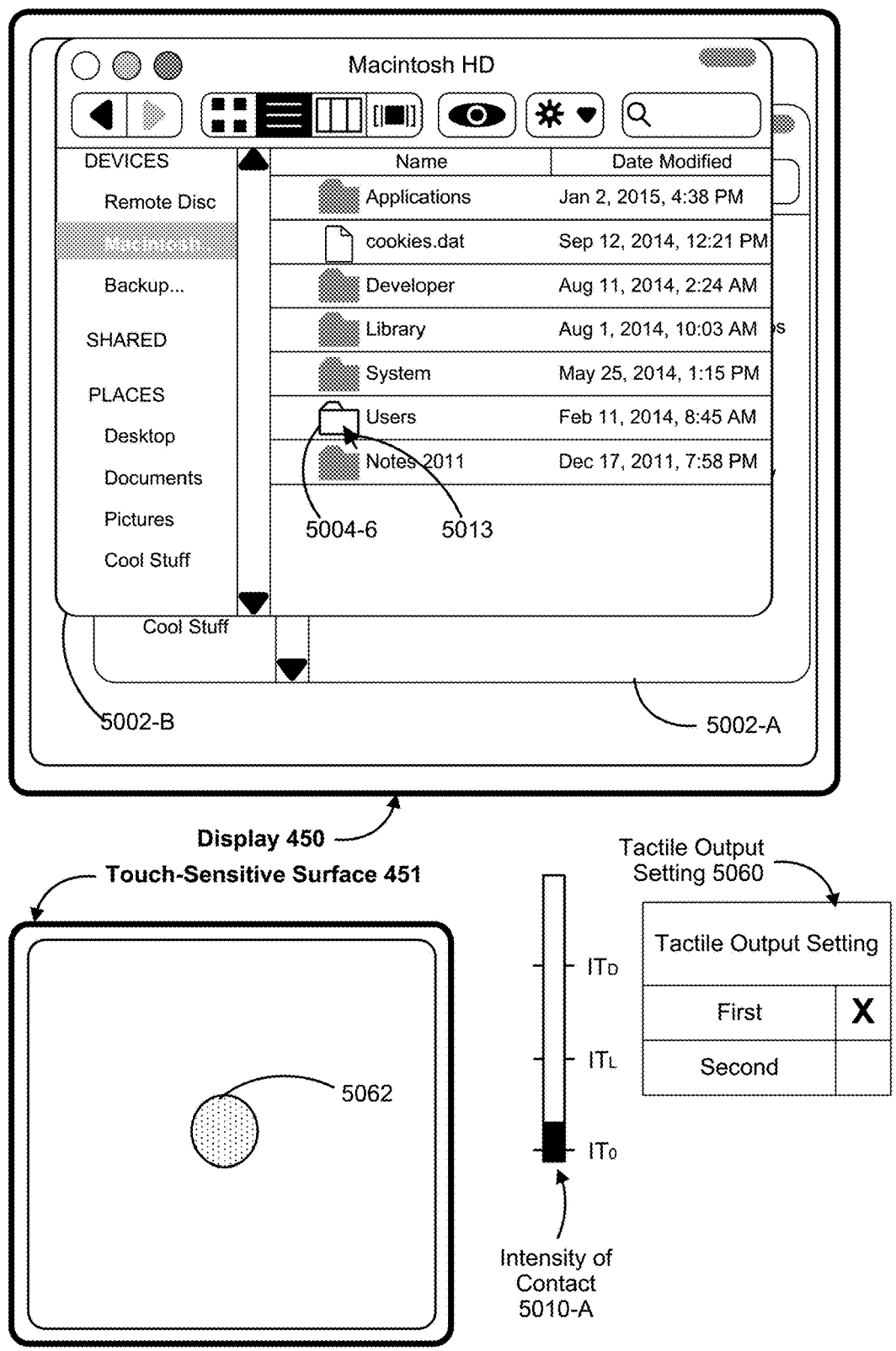

FIG. 5Y illustrates tactile output setting chart 5060, used to indicate activation of one or more tactile output settings associated with one or more tactile output generators of the device. In some embodiments, one or more tactile output generators are embedded in or are otherwise coupled to touch-sensitive surface 451. Examples of tactile outputs will be discussed with respect to touch-sensitive surface 451, but it will be understood that other physical implementations for providing tactile output are possible and intended to be included herein.

FIG. 5Y illustrates a first tactile output setting being active, and a user interaction including contact 5062 detected on touch-sensitive surface 451. In some embodiments, the first tactile output setting corresponds to a "silent trackpad mode," or a mode involving little to no tactile output generation and/or little to no sound generation in conjunction with the performance of display operations. In some embodiments, the silent trackpad mode is a mode of touch-sensitive surface operation in which the features of a normal mode of touch-sensitive surface operation are available at lower intensity thresholds (e.g., instead of pressing to $IT_L$ and then releasing, the user can tap on the touch-sensitive surface and then release to perform a primary operation, and instead of pressing to $IT_D$ and then releasing, the user press to $IT_L$ and then release to perform an alternate operation). This enables users to access all of the functionality of the normal mode of touch-sensitive surface operation without applying as much force. Additionally, in the "silent trackpad" mode of operation, some audible or tactile outputs associated with reaching different intensity levels can be reduced so as to reduce the noise caused by using the device in quiet environments (e.g., environments with low ambient noise, such as libraries, business meetings, classrooms, etc.).

Contact 5062 is shown to exhibit minimal contact with touch-sensitive surface 451. Intensity diagram 5010-A illustrates a detected intensity between thresholds $IT_0$ and $IT_L$, corresponding to the minimal contact detected, of contact 5062. For example, the user interaction including contact 5062 is a light tap on touch-sensitive surface 451, or a very light, continuously maintained contact.

Focus selector 5013 is shown to be displayed over draggable object 5004-6, of user interface 5002-B. As described above, in some embodiments, respective objects of a user interface displayed on display 450, are defined to have respective regions. Accordingly, in response to detecting a contact with intensity between thresholds $IT_0$ and $IT_L$ while the first tactile output setting is active (e.g., silent trackpad mode) and focus selector 5013 is displayed over the region corresponding to draggable object 5004-6, a first display operation is performed. In this example, a folder in the Macintosh HD directory is selected and a display operation is performed to visually distinguish the folder from other un-selected folders in the same directory (e.g., so as to indicate that further user inputs on touch-sensitive surface 451 will affect the selected object, for example a lateral movement of the contact on touch-sensitive surface 451 will cause user interface object 5004-6 to be moved on the display, while pressing harder on touch-sensitive surface 451 will cause a contextual menu to be displayed). In this example there is no tactile output generated in conjunction with performing the display operation, but in some embodiments a tactile output is generated. In this example there is no sound generated in conjunction with performing the display operation, but in some embodiments a sound is generated. In some embodiments, a quick tap on touch sensitive surface 451 (between thresholds $IT_0$ and $IT_L$ that ends within a predetermined time period) causes a primary activation operation to be performed, such as opening the "users" folder represented by icon 5004-6, while a maintained contact on touch sensitive surface 451 (between thresholds $IT_0$ and $IT_L$ that does not end within a predetermined time period) enables other operations to be performed (e.g., moving user interface object 5004-6).

Figure 5Z:
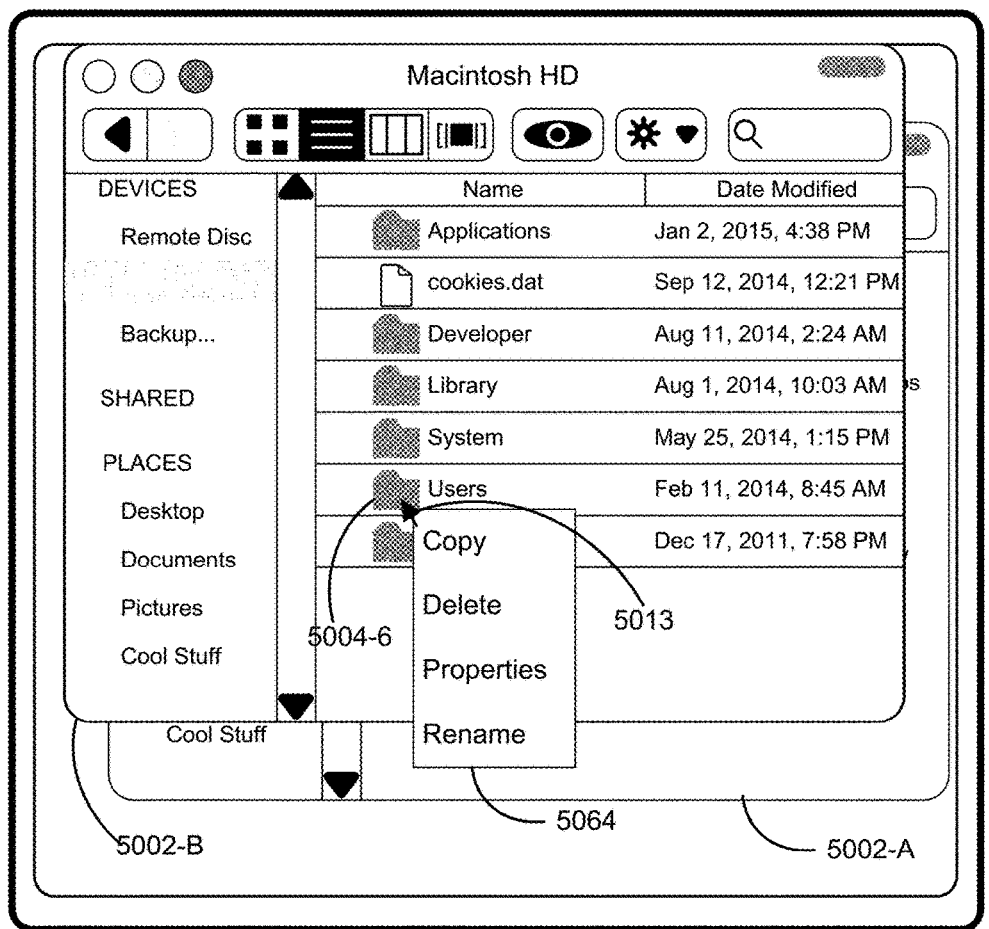
Figure 5Z:
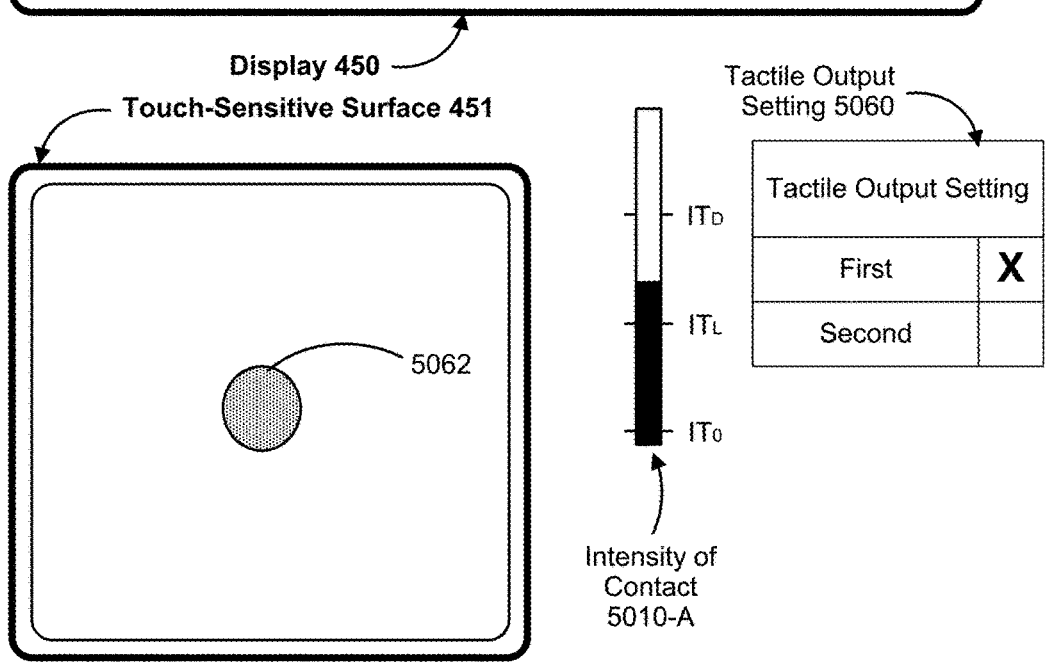
Figure 5A:
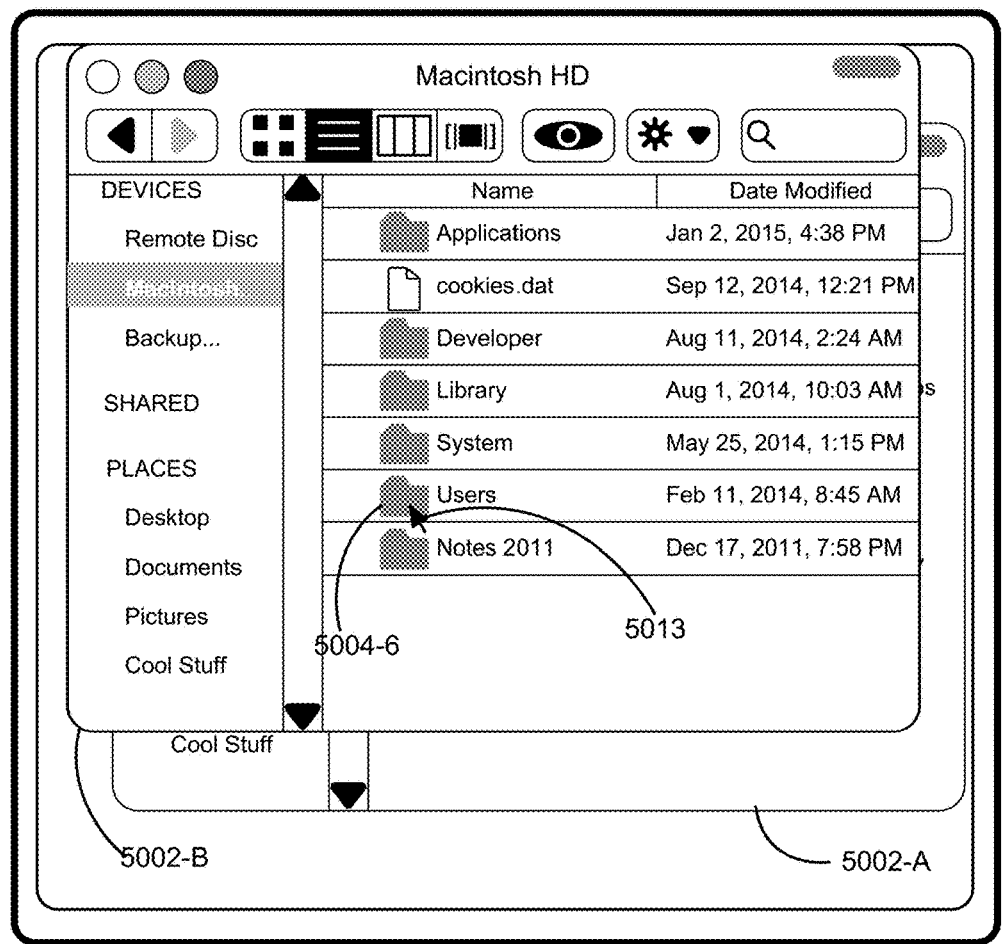
Figure 5A:
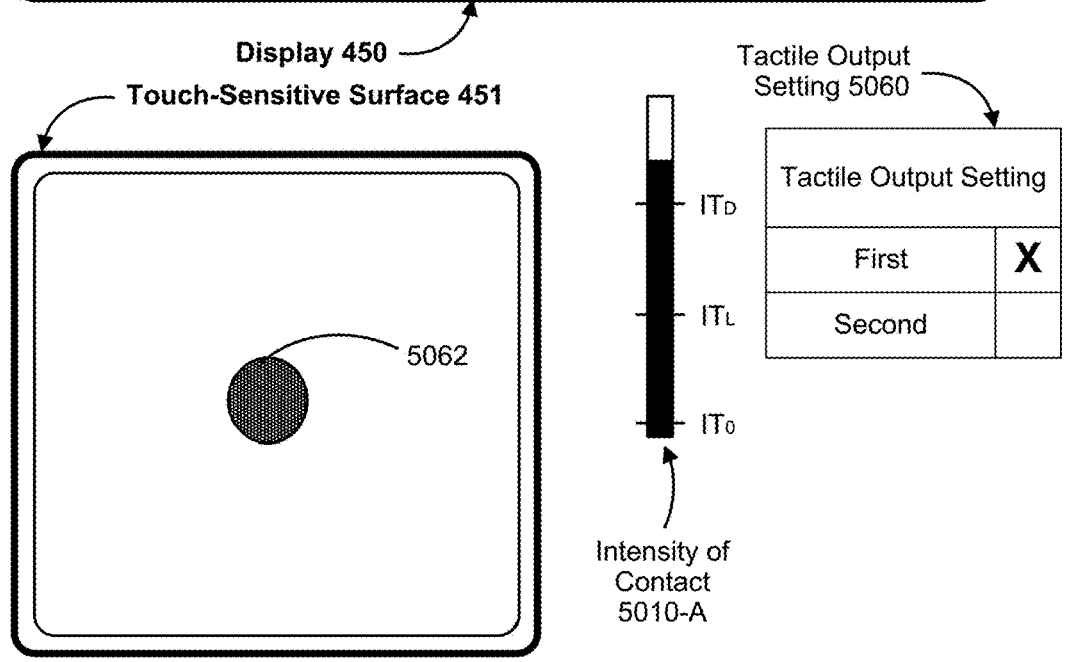
Figure 5B:
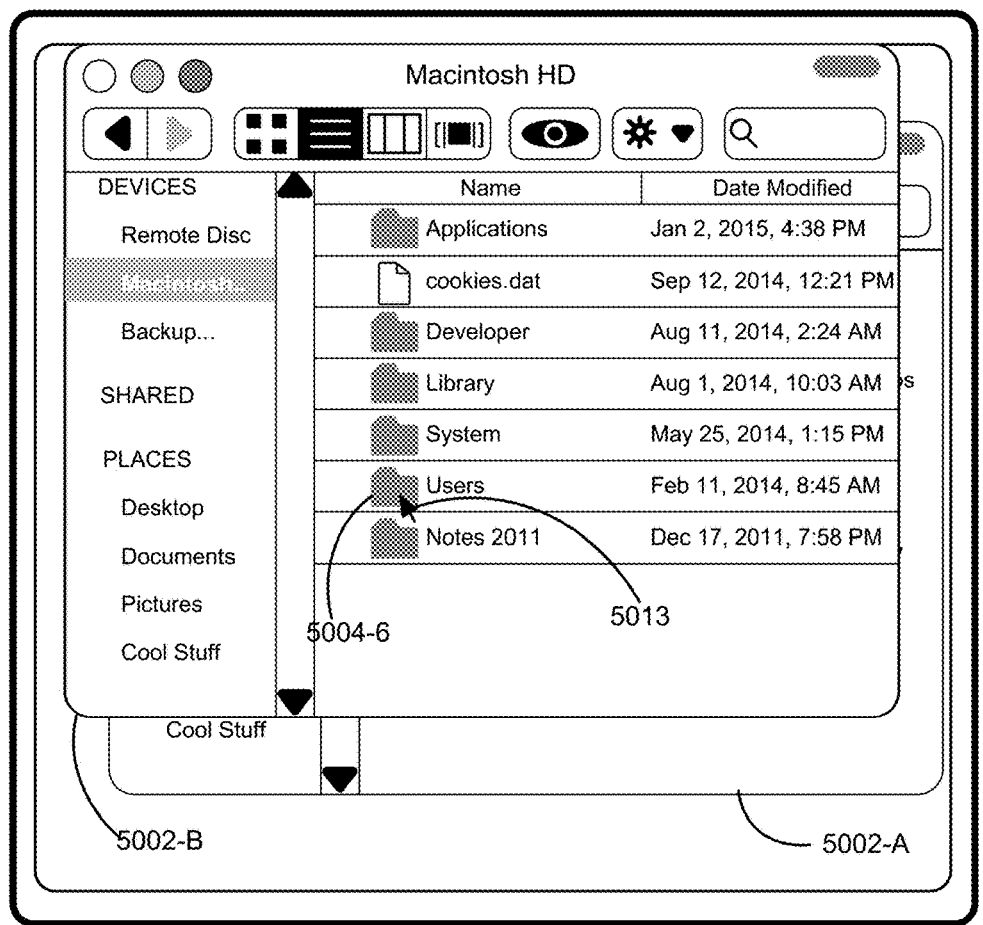
Figure 5B:
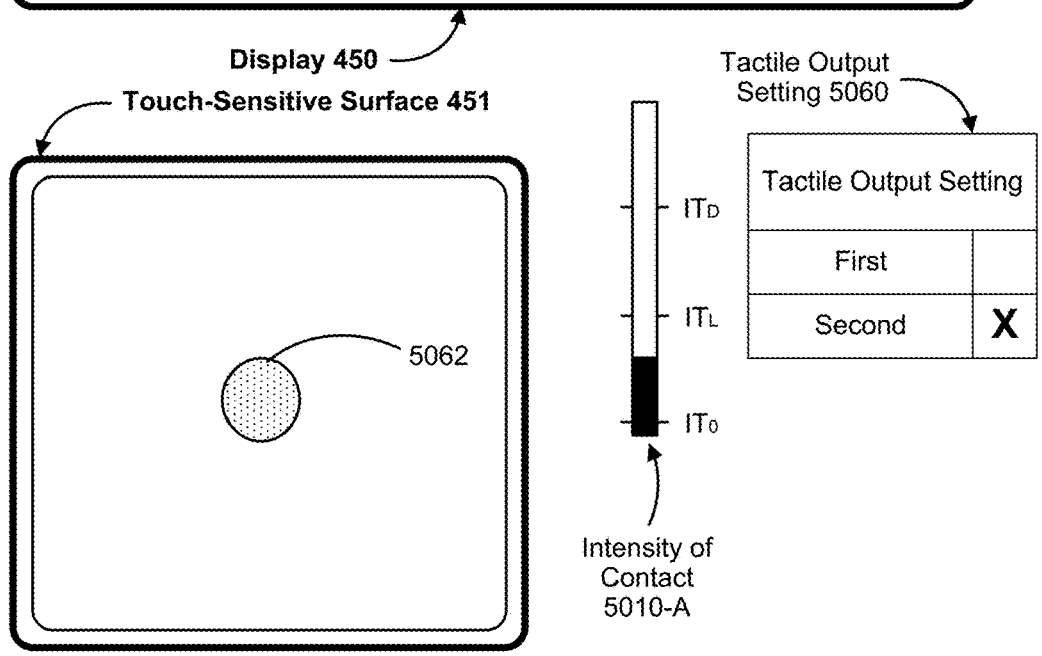
Figure 5C:
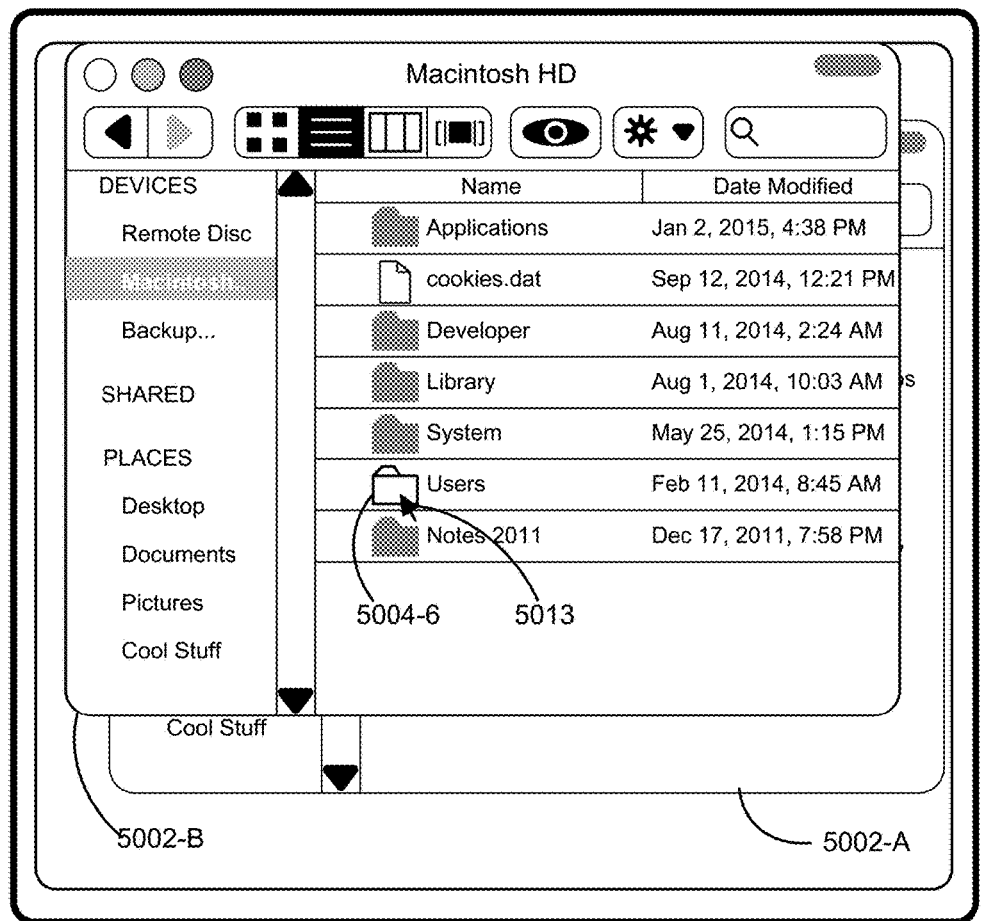
Figure 5C:
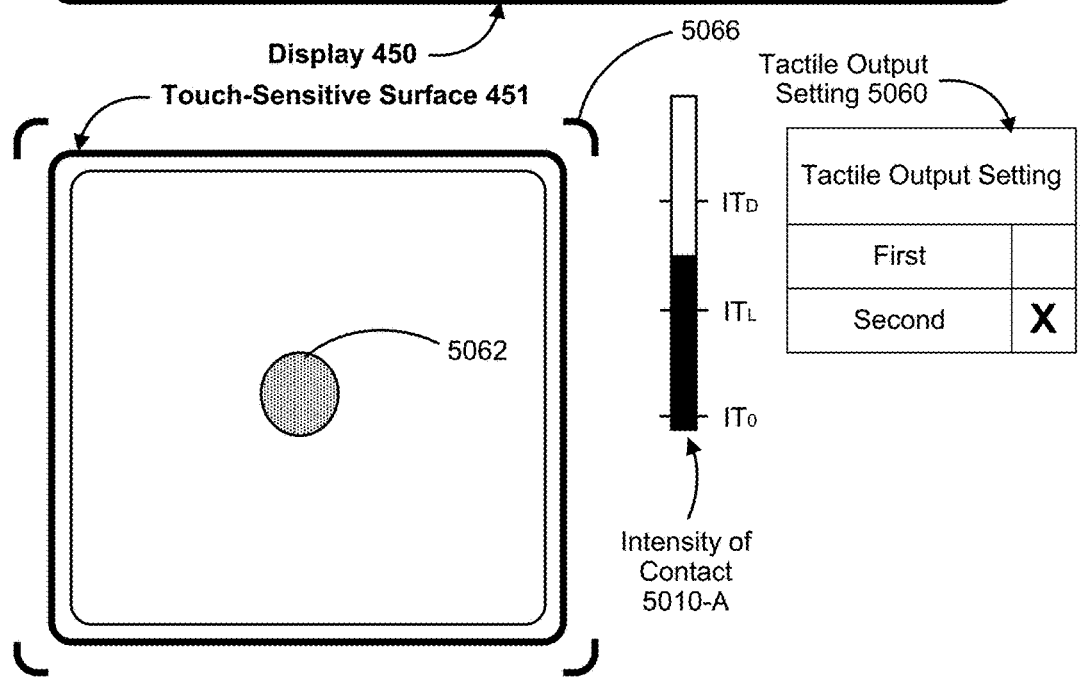
Figure 5D:
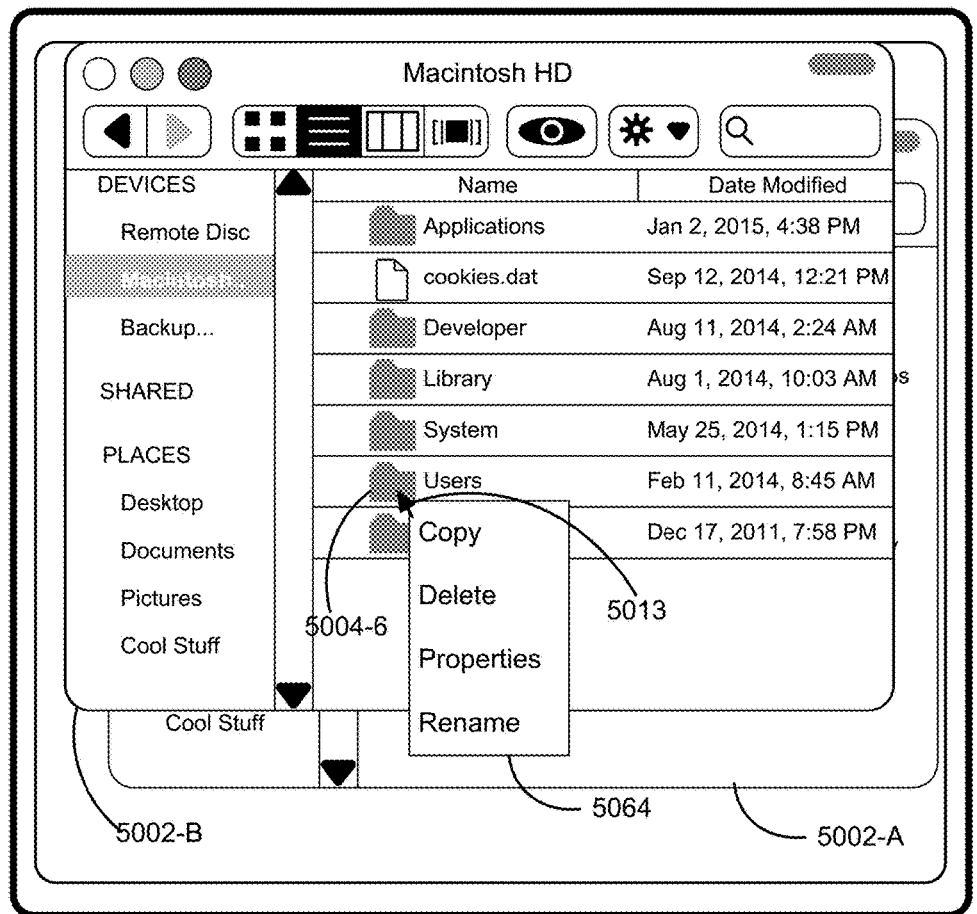
Figure 5D:
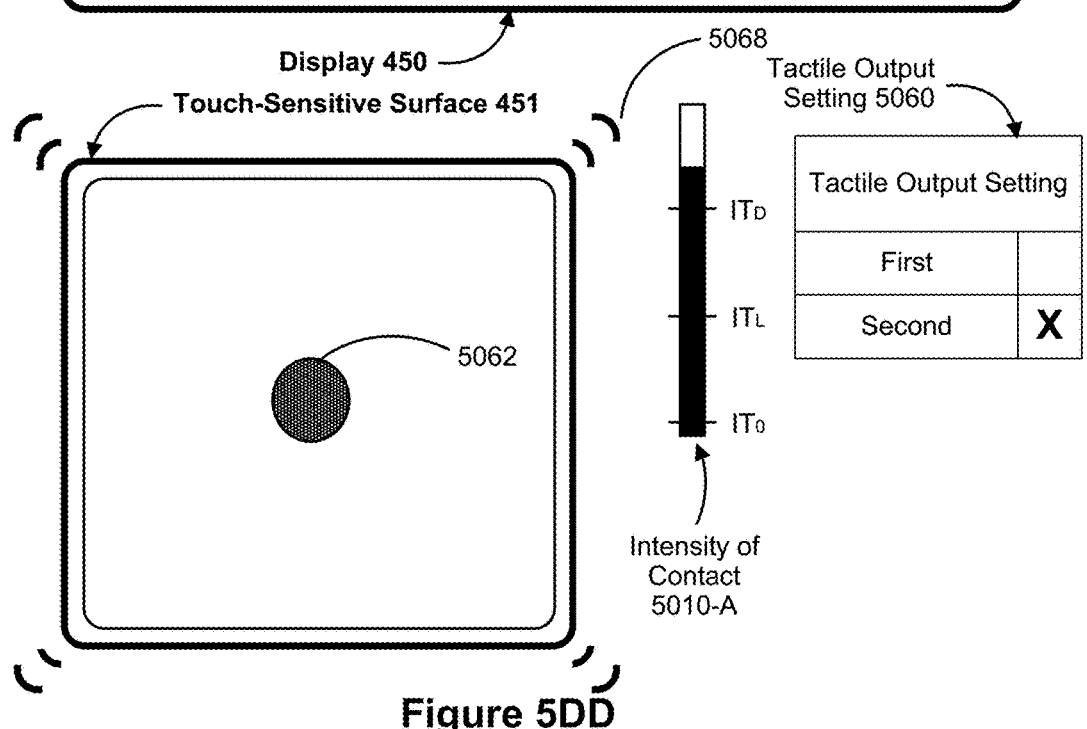
Figure 5E:
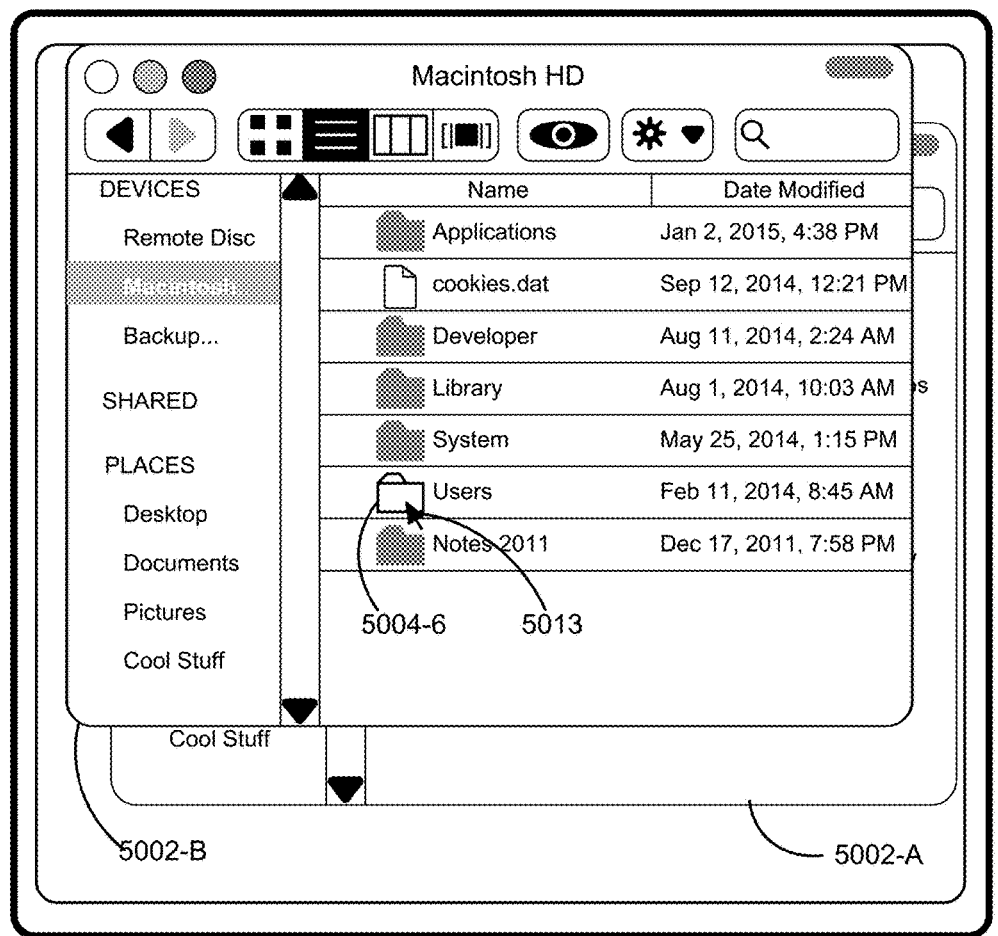
Figure 5E:
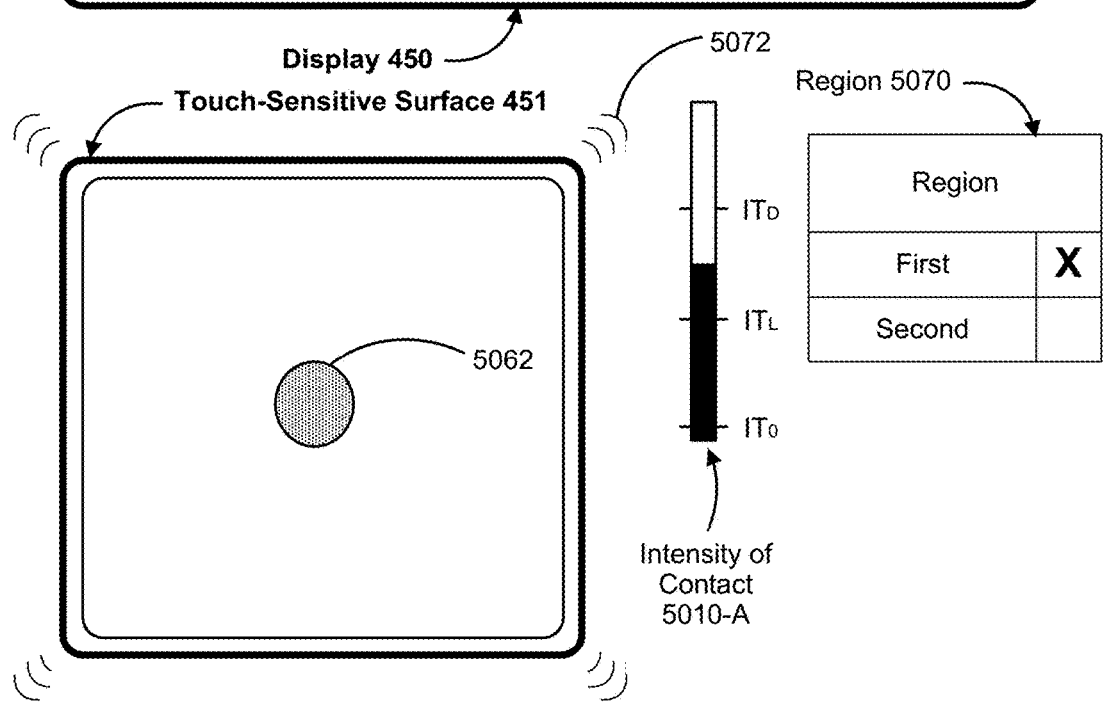
Figure 5F:
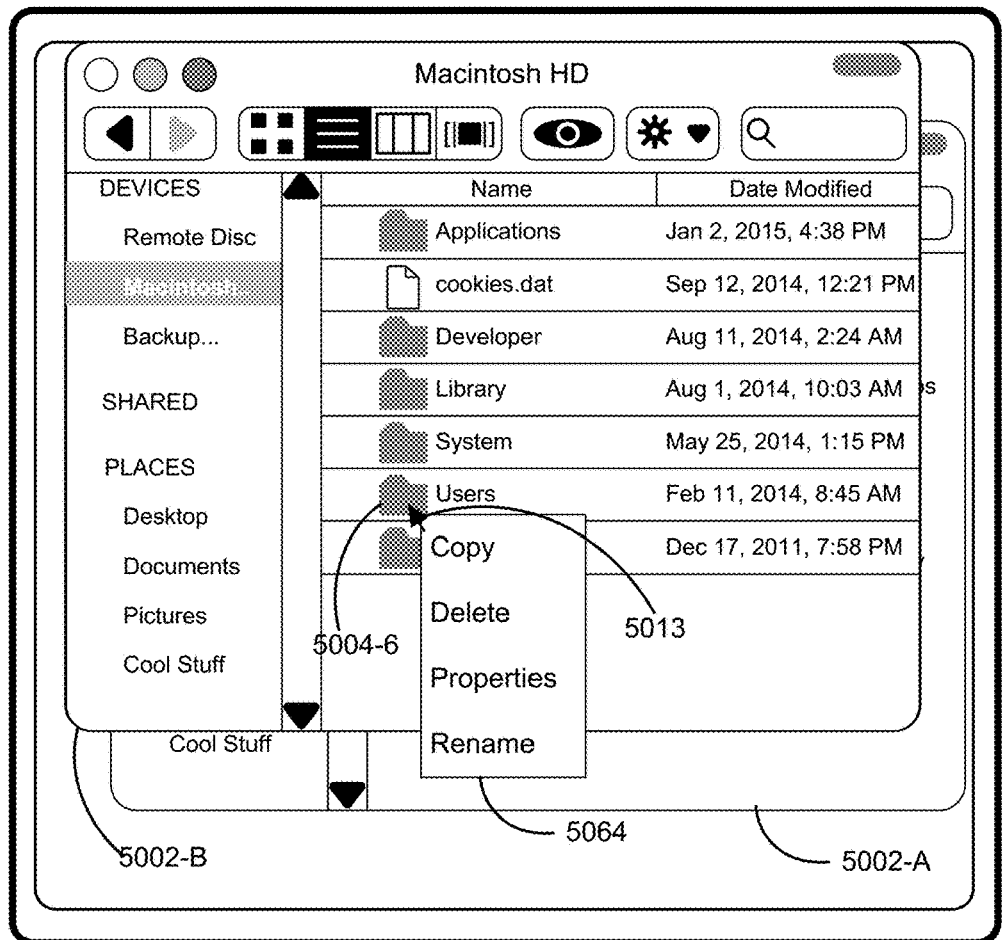
Figure 5F:
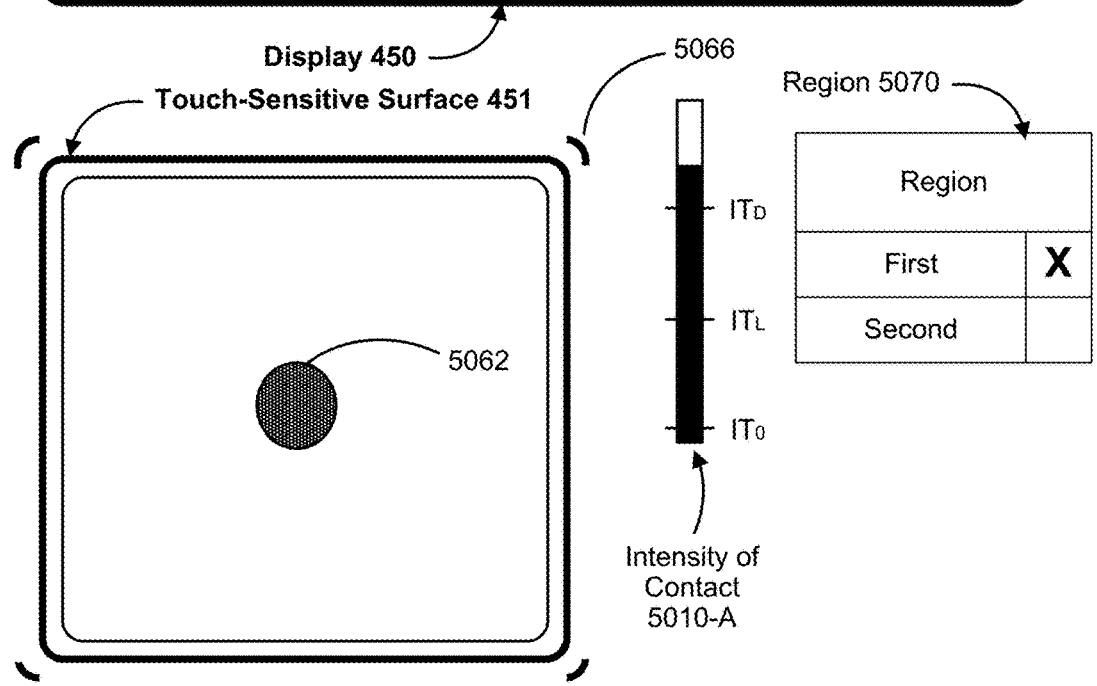
Figure 5G:
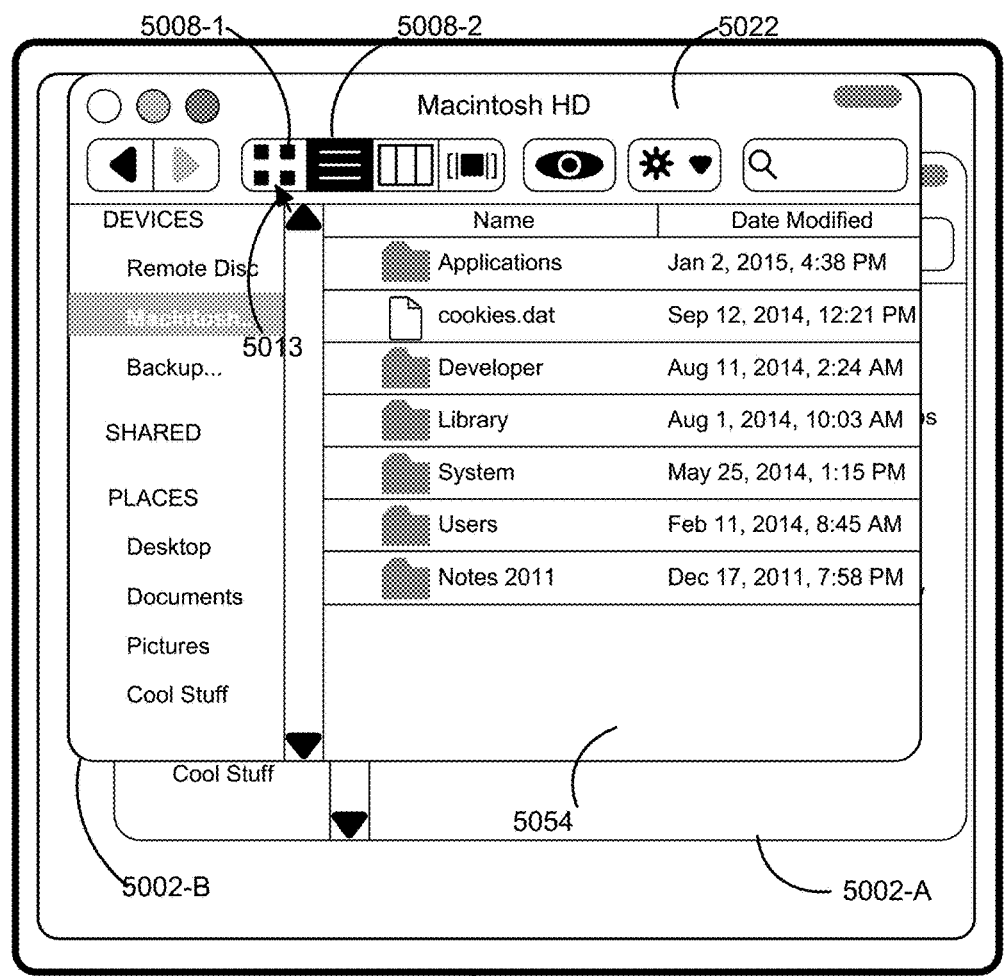
Figure 5G:
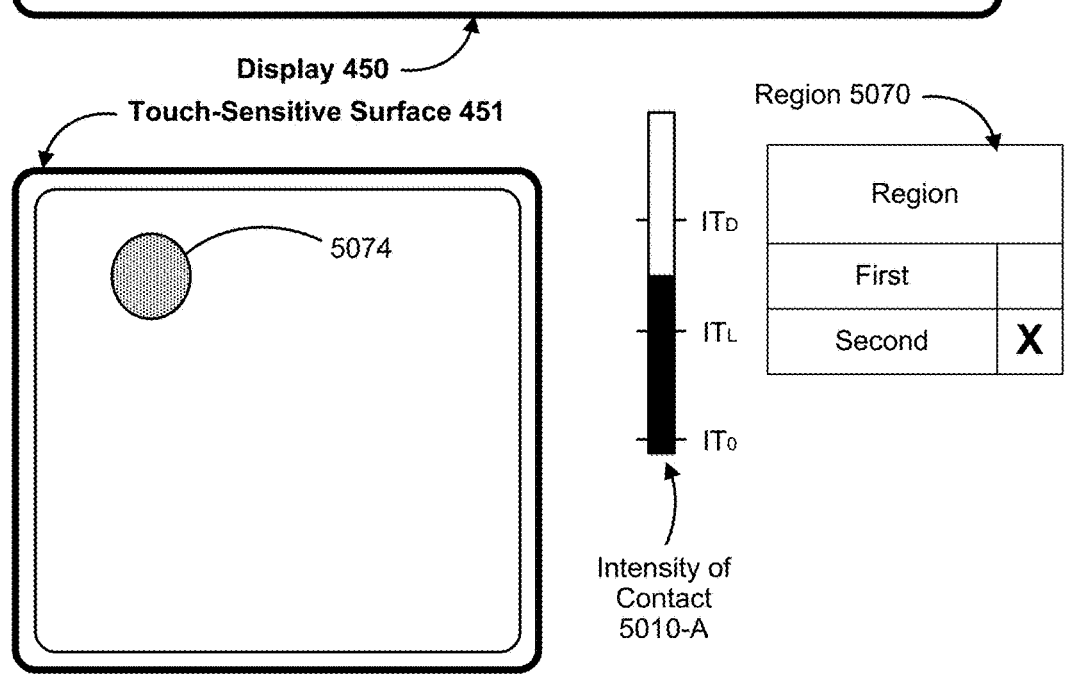
Figure 5H:
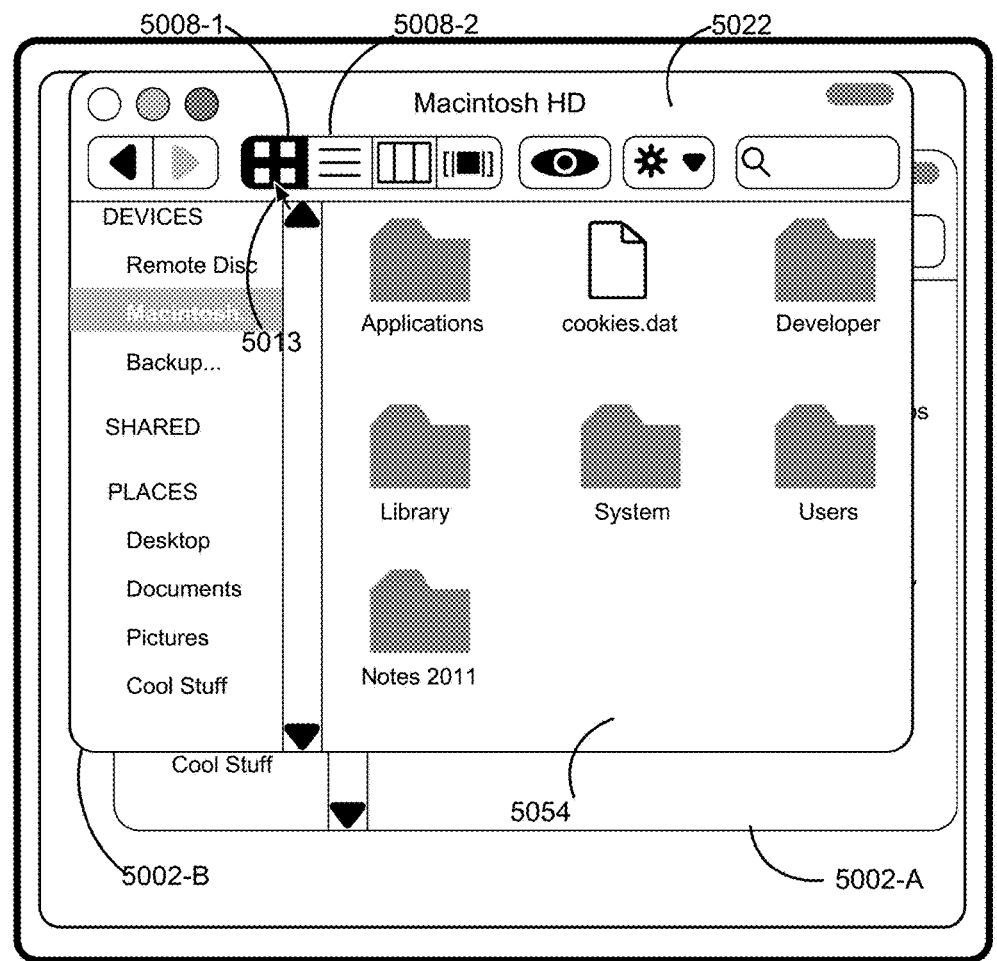
Figure 5H:
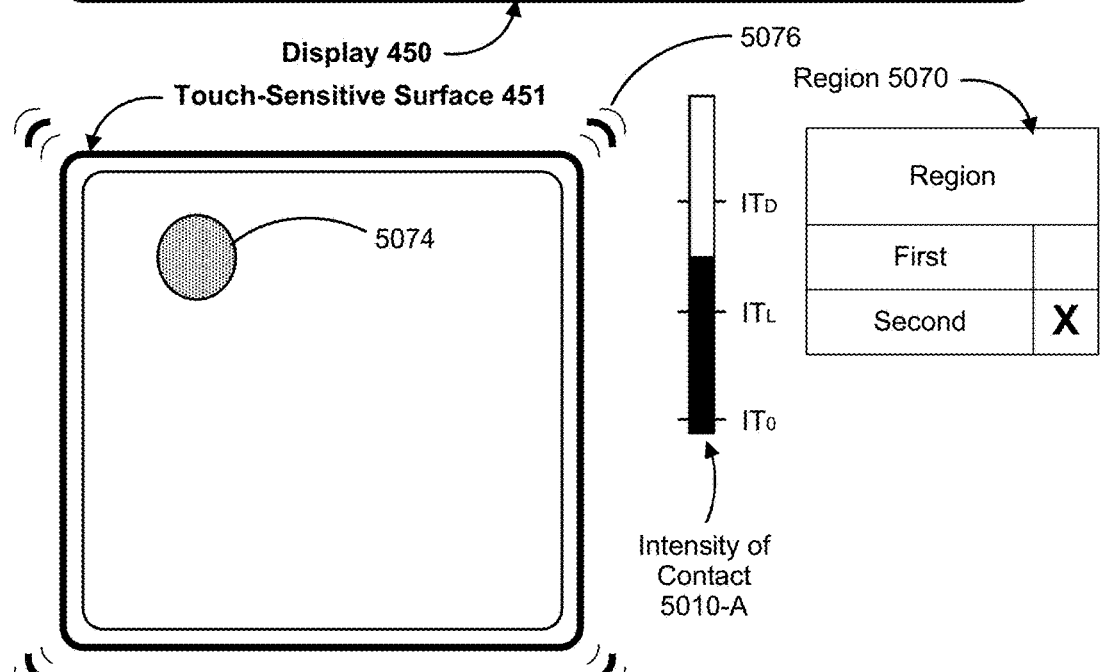
Figure 5I:
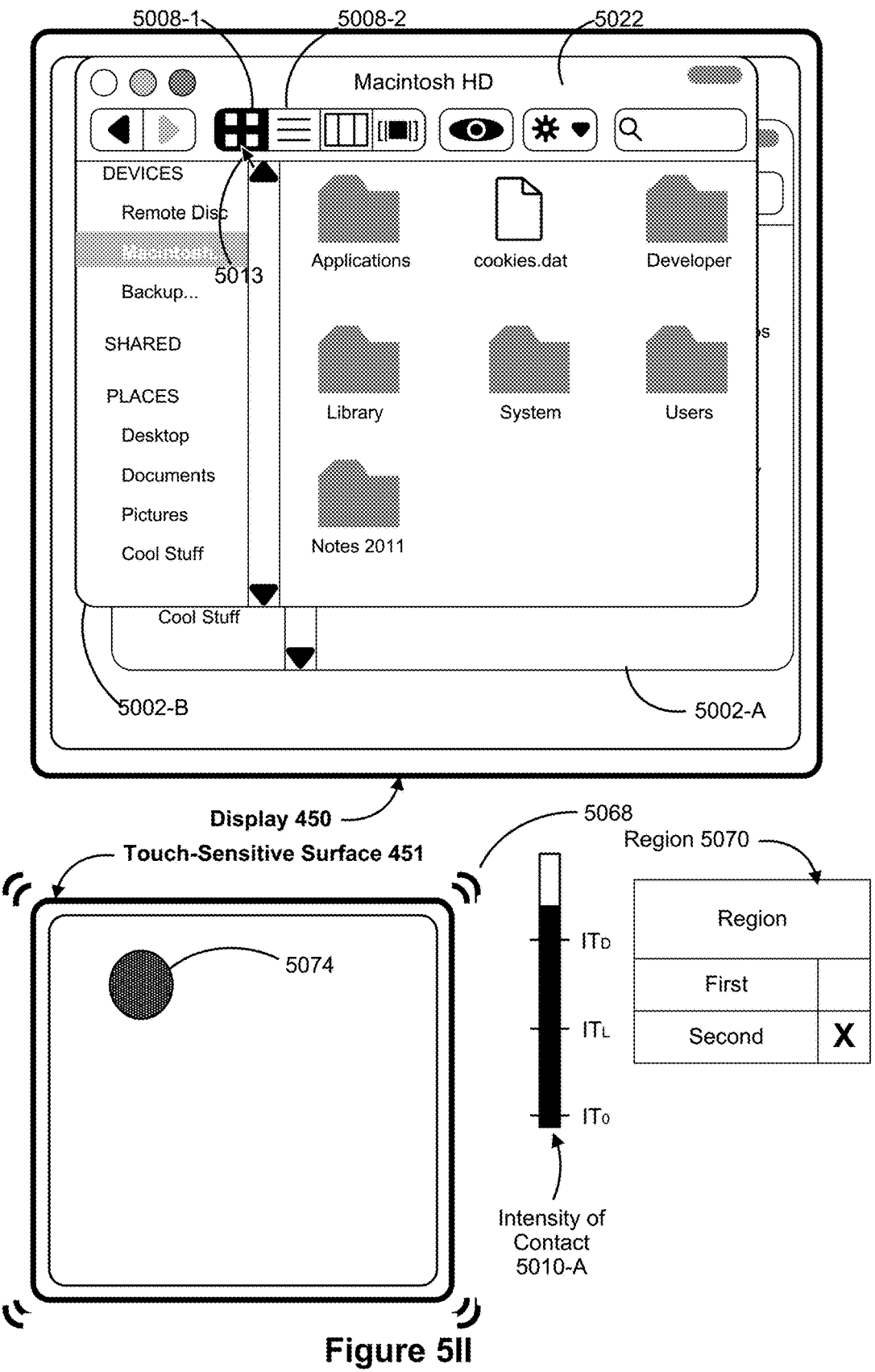
Figure 5J:
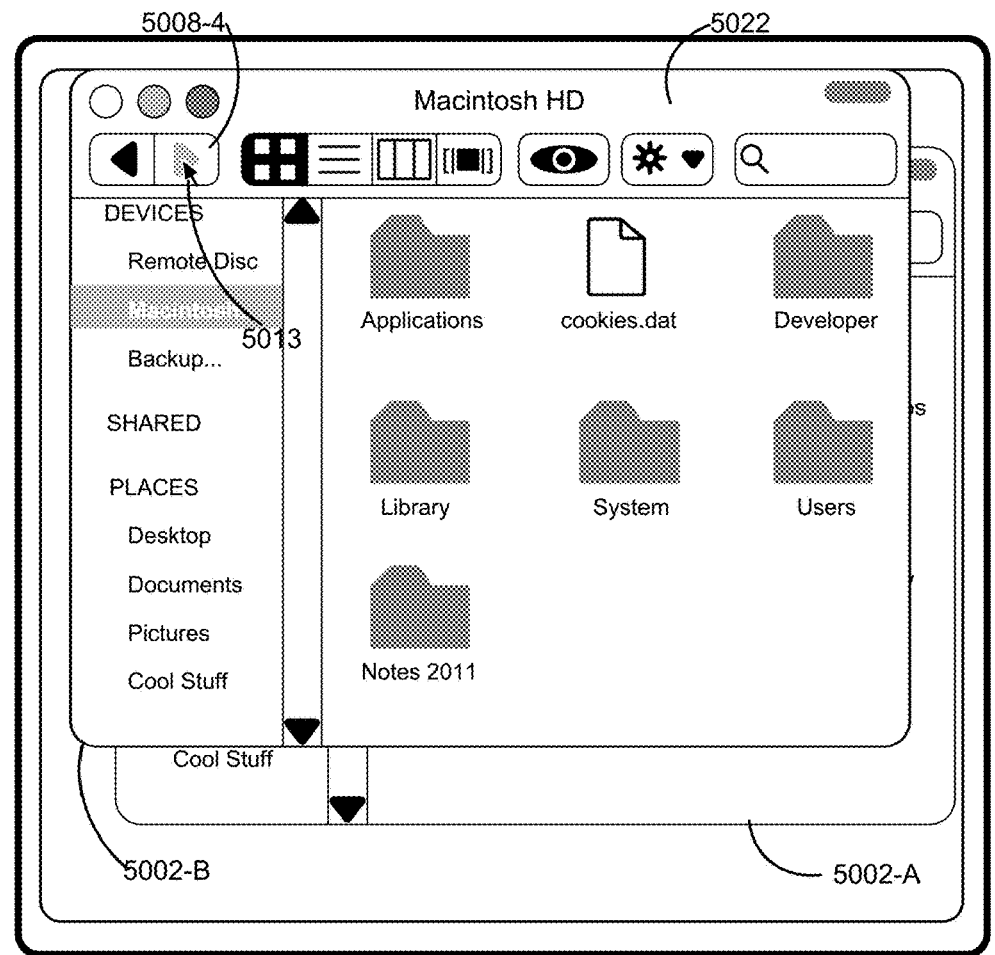
Figure 5J:
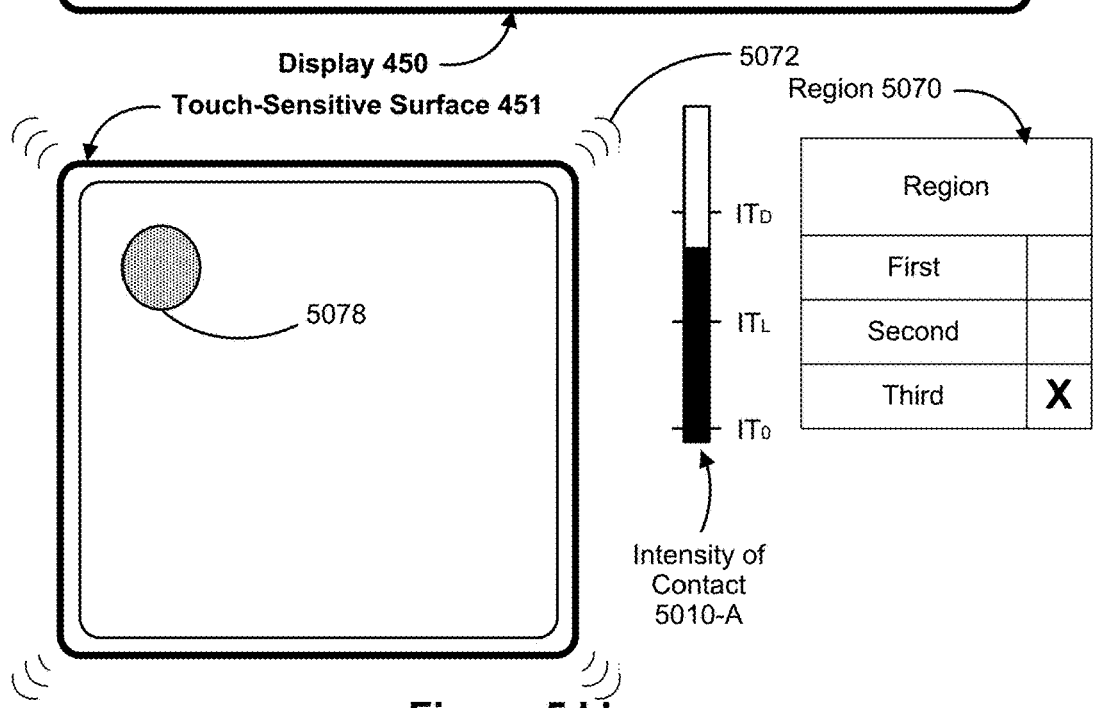
Figure 5K:
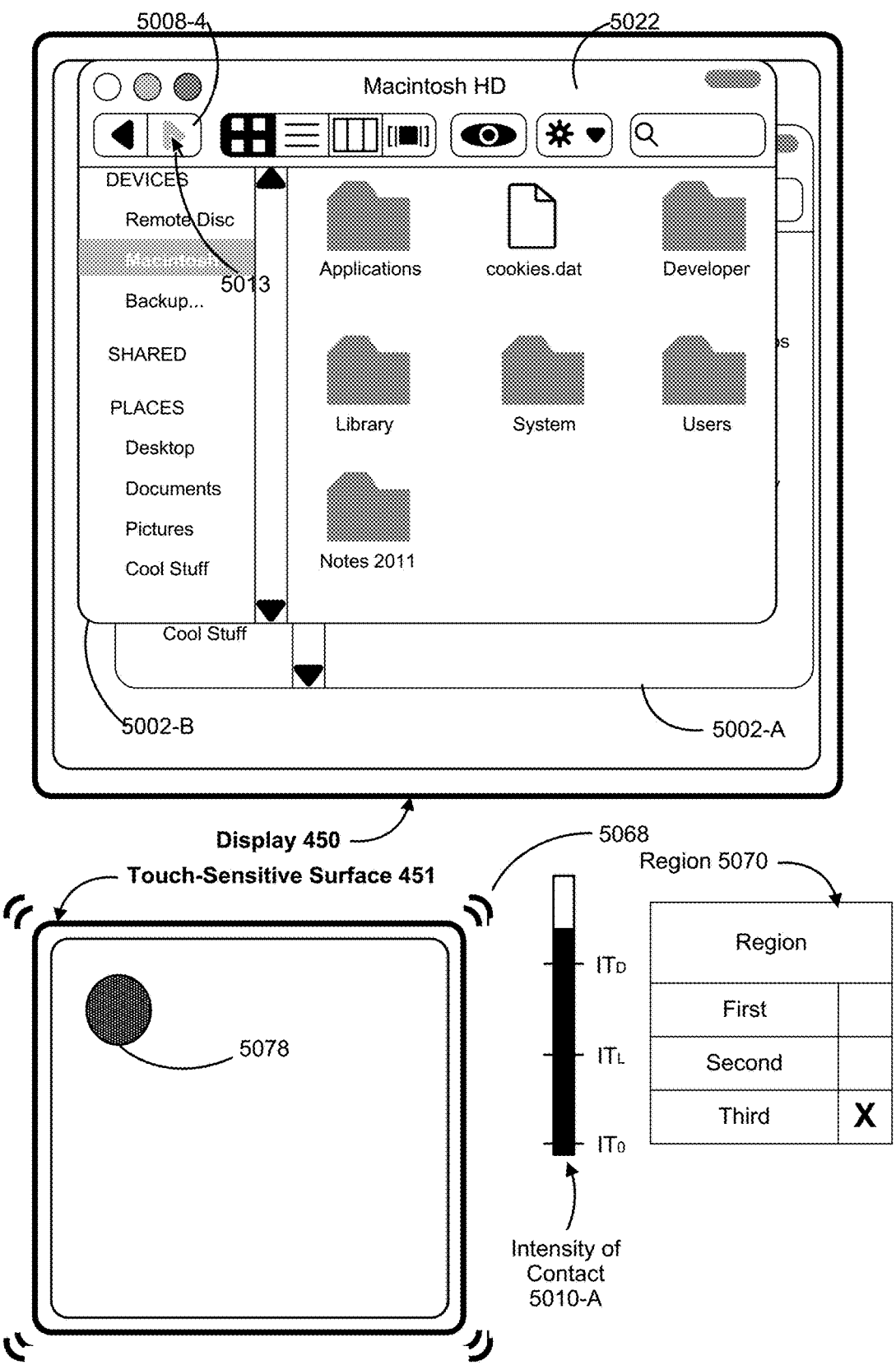
Figure 5L:
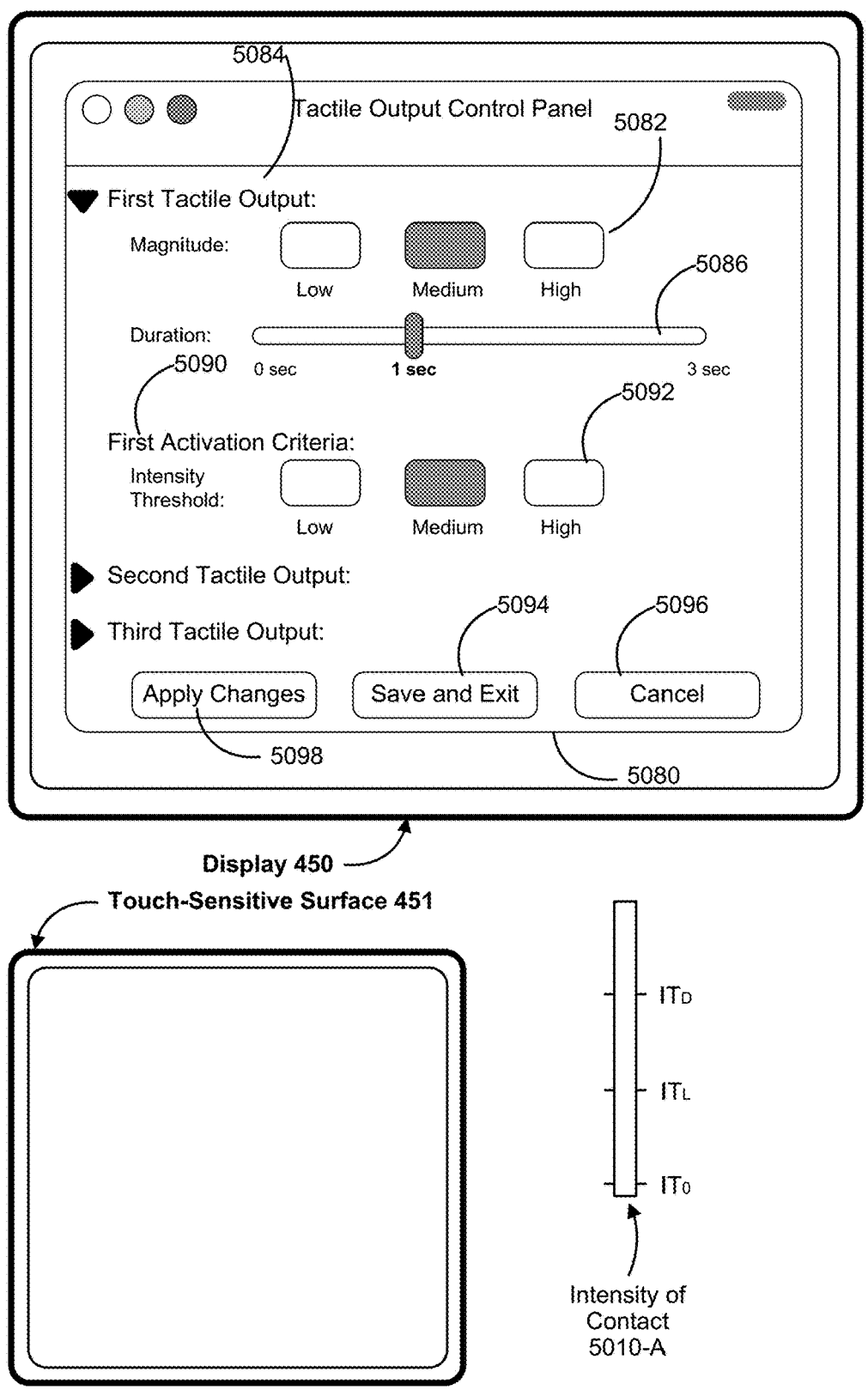
Figure 5M:
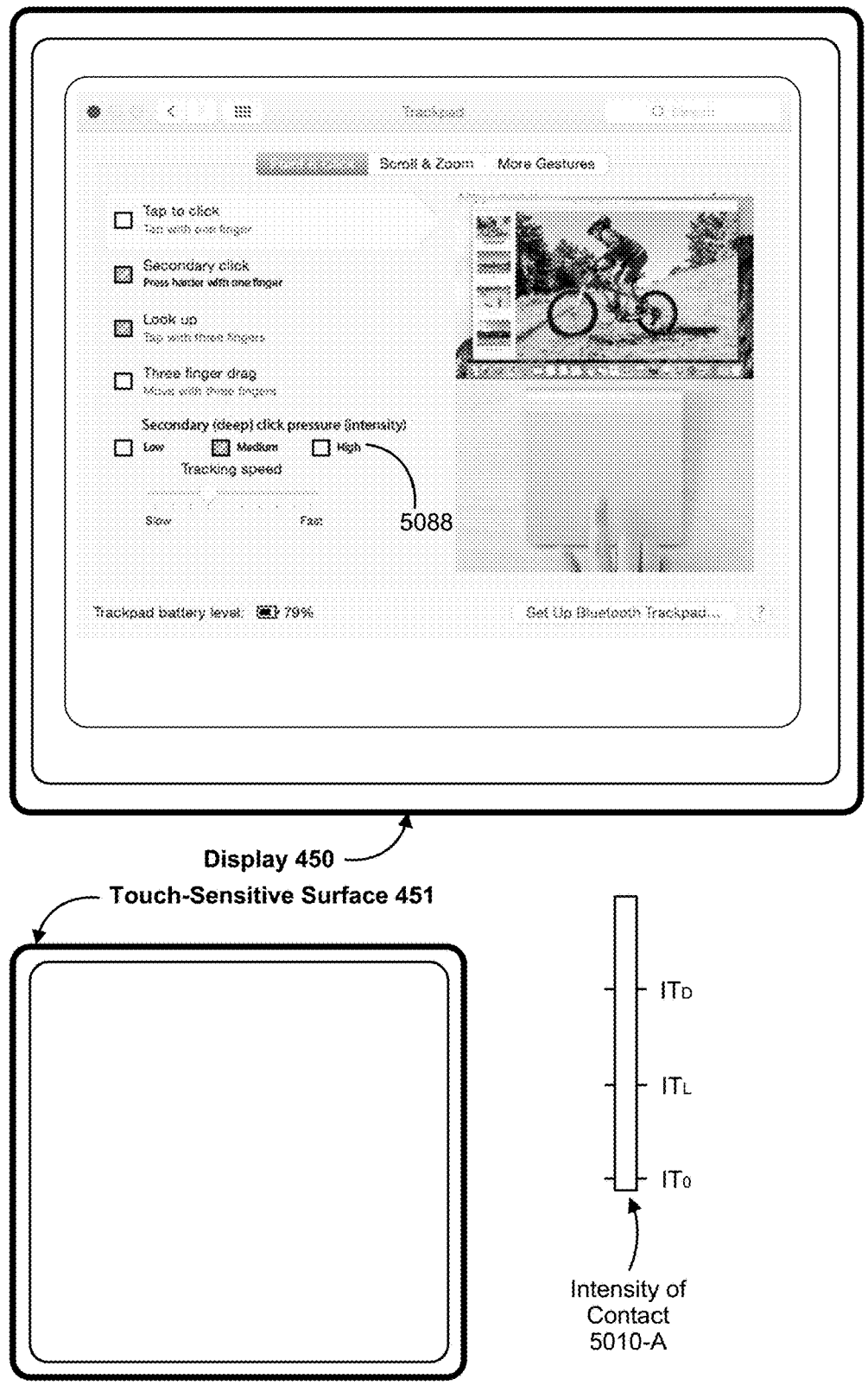
Figure 5N:
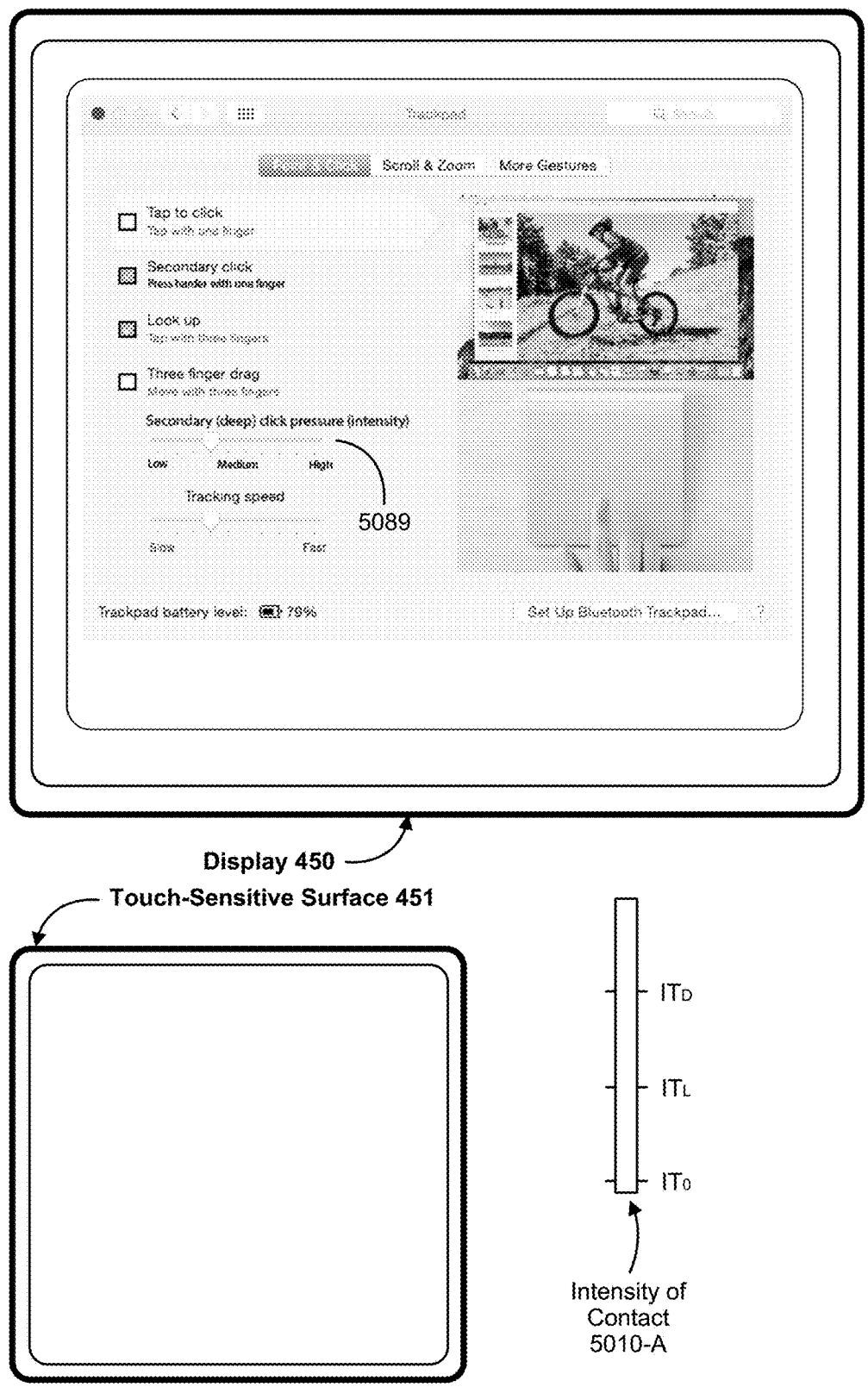
Figure 5O:
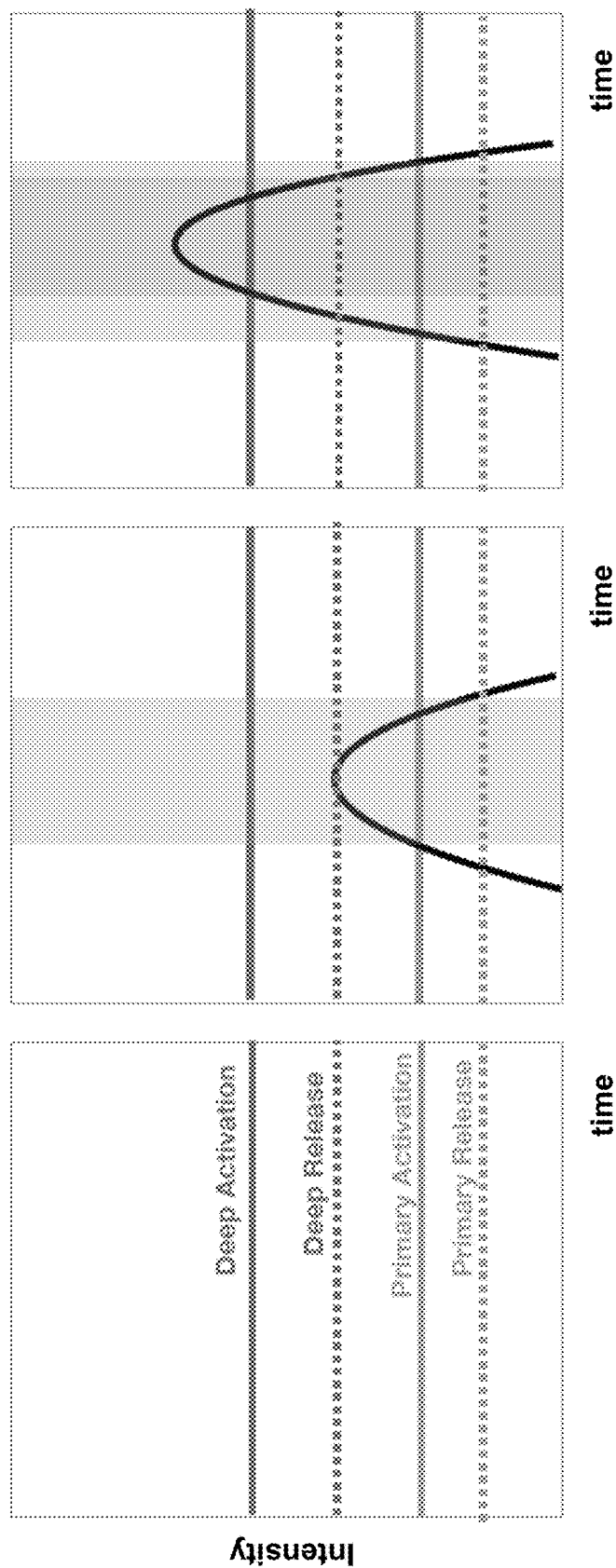
Figure 5P:
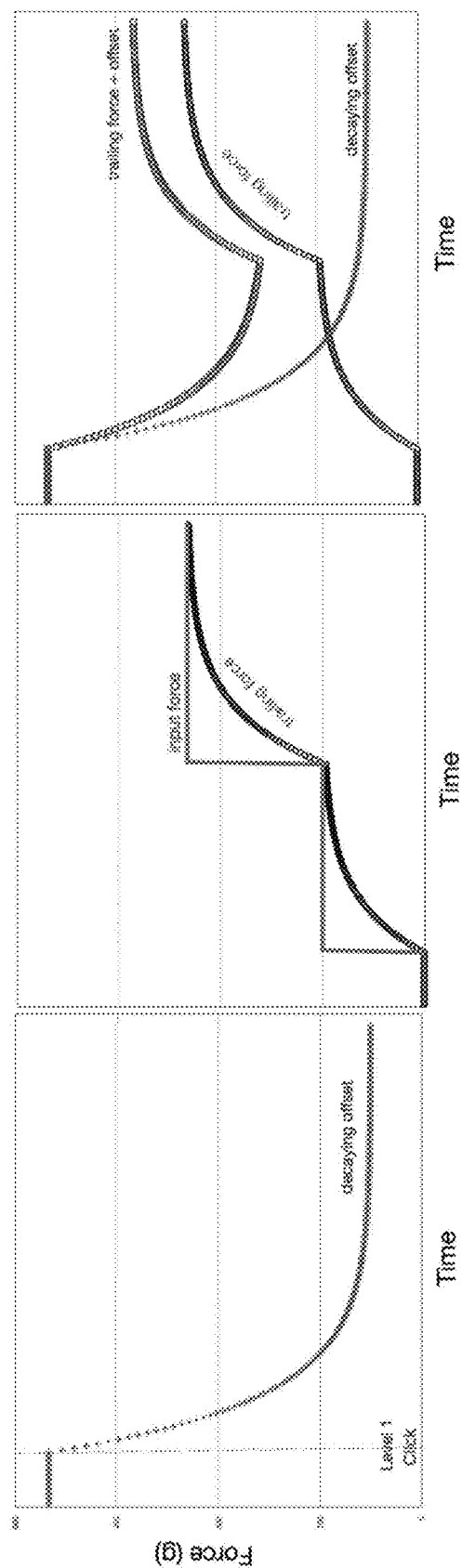
Figure 5Q:
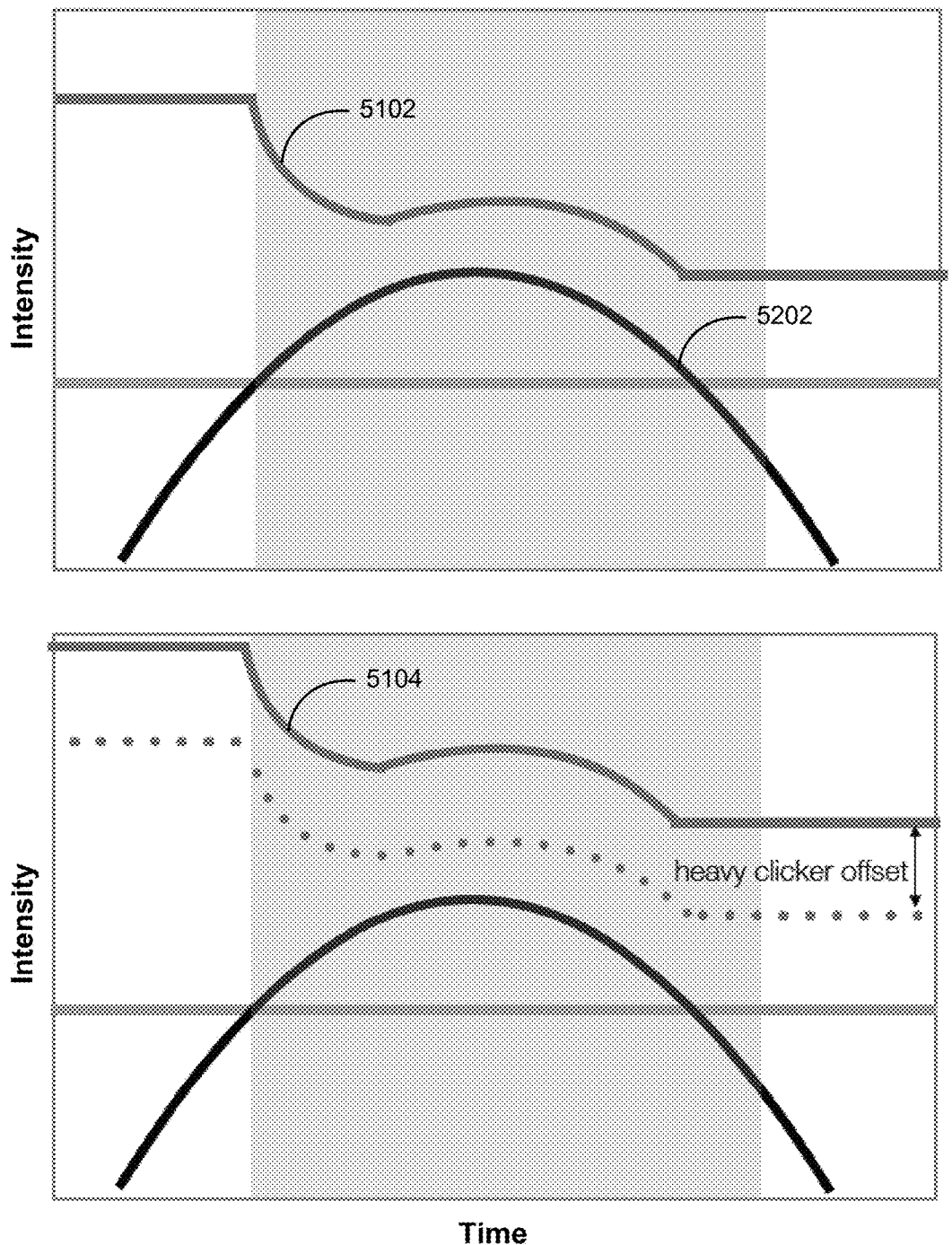
Figure 6E:
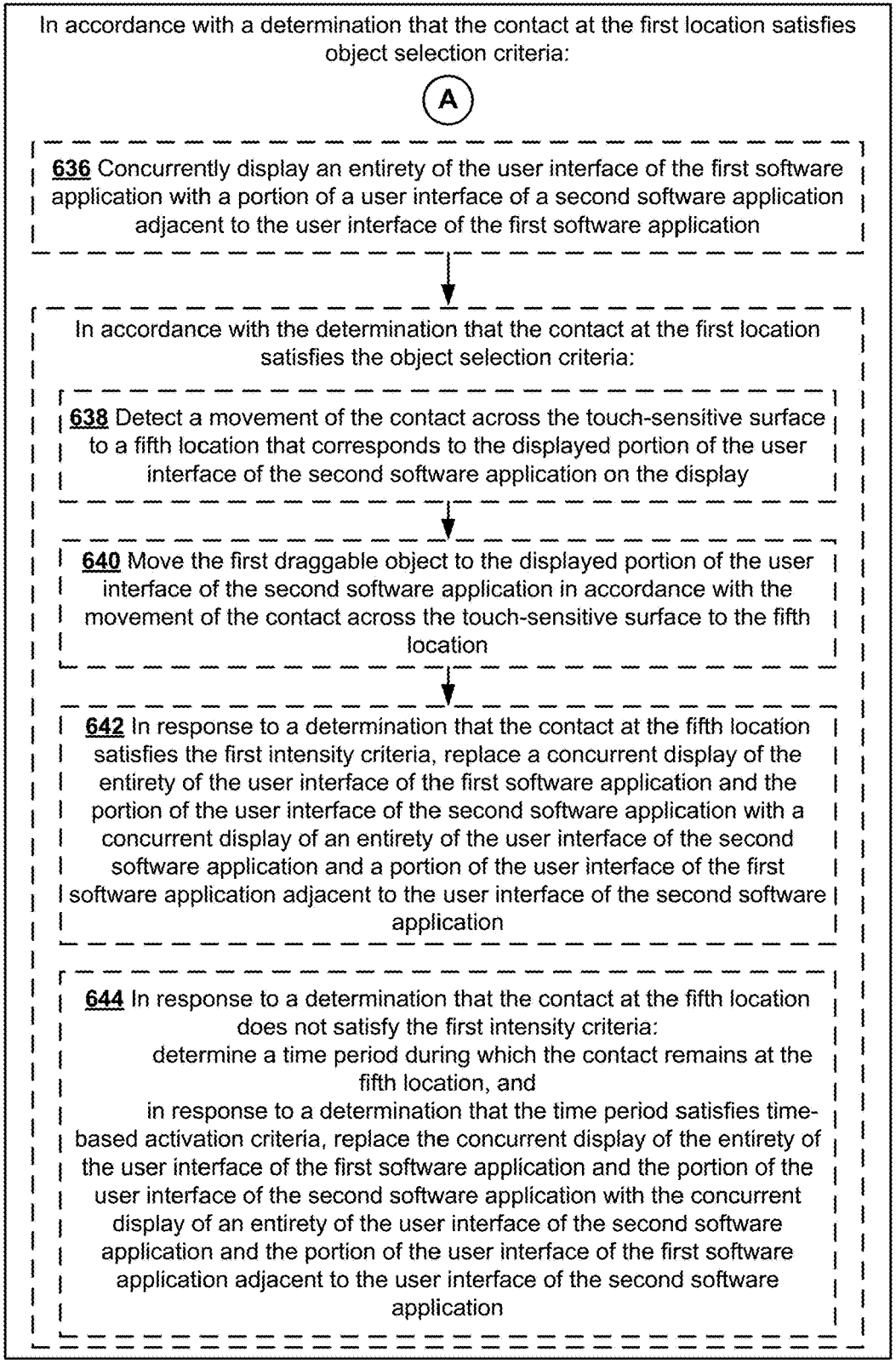
Figure 7A:
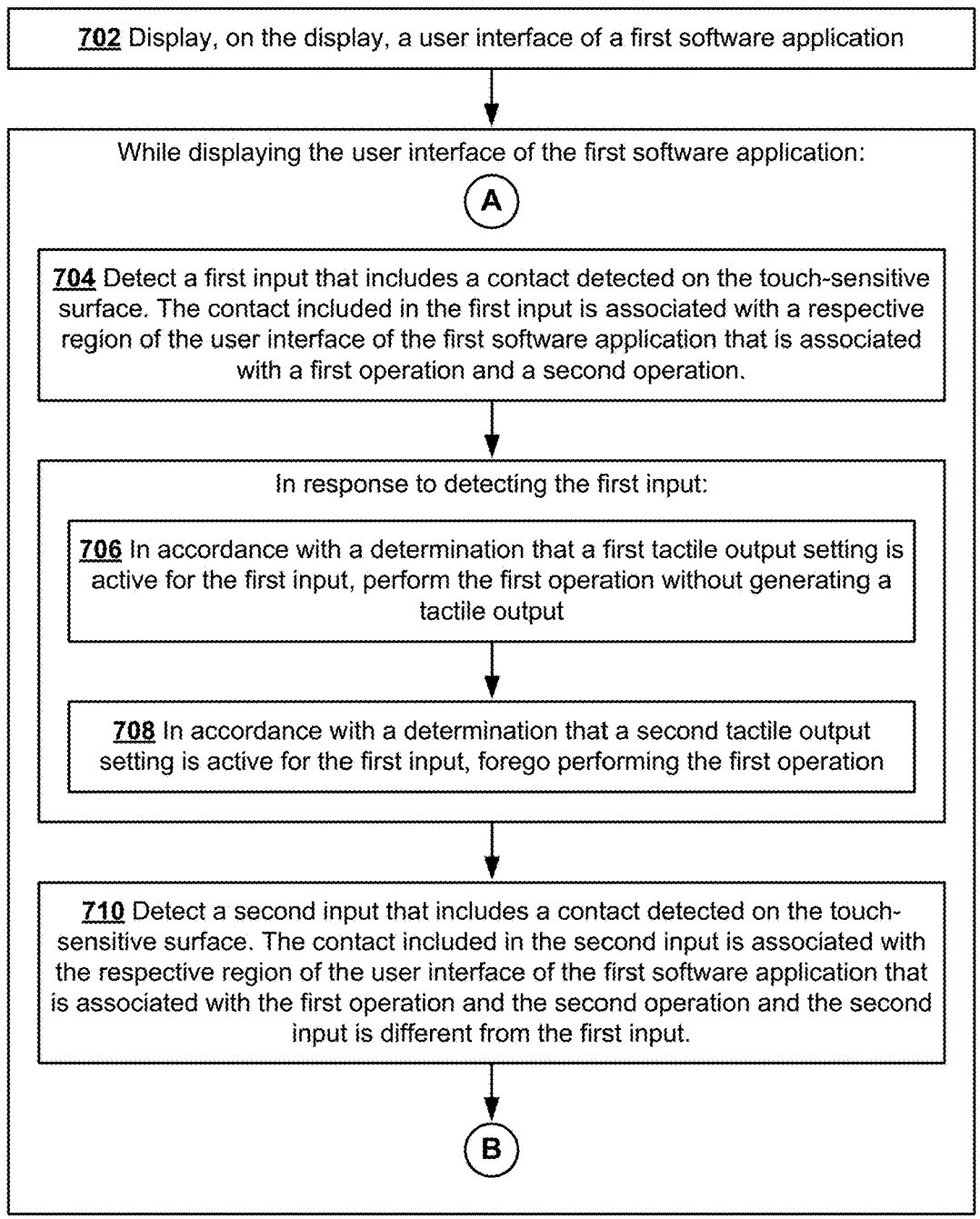
Figure 7B:
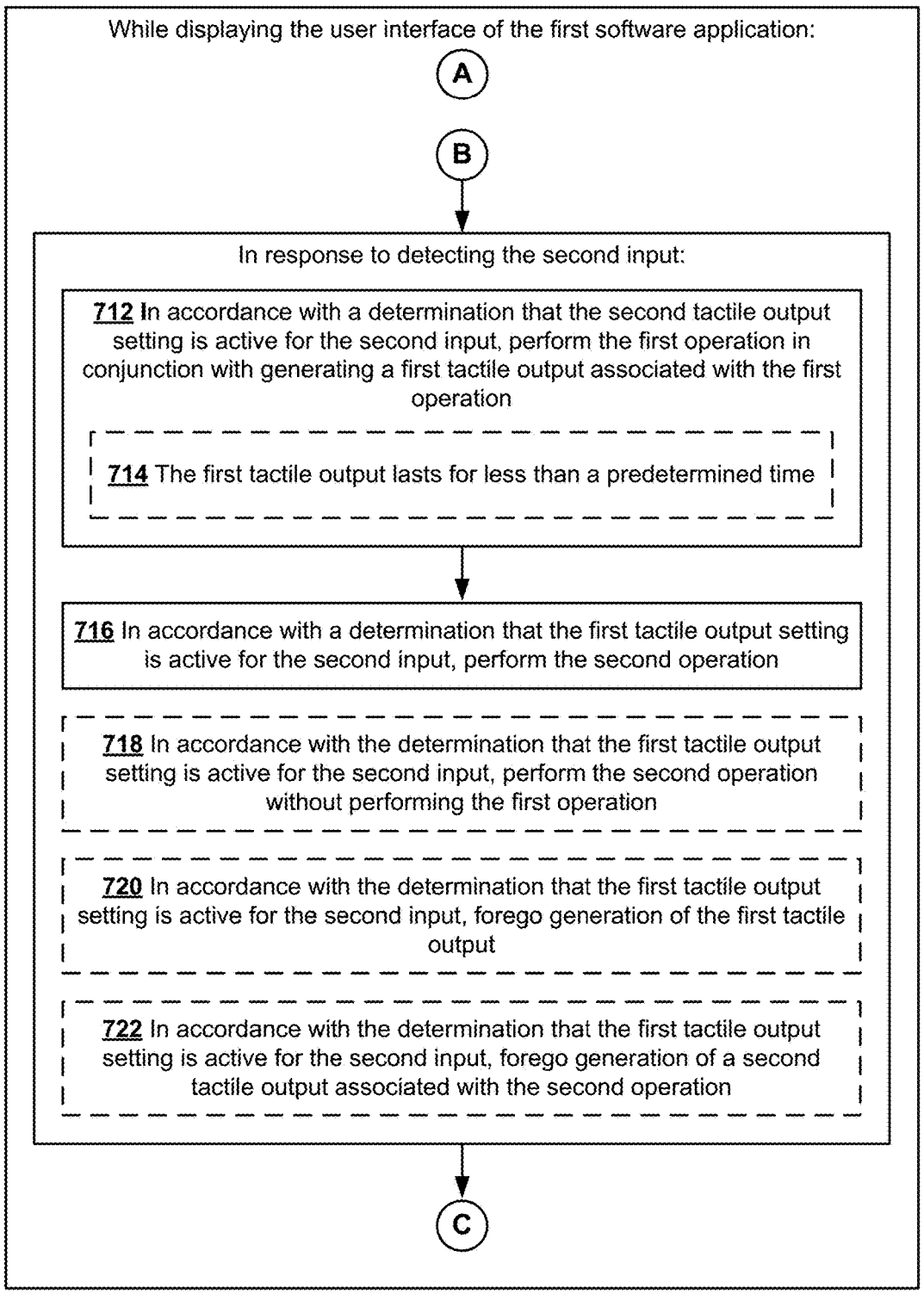
Figure 7C:
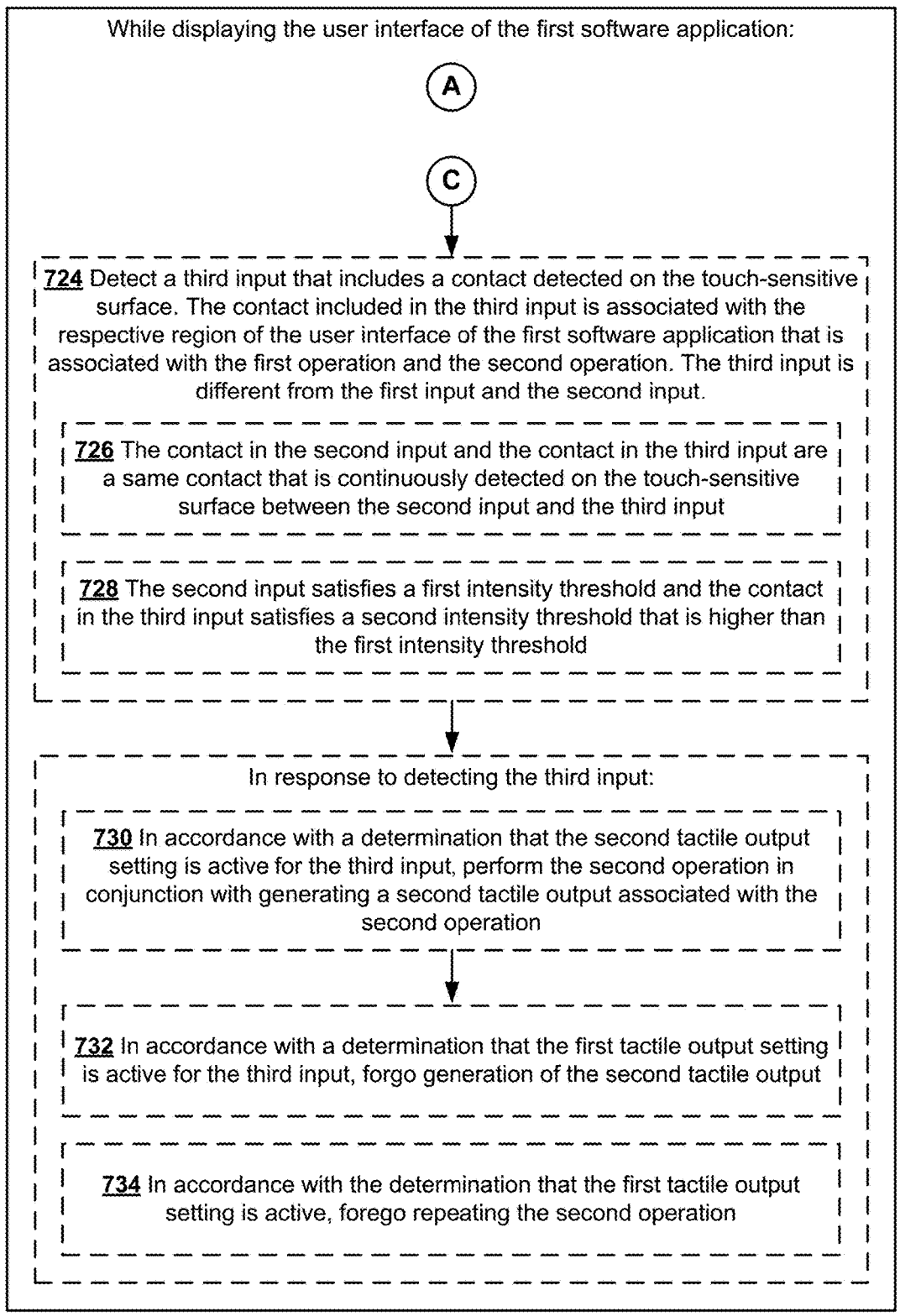
Figure 8B:
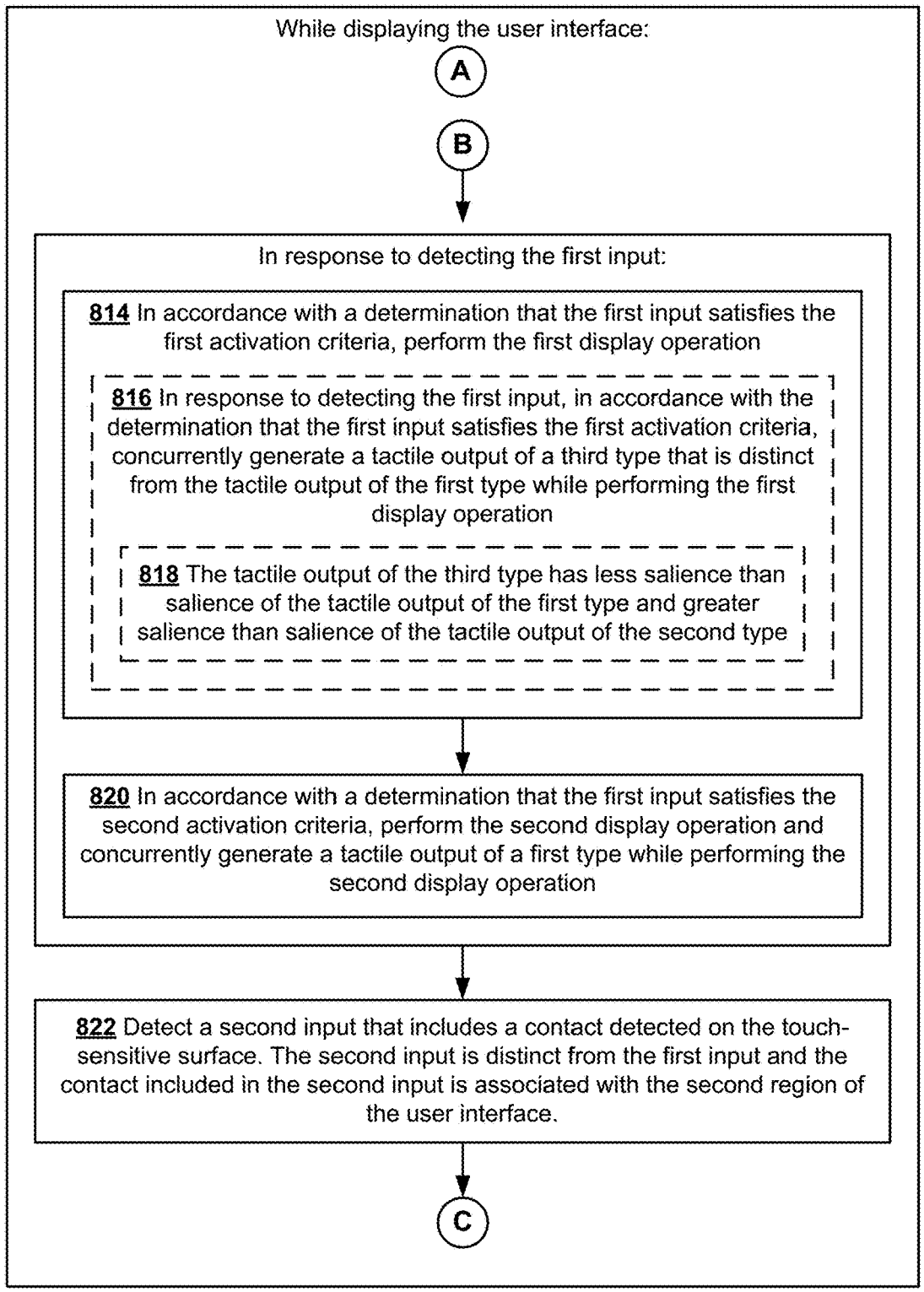
Figure 8C:
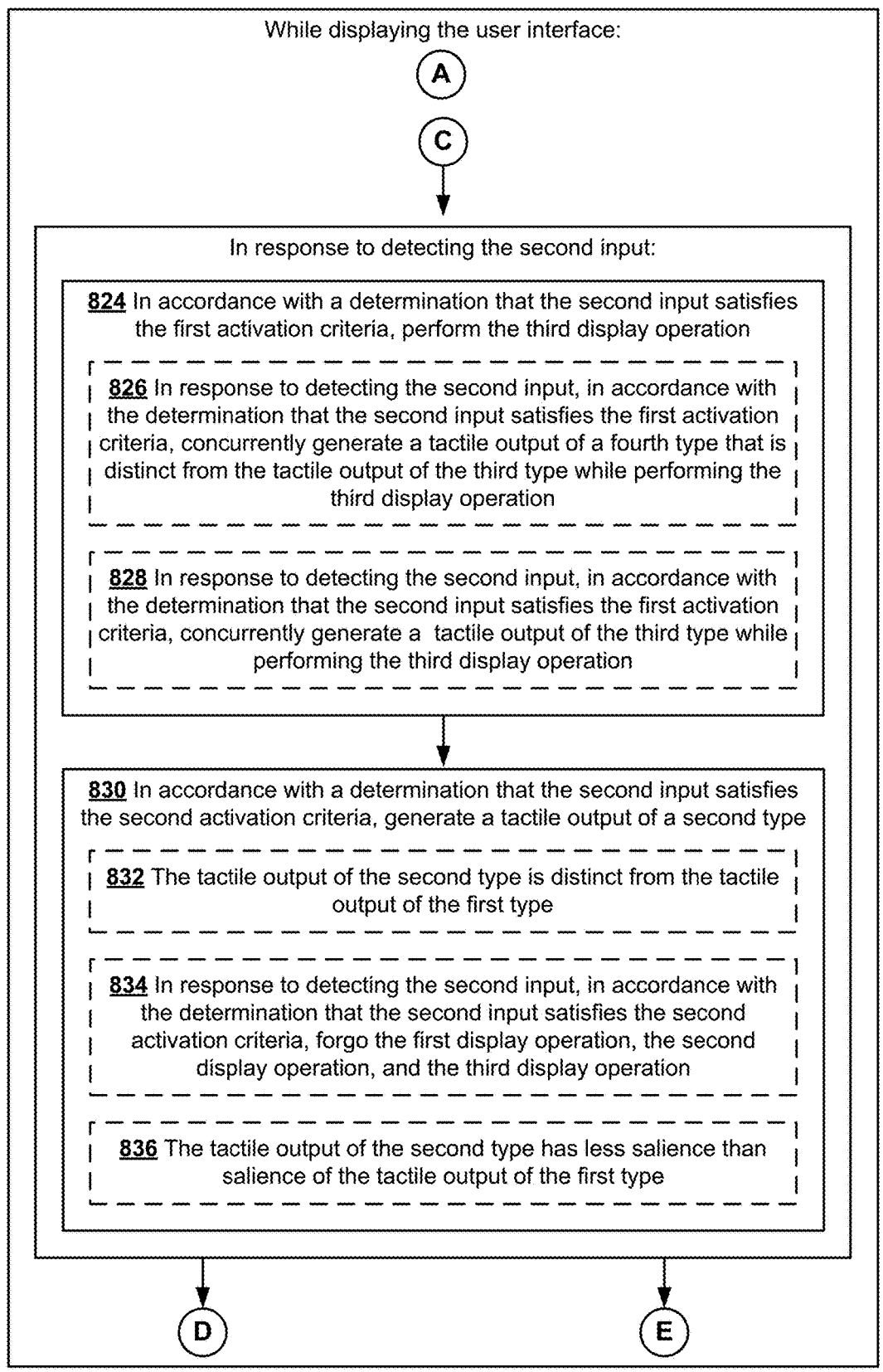
Figure 8D:
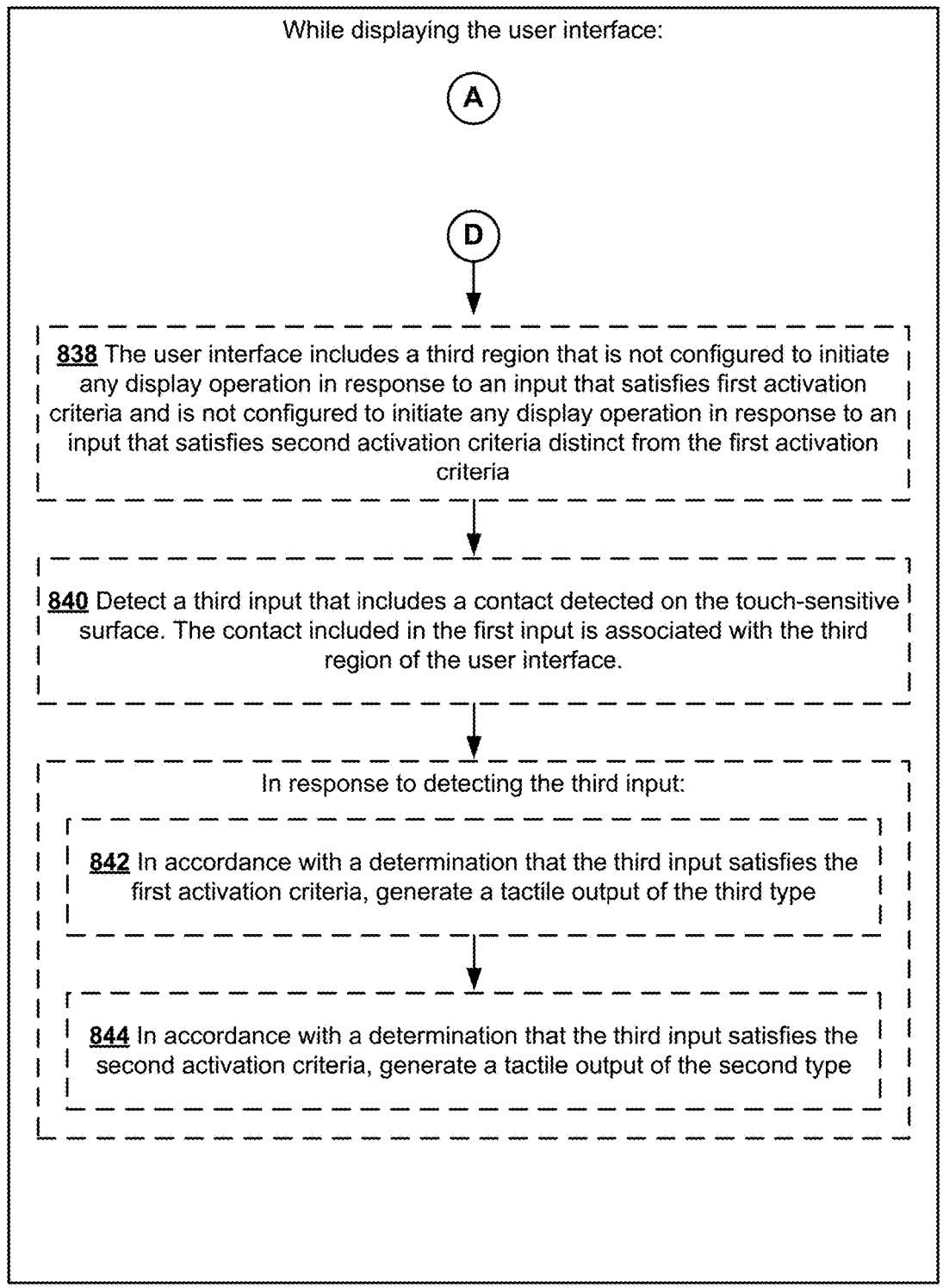
Figure 8E:
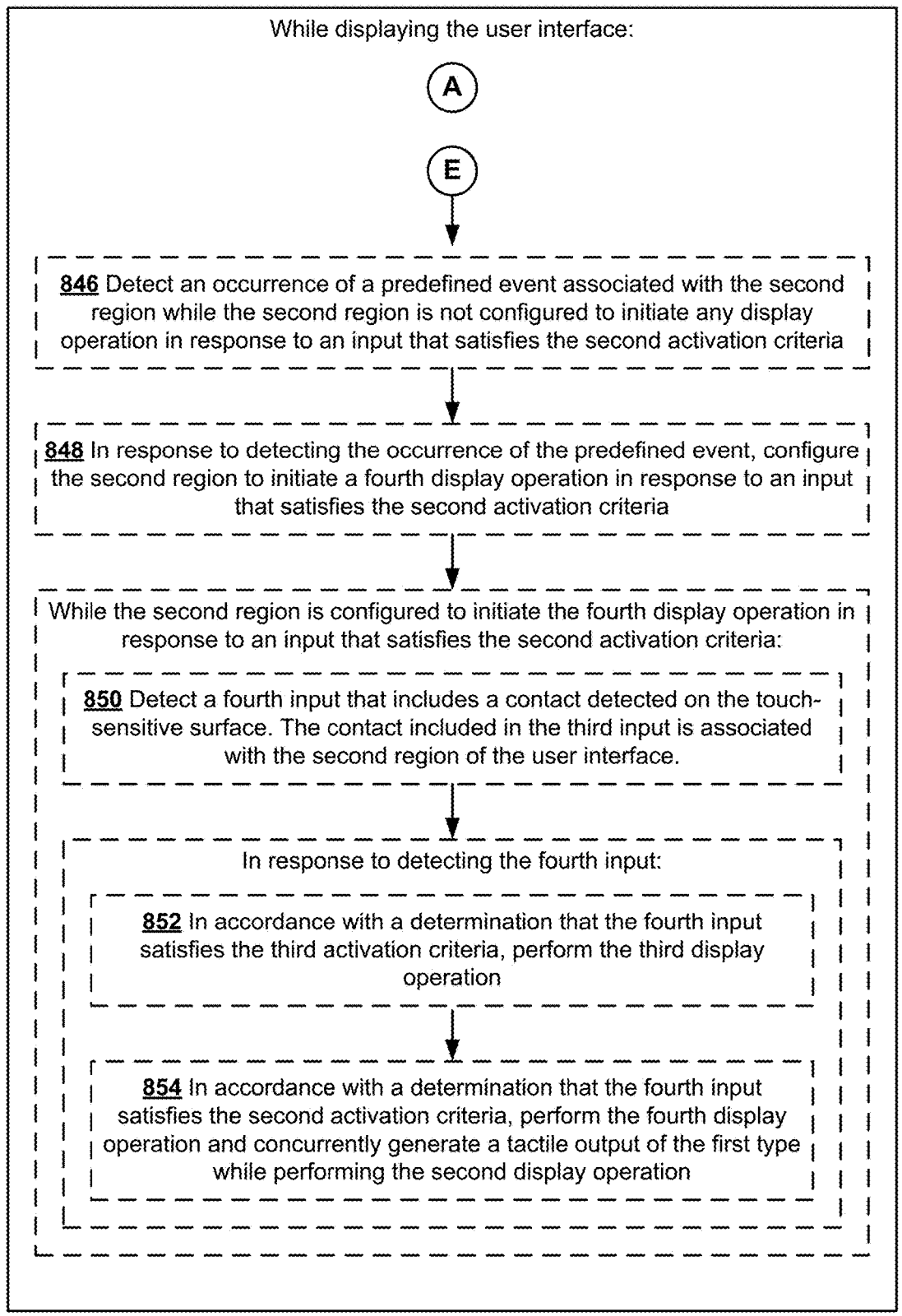
Figure 8F:
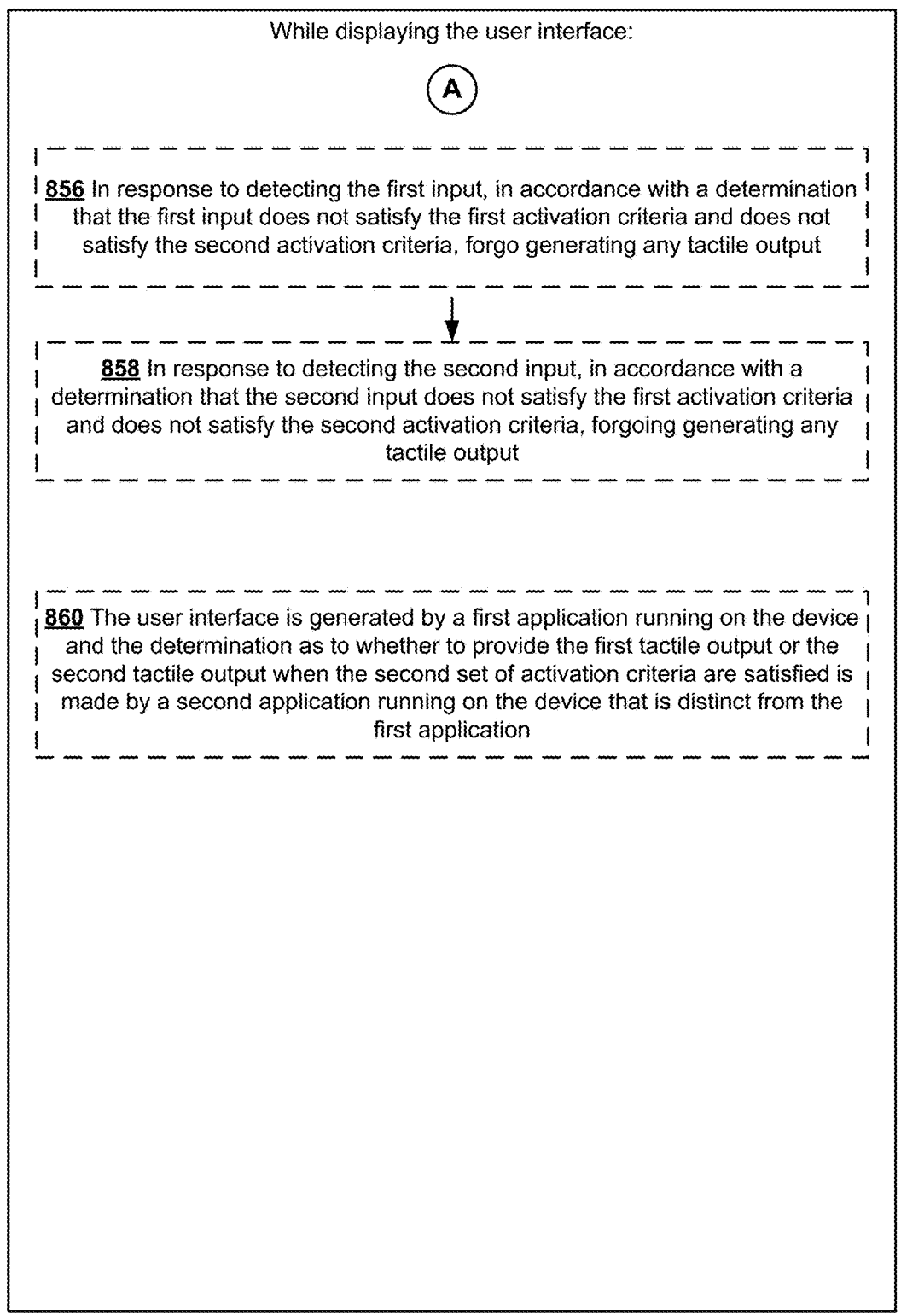

FIG. 5Z illustrates the first tactile output setting being active (e.g., silent trackpad mode), and a user interaction including contact 5062 detected on touch-sensitive surface 451. Intensity diagram 5010-A illustrates a detected intensity between thresholds $IT_L$ and $IT_D$, corresponding to contact 5062. For example, the user interaction including contact 5062 is a medium-intensity, continuously maintained contact (e.g., a contact with intensity between thresholds $IT_L$ and $IT_D$).

Focus selector 5013 is shown to be displayed over draggable object 5004-6, of user interface 5002-B. In response to detecting focus selector 5013 over the region corresponding to draggable object 5004-6 while the first tactile output setting is active and a contact intensity between thresholds $IT_L$ and $IT_D$ is detected, a second display operation is performed. In this example, it is desired to view options relating to a particular folder in the Macintosh HD directory, and a display operation is performed to display a menu 5064 of options relating to the folder. In this example there is no tactile output generated in conjunction with performing the display operation, but in some embodiments a tactile output is generated. In this example there is no sound generated in conjunction with performing the display operation, but in some embodiments a sound is generated.

In some embodiments, the second display operation is performed in response to detecting a contact intensity above intensity threshold $IT_L$ while focus selector 5013 is displayed over the region corresponding to draggable object 5004-6 and the first tactile output setting is active (e.g., silent trackpad mode) regardless of whether or not the contact intensity is above intensity threshold $IT_D$.

In some embodiments, the second display operation is performed in response to detecting a contact intensity between thresholds $IT_L$ and $IT_D$ while focus selector 5013 is displayed over the region corresponding to draggable object 5004-6 and the first tactile output setting is active, and no further display operation is performed in response to detecting a contact intensity above intensity threshold $IT_D$ while focus selector 5013 is displayed over the region corresponding to draggable object 5004-6 and the first tactile output setting is active. For example, the menu 5064 remains on display even when the contact intensity is above threshold $IT_D$.

FIG. 5AA illustrates alternate embodiments, where the first tactile output setting is active (e.g., silent trackpad mode), and a user interaction includes contact 5062 detected on touch-sensitive surface 451. Intensity diagram 5010-A illustrates a detected intensity above threshold $IT_D$, corresponding to contact 5062. For example, the user interaction including contact 5062 is a high-intensity, short-duration contact (e.g., a contact with intensity above threshold $IT_D$).

Focus selector 5013 is shown to be displayed over draggable object 5004-6, of user interface 5002-B. In response to detecting focus selector 5013 over the region corresponding to draggable object 5004-6 while the first tactile output setting is active and a contact intensity above threshold $IT_D$ is detected, no display operation is performed. In this example, while the first tactile output setting is active, there is no display operation associated with the detected intensity level. In this example there is no tactile output generated in response to detecting the contact, but in some embodiments a tactile output is generated. In this example there is no sound generated in response to detecting the contact, but in some embodiments a sound is generated.

FIG. 5BB illustrates a second tactile output setting being active, and a user interaction including contact 5062 detected on touch-sensitive surface 451. Intensity diagram 5010-A illustrates a detected intensity between thresholds $IT_0$ and $IT_L$, corresponding to the minimal contact detected, of contact 5062. For example, the user interaction including contact 5062 is a light tap on touch-sensitive surface 451, or a very light, continuously maintained contact.

Focus selector 5013 is shown to be displayed over draggable object 5004-6, of user interface 5002-B. In response to detecting focus selector 5013 over the region corresponding to draggable object 5004-6 while the second tactile output setting is active and a contact intensity between thresholds $IT_0$ and $IT_L$ is detected, no display operation is performed. In this example, while the second tactile output setting is active, there is no display operation associated with the detected intensity level. In this example there is no tactile output generated in response to detecting the contact, but in some embodiments a tactile output is generated. In this example there is no sound generated in response to detecting the contact, but in some embodiments a sound is generated.

FIG. 5CC illustrates a second tactile output setting being active, and a user interaction including contact 5062 detected on touch-sensitive surface 451. Intensity diagram 5010-A illustrates a detected intensity between thresholds $IT_L$ and $IT_D$, corresponding to contact 5062. For example, the user interaction including contact 5062 is a medium-intensity, continuously maintained contact (e.g., a contact with intensity between thresholds $IT_L$ and $IT_D$).

Focus selector 5013 is shown to be displayed over draggable object 5004-6, of user interface 5002-B. In response to detecting focus selector 5013 over the region corresponding to draggable object 5004-6 while the second tactile output setting is active and a contact intensity between thresholds $IT_L$ and $IT_D$ is detected, a first display operation is performed. In some embodiments a different display operation is performed. In this example, a folder in the Macintosh HD directory is selected and a display operation is performed to visually distinguish the folder from other un-selected folders in the same directory (e.g., so as to indicate that further user inputs on touch-sensitive surface 451 will affect the selected object, for example a lateral movement of the contact on touch-sensitive surface 451 will cause user interface object 5004-6 to be moved on the display, while pressing harder on touch-sensitive surface 451 will cause a contextual menu to be displayed). In this example there is a first tactile output 5066 generated in conjunction with performing the display operation, but in some embodiments no tactile output is generated, or a different tactile output is generated. In this example there is no sound generated in conjunction with performing the display operation, but in some embodiments a sound is generated. In some embodiments a particular sound is generated in conjunction with tactile output 5066 (e.g., the first tactile output). In some embodiments, a quick tap on touch sensitive surface 451 (between thresholds $IT_L$ and $IT_D$ that ends within a predetermined time period) causes a primary activation operation to be performed, such as opening the "users" folder represented by icon 5004-6, while a maintained contact on touch sensitive surface 451 (between thresholds $IT_L$ and $IT_D$ that does not end within a predetermined time period) enables other operations to be performed (e.g., moving user interface object 5004-6).

FIG. 5DD illustrates a second tactile output setting being active, and a user interaction including contact 5062 detected on touch-sensitive surface 451. Intensity diagram 5010-A illustrates a detected intensity above threshold $IT_D$, corresponding to contact 5062. For example, the user interaction including contact 5062 is a high-intensity, short-duration contact (e.g., a contact with intensity above threshold $IT_D$).

Focus selector 5013 is shown to be displayed over draggable object 5004-6, of user interface 5002-B. In response to detecting focus selector 5013 over the region corresponding to draggable object 5004-6 while the second tactile output setting is active and a contact intensity above threshold $IT_D$ is detected, a second display operation is performed. In some embodiments a different display operation is performed. In this example, it is desired to view options relating to a particular folder in the Macintosh HD directory, and a display operation is performed to display a menu 5064 of options relating to the folder. In this example there is a second tactile output 5068 generated in conjunction with performing the display operation, but in some embodiments no tactile output is generated, or a different tactile output is generated. In this example there is no sound generated in conjunction with performing the display operation, but in some embodiments a sound is generated. In some embodiments a particular sound is generated in conjunction with tactile output 5068 (e.g., the second tactile output), and in some embodiments, the particular sound associated with tactile output 5068 is distinct from a sound associated with another other type of tactile output (e.g., tactile output 5066).

FIG. 5EE illustrates region chart 5070 that indicates a type of region in user interface 5002-A that focus selector 5013 is displayed over. A first region is configured to perform particular display operations in response to the detection of particular types of inputs on touch-sensitive surface 451, and a second region is configured to perform at least one different display operation in response to the detection of particular types of inputs on touch-sensitive surface 451. For example, the first region performs a first display operation in response to detecting a "light press" on touch-sensitive surface 451, and performs a second display operation in response to detecting a "deep press" on surface 451, while the second region performs a third display operation in response to detecting a "light press" on touch-sensitive surface 451, and does not perform any display operation in response to detecting a "deep press" on surface 451. In some embodiments, regions are further characterized by one or more tactile output operations performed in conjunction with display operations.

FIG. 5EE illustrates focus selector 5013 displayed over a first region, and a user interaction including contact 5062 detected on touch-sensitive surface 451. Intensity diagram 5010-A illustrates a detected intensity between thresholds $IT_L$ and $IT_D$, corresponding to contact 5062. For example, the user interaction including contact 5062 is a medium-intensity, continuously maintained contact (e.g., a contact with intensity between thresholds $IT_L$ and $IT_D$).

Focus selector 5013 is shown to be displayed over draggable object 5004-6, of user interface 5002-B. In response to detecting focus selector 5013 over the region corresponding to draggable object 5004-6 (defined as being of the first region type), and a contact intensity between thresholds $IT_L$ and $IT_D$, a first display operation is performed. In some embodiments a different display operation is performed. In this example, a folder in the Macintosh HD directory is selected and a display operation is performed to visually distinguish the folder from other un-selected folders in the same directory. In this example there is a third tactile output 5072 generated in conjunction with performing the display operation, but in some embodiments no tactile output is generated, or a different tactile output is generated. In this example there is no sound generated in conjunction with performing the display operation, but in some embodiments a sound is generated. In some embodiments a particular sound is generated in conjunction with tactile output 5072 (e.g., the third tactile output).

FIG. 5FF illustrates focus selector 5013 displayed over a first region, and a user interaction including contact 5062 detected on touch-sensitive surface 451. Intensity diagram 5010-A illustrates a detected intensity above threshold $IT_D$, corresponding to contact 5062. For example, the user interaction including contact 5062 is a high-intensity, short-duration contact (e.g., a contact with intensity above threshold $IT_D$).

Focus selector 5013 is shown to be displayed over draggable object 5004-6, of user interface 5002-B. In response to detecting focus selector 5013 over the region corresponding to draggable object 5004-6 (defined as being of the first region type), and a contact intensity above threshold $IT_D$, a second display operation is performed. In this example, it is desired to view options relating to a particular folder in the Macintosh HD directory, and a display operation is performed to display a menu 5064 of options relating to the folder. In this example there is a first tactile output 5066 generated in conjunction with performing the display operation, but in some embodiments no tactile output is generated or a different tactile output is generated. In this example there is no sound generated in conjunction with performing the display operation, but in some embodiments a sound is generated in conjunction with tactile output 5066 (e.g., the first tactile output).

FIG. 5GG illustrates focus selector 5013 is displayed over a second region (as noted in region chart 5070), and a user interaction that includes contact 5074 is detected on touch-sensitive surface 451. Intensity diagram 5010-A illustrates a detected intensity between thresholds $IT_L$ and $IT_D$, corresponding to contact 5074. For example, the user interaction including contact 5074 is a medium-intensity, continuously maintained contact (e.g., a contact with intensity between thresholds $IT_L$ and $IT_D$).

FIG. 5HH also illustrates that focus selector 5013 is shown to be displayed over file view control object 5008-1, of user interface 5002-B. In response to detecting focus selector 5013 over the region corresponding to file view control object 5008-1 (defined as being of the second region type), and a contact intensity above threshold $IT_L$ and below threshold $IT_D$, a third display operation is performed. In this example, file view control object 5008-1 is activated and the third display operation changes the view of the contents of the "Macintosh HD" directory from being shown in list view (e.g., in FIG. 5GG), to being shown in icon view. In this example there is a (fourth) tactile output 5076 generated in conjunction with performing the display operation, but in some embodiments no tactile output is generated or a different tactile output is generated (e.g., a third tactile output). In this example there is no sound generated in conjunction with performing the display operation, but in some embodiments a sound is generated in conjunction with tactile output 5076 (e.g., the fourth tactile output).

FIG. 5II illustrates focus selector 5013 displayed over file view control object 5008-1 of the second region type, and a user interaction including contact 5074 detected on touch-sensitive surface 451. Intensity diagram 5010-A illustrates a detected intensity above threshold $IT_D$, corresponding to contact 5062. For example, the user interaction including contact 5062 is a high-intensity, short-duration contact (e.g., a contact with intensity above threshold $IT_D$). In this example, while the focus selector 5013 is detected over an object of the second region type, there is no display operation associated with the detected intensity level. In this example there is a second tactile output 5068 generated in conjunction with performing the display operation, but in some embodiments no tactile output is generated, or a different tactile output is generated. In this example there is no sound generated in conjunction with performing the display operation, but in some embodiments a sound is generated. In some embodiments a particular sound is generated in conjunction with tactile output 5068 (e.g., the second tactile output), and in some embodiments, the particular sound associated with tactile output 5068 is distinct from a sound associated with another other type of tactile output (e.g., tactile output 5066).

FIG. 5JJ illustrates that focus selector 5013 is displayed over a control object 5008-4 of a third region type (as noted in region chart 5070), and a user interaction that includes contact 5078 is detected on touch-sensitive surface 451. Intensity diagram 5010-A illustrates a detected intensity between thresholds $IT_L$ and $IT_D$, corresponding to contact 5078. For example, the user interaction including contact 5074 is a medium-intensity, continuously maintained contact (e.g., a contact with an intensity between thresholds $IT_L$ and $IT_D$). In response to detecting the intensity level, no display operation is performed. In this example there is a third tactile output 5072 generated in response to detecting the intensity level of contact 5078, but in some embodiments no tactile output is generated, or a different tactile output is generated. In some embodiments a particular sound is generated in conjunction with tactile output 5072 (e.g., the third tactile output), and in some embodiments, a particular sound associated with tactile output 5072 is distinct from a sound associated with another other type of tactile output (e.g., a tactile output that indicates that.

FIG. 5KK illustrates an increase in intensity detected at contact 5078. Intensity diagram 5010-A illustrates a detected intensity above threshold $IT_D$, corresponding to contact 5078. For example, the user interaction including contact 5062 is a high-intensity, short-duration contact (e.g., a contact with intensity above threshold $IT_D$). In this example, in response to detecting the intensity level, no display operation is performed. In this example there is a second tactile output 5068 generated in response to detecting the intensity level of contact 5078, but in some embodiments no tactile output is generated, or a different tactile output is generated. In some embodiments a particular sound is generated in conjunction with tactile output 5068 (e.g., the second tactile output), and in some embodiments, a particular sound associated with tactile output 5068 is distinct from a sound associated with another other type of tactile output.

FIG. 5LL illustrates an exemplary settings user interface or control panel 5080 for changing one or more tactile outputs and/or one or more activation criteria in accordance with some embodiments. For example, control panel 5080 has one or more control objects 5082 for adjusting the magnitude of a first tactile output 5084. In this example, the magnitude control objects 5082 are discrete control objects that each correspond to a particular setting, but in some embodiments, the magnitude of first tactile output 5084 can be adjusted using a continuous control object such as control object 5086. Control object 5086 allows for an adjustment of the duration of first tactile output 5084. In some embodiments the duration of the first tactile output can be adjusted using discrete control objects such as control objects 5082.

FIG. 5LL also illustrates control objects corresponding to adjustment of first activation criteria 5090. In some embodiments, activation criteria such as first activation criteria 5090 include intensity threshold control objects 5092. In some embodiments, intensity threshold control objects 5092 are tied to control objects 5082 for adjusting the magnitude of a tactile output. In some embodiments, the magnitude of first tactile output 5084 and the intensity threshold of first activation criteria 5090 are both adjusted using one or more continuous control objects (e.g., a slider bar that adjusts both settings simultaneously). While the above description pertains to a first tactile output 5084 and first activation criteria 5090, in some embodiments the same principles apply to one or more other tactile outputs and activation criteria. In some embodiments, a respective tactile output setting has a corresponding activation criteria setting. In some embodiments, a change to one setting (or pair of settings), causes a change to another setting (or pair of settings).

In some embodiments, as shown in FIG. 5LL, control panel 5080 has a user interface element 5098 for applying changes to one or more settings in control panel 5080. In some embodiments, control panel 5080 has a user interface element 5094 for saving changes to one or more settings and exiting control panel 5080. In some embodiments, control panel 5080 has a user interface element 5096 for canceling any changes made to one or more settings and ceasing to display control panel 5080 in display 450.

FIGS. 5MM-5NN illustrate exemplary settings user interfaces or control panels for changing one or more tactile outputs and/or one or more activation criteria in accordance with some embodiments.

The settings user interfaces illustrated in FIGS. 5MM-5NN are used to adjust settings for operations of a touch-sensitive surface (e.g., a trackpad). In FIGS. 5MM-5NN, the settings user interfaces include options that are not directly related to intensity based user inputs.

In FIG. 5MM, the intensity threshold control objects 5088 are radio buttons that correspond to low, medium, and high intensity levels. Based on user selection of one of the radio buttons, intensity thresholds (e.g., $IT_L$ and $IT_D$) are changed. For example, $IT_L$ and $IT_D$ are increased in response to selection of the radio button that corresponds to high intensity thresholds (from previous selection of the radio button that corresponds to low or medium intensity thresholds).

In FIG. 5NN, the intensity threshold control object 5089 is a slider that corresponds to a plurality of intensity levels. In FIG. 5NN, the intensity threshold control object 5089 provides more than three intensity levels so that a finer adjustment of the intensity levels is allowed.

In some embodiments, tactile output settings are adjusted based on the user interaction with the intensity threshold control object(s) (e.g., user selection of one of the radio buttons in FIG. 5MM or user adjustment of the slider in FIG. 5NN). In some embodiments, delay time between a light press and a deep press is adjusted based on the user interaction with the intensity threshold control object(s).

The settings user interfaces or control panels illustrated in FIGS. 5MM-5NN provide simple user interfaces for easy adjustment of the intensity-based operations of the electronic device, thereby reducing the number, extent, and/or nature of the inputs from the user.

FIGS. 5OO-5QQ are exemplary intensity diagrams in accordance with some embodiments.

FIG. 5OO illustrates three intensity diagrams (left, center, and right) in accordance with some embodiments. The left intensity diagram in FIG. 5OO includes multiple intensity thresholds, such as primary activation intensity threshold (e.g., an intensity threshold that an intensity of a contact needs to exceed in order to activate a first operation), primary activation release threshold (e.g., an intensity threshold that an intensity of a contact needs to fall below, after exceeding the primary activation intensity threshold, in order to cease the first operation), deep activation intensity threshold (e.g., an intensity threshold that an intensity of a contact needs to exceed in order to activate a second operation in some embodiments), and deep release intensity threshold (e.g., an intensity threshold that an intensity of a contact needs to fall below, after exceeding the deep activation intensity threshold, in order to cease the second operation).

The center intensity diagram in FIG. 5OO illustrates an intensity of a contact that changes over time (e.g., a light press input). In the center intensity diagram in FIG. 5OO, the intensity of the contact increases over time to exceed the primary activation intensity threshold, thereby activating the first operation. The center intensity diagram in FIG. 5OO also illustrates that, subsequent to the intensity of the contact exceeds the primary activation intensity threshold, the intensity of the contact decreases and falls below the primary release intensity threshold.

The right intensity diagram in FIG. 5OO illustrates an intensity of a contact that changes over time and exceeds the deep activation intensity threshold (e.g., a deep press input). In some embodiments, when the intensity of the contact exceeds the deep activation intensity threshold, the second operation (e.g., a deep press operation) is activated.

In some cases, users unintentionally press the touch-sensitive surface with high intensity (e.g., a deep press input) without an intention to activate the second operation (e.g., a deep press operation). The unintentional deep press input may be due to variation in perception of intensity from person to person, variation in finger strength from person to person, variation in perception of intensity for an individual over time, and/or variation in intensity for an individual over time (e.g., decreased intensity due to fatigue or increased intensity due to reduced sensitivity of the individual), etc. An unintentional activation of the second operation (e.g., a deep press operation) is inefficient, wastes time, and degrades the user experience. Thus, it is important to reduce "unintentional" activations of the second operation (e.g., a deep press operation).

The intensity diagrams in FIGS. 5PP-5QQ illustrate features that reduce unintentional activation of a deep press operation.

FIG. 5PP illustrates three intensity diagrams (left, center, and right). The left intensity diagram in FIG. 5PP illustrates a decaying intensity threshold offset for the deep activation intensity threshold that decreases over time. In some embodiments, the decaying intensity threshold offset decreases from the time at which an intensity of a contact satisfies a lower activation intensity threshold (e.g., primary activation intensity threshold in FIG. 5OO). In some embodiments, the decaying intensity threshold offset decreases after a predetermined duration (e.g., 10 ms, 20 ms, 30 ms, 40 ms, 50 ms, 60 ms, 70 ms, 80 ms, 90 ms, 100 ms, 110 ms, 120 ms, 130 ms, 140 ms, 150 ms, 160 ms, 170 ms, 180 ms, 190 ms, 200 ms, 300 ms, 400 ms, 500 ms, etc.) after the time at which an intensity of a contact satisfies the lower activation intensity threshold. In some embodiments, the decaying intensity threshold offset decreases in accordance with a predefined time constant (e.g., 0.1 s, 0.2 s, 0.3 s, 0.4 s, 0.5 s, 0.6 s, 0.7 s, 0.8 s, 0.9 s, 1.0 s, 1.1 s, 1.2 s, 1.3 s, 1.4 s, 1.5 s, 1.6 s, 1.7 s, 1.8 s, 1.9 s, 2 s, 3 s, 4 s, 5 s, etc). In some embodiments, the offset starts from a high intensity threshold. When this decaying intensity threshold offset is used, an intensity of a contact needs to exceed the increased initial threshold to activate a deep press operation. Thus, this decaying intensity threshold offset prevents a quick high intensity press input from activating a deep press operation.

The center intensity diagram in FIG. 5PP illustrates an intensity threshold offset for the deep activation intensity threshold that trails an intensity of a contact (e.g., "trailing force" intensity threshold offset in FIG. 5PP, which trails the "input force" of a contact in FIG. 5PP) in accordance with some embodiments. In some embodiments, the trailing force intensity offset is determined based on an intensity of the contact over time. For example, the trailing force intensity threshold offset in the center intensity diagram in FIG. 5PP is determined by processing intensity of the contact with a low pass filter (e.g., with a predefined time constant (e.g., 0.1 s, 0.2 s, 0.3 s, 0.4 s, 0.5 s, 0.6 s, 0.7 s, 0.8 s, 0.9 s, 1.0 s, 1.1 s, 1.2 s, 1.3 s, 1.4 s, 1.5 s, 1.6 s, 1.7 s, 1.8 s, 1.9 s, 2 s, 3 s, 4 s, 5 s, etc). When this trailing force intensity threshold offset is used, the deep activation intensity threshold is increased as an intensity of a contact increases (e.g., when a user applies higher intensity while dragging a contact). Thus, this trailing force intensity threshold offset reduces activation of a deep press operation by a gradual increase in intensity of a contact over time (e.g., during a drag).

The right intensity diagram in FIG. 5PP illustrates that a first offset that decreases over time (e.g., the decaying intensity threshold offset described with respect to the left intensity diagram in FIG. 5PP), a second offset that changes over time based on an intensity of a contact on the touch-sensitive surface (e.g., the trailing force intensity threshold offset described with respect to the center intensity diagram in FIG. 5PP), and/or a sum of the first offset and the second offset (e.g., a weighted sum of the first offset and the second offset, with equal or different weights) may be used to reduce unintentional activation of a deep press operation.

FIG. 5QQ illustrates two intensity versus time diagrams (top and bottom). The top intensity versus time diagram in FIG. 5QQ illustrates that a dynamic (time varying) intensity threshold 5102 includes a sum of the first offset and the second offset. In the top intensity diagram in FIG. 5QQ, an intensity 5202 of a contact does not exceed the intensity threshold 5102, and thus a deep press operation is not activated.

The bottom intensity diagram in FIG. 5QQ illustrates that another dynamic (time varying) intensity threshold 5104. The intensity threshold 5104 is offset from the intensity threshold 5102 by an intensity threshold offset for a user that has been determined based on past inputs from the user. For example, for a user who has a tendency to provide high intensity inputs, the intensity threshold offset is increased (e.g., by the heavy clicker offset in FIG. 5QQ) to prevent unintentional activation of a deep press operation. In some embodiments, the intensity offset for a user is a time-independent offset for a particular input (e.g., the intensity offset for a user does not change during the course of the particular input, although other intensity offsets for the deep activation intensity threshold, such as the first offset and the second offset, may change over time during the course of the particular input).

FIGS. 6A-6E illustrate a flow diagram of a method 600 of enabling interaction with one or more control objects in a user interface, in accordance with some embodiments. The method 600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 provides an intuitive way to interact with one or more control objects in a user interface. The method reduces the number, extent, and/or nature of the inputs from a user when interacting with one or more control objects in a user interface, thereby creating a more efficient human-machine interface. For battery-operated electronic devices, enabling a user to interact with one or more control objects in a user interface faster and more efficiently conserves power and increases the time between battery charges.

The device displays (602) on the display, a user interface of a first software application that includes one or more draggable objects (e.g., file icons, folder icons, calendar entries, such as folder icon 5004-2 in FIG. 5B) and one or more control objects distinct from the one or more draggable objects (e.g., buttons, toolbars, menus, such as file view control object 5008-1 in FIG. 5B). While the device displays the user interface of the first software application, the device performs at least the following operations.

The device detects (604) a contact (e.g., contact 5016 in FIG. 5C) on the touch-sensitive surface at a first location while a focus selector is displayed over a first draggable object of the one or more draggable objects displayed on the display.

After detecting the contact on the touch-sensitive surface at the first location, the device detects (606) a movement of the contact across the touch-sensitive surface to a second location that corresponds to a first control object of the one or more control objects displayed on the display (e.g., movement 5020 in FIG. 5D from location 5016 to location 5018 on touch-sensitive surface 451).

In some embodiments, in response to detecting movement of the contact from the first location to the second location, and in accordance with a determination that the contact at the first location does not satisfy the object selection criteria, the device moves (608) the focus selector to the first control object in accordance with the movement of the contact across the touch-sensitive surface to the first control object without moving the first draggable object to the first control object (e.g., if the contact at the first location does not satisfy the object selection criteria, the first draggable object is not selected and the focus selector moves without the first draggable object). In some embodiments, in accordance with a determination that the contact at the second location satisfies the second intensity criteria, the device performs (610) the first predetermined operation that corresponds to activation of the first control object without moving the first draggable object to the first control object (e.g., if the focus selector moves over to file view control object 5008-1, icon view control object 5008-1 is activated and contents of the directory is displayed in an icon view). In some embodiments, the method includes, in accordance with a determination that the contact at the second location satisfies the first intensity criteria, performing the first predetermined operation that corresponds to activation of the first control object.

In response to detecting movement of the contact from the first location to the second location, and in accordance with a determination that the contact at the first location satisfies object selection criteria, the device moves (612) the first draggable object to the first control object in accordance with the movement of the contact across the touch-sensitive surface to the first control object (e.g., FIG. 5D).

In some embodiments, in response to moving the first draggable object to the first control object, and in accordance with a determination that the first software application is configured to perform the first predetermined operation in response to detecting a contact at the second location that satisfies the first intensity criteria, the device visually distinguishes (614) the first control object prior to determining that the contact satisfies the first intensity criteria (e.g., file view control object 5008-1 is visually distinguished in FIG. 5D).

Furthermore, in some embodiments, the device detects (616) a movement of the contact across the touch-sensitive surface to a fourth location that corresponds to a second control object of the one or more control objects (e.g., FIG. 5N). In some embodiments, in accordance with a determination that the first software application is not configured to perform a predetermined operation in response to detecting a contact at the fourth location that satisfies the first intensity criteria, the device foregoes (618) visually distinguishing the second control object (e.g., in FIG. 5N, control object 5008-3 is not visually distinguished).

In accordance with a determination that the contact at the second location satisfies first intensity criteria, the device performs (620) a first predetermined operation that corresponds to activation of the first control object (e.g., displaying contents of the directory in an icon view, as shown in FIG. 5E).

In some embodiments, the user interface includes (622) multiple distinct portions, a first portion of the multiple distinct portions (e.g., region 5022) includes the first control object, and performing the first predetermined operation that corresponds to activation of the first control object includes changing a second portion (e.g., region 5024), distinct from the first portion, of the multiple distinct portions. In some embodiments, changing the second portion includes forgoing a change to the first portion. For example, in FIG. 5E, performing the first predetermined operation updates region 5024. In some embodiments, changing the second portion includes maintaining the first portion.

In some embodiments, the first software application is a calendar application (624), the user interface of the first software application includes multiple time-period user interface elements (e.g., control objects) in the first portion, the one or more draggable objects are one or more calendar entry objects (e.g., one or more graphical representations of calendar events), a respective time-period user interface element of the multiple time-period user interface elements corresponds to a predefined unit of time (e.g., day, week, month, and/or year), the second portion of the user interface of the first software application, prior to the determination that the contact at the second location satisfies the first intensity criteria, includes a calendar view that corresponds to a first unit of time (e.g., a day view), and changing the second portion includes replacing the calendar view that corresponds to a first unit of time with a calendar view that corresponds to a second unit of time that is distinct from the first unit of time (e.g., a month view).

In some embodiments, the first software application is a file system navigation application (626), also called a file manager or a file browser (e.g., Finder, Windows Explorer, and File Explorer) (e.g., the user interface of a file system navigation application in FIG. 5B). In some embodiments, the user interface of the first software application includes multiple file view control objects (e.g., an object to show files as icons, and an object to show files in a list) in the first portion, the one or more draggable objects are one or more of file icons and/or folder icons, and a respective file view control object of the multiple file view control objects corresponds to a distinct file view type (e.g., an icon view, a list view, a column view, and/or a cover view). In some embodiments, the second portion of the user interface, prior to the determination that the contact at the second location satisfies the first intensity criteria, includes a file view of a first file view type (e.g., a list view), and changing the second portion includes replacing the file view of the first file view type with a file view of a second file view type that is distinct from the file view of the first file view type (e.g., an icon view).

In some embodiments, the device, subsequent to moving the first draggable object to the first control object and changing the second portion, detects (628) a movement of the contact across the touch-sensitive surface to a third location that corresponds to the changed second portion on the display. For example, changing the second portion of the display includes replacing the calendar view from a day view to a month view. In another example, changing the second portion of the display includes replacing display of contents in a first directory with display of contents in a second directory (e.g., FIG. 5H). Furthermore, in some embodiments, the device moves (630) the first draggable object to a location, in the changed second portion, that corresponds to the third location on the touch-sensitive surface in accordance with the movement of the contact across the touch-sensitive surface to the third location. Furthermore, in some embodiments, in accordance with a determination that the contact at the third location does not satisfy the object selection criteria, the device drops (632) the first draggable object at the location, in the changed second portion, that corresponds to the third location on the touch-sensitive surface (e.g., FIG. 5I).

In some embodiments, the object selection criteria include (634) second intensity criteria. For example, a contact with intensity between $IT_L$ and $IT_D$ is used to select a draggable object.

In some embodiments, the device concurrently displays (636) an entirety of the user interface of the first software application with a portion of a user interface of a second software application adjacent to the user interface of the first software application (e.g., user interface 5002-A and user interface 5002-B in FIG. 5Q). In some embodiments, the user interface of the first software application is in contact with the portion of the user interface of the second software application. In some embodiments, the user interface of the first software application appears to overlie a portion of the user interface of the second software application.

Furthermore, in some embodiments, in accordance with the determination that the contact at the first location satisfies the object selection criteria, the device detects (638) a movement of the contact across the touch-sensitive surface to a fifth location that corresponds to the displayed portion of the user interface of the second software application on the display (e.g., FIG. 5S). In some embodiments, the device moves (640) the first draggable object to the displayed portion of the user interface of the second software application in accordance with the movement of the contact across the touch-sensitive surface to the fifth location. In some embodiments, the contact continues to satisfy the object selection criteria during the movement of the contact across the touch-sensitive surface to the fifth location.

In some embodiments, in response to a determination that the contact at the fifth location satisfies the first intensity criteria (e.g., intensity of contact satisfying threshold $IT_D$ in FIG. 5T), the device replaces (642) a concurrent display of the entirety of the user interface of the first software application and the portion of the user interface of the second software application with a concurrent display of an entirety of the user interface of the second software application and a portion of the user interface of the first software application adjacent to the user interface of the second software application (e.g., user interface 5002-B and user interface 5002-A in FIG. 5V). In some embodiments, the user interface of the second software application appears to overlie a portion of the user interface of the first software application.

In some embodiments, in response to a determination that the contact at the fifth location does not satisfy the first intensity criteria, the device determines (644) a time period during which the contact remains at the fifth location, and in response to a determination that the time period satisfies time-based activation criteria (e.g., focus selector 5013 remains over user interface 5002-B and satisfies the time-based activation criteria, as shown in FIG. 5U), the device replaces the concurrent display of the entirety of the user interface of the first software application and the portion of the user interface of the second software application with the concurrent display of an entirety of the user interface of the second software application and the portion of the user interface of the first software application adjacent to the user interface of the second software application (e.g., user interface 5002-B and user interface 5002-A in FIG. 5V).

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 600 described above with respect to FIGS. 6A-6E. For example, the contacts, inputs, user interface objects, intensity thresholds, focus selectors, and criteria described above with reference to method 600 optionally have one or more of the characteristics of the contacts, inputs, user interface objects, intensity thresholds, focus selectors, and criteria described herein with reference to other methods described herein (e.g., methods 700, 800, and 900). For brevity, these details are not repeated here.

FIGS. 7A-7D illustrate a flow diagram of a method 700 of performing operations in conjunction with generating tactile outputs, in accordance with some embodiments. The method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the device includes one or more tactile output generators. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to perform operations in conjunction with generating tactile outputs. The method reduces the cognitive burden on a user when performing operations in conjunction with generating tactile outputs, thereby creating a more efficient human-machine interface. For battery-operated electronic devices, enabling a user to perform operations in conjunction with generating tactile outputs faster and more efficiently conserves power and increases the time between battery charges.

The device displays (702), on the display of the electronic device, a user interface of a first software application. While displaying the user interface of the first software application, the device performs at least the following operations.

The device detects (704) a first input (e.g., a tap gesture) that includes a contact detected on the touch-sensitive surface, wherein the contact included in the first input is associated with a respective region of the user interface of the first software application that is associated with a first operation (e.g., a response to a "light press" or "left click") and a second operation (e.g., a response to a "deep press," "right click," or "option+click"). In some embodiments, the first operation is a first display operation and the second operation is a second display operation.

In response to detecting the first input (e.g., a tap gesture), and in accordance with a determination that a first tactile output setting is active (e.g., silent trackpad mode) for the first input, the device performs (706) the first operation without generating a tactile output. In some embodiments, the first tactile output setting is active for the first input, based on a location of the contact, a location of the focus selector corresponding to the contact, or a system-wide setting or condition. For example, as illustrated in FIG. 5Y, tactile output setting chart 5060 indicates that the first tactile output setting is active. In response to detecting the input associated with contact 5062, having an intensity level below threshold $IT_L$, the "Users" folder (object 5004-6) is highlighted in display 450 (an exemplary first display operation is performed). FIG. 5Y also illustrates performance of this operation without generating a tactile output.

In response to detecting the first input, and in accordance with a determination that a second tactile output setting is active (e.g., non-silent trackpad mode) for the first input, the device forgoes (708) performing the first operation. For example, as illustrated in FIG. 5BB, tactile output setting chart 5060 indicates that the second tactile output setting is active. In response to detecting the input associated with contact 5062, having an intensity level below threshold $IT_L$, the "Users" folder (object 5004-6) is not highlighted in display 450 (an exemplary first display operation is not performed). FIG. 5BB also illustrates performance of this operation without generating a tactile output.

The device detects (710) a second input (e.g., a light press) that includes a contact detected on the touch-sensitive surface, wherein the contact included in the second input is associated with the respective region of the user interface of the first software application that is associated with the first operation (e.g., a response to a "light press" or "left click") and the second operation (e.g., a response to a "deep press," "right click," or "option+click") and the second input is different from the first input.

In response to detecting the second input, and in accordance with a determination that the second tactile output setting is active (e.g., non-silent trackpad mode) for the second input, the device performs (712) the first operation in conjunction with generating a first tactile output associated with the first operation. For example, as illustrated in FIG. 5CC, tactile output setting chart 5060 indicates that the second tactile output setting is active. In response to detecting the input associated with contact 5062, having an intensity level above threshold $IT_L$, and below threshold $IT_D$, the "Users" folder (object 5004-6) is highlighted in display 450 (an exemplary first display operation is performed). FIG. 5CC also illustrates performance of this operation in conjunction with generating a first tactile output.

In some embodiments, the first tactile output (714) lasts for less than a predetermined time. In some embodiments, duration of the first tactile output is independent of duration of the contact remaining on the touch-sensitive surface. In some embodiments, the second tactile output lasts for less than the predetermined time. In some embodiments, duration of a respective tactile output is less than 0.5 seconds. In some embodiments, the duration of the respective predetermined tactile output is less than 0.4 seconds. In some embodiments, the duration of the respective predetermined tactile output is less than 0.3 seconds. In some embodiments, the duration of the respective predetermined tactile output is less than 0.2 seconds. In some embodiments, the duration of the respective predetermined tactile output is less than 0.1 seconds.

In response to detecting the second input, and in accordance with a determination that the first tactile output setting is active (e.g., silent trackpad mode) for the second input, the device performs (716) the second operation. In some embodiments, the device performs the second operation instead of the first operation, or without performing the first operation, and/or without generating the first tactile output. For example, as illustrated in FIG. 5Z, tactile output setting chart 5060 indicates that the first tactile output setting is active. In response to detecting the input associated with contact 5062, having an intensity level above threshold $IT_L$, and below threshold $IT_D$, a menu associated with the "Users" folder (object 5004-6) is displayed in display 450 (an exemplary second display operation is performed). FIG. 5Z also illustrates performance of this operation without generating a first tactile output and without performing the first display operation (e.g., highlighting the "Users" folder).

In some embodiments, in response to detecting the second input, in accordance with the determination that the first tactile output setting is active for the second input (e.g., silent trackpad mode), the device performs (718) the second operation without performing the first operation.

In some embodiments, in response to detecting the second input, in accordance with the determination that the first tactile output setting is active for the second input (e.g., silent trackpad mode), the device forgoes (720) generation of the first tactile output.

In some embodiments, in response to detecting the second input, in accordance with the determination that the first tactile output setting is active for the second input (e.g., silent trackpad mode), the device forgoes (722) generation of a second tactile output associated with the second operation.

In some embodiments, the device detects (724) a third input (e.g., a deep press) that includes a contact detected on the touch-sensitive surface, wherein the contact included in the third input is associated with the respective region of the user interface of the first software application that is associated with the first operation (e.g., a response to a "light press" or "left click") and the second operation (e.g., a response to a "deep press," "right click," or "option+click") and the third input is different from the first input and the second input. In some embodiments, the contact in the second input and the contact in the third input are (726) a same contact that is continuously detected on the touch-sensitive surface between the second input and the third input. In some embodiments, the second input satisfies (728) a first intensity threshold and the contact in the third input satisfies a second intensity threshold that is higher than the first intensity threshold.

In some embodiments, in response to detecting the third input (e.g., a deep press), and in accordance with a determination that the second tactile output setting is active (e.g., non-silent trackpad mode) for the third input, the device performs (730) the second operation in conjunction with generating a second tactile output associated with the second operation. For example, as illustrated in FIG. 5DD, tactile output setting chart 5060 indicates that the second tactile output setting is active. In response to detecting the input associated with contact 5062, having an intensity level above threshold $IT_D$, a menu associated with the "Users" folder (object 5004-6) is displayed in display 450 (an exemplary second display operation is performed). FIG. 5Z also illustrates performance of this operation in conjunction with generating a second tactile output and without performing the first display operation (e.g., highlighting the "Users" folder).

In some embodiments, in response to detecting the third input (e.g., a deep press), and in accordance with a determination that the first tactile output setting is active (e.g., silent trackpad mode) for the third input, the device forgoes (732) generation of the second tactile output. In some embodiments, in response to detecting the third input and in accordance with the determination that the first tactile output setting is active (e.g., silent trackpad mode), the device forgoes (734) repeating the second operation. For example, as illustrated in FIG. 5AA, tactile output setting chart 5060 indicates that the first tactile output setting is active. In response to detecting the input associated with contact 5062, having an intensity level above threshold $IT_D$, the "Users" folder is not highlighted (an exemplary first display operation is not performed), and a menu associated with the "Users" folder (object 5004-6) is not displayed in display 450 (an exemplary second display operation is not performed). FIG. 5AA also illustrates forgoing performance of the second operation in conjunction with forgoing generating any tactile output and without performing the first display operation (e.g., highlighting the "Users" folder).

In some embodiments, the second tactile output includes (736) an audible component that is louder than an audible component of the first tactile output. In some embodiments, the first tactile output has (738) a first tactile output intensity and the second tactile output has a second tactile output intensity that is greater than the first tactile output intensity.

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, and 900) are also applicable in an analogous manner to method 700 described above with respect to FIGS. 7A-7D. For example, the contacts, inputs, operations, tactile output settings, tactile output intensity, intensity thresholds, regions and tactile outputs described above with reference to method 700 optionally have one or more of the characteristics of the contacts, inputs, operations, tactile output settings, tactile output intensity, intensity thresholds, regions and tactile outputs described herein with reference to other methods described herein (e.g., methods 600, 800, and 900). For brevity, these details are not repeated here.

FIGS. 8A-8F illustrate a flow diagram of a method 800 of providing tactile outputs based on one or more regions of a user interface, in accordance with some embodiments. The method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to provide tactile outputs based on one or more regions of a user interface. The method reduces the cognitive burden on a user when providing tactile outputs based on one or more regions of a user interface, thereby creating a more efficient human-machine interface. For battery-operated electronic devices, enabling a user to provide tactile outputs based on one or more regions of a user interface faster and more efficiently conserves power and increases the time between battery charges.

The device displays (802), on the display of the electronic device, a user interface that includes a first region that is configured to initiate a first display operation in response to an input (e.g., a light press) (optionally, an input associated with the first region) that satisfies first activation criteria and initiate a second display operation in response to an input (e.g., a deep press) (optionally, an input associated with the first region) that satisfies second activation criteria distinct from the first activation criteria, and a second region that is distinct from the first region, wherein the second region is configured to initiate a third display operation in response to an input (optionally, an input associated with the second region) that satisfies the first activation criteria (e.g., a light press) and the second region is not configured to initiate any display operation in response to an input (optionally, an input associated with the second region) that satisfies the second activation criteria (e.g., a deep press). For example, the first region is responsive to inputs that satisfy one or more first activation criteria and is also responsive to inputs that satisfy one or more second activation criteria, and the second region is responsive to inputs that satisfy the first activation criteria and is not responsive to inputs that satisfy the second activation criteria.

In some embodiments, the first activation criteria include (804) first intensity criteria. In some embodiments, the first intensity criteria include a first intensity threshold. In some embodiments, the second activation criteria include (806) second intensity criteria distinct from the first intensity criteria. In some embodiments, the second intensity criteria include a second intensity threshold that is higher than the first intensity threshold.

In some embodiments, the first region is (808) a region that includes a user interface control and the second region is a region that does not include any user interface control. In some embodiments, the user interface includes (810) a plurality of regions that are configured to perform display operations in response to inputs that satisfy the second activation criteria, and (all other) regions of the user interface that are outside of the plurality of regions are not configured to perform display operations to inputs that satisfy the second activation criteria. In some embodiments, the second activation criteria are correspond to a unique form of input to which only certain controls and/or applications are configured to respond. However, in order to maintain a consistent feel for the user interface, the input device provides feedback to the user indicating that the second activation criteria have been met even when the input corresponds to a location outside of the controls or applications that are configured to respond to the second activation criteria.

While displaying the user interface of the first software application, the device performs at least the following operations. The device detects (812) a first input that includes a contact detected on the touch-sensitive surface, wherein the contact included in the first input is associated with the first region of the user interface.

In response to detecting the first input, and in accordance with a determination that the first input satisfies the first activation criteria (e.g., a light press), the device performs (814) the first display operation. In some embodiments, in response to detecting the first input, in accordance with the determination that the first input satisfies the first activation criteria (e.g., a light press), the device concurrently generates (816) a tactile output of a third type that is distinct from the tactile output of the first type while performing the first display operation. For example, as illustrated in FIG. 5EE, region chart 5070 indicates that a detected contact is associated with the first region. In response to detecting the input associated with contact 5062, having an intensity level above threshold $IT_L$, and below threshold $IT_D$, the "Users" folder (object 5004-6) is highlighted (an exemplary first display operation is performed). FIG. 5EE also illustrates performance of this operation in conjunction with generating a third tactile output.

In some embodiments, the tactile output of the third type is distinct from the tactile output of a second type, described below. In some embodiments, the tactile output of the third type (e.g., a tactile output indicating a light press) has less salience (818) than salience of the tactile output of the first type (e.g., a tactile output for a deep operation) and greater salience than salience of the tactile output of a second type (e.g., a tactile output indicating absence of a deep operation). In some embodiments, the salience of a tactile output includes one or more of: an amplitude of the tactile output (e.g., speed and force of a displacement of the touch-sensitive surface) and a duration of the tactile output.

In response to detecting the first input, and in accordance with a determination that the first input satisfies the second activation criteria (e.g., a deep press), the device performs (820) the second display operation and concurrently generating a tactile output of a first type (e.g., a tactile output for a deep operation) while performing the second display operation. For example, as illustrated in FIG. 5FF, region chart 5070 indicates that a detected contact is associated with the first region. In response to detecting the input associated with contact 5062, having an intensity level above threshold $IT_D$, a menu associated with the "Users" folder (object 5004-6) is displayed (an exemplary second display operation is performed). FIG. 5FF also illustrates performance of this operation in conjunction with generating a first tactile output. FIG. 5FF also illustrates performance of this operation without performing the first display operation (e.g., highlighting the "Users" folder).

The device detects (822) a second input that includes a contact detected on the touch-sensitive surface, wherein the second input is distinct from the first input and the contact included in the second input is associated with the second region of the user interface. For example, FIG. 5GG illustrates a second input including contact 5074, associated with the file view control object 5008-1, and region chart 5070 indicates that the detected contact is associated with the second region.

In response to detecting the second input, and in accordance with a determination that the second input satisfies the first activation criteria (e.g., a light press), the device performs (824) the third display operation. In some embodiments, in response to detecting the second input and in accordance with the determination that the second input satisfies the first activation criteria (e.g., a light press), the device concurrently generates (826) a tactile output of a fourth type that is distinct from the tactile output of the third type while performing the third display operation. For example, as illustrated in FIG. 5HH, region chart 5070 indicates that a detected contact is associated with the second region. In response to detecting the input associated with contact 5074, having an intensity level above threshold $IT_L$, and below threshold $IT_D$, the file view control icon 5008-1 is selected and region 5054 displays the contents of the "Macintosh HD" directory in an icon-view. FIG. 5HH also illustrates performance of this operation in conjunction with generating a tactile output of a fourth type. In some embodiments, in response to detecting the second input and in accordance with the determination that the second input satisfies the first activation criteria (e.g., a light press), the device concurrently generates (828) a tactile output of the third type while performing the third display operation.

In response to detecting the second input, and in accordance with a determination that the second input satisfies the second activation criteria (e.g., a deep press), the device generates (830) a tactile output of a second type (e.g., a tactile output indicating absence of a deep operation). In some embodiments, the tactile output of the second type is distinct (832) from the tactile output of the first type. In some embodiments, the tactile output of the second type is identical to the tactile output of the first type.

In some embodiments, in response to detecting the second input and in accordance with the determination that the second input satisfies the second activation criteria (e.g., a deep press), the device forgoes (834) performing the first display operation, the second display operation, and the third display operation. For example, as illustrated in FIG. 5II, region chart 5070 indicates that a detected contact is associated with the second region. In response to detecting the input associated with contact 5074, having an intensity level above threshold $IT_D$, there is no display operation performed (e.g., there is no change in the display of the contents of display 450, from FIG. 5HH). FIG. 5II also illustrates forgoing performance of any display operation in conjunction with generating a tactile output of the second type. For example, in FIG. 5II, the tactile output of the second type indicates to the user of the device that there is no display operation associated with a "deep press" detected while the cursor is over the icon file control object.

In some embodiments, the tactile output of the second type (e.g., a tactile output indicating absence of a deep operation) has less salience (836) than salience of the tactile output of the first type (e.g., a tactile output for a deep operation).

In some embodiments, the user interface includes (838) a third region that is not configured to initiate any display operation in response to an input (associated with the third region) that satisfies first activation criteria and is not configured to initiate any display operation in response to an input (associated with the third region) that satisfies second activation criteria distinct from the first activation criteria (e.g., the third region is not responsive to inputs that satisfy the first activation criteria or the second activation criteria). Furthermore, in some embodiments, the device detects (840) a third input that includes a contact detected on the touch-sensitive surface, wherein the contact included in the first input is associated with the third region of the user interface.

In some embodiments, in response to detecting the third input, and in accordance with a determination that the third input satisfies the first activation criteria (e.g., a light press), the device generates (842) a tactile output of the third type (e.g., a tactile output indicating a light press). For example, as illustrated in FIG. 5JJ, region chart 5070 indicates that a detected contact is associated with the third region. In response to detecting the input associated with contact 5078, having an intensity level above threshold $IT_L$ and below $IT_D$, there is no display operation performed. FIG. 5JJ also illustrates forgoing performance of any display operation in conjunction with generating a tactile output of the third type. For example, in FIG. 5JJ, the tactile output of the second type indicates to the user of the device that there is no display operation associated with a "light press" detected while the cursor is over control object 5008-4.

In some embodiments, in response to detecting the third input, and in accordance with a determination that the third input satisfies the second activation criteria (e.g., a deep press), the device generates (844) a tactile output of the second type (e.g., a tactile output indicating absence of a deep operation). For example, as illustrated in FIG. 5KK, region chart 5070 indicates that a detected contact is associated with the third region. In response to detecting the input associated with contact 5078, having an intensity level above threshold $IT_D$, there is no display operation performed. FIG. 5KK also illustrates forgoing performance of any display operation in conjunction with generating a tactile output of the second type. For example, in FIG. 5KK, the tactile output of the second type indicates to the user of the device that there is no display operation associated with a "deep press" detected while the cursor is over the control object 5008-4.

Thus, in some embodiments, the tactile output associated with a light press input is the same everywhere, while a tactile output associated with a deep press input is different depending on whether the portion of the user interface corresponding to the deep press input is configured to respond to the deep press input (e.g., so as to provide the user with an indication of which user interface elements are responsive to a deep press input and which user interface elements are not responsive to the deep press input).

In some embodiments, the device detects (846) an occurrence of a predefined event associated with the second region while the second region is not configured to initiate any display operation in response to an input (associated with the second region) that satisfies the second activation criteria (e.g., a deep press). In some embodiments, in response to detecting the occurrence of the predefined event, the device configures (848) the second region to initiate a fourth display operation in response to an input that satisfies the second activation criteria.

In some embodiments, while the second region is configured to initiate the fourth display operation in response to an input that satisfies the second activation criteria, the device detects (850) a fourth input that includes a contact detected on the touch-sensitive surface, wherein the contact included in the third input is associated with the second region of the user interface. In some embodiments, in response to detecting the fourth input, and in accordance with a determination that the fourth input satisfies the third activation criteria (e.g., a light press), the device performs (852) the third display operation. In some embodiments, in response to detecting the fourth input, and in accordance with a determination that the fourth input satisfies the second activation criteria (e.g., a deep press), the device performs (854) the fourth display operation and concurrently generates a tactile output of the first type (e.g., a tactile output for a deep operation) while performing the second display operation.

In some embodiments, in response to detecting the first input and in accordance with a determination that the first input does not satisfy the first activation criteria and does not satisfy the second activation criteria, the device forgoes (856) generating any tactile output, and in response to detecting the second input, in accordance with a determination that the second input does not satisfy the first activation criteria and does not satisfy the second activation criteria, the device forgoes (858) generating any tactile output.

In some embodiments, the user interface is generated (860) by a first application running on the device (e.g., a user facing application such as the user interface generating portion of an operating system, a file browser, a web browser, a mail application, etc.) and the determination as to whether to provide the first tactile output or the second tactile output when the second set of activation criteria are satisfied is made by a second application running on the device (e.g., firmware that controls a tactile output mechanism) that is distinct from the first application.

It should be understood that the particular order in which the operations in FIGS. 8A-8F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 900) are also applicable in an analogous manner to method 800 described above with respect to FIGS. 8A-8F. For example, the contacts, inputs, operations, activation criteria, salience, intensity thresholds, regions, tactile output types, and tactile outputs described above with reference to method 700 optionally have one or more of the characteristics of the contacts, inputs, operations, activation criteria, salience, intensity thresholds, regions, tactile output types, and tactile outputs described herein with reference to other methods described herein (e.g., methods 600, 700, and 900). For brevity, these details are not repeated here.

FIGS. 9A-9C illustrate a flow diagram of a method 900 of configuring tactile outputs and activation criteria, in accordance with some embodiments. The method 900 is performed at an electronic device (e.g., device 300, FIG. 3, or portable multifunction device 100, FIG. 1A) with a display, a touch-sensitive surface, one or more sensors to detect intensity of contacts with the touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides an intuitive way to configure tactile outputs and activation criteria. The method reduces the number, extent, and/or nature of the inputs from a user when configuring tactile outputs and activation criteria, thereby creating a more efficient human-machine interface. For battery-operated electronic devices, enabling a user to configure tactile outputs and activation criteria faster and more efficiently conserves power and increases the time between battery charges.

The device is configured to provide (902) a first tactile output (e.g., a light press tactile output) in response to detecting that first activation criteria have been met (e.g., light press activation criteria), the first activation criteria including a criterion that is met when an intensity of a contact on the touch-sensitive surface increases above a first intensity threshold (e.g., selection of draggable object 5004-6 in response to intensity between $IT_L$ and $IT_D$, as shown in FIG. 5CC). The device is configured to provide (904) a second tactile output (e.g., a deep press tactile output) in response to detecting that second activation criteria have been met (e.g., deep press activation criteria), the second activation criteria including a criterion that is met when an intensity of a contact on the touch-sensitive surface increases above a second intensity threshold, distinct from the first intensity threshold (e.g., display of menu 5064 in response to intensity above $IT_D$, as shown in FIG. 5DD).

The device displays (906), on the display, a settings user interface (e.g., the user interface illustrated in FIG. 5MM or FIG. 5NN) that includes one or more control objects, wherein the settings user interface is configured to adjust operations of the device that use: the one or more sensors that detect intensity of contacts with the touch-sensitive surface, and/or the one or more tactile output generators.

While displaying the settings user interface, the device detects (908) an input for a first control object of the one or more control objects (e.g., an input for a single, combined contact intensity/tactile output setting control). In some embodiments, the first control object is (910) a discrete control object that corresponds to a particular setting. For example, a check box that corresponds to a high, medium or low intensity/output setting (e.g., control objects 5088 in FIG. 5MM). In some embodiments, the first control object is (912) a continuous control object that corresponds to three or more settings. For example, a virtual slider or a virtual dial that corresponds to a range of intensity/output settings, from a high setting to a low setting (e.g., control object 5089 in FIG. 5NN).

In accordance with the detected input for the first control object, the device changes (914) the second intensity threshold (e.g., increasing or decreasing a magnitude of the second intensity threshold), and changes (916) the second tactile output (e.g., increasing or decreasing a magnitude, duration, frequency, salience, and/or other output characteristic of the second tactile output). In some embodiments, the second intensity threshold and the second tactile output are changed in response to detecting the input for the first control object. In some embodiments, the second intensity threshold and the second tactile output are changed as soon as the input for the first control object is detected. In some embodiments, the second intensity threshold and the second tactile output are changed by activating an "accept changes," "set," "exit," or other similar icon in the settings user interface.

In some embodiments, in accordance with the detected input for the first control object, the device changes (918) the first intensity threshold (e.g., increasing or decreasing a magnitude of the first intensity threshold). In some embodiments, the magnitude of the first intensity threshold is changed in a same way and/or amount as the magnitude of the second intensity threshold (e.g., the first intensity threshold and the second intensity threshold are both increased by 15% or are both decreased by 15%, depending on the change in the setting indicated by the detected user input on the first control object). In some embodiments, the first intensity threshold is changed in response to detecting the input for the first control object. In some embodiments, the first intensity threshold is changed as soon as the input for the first control object is detected. In some embodiments, the first intensity threshold is changed by activating an "accept changes," "set," "exit," or other similar icon in the settings user interface.

In some embodiments, in accordance with the detected input for the first control object, the device changes (920) the first tactile output (e.g., increasing or decreasing a magnitude, duration, frequency, salience, and/or other output characteristic of the first tactile output). In some embodiments, the characteristics of the first tactile output are changed in a same way and/or amount as the characteristics of the second tactile output (e.g., the amplitude of the first tactile output and the second tactile output are both increased by 15% or are both decreased by 15%, depending on the change in the setting indicated by the detected user input on the first control object). In some embodiments, the first tactile output is changed in response to detecting the input for the first control object. In some embodiments, the first tactile output is changed as soon as the input for the first control object is detected. In some embodiments, the first tactile output is changed by activating an "accept changes," "set," "exit," or other similar icon in the settings user interface.

In some embodiments, in addition to the first tactile output and the second tactile output, the device is configured to provide other tactile outputs in response to detecting events associated with movement of a contact on the touch-sensitive surface (e.g., providing tactile output "detents" in response to detecting movement on the touch-sensitive surface that corresponds to movement of a cursor on the display along a slider or over a boundary in a displayed user interface). Furthermore, in accordance with the detected input for the first control object, the device changes (922) the other tactile outputs (e.g., increasing or decreasing a magnitude, duration, frequency, salience, and/or other output characteristic of the other tactile outputs that the device is configured to provide). In some embodiments, the characteristics of the first tactile output, the second tactile output and the other tactile outputs are all changed in the same manner (e.g., all are increased in amplitude by 15% or all are decreased in amplitude by 15%, depending on the setting selected by the user with the input on the first control object). In some embodiments, the other tactile outputs are changed in response to detecting the input for the first control object. In some embodiments, the other tactile outputs are changed as soon as the input for the first control object is detected. In some embodiments, the other tactile outputs are by activating an "accept changes," "set," "exit," or other similar icon in the settings user interface.

In some embodiments, the first intensity threshold is lower than the second intensity threshold. Thus, in some embodiments, the intensity of a new contact detected on the touch-sensitive surface will have to pass through the first intensity threshold to reach the second intensity threshold. Furthermore, the second activation criteria includes a time-based criterion that is dependent upon a time at which the first activation criteria is met, and in accordance with the detected input for the first control object, the device changes (924) the time-based criterion. In some embodiments, the device increases the length of a delay time period (e.g., the delay time between the time when the first activation criteria are met and the time when the second intensity threshold is met). In some embodiments, the device decreases the length of a delay time. In some embodiments, when the second intensity threshold is increased, a delay time in the time-based criterion is lengthened, and the duration, amplitude, and/or salience of the second tactile output are increased. In some embodiments, when the second intensity threshold is decreased, a delay time in the time-based criterion is shortened, and the duration, amplitude, and/or salience of the second tactile output are decreased. In some embodiments, the device has a reduced-sensitivity time period after the first activation criteria are met, during which the second intensity threshold is temporarily increased, and this reduced-sensitivity time period is increased or decreased in accordance with the detected input for the first control object. In some embodiments, the time-based criterion is changed in response to detecting the input for the first control object. In some embodiments, the time-based criterion is changed as soon as the input for the first control object is detected. In some embodiments, the time-based criterion is changed by activating an "accept changes," "set," "exit," or other similar icon in the settings user interface.

In some embodiments, the time-based criterion includes a delay time period that occurs after the time at which the first activation criteria were met, and the time-based criterion is met (926) after the delay time period has elapsed. In some embodiments, the time-based criterion is met upon completion of the delay time period. For example, during the delay time period, the second activation criteria are not met, even if an intensity of the contact is above the second intensity threshold, to prevent accidental activation of the second tactile output.

In some embodiments, the second activation criteria include (928) a criterion that is met when the intensity of the contact increases by more than a predefined amount (e.g., and/or increases above the second intensity threshold) after the delay time period has elapsed. For example, in order to meet the second activation criteria, after the delay time period, the user has to increase the intensity of the contact by pressing harder.

In some embodiments, the second activation criteria include (930) a criterion that is met when the intensity of the contact increases from an intensity below the second intensity threshold to an intensity above the second intensity threshold after the delay time period has elapsed. For example, in order to meet the second activation criteria, if the contact intensity is already above the second intensity threshold at the end of the delay time period, the user has to back off and press again by reducing the intensity of their contact below the second intensity threshold and then increasing the intensity of their contact above the second intensity threshold.

In some embodiments, the time-based criterion includes (936, FIG. 9C) one or more of: a first offset that decreases over time (e.g., the decaying intensity threshold offset illustrated in the left intensity diagram in FIG. 5PP); and a second offset that changes over time based on an intensity of a contact on the touch-sensitive surface (e.g., the trailing force intensity threshold offset illustrated in the center intensity diagram in FIG. 5PP). In some embodiments, the first offset decreases over time from the time at which the first activation criteria are satisfied. In some embodiments, the first offset decreases over time after a predefined duration from the time at which the first activation criteria are satisfied.

In some embodiments, the time-based criterion includes (938) an intensity offset for a user that is determined based on multiple separate inputs (e.g., inputs that are not continuous extensions of one another) on the touch-sensitive surface by the user. For example, as explained above with respect to FIG. 5QQ, for a user who has a tendency to provide high intensity inputs, an intensity offset for the user is used to increase the deep activation intensity threshold, thereby reducing unintentional activation of a deep press operation. In some embodiments, the intensity offset for the user is determined based on the user's historical inputs (e.g., prior inputs). In some embodiments, the intensity offset for the user is determined prior to detecting the contact on the touch-sensitive surface that is processed to determine whether to provide the second tactile output.

In some embodiments, the intensity offset for the user is determined (940) based on one or more of: peak intensities of a first predefined number of separate click inputs on the touch-sensitive surface by the user (e.g., peak intensities of clicks made by the user), and peak intensities of a second predefined number of separate drag inputs on the touch-sensitive surface by the user (e.g., peak intensities during drag inputs made by the user). For example, peak intensities of the prior 10, 20, 30, 40, 50, 60, 70, 80, or 90 click inputs by the user, and/or peak intensities during the prior 10, 20, 30, 40, 50, 60, 70, 80, or 90 drag inputs by the user are used to determine the intensity offset for the user in some embodiments. In some embodiments, peak intensities of click inputs that satisfy the first intensity threshold and that do not satisfy the second intensity threshold are used for determining the intensity offset for the user (e.g., peak intensities of click inputs that satisfy the second intensity threshold are excluded). In some embodiments, peak intensities of click inputs that remain in contact with the touch-sensitive surface for a duration longer than a predefined duration threshold (e.g., 0.1 s, 0.2 s, 0.3 s, 0.4 s, 0.5 s, 0.6 s, 0.7 s, 0.8 s, 0.9 s, 1 s, 2 s, 3 s, 4 s, 5 s, etc.) are excluded from determining the intensity offset for the user. In some embodiments, the first predefined number is the same as the second predefined number. In some embodiments, the first predefined number is distinct from the second predefined number.

In some embodiments, the peak intensities of prior click inputs by the user are compared to a reference intensity of a click input (e.g., an average or median intensity of click inputs made by multiple users) to determine the intensity offset for the user. In some embodiments, the peak intensities of prior drag inputs by the user are compared to a reference intensity of a drag input (e.g., an average or median intensity of drag inputs made by multiple users) to determine the intensity offset for the user. In some embodiments, the reference intensity of a click input and/or the reference intensity of a drag input are/is adjusted based on the user input on the settings user interface. For example, when a low deep press intensity is selected (e.g., from the settings user interface illustrated in FIG. 5MM), a reference intensity of a low intensity click input and/or a reference intensity of a low intensity drag input are used. Similarly, when a high deep press intensity is selected, a reference intensity of a high intensity click input and/or a reference intensity of a high intensity drag input are used.

In some embodiments, the time-based criterion includes (932, FIG. 9B) a reduced-sensitivity time period that occurs after the time at which the first activation criteria are satisfied, and during the reduced-sensitivity time period, the second intensity threshold is increased. For example, during the reduced-sensitivity period, the second intensity threshold is temporarily increased to prevent accidental activation of the second tactile output.

In some embodiments, the device is configured (934) to respond to the satisfaction of the first activation criteria with a first type of operation (e.g., a light/primary activation), and the device is configured to respond to the satisfaction of the second activation criteria with a second type of operation (e.g., a deep/alternative activation) that is different from the first type of operation.

In some embodiments, while displaying a first user interface and while the device is in a first haptic output mode of a plurality of haptic output modes, the device provides a first haptic output (e.g., a light press haptic output) in response to detecting that first activation criteria (e.g., light press activation criteria) for the first haptic output mode have been met, the first activation criteria for the first haptic output mode including a criterion that is met when an intensity of a contact on the touch-sensitive surface increases above a first intensity threshold. In some embodiments, the device also provides a second haptic output (e.g., a deep press haptic output) in response to detecting that second activation criteria (e.g., deep press activation criteria) for the first haptic output mode have been met, the second activation criteria for the first haptic output mode including a criterion that is met when an intensity of a contact on the touch-sensitive surface increases above a second intensity threshold.

In some embodiments, the device displays a settings user interface for controlling operation of the touch-sensitive surface, the settings user interface including a plurality of control objects, and while displaying the settings user interface, the device detects an input associated with a control object of the plurality of control objects in the settings user interface (e.g., an intensity/output setting control).

In some embodiments, in response to detecting the input associated with the single control in the settings user interface, the device exits the first haptic output mode and enters a second haptic output mode, of the plurality of haptic output modes, that is distinct from the first haptic output mode, and while displaying a second user interface and while the device is in the second haptic output mode, the device provides a third haptic output (e.g., a deep press haptic output) in response to detecting that second activation criteria (e.g., deep press activation criteria) for the second haptic output mode have been met, the second activation criteria for the second haptic output mode including a criterion that is met when an intensity of a contact on the touch-sensitive surface increases above a third intensity threshold, wherein the third intensity threshold is distinct from the second intensity threshold, and a salience (e.g., magnitude, duration, frequency) of the third haptic output is distinct from the second haptic output.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 800) are also applicable in an analogous manner to method 900 described above with respect to FIGS. 9A-9C. For example, the contacts, inputs, operations, tactile output settings, tactile output intensity, intensity thresholds, contact intensity, time-based criteria, control objects, and tactile outputs described above with reference to method 900 optionally have one or more of the characteristics of the contacts, inputs, operations, tactile output settings, tactile output intensity, intensity thresholds, contact intensity, time-based criteria, control objects, and tactile outputs described herein with reference to other methods described herein (e.g., methods 600, 700, and 800). For brevity, these details are not repeated here.

Figure 10:
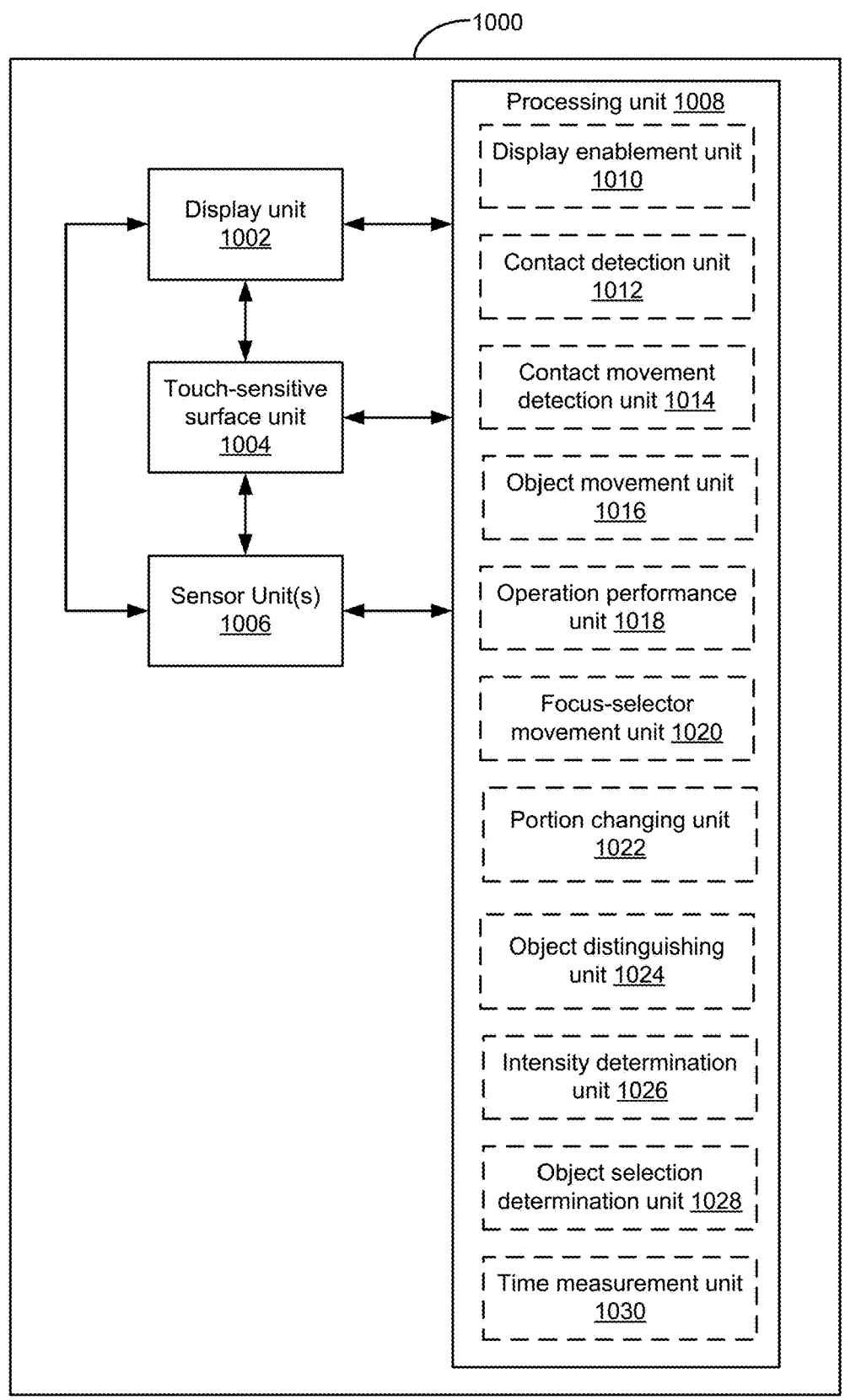
FIGS. 10-13 are functional block diagrams of electronic devices in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a display unit 1002 configured to display a user interface, a touch-sensitive surface unit 1004 configured to receive contacts, one or more sensor units 1006 configured to detect intensity of contacts with the touch-sensitive surface unit 1004; optionally, one or more tactile output units 1007 configured to provide tactile outputs, and a processing unit 1008 coupled with the display unit 1002, the touch-sensitive surface unit 1004 and the one or more sensor units 1006. In some embodiments, the processing unit 1008 includes: a display enablement unit 1010, a contact detection unit 1012, a contact movement detection unit 1014, an object movement unit 1016, an operation performance unit 1018, a focus-selector movement unit 1020, a portion changing unit 1022, an object distinguishing unit 1024, an intensity determining unit 1026, an object selection determination unit 1028, and a time measurement unit 1030.

The processing unit 1008 is configured to: enable display (e.g., with the display enablement unit 1010) of a user interface of a first software application that includes one or more draggable objects and one or more control objects distinct from the one or more draggable objects; and, while enabling display of the user interface of the first software application: detect a contact (e.g., with the contact detection unit 1012) on the touch-sensitive surface unit 1004 at a first location while a focus selector is displayed over a first draggable object of the one or more draggable objects displayed on the display unit 1002. The processing unit 1008 is also configured to: after detecting the contact on the touch-sensitive surface unit 1004 at the first location, detect a movement of the contact (e.g., with the contact movement detection unit 1014) across the touch-sensitive surface unit 1004 to a second location that corresponds to a first control object of the one or more control objects displayed on the display unit 1002; and, in response to detecting movement of the contact from the first location to the second location, in accordance with a determination that the contact at the first location satisfies object selection criteria (e.g., with object selection determination unit 1028), move the first draggable object (e.g., with the object movement unit 1016) to the first control object in accordance with the movement of the contact across the touch-sensitive surface unit 1004 to the first control object; and, in accordance with a determination that the contact at the second location satisfies first intensity criteria (e.g., with intensity determination unit 1026), perform a first predetermined operation (e.g., with the operation performance unit 1018) that corresponds to activation of the first control object.

In some embodiments, the processing unit 1008 is further configured to: in accordance with a determination that the contact at the first location does not satisfy the object selection criteria (e.g., with object selection determination unit 1028), move the focus selector (e.g., with the focus-selector movement unit 1020) to the first control object in accordance with the movement of the contact across the touch-sensitive surface unit 1004 to the first control object without moving the first draggable object to the first control object; and, in accordance with a determination that the contact at the second location satisfies the second intensity criteria (e.g., with intensity determination unit 1026), perform the first predetermined operation (e.g., with the operation performance unit 1018) that corresponds to activation of the first control object without moving the first draggable object to the first control object.

In some embodiments, a first portion of the multiple distinct portions includes the first control object, and the user interface includes multiple distinct portions, and the processing unit 1008 is further configured to: perform the first predetermined operation (e.g., with the operation performance unit 1018) that corresponds to activation of the first control object including changing a second portion (e.g., with the portion changing unit 1022), distinct from the first portion, of the multiple distinct portions.

In some embodiments, the first software application is a calendar application, the user interface of the first software application includes multiple time-period user interface elements in the first portion, the one or more draggable objects are one or more calendar entry objects, a respective time-period user interface element of the multiple time-period user interface elements corresponds to a predefined unit of time, the second portion of the user interface of the first software application, prior to the determination that the contact at the second location satisfies the first intensity criteria (e.g., with the intensity determination unit 1026), includes a calendar view that corresponds to a first unit of time, and changing the second portion includes replacing the calendar view (e.g., with the display enablement unit 1010) that corresponds to a first unit of time with a calendar view that corresponds to a second unit of time that is distinct from the first unit of time.

In some embodiments, the first software application is a file system navigation application, the user interface of the first software application includes multiple file view control objects in the first portion, the one or more draggable objects are one or more of file icons and/or folder icons, a respective file view control object of the multiple file view control objects corresponds to a distinct file view type, the second portion of the user interface, prior to the determination that the contact at the second location satisfies the first intensity criteria (e.g., with intensity determination unit 1026), includes a file view of a first file view type and changing the second portion (e.g., with portion changing unit 1022) includes replacing the file view (e.g., with display enablement unit 1010) of the first file view type with a file view of a second file view type that is distinct from the file view of the first file view type.

In some embodiments, the processing unit 1008 is further configured to: subsequent to moving the first draggable object to the first control object and changing the second portion: detect a movement of the contact (e.g., with the contact movement detection unit 1014) across the touch-sensitive surface unit 1004 to a third location that corresponds to the changed second portion on the display unit 1002; move the first draggable object (e.g., with the object movement unit 1016) to a location, in the changed second portion, that corresponds to the third location on the touch-sensitive surface unit 1004 in accordance with the movement of the contact (e.g., with the contact movement detection unit 1014) across the touch-sensitive surface unit 1004 to the third location; and, in accordance with a determination that the contact at the third location does not satisfy the object selection criteria (e.g., with the object selection determination unit 1028), drop the first draggable object at the location (e.g., with the display enablement unit 1010), in the changed second portion, that corresponds to the third location on the touch-sensitive surface unit 1004.

In some embodiments, the processing unit 1008 is further configured to: in response to moving the first draggable object to the first control object, and in accordance with a determination that the first software application is configured to perform the first predetermined operation in response to detecting a contact at the second location that satisfies the first intensity criteria, visually distinguish (e.g., with the object distinguishing unit 1024) the first control object prior to determining that the contact satisfies the first intensity criteria (e.g., with intensity determination unit 1026).

In some embodiments, the processing unit 1008 is further configured to: detect a movement of the contact (e.g., with contact movement detection unit 1014) across the touch-sensitive surface unit 1004 to a fourth location that corresponds to a second control object of the one or more control objects; and, in accordance with a determination that the first software application is not configured to perform a predetermined operation in response to detecting a contact at the fourth location that satisfies the first intensity criteria (e.g., with intensity determination unit 1026), forgo visually distinguishing (e.g., with object distinguishing unit 1024) the second control object.

In some embodiments, the processing unit 1008 is further configured to: concurrently enable display (e.g., with display enablement unit 1010) of an entirety of the user interface of the first software application with a portion of a user interface of a second software application adjacent to the user interface of the first software application; and in accordance with the determination that the contact at the first location satisfies the object selection criteria (e.g., with object selection determination unit 1028): detect a movement of the contact (e.g., with contact movement detection unit 1014) across the touch-sensitive surface unit 1004 to a fifth location that corresponds to the displayed portion of the user interface of the second software application on the display unit 1002; move the first draggable object (e.g., with object movement unit 1016) to the displayed portion of the user interface of the second software application in accordance with the movement of the contact across the touch-sensitive surface unit 1004 to the fifth location; and in response to a determination that the contact at the fifth location satisfies the first intensity criteria (e.g., with the intensity determination unit 1026), enable replacement of a concurrent display (e.g., with display enablement unit 1010) of the entirety of the user interface of the first software application and the portion of the user interface of the second software application with a concurrent display of an entirety of the user interface of the second software application and a portion of the user interface of the first software application adjacent to the user interface of the second software application.

In some embodiments, the processing unit 1008 is further configured to: in response to a determination that the contact at the fifth location does not satisfy the first intensity criteria: determine a time period during which the contact remains at the fifth location (e.g., with time measurement unit 1030); and in response to a determination that the time period satisfies time-based activation criteria (e.g., with time measurement unit 1030), enable replacement of the concurrent display (e.g., with display enablement unit 1010) of the entirety of the user interface of the first software application and the portion of the user interface of the second software application with the concurrent display of an entirety of the user interface of the second software application and the portion of the user interface of the first software application adjacent to the user interface of the second software application.

The operations described above with reference to FIGS. 6A-6E are, optionally, implemented by components depicted in FIGS. 1A-1B or FIG. 10. For example, contact-detection operation 604, contact movement detection operation 606, and object-movement operation 612 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 11:
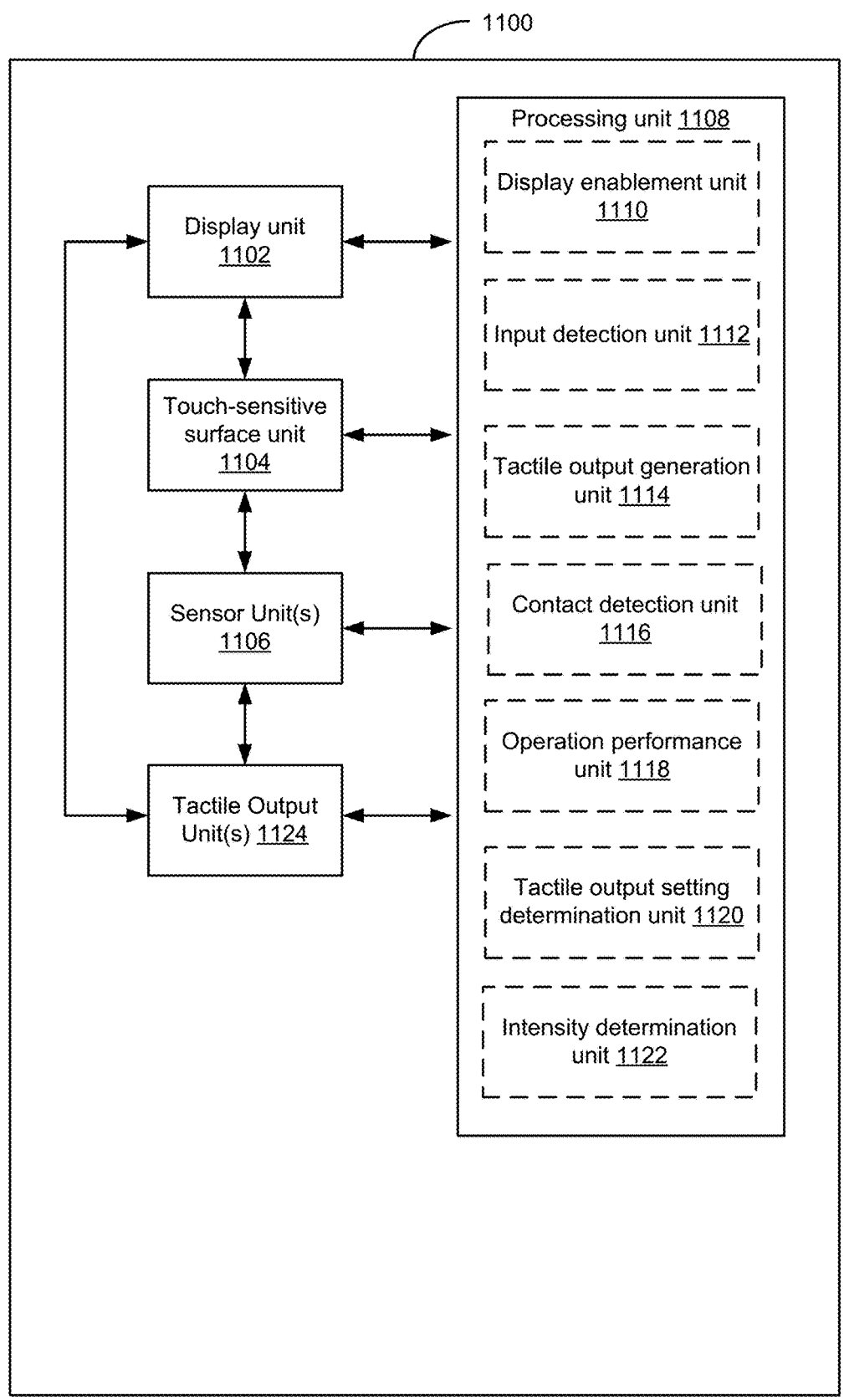

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a user interface, a touch-sensitive surface unit 1104 configured to receive contacts, one or more sensor units 1106 configured to detect intensity of contacts with the touch-sensitive surface unit 1104, one or more tactile output units 1124 configured to provide tactile outputs, and a processing unit 1108 coupled with the display unit 1102, the touch-sensitive surface unit 1104 and the one or more sensor units 1106. In some embodiments, the processing unit 1108 includes: a display enablement unit 1110, an input detection unit 1112, a tactile output generation unit 1114, a contact detection unit 1116, an operation performance unit 1118, a tactile output setting determination unit 1120, and intensity determining unit 1122.

The processing unit 1108 is configured to: enable display (e.g., with display enablement unit 1110) of a user interface of a first software application; and, while enabling display of the user interface of the first software application: detect a first input (e.g., with input detection unit 1112) that includes a contact detected (e.g., with contact detection unit 1116) on the touch-sensitive surface unit 1104, wherein the contact included in the first input is associated with a respective region of the user interface of the first software application that is associated with a first operation and a second operation.

The processing unit 1108 is also configured to: in response to detecting the first input (e.g., with input detection unit 1112) and in accordance with a determination that a first tactile output setting (e.g., with tactile output setting determination unit 1120) is active for the first input, perform the first operation (e.g., operation performance unit 1118) without generating a tactile output; and in accordance with a determination that a second tactile output setting is active for the first input, forgo performing the first operation.

The processing unit 1108 is also configured to: detect a second input (e.g., with input detection unit 1112) that includes a contact detected (e.g., with contact detection unit 1116) on the touch-sensitive surface unit 1104, wherein the contact included in the second input is associated with the respective region of the user interface of the first software application that is associated with the first operation and the second operation and the second input is different from the first input; and in response to detecting the second input (e.g., with input detection unit 1112) and in accordance with a determination that the second tactile output setting is active (e.g., with tactile output setting determination unit 1120) for the second input, perform the first operation (e.g., operation performance unit 1118) in conjunction with generating a first tactile output (e.g., with tactile output generation unit 1114) associated with the first operation; and in accordance with a determination that the first tactile output setting is active (e.g., with tactile output setting determination unit 1120) for the second input, perform the second operation (e.g., operation performance unit 1118).

In some embodiments, the processing unit 1108 is further configured to: detect a third input (e.g., with input detection unit 1112) that includes a contact detected (e.g., with contact detection unit 1116) on the touch-sensitive surface unit 1104, wherein the contact included in the third input is associated with the respective region of the user interface of the first software application that is associated with the first operation and the second operation and the third input is different from the first input and the second input; and in response to detecting the third input and in accordance with a determination that the second tactile output setting is active (e.g., with tactile output setting determination unit 1120) for the third input, perform the second operation (e.g., operation performance unit 1118) in conjunction with generating a second tactile output (e.g., with tactile output generation unit 1114) associated with the second operation; and in accordance with a determination that the first tactile output setting is active (e.g., with tactile output setting determination unit 1120) for the third input, forgo generation of the second tactile output.

In some embodiments, the second tactile output includes an audible component that is louder than an audible component of the first tactile output. In some embodiments, the first tactile output has a first tactile output intensity and the second tactile output has a second tactile output intensity that is greater than the first tactile output intensity. In some embodiments, the processing unit 1108 is further configured to, in response to detecting the third input (e.g., with input detection unit 1112), in accordance with the determination that the first tactile output setting is active (e.g., with tactile output setting determination unit 1120), forgo repeating the second operation.

In some embodiments, the contact in the second input and the contact in the third input are a same contact that is continuously detected (e.g., with contact detection unit 1116) on the touch-sensitive surface unit 1104 between the second input and the third input. In some embodiments, the contact in the second input satisfies a first intensity threshold (e.g., using intensity determination unit 1122) and the contact in the third input satisfies a second intensity threshold that is higher than the first intensity threshold. In some embodiments, the processing unit 1108 is further configured to, in response to detecting the second input (e.g., with input detection unit 1112), in accordance with the determination that the first tactile output setting is active for the second input (e.g., with tactile output setting determination unit 1120), perform the second operation without performing the first operation (e.g., operation performance unit 1118).

In some embodiments, the processing unit 1108 is further configured to, in response to detecting the second input (e.g., with input detection unit 1112), in accordance with the determination that the first tactile output setting is active (e.g., with tactile output setting determination unit 1120) for the second input, forgo generation of the first tactile output. In some embodiments, the processing unit 1108 is further configured to, in response to detecting the second input (e.g., with input detection unit 1112), in accordance with the determination that the first tactile output setting is active for the second input (e.g., with tactile output setting determination unit 1120), forgo generation of a second tactile output associated with the second operation. In some embodiments, the first tactile output lasts for less than a predetermined time.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7D are, optionally, implemented by components depicted in FIGS. 1A-1B or FIG. 11. For example, input-detection operation 704, and tactile output generation operation 712 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 12:
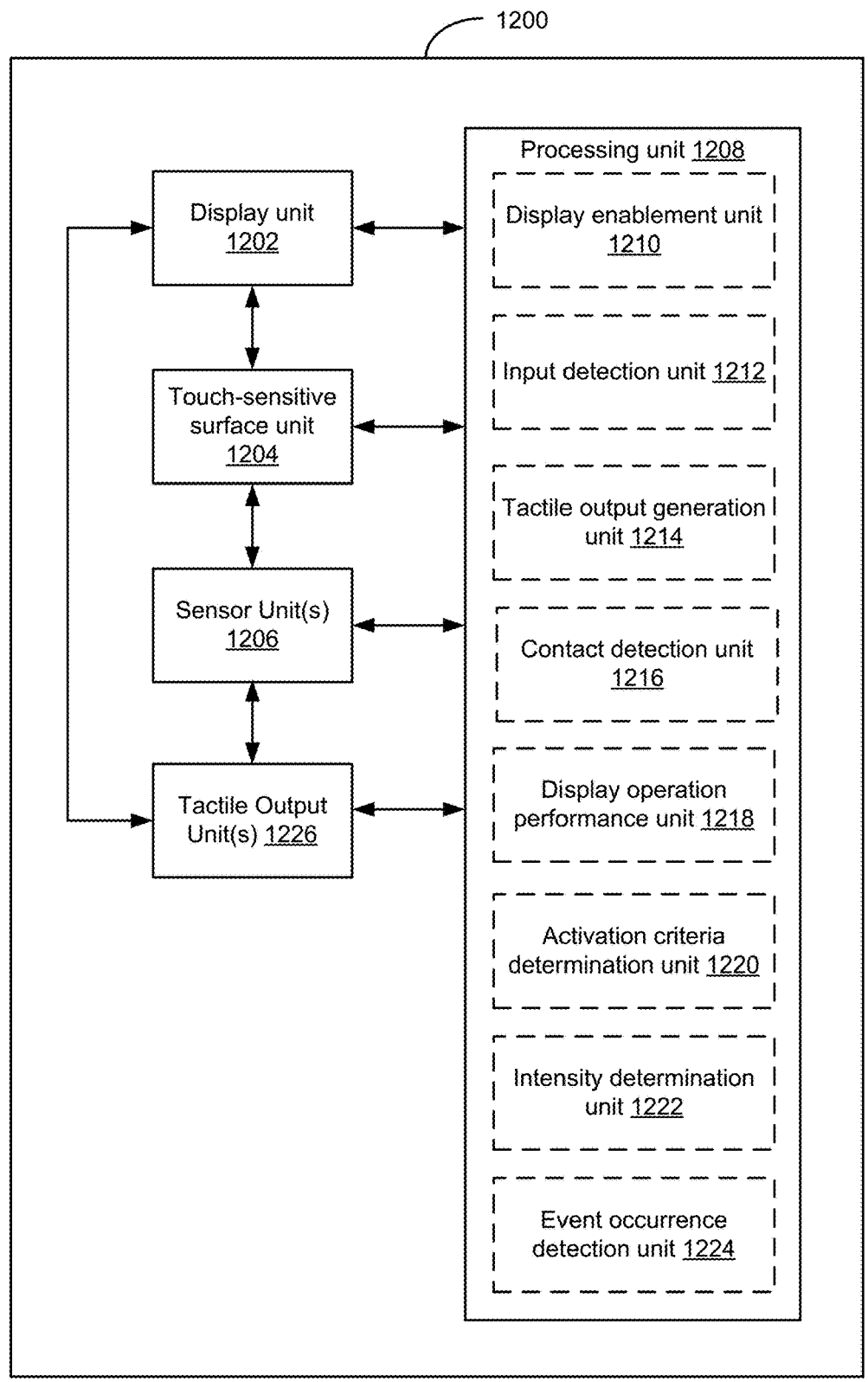

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface, a touch-sensitive surface unit 1204 configured to receive contacts, one or more sensor units 1206 configured to detect intensity of contacts with the touch-sensitive surface unit 1204; and a processing unit 1208 coupled with the display unit 1202, the touch-sensitive surface unit 1204 and the one or more sensor units 1206. In some embodiments, the processing unit 1208 includes: a display enablement unit 1210, an input detection unit 1212, a tactile output generation unit 1214, a contact detection unit 1216, a display operation performance unit 1218, an activation criteria determination unit 1220, an intensity determination unit 1222 and an event occurrence detection unit 1224.

The processing unit 1208 is configured to: enable display (e.g., with display enablement unit 1110) of a user interface that includes a first region that is configured to initiate a first display operation in response to an input that satisfies first activation criteria and initiate a second display operation in response to an input that satisfies second activation criteria distinct from the first activation criteria, and a second region that is distinct from the first region, wherein the second region is configured to initiate a third display operation in response to an input that satisfies the first activation criteria and the second region is not configured to initiate any display operation in response to an input that satisfies the second activation criteria.

While enabling display of the user interface, the processing unit 1208 is also configured to detect a first input (e.g., with the input detection unit 1212) that includes a contact detected (e.g., with the contact detection unit 1216) on the touch-sensitive surface unit 1204, wherein the contact included in the first input is associated with the first region of the user interface.

The processing unit 1208 is also configured to: in response to detecting the first input, in accordance with a determination that the first input satisfies the first activation criteria (e.g., with the activation criteria determination unit 1220), perform the first display operation (e.g., with the display operation performance unit 1218); and in accordance with a determination that the first input satisfies the second activation criteria, perform the second display operation and concurrently generate a tactile output of a first type (e.g., with the tactile output generation unit 1214) while performing the second display operation.

The processing unit 1208 is also configured to: detect a second input (e.g., with the input detection unit 1212) that includes a contact detected (e.g., with the contact detection unit 1216) on the touch-sensitive surface unit 1204, wherein the second input is distinct from the first input and the contact included in the second input is associated with the second region of the user interface.

The processing unit 1208 is also configured to: in response to detecting the second input, in accordance with a determination that the second input satisfies the first activation criteria (e.g., with the activation criteria determination unit 1220), perform the third display operation (e.g., with the display operation performance unit 1218), and in accordance with a determination that the second input satisfies the second activation criteria, generate (e.g., with the tactile output generation unit 1214) a tactile output of a second type. In some embodiments, the tactile output of the second type is distinct from the tactile output of the first type.

In some embodiments, the processing unit 1208 is further configured to: in response to detecting the first input and in accordance with the determination that the first input satisfies the first activation criteria (e.g., with the activation criteria determination unit 1220), concurrently generate (e.g., with the tactile output generation unit 1214) a tactile output of a third type that is distinct from the tactile output of the first type while performing the first display operation (e.g., with the display operation performance unit 1218).

In some embodiments, the processing unit 1208 is further configured to: in response to detecting the second input, in accordance with the determination that the second input satisfies the first activation criteria (e.g., with the activation criteria determination unit 1220), concurrently generate a tactile output of a fourth type (e.g., with the tactile output generation unit 1214) that is distinct from the tactile output of the third type while performing the third display operation (e.g., with the display operation performance unit 1218).

In some embodiments, the processing unit 1208 is further configured to: in response to detecting the second input, in accordance with the determination that the second input satisfies the first activation criteria (e.g., with the activation criteria determination unit 1220), concurrently generating a tactile output of the third type (e.g., with the tactile output generation unit 1214) while performing the third display operation (e.g., with the display operation performance unit 1218).

In some embodiments, the user interface includes a third region that is not configured to initiate any display operation in response to an input that satisfies first activation criteria and is not configured to initiate any display operation in response to an input that satisfies second activation criteria distinct from the first activation criteria, and the processing unit 1208 is further configured to: detect a third input (e.g., with the input detection unit 1212) that includes a contact detected on the touch-sensitive surface unit 1204, wherein the contact included in the first input is associated with the third region of the user interface, and in response to detecting the third input, in accordance with a determination that the third input satisfies the first activation criteria (e.g., with the activation criteria determination unit 1220), generate a tactile output of the third type (e.g., with the tactile output generation unit 1214), and in accordance with a determination that the third input satisfies the second activation criteria (e.g., with the activation criteria determination unit 1220), generate a tactile output of the second type (e.g., with the tactile output generation unit 1214).

In some embodiments, the tactile output of the second type has less salience than salience of the tactile output of the first type. In some embodiments, the tactile output of the third type has less salience than salience of the tactile output of the first type and greater salience than salience of the tactile output of the second type. In some embodiments, the first activation criteria include first intensity criteria. In some embodiments, the second activation criteria include second intensity criteria distinct from the first intensity criteria. In some embodiments, the first region is a region that includes a user interface control and the second region is a region that does not include any user interface control.

In some embodiments, the processing unit 1208 is further configured to: in response to detecting the first input (e.g., with the input detection unit 1212), in accordance with a determination that the first input does not satisfy the first activation criteria and does not satisfy the second activation criteria (e.g., with the activation criteria determination unit 1220), forgo generating any tactile output, and in response to detecting the second input (e.g., with the input detection unit 1212), in accordance with a determination that the second input does not satisfy the first activation criteria and does not satisfy the second activation criteria (e.g., with the activation criteria determination unit 1220), forgo generating any tactile output.

In some embodiments, the processing unit 1208 is further configured to: detect an occurrence of a predefined event associated with the second region while the second region is not configured to initiate any display operation in response to an input that satisfies the second activation criteria, in response to detecting the occurrence of the predefined event, configure the second region to initiate a fourth display operation in response to an input that satisfies the second activation criteria. Furthermore, in some embodiments, the processing unit 1208 is further configured to: while the second region is configured to initiate the fourth display operation in response to an input that satisfies the second activation criteria, detect a fourth input (e.g., with the input detection unit 1212) that includes a contact detected on the touch-sensitive surface unit 1204, wherein the contact included in the third input is associated with the second region of the user interface, and in response to detecting the fourth input (e.g., with the input detection unit 1212), in accordance with a determination that the fourth input satisfies the third activation criteria (e.g., with the activation criteria determination unit 1220), perform the third display operation, and in accordance with a determination that the fourth input satisfies the second activation criteria, perform the fourth display operation and concurrently generate a tactile output of the first type (e.g., with the tactile output generation unit 1214) while performing the second display operation (e.g., with the display operation performance unit 1218).

In some embodiments, the user interface includes a plurality of regions that are configured to perform display operations in response to inputs that satisfy the second activation criteria, and regions of the user interface that are outside of the plurality of regions are not configured to perform display operations to inputs that satisfy the second activation criteria. In some embodiments, the user interface is generated by a first application running on the device and the determination as to whether to provide the first tactile output or the second tactile output when the second set of activation criteria are satisfied is made by a second application running on the device that is distinct from the first application.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8F are, optionally, implemented by components depicted in FIGS. 1A-1B or FIG. 12. For example, input-detection operation 812, and tactile output generation operation 820 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
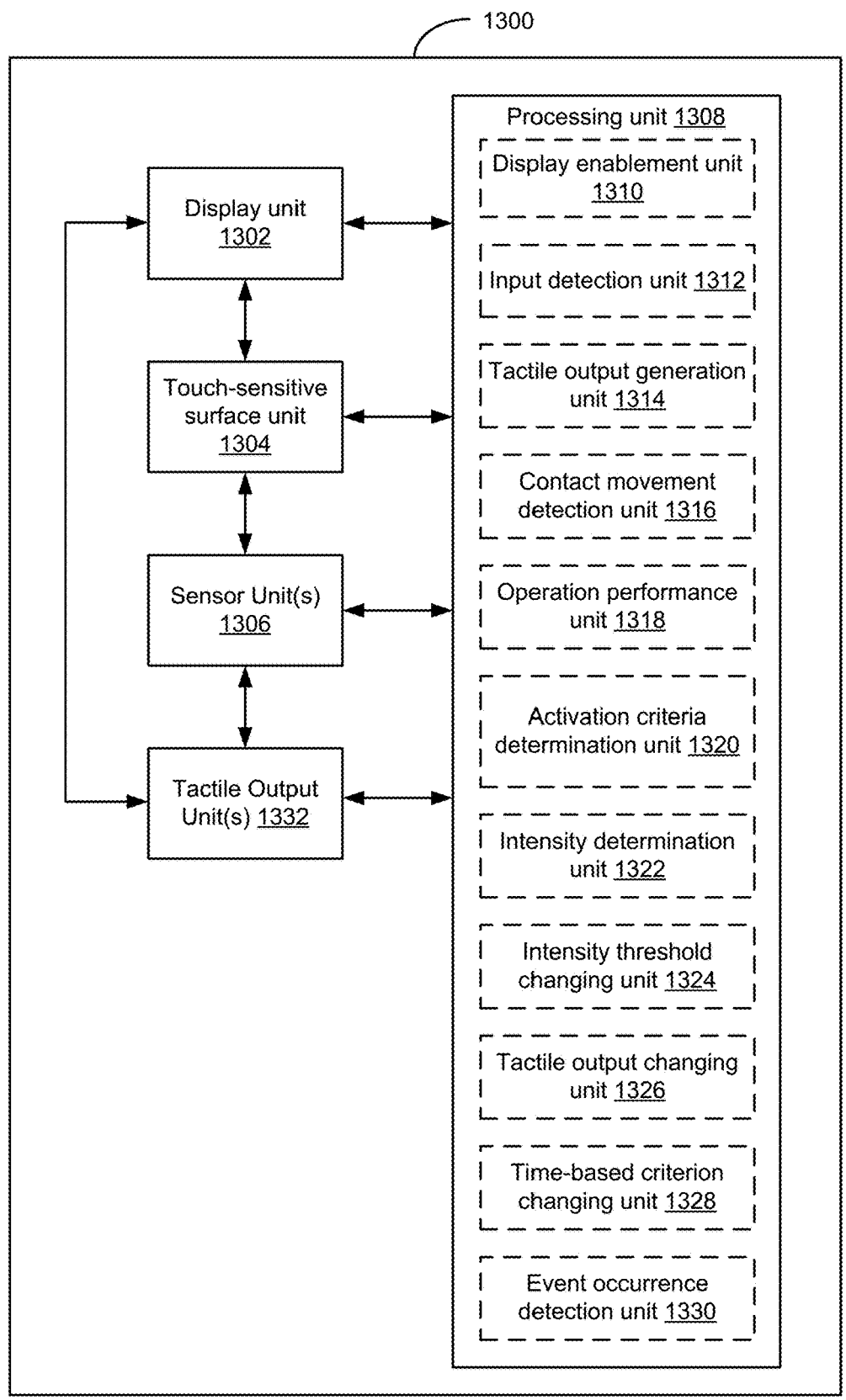

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, a touch-sensitive surface unit 1304 configured to receive contacts, one or more sensor units 1306 configured to detect intensity of contacts with the touch-sensitive surface unit 1304; one or more tactile output units 1332 configured to provide tactile outputs; and a processing unit 1308 coupled with the display unit 1302, the touch-sensitive surface unit 1304 the one or more sensor units 1306 and the one or more tactile output units 1332. In some embodiments, the processing unit 1308 includes: a display enablement unit 1310, an input detection unit 1312, a tactile output generation unit 1314, a contact movement detection unit 1316, an operation performance unit 1318, an activation criteria determination unit 1320, an intensity determination unit 1322, an intensity threshold changing unit 1324, a tactile output changing unit 1326, a time-based criterion changing unit 1328, and an event occurrence detection unit 1330.

The one or more tactile output units 1332 are configured to: provide a first tactile output in response to detecting that first activation criteria have been met, the first activation criteria including a criterion that is met when an intensity of a contact on the touch-sensitive surface unit 1304 increases above a first intensity threshold and provide a second tactile output in response to detecting that second activation criteria have been met, the second activation criteria including a criterion that is met when an intensity of a contact on the touch-sensitive surface unit 1304 increases above a second intensity threshold, distinct from the first intensity threshold.

In some embodiments, the processing unit 1308 is configured to: provide a first tactile output (e.g., with the tactile output generation unit 1314) in response to detecting that first activation criteria have been met (e.g., with activation criteria determination unit 1320), the first activation criteria including a criterion that is met when an intensity of a contact on the touch-sensitive surface unit 1304 increases above a first intensity threshold (e.g., using intensity determination unit 1322) and provide a second tactile output (e.g., with the tactile output generation unit 1314) in response to detecting that second activation criteria have been met (e.g., with activation criteria determination unit 1320), the second activation criteria including a criterion that is met when an intensity of a contact on the touch-sensitive surface unit 1304 increases above a second intensity threshold, distinct from the first intensity threshold (e.g., using intensity determination unit 1322).

The processing unit 1308 is also configured to: enable display (e.g., with display enablement unit 1308) of a settings user interface that includes one or more control objects, wherein the settings user interface is configured to adjust operations of the device that use: the one or more sensors that detect intensity of contacts (e.g., one or more sensor units 1306) with the touch-sensitive surface unit 1304, and/or the one or more tactile output generators (e.g., one or more tactile output units 1332). The processing unit 1308 is configured to, while enabling display of the settings user interface: detect an input (e.g., with input detection unit 1312) for a first control object of the one or more control objects, and in accordance with the detected input for the first control object, change the second intensity threshold (e.g., with intensity threshold changing unit 1324) and change the second tactile output (e.g., with tactile output changing unit 1326).

In some embodiments, the processing unit 1308 is further configured to: in accordance with the detected input for the first control object, change the first intensity threshold (e.g., with intensity threshold changing unit 1324). In some embodiments, the processing unit 1308 is further configured to: in accordance with the detected input for the first control object, change the first tactile output (e.g., with tactile output changing unit 1326).

In some embodiments, the processing unit 1308 is further configured to: provide other tactile outputs (e.g., with tactile output generation unit 1314) in response to detecting events associated with movement of a contact (e.g., with contact movement detection unit 1316) on the touch-sensitive surface unit 1304, and in accordance with the detected input for the first control object, change the other tactile outputs (e.g., with tactile output changing unit 1326).

In some embodiments, the first intensity threshold is lower than the second intensity threshold, the second activation criteria includes a time-based criterion that is dependent upon a time at which the first activation criteria is met, and the processing unit 1308 is further configured to: in accordance with the detected input for the first control object, change the time-based criterion (e.g., with time-based criterion changing unit 1328). In some embodiments, the time-based criterion includes a delay time period that occurs after the time at which the first activation criteria were met, and the time-based criterion is met after the delay time period has elapsed.

In some embodiments, the second activation criteria include a criterion that is met (e.g., using activation criteria determination unit 1320) when the intensity of the contact increases by more than a predefined amount after the delay time period has elapsed. In some embodiments, the second activation criteria include a criterion that is met (e.g., using activation criteria determination unit 1320) when the intensity of the contact increases from an intensity below the second intensity threshold to an intensity above the second intensity threshold (e.g., using intensity determination unit 1322) after the delay time period has elapsed.

In some embodiments, the time-based criterion includes a reduced-sensitivity time period that occurs after the time at which the first activation criteria are satisfied, and during the reduced-sensitivity time period, the second intensity threshold is increased. In some embodiments, the device is configured to respond to the satisfaction of the first activation criteria with a first type of operation (e.g., with operation performance unit 1318), and the device is configured to respond to the satisfaction of the second activation criteria with a second type of operation (e.g., with operation performance unit 1318) that is different from the first type of operation.

In some embodiments, the time-based criterion includes one or more of: a first offset that decreases over time; and a second offset that changes over time based on an intensity of a contact on the touch-sensitive surface unit 1304.

In some embodiments, the time-based criterion includes an intensity offset for a user that is determined based on multiple separate inputs on the touch-sensitive surface unit 1304 by the user.

In some embodiments, the intensity offset for the user is determined based on one or more of: peak intensities of a first predefined number of separate click inputs on the touch-sensitive surface unit 1304 by the user, and peak intensities of a second predefined number of separate drag inputs on the touch-sensitive surface unit 1304 by the user.

In some embodiments, the first control object is a discrete control object that corresponds to a particular setting and in some embodiments, the first control object is a continuous control object that corresponds to three or more settings.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9C are, optionally, implemented by components depicted in FIGS. 1A-1B or FIG. 13. For example, intensity-threshold changing operation 914, and tactile output changing operation 920 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device with a touch-sensitive surface and a display, wherein the electronic device includes one or more sensors to detect intensity of contacts with the touch-sensitive surface:
displaying, on the display, a user interface of a first software application that includes multiple distinct portions, wherein a second portion of the multiple distinct portions includes one or more draggable objects and a first portion, distinct from the second portion, of the multiple distinct portions includes a first control object of a plurality of control objects distinct from the one or more draggable objects, wherein the one or more draggable objects, but not the plurality of control objects, are configured to be moved independently of other user interface objects in the user interface; and,
while displaying the user interface of the first software application:
detecting a contact on the touch-sensitive surface at a first location while a focus selector is displayed over a first draggable object of the one or more draggable objects displayed on the display;
after detecting the contact on the touch-sensitive surface at the first location, detecting a movement of the contact across the touch-sensitive surface to a second location that corresponds to the first control object of the plurality of control objects displayed on the display; and,
in response to detecting movement of the contact from the first location to the second location, in accordance with a determination that the contact at the first location satisfies object selection criteria:
moving the first draggable object to the first control object in accordance with the movement of the contact across the touch-sensitive surface to the second location that corresponds to the first control object; and,
in accordance with a determination that the contact at the second location satisfies first intensity criteria, performing a first predetermined operation that corresponds to activation of the first control object, including changing the second portion of the multiple distinct portions of the user interface;
subsequent to moving the first draggable object to the first control object and changing the second portion:
detecting a movement of the contact across the touch-sensitive surface to a third location that corresponds to the changed second portion on the display;
moving the first draggable object to a location in the changed second portion in accordance with the movement of the contact across the touch-sensitive surface to the third location; and,
in accordance with a determination that the contact at the third location does not satisfy the object selection criteria, dropping the first draggable object at the location in the changed second portion.

2. The method of claim 1, wherein the object selection criteria include second intensity criteria.

3. The method of claim 2, including:
in accordance with a determination that the contact at the first location does not satisfy the object selection criteria:
moving the focus selector to the first control object in accordance with the movement of the contact across the touch-sensitive surface to the second location that corresponds to the first control object without moving the first draggable object to the first control object; and,
in accordance with a determination that the contact at the second location satisfies the second intensity criteria, performing the first predetermined operation that corresponds to activation of the first control object without moving the first draggable object to the first control object.

4. The method of claim 1, wherein:
the first software application is a calendar application;
the user interface of the first software application includes multiple time-period user interface elements in the first portion;
the one or more draggable objects are one or more calendar entry objects;
a respective time-period user interface element of the multiple time-period user interface elements corresponds to a predefined unit of time;
the second portion of the user interface of the first software application, prior to the determination that the contact at the second location satisfies the first intensity criteria, includes a calendar view that corresponds to a first unit of time; and
changing the second portion includes replacing the calendar view that corresponds to a first unit of time with a calendar view that corresponds to a second unit of time that is distinct from the first unit of time.

5. The method of claim 1, wherein:
the first software application is a file system navigation application;
the user interface of the first software application includes multiple file view control objects in the first portion;
the one or more draggable objects are one or more of file icons and/or folder icons;
a respective file view control object of the multiple file view control objects corresponds to a distinct file view type;
the second portion of the user interface, prior to the determination that the contact at the second location satisfies the first intensity criteria, includes a file view of a first file view type; and
changing the second portion includes replacing the file view of the first file view type with a file view of a second file view type that is distinct from the file view of the first file view type.

6. The method of claim 1, including:
in response to moving the first draggable object to the first control object:
in accordance with a determination that the first software application is configured to perform the first predetermined operation in response to detecting a contact at the second location that satisfies the first intensity criteria, visually distinguishing the first control object prior to determining that the contact satisfies the first intensity criteria.

7. The method of claim 6, including:
detecting a movement of the contact across the touch-sensitive surface to a fourth location that corresponds to a second control object of the plurality of control objects; and, in accordance with a determination that the first software application is not configured to perform a predetermined operation in response to detecting a contact at the fourth location that satisfies the first intensity criteria, forgoing visually distinguishing the second control object.

8. The method of claim 1, including:
concurrently displaying an entirety of the user interface of the first software application with a portion of a user interface of a second software application adjacent to the user interface of the first software application;
in accordance with the determination that the contact at the first location satisfies the object selection criteria:
  detecting a movement of the contact across the touch-sensitive surface to a fifth location that corresponds to the displayed portion of the user interface of the second software application on the display;
  moving the first draggable object to the displayed portion of the user interface of the second software application in accordance with the movement of the contact across the touch-sensitive surface to the fifth location; and,
  in response to a determination that the contact at the fifth location satisfies the first intensity criteria, replacing a concurrent display of the entirety of the user interface of the first software application and the portion of the user interface of the second software application with a concurrent display of an entirety of the user interface of the second software application and a portion of the user interface of the first software application adjacent to the user interface of the second software application.

9. The method of claim 8, including:
in response to a determination that the contact at the fifth location does not satisfy the first intensity criteria:
  determining a time period during which the contact remains at the fifth location; and
  in response to a determination that the time period satisfies time-based activation criteria, replacing the concurrent display of the entirety of the user interface of the first software application and the portion of the user interface of the second software application with the concurrent display of an entirety of the user interface of the second software application and the portion of the user interface of the first software application adjacent to the user interface of the second software application.

10. An electronic device, comprising:
a display;
a touch-sensitive surface;
one or more sensors to detect intensity of contacts with the touch-sensitive surface;
one or more processors;
memory; and
one or more programs, wherein the one or more programs are stored in the memory and configured to be executed by the one or more processors, the one or more programs including instructions for:
displaying, on the display, a user interface of a first software application that includes multiple distinct portions, wherein a second portion of the multiple distinct portions includes one or more draggable objects and a first portion, distinct from the second portion, of the multiple distinct portions includes a first control object of a plurality of control objects distinct from the one or more draggable objects, wherein the one or more draggable objects, but not the plurality of control objects, are configured to be moved independently of other user interface objects in the user interface; and,
while displaying the user interface of the first software application:
  detecting a contact on the touch-sensitive surface at a first location while a focus selector is displayed over a first draggable object of the one or more draggable objects displayed on the display;
  after detecting the contact on the touch-sensitive surface at the first location, detecting a movement of the contact across the touch-sensitive surface to a second location that corresponds to the first control object of the plurality of control objects displayed on the display; and,
  in response to detecting movement of the contact from the first location to the second location, in accordance with a determination that the contact at the first location satisfies object selection criteria:
    moving the first draggable object to the first control object in accordance with the movement of the contact across the touch-sensitive surface to the second location that corresponds to the first control object; and,
    in accordance with a determination that the contact at the second location satisfies first intensity criteria, performing a first predetermined operation that corresponds to activation of the first control object, including changing the second portion of the multiple distinct portions of the user interface;
  subsequent to moving the first draggable object to the first control object and changing the second portion:
    detecting a movement of the contact across the touch-sensitive surface to a third location that corresponds to the changed second portion on the display;
    moving the first draggable object to a location in the changed second portion in accordance with the movement of the contact across the touch-sensitive surface to the third location; and,
    in accordance with a determination that the contact at the third location does not satisfy the object selection criteria, dropping the first draggable object at the location in the changed second portion.

11. The electronic device of claim 10, wherein the object selection criteria include second intensity criteria.

12. The electronic device of claim 11, wherein the one or more programs include instructions for:
in accordance with a determination that the contact at the first location does not satisfy the object selection criteria:
  moving the focus selector to the first control object in accordance with the movement of the contact across the touch-sensitive surface to the second location that corresponds to the first control object without moving the first draggable object to the first control object; and,
  in accordance with a determination that the contact at the second location satisfies the second intensity criteria, performing the first predetermined operation that corresponds to activation of the first control object without moving the first draggable object to the first control object.

13. The electronic device of claim 10, wherein:
the first software application is a calendar application;
the user interface of the first software application includes multiple time-period user interface elements in the first portion;

the one or more draggable objects are one or more calendar entry objects;
a respective time-period user interface element of the multiple time-period user interface elements corresponds to a predefined unit of time;
the second portion of the user interface of the first software application, prior to the determination that the contact at the second location satisfies the first intensity criteria, includes a calendar view that corresponds to a first unit of time; and
changing the second portion includes replacing the calendar view that corresponds to a first unit of time with a calendar view that corresponds to a second unit of time that is distinct from the first unit of time.

14. The electronic device of claim 10, wherein:
the first software application is a file system navigation application;
the user interface of the first software application includes multiple file view control objects in the first portion;
the one or more draggable objects are one or more of file icons and/or folder icons;
a respective file view control object of the multiple file view control objects corresponds to a distinct file view type;
the second portion of the user interface, prior to the determination that the contact at the second location satisfies the first intensity criteria, includes a file view of a first file view type; and
changing the second portion includes replacing the file view of the first file view type with a file view of a second file view type that is distinct from the file view of the first file view type.

15. The electronic device of claim 10, wherein the one or more programs include instructions for:
in response to moving the first draggable object to the first control object:
in accordance with a determination that the first software application is configured to perform the first predetermined operation in response to detecting a contact at the second location that satisfies the first intensity criteria, visually distinguishing the first control object prior to determining that the contact satisfies the first intensity criteria.

16. The electronic device of claim 15, wherein the one or more programs include instructions for:
detecting a movement of the contact across the touch-sensitive surface to a fourth location that corresponds to a second control object of the plurality of control objects; and,
in accordance with a determination that the first software application is not configured to perform a predetermined operation in response to detecting a contact at the fourth location that satisfies the first intensity criteria, forgoing visually distinguishing the second control object.

17. The electronic device of claim 10, wherein the one or more programs include instructions for:
concurrently displaying an entirety of the user interface of the first software application with a portion of a user interface of a second software application adjacent to the user interface of the first software application;
in accordance with the determination that the contact at the first location satisfies the object selection criteria:
detecting a movement of the contact across the touch-sensitive surface to a fifth location that corresponds to the displayed portion of the user interface of the second software application on the display;
moving the first draggable object to the displayed portion of the user interface of the second software application in accordance with the movement of the contact across the touch-sensitive surface to the fifth location; and,
in response to a determination that the contact at the fifth location satisfies the first intensity criteria, replacing a concurrent display of the entirety of the user interface of the first software application and the portion of the user interface of the second software application with a concurrent display of an entirety of the user interface of the second software application and a portion of the user interface of the first software application adjacent to the user interface of the second software application.

18. The electronic device of claim 17, wherein the one or more programs include instructions for:
in response to a determination that the contact at the fifth location does not satisfy the first intensity criteria:
determining a time period during which the contact remains at the fifth location; and
in response to a determination that the time period satisfies time-based activation criteria, replacing the concurrent display of the entirety of the user interface of the first software application and the portion of the user interface of the second software application with the concurrent display of an entirety of the user interface of the second software application and the portion of the user interface of the first software application adjacent to the user interface of the second software application.

19. A non-transitory computer readable storage medium storing one or more programs, the one or more programs comprising instructions, which when executed by an electronic device with a display, a touch-sensitive surface, and one or more sensors to detect intensity of contacts with the touch-sensitive surface, cause the device to:
display, on the display, a user interface of a first software application that includes multiple distinct portions, wherein a second portion of the multiple distinct portions includes one or more draggable objects and a first portion, distinct from the second portion, of the multiple distinct portions includes a first control object of a plurality of control objects distinct from the one or more draggable objects, wherein the one or more draggable objects, but not the plurality of control objects, are configured to be moved independently of other user interface objects in the user interface; and,
while displaying the user interface of the first software application:
detect a contact on the touch-sensitive surface at a first location while a focus selector is displayed over a first draggable object of the one or more draggable objects displayed on the display;
after detecting the contact on the touch-sensitive surface at the first location, detect a movement of the contact across the touch-sensitive surface to a second location that corresponds to the first control object of the plurality of control objects displayed on the display; and,
in response to detecting movement of the contact from the first location to the second location, in accordance with a determination that the contact at the first location satisfies object selection criteria:
move the first draggable object to the first control object in accordance with the movement of the contact across the touch-sensitive surface to the second location that corresponds to the first control object; and,
in accordance with a determination that the contact at the second location satisfies first intensity criteria, perform a first predetermined operation that corresponds to activation of the first control object, including changing the second portion of the multiple distinct portions of the user interface;
subsequent to moving the first draggable object to the first control object and changing the second portion:
detect a movement of the contact across the touch-sensitive surface to a third location that corresponds to the changed second portion on the display;
move the first draggable object to a location in the changed second portion in accordance with the movement of the contact across the touch-sensitive surface to the third location; and,
in accordance with a determination that the contact at the third location does not satisfy the object selection criteria, drop the first draggable object at the location in the changed second portion.

20. The computer readable storage medium of claim 19, wherein the object selection criteria include second intensity criteria.

21. The computer readable storage medium of claim 20, wherein the one or more programs include instructions, which when executed by the electronic device, cause the device to:
in accordance with a determination that the contact at the first location does not satisfy the object selection criteria:
move the focus selector to the first control object in accordance with the movement of the contact across the touch-sensitive surface to the second location that corresponds to the first control object without moving the first draggable object to the first control object; and,
in accordance with a determination that the contact at the second location satisfies the second intensity criteria, perform the first predetermined operation that corresponds to activation of the first control object without moving the first draggable object to the first control object.

22. The computer readable storage medium of claim 19, wherein:
the first software application is a calendar application;
the user interface of the first software application includes multiple time-period user interface elements in the first portion;
the one or more draggable objects are one or more calendar entry objects;
a respective time-period user interface element of the multiple time-period user interface elements corresponds to a predefined unit of time;
the second portion of the user interface of the first software application, prior to the determination that the contact at the second location satisfies the first intensity criteria, includes a calendar view that corresponds to a first unit of time; and
changing the second portion includes replacing the calendar view that corresponds to a first unit of time with a calendar view that corresponds to a second unit of time that is distinct from the first unit of time.

23. The computer readable storage medium of claim 19, wherein:

the first software application is a file system navigation application;
the user interface of the first software application includes multiple file view control objects in the first portion;
the one or more draggable objects are one or more of file icons and/or folder icons;
a respective file view control object of the multiple file view control objects corresponds to a distinct file view type;
the second portion of the user interface, prior to the determination that the contact at the second location satisfies the first intensity criteria, includes a file view of a first file view type; and
changing the second portion includes replacing the file view of the first file view type with a file view of a second file view type that is distinct from the file view of the first file view type.

24. The computer readable storage medium of claim 19, wherein the one or more programs include instructions, which when executed by the electronic device, cause the device to:
in response to moving the first draggable object to the first control object:
in accordance with a determination that the first software application is configured to perform the first predetermined operation in response to detecting a contact at the second location that satisfies the first intensity criteria, visually distinguish the first control object prior to determining that the contact satisfies the first intensity criteria.

25. The computer readable storage medium of claim 24, wherein the one or more programs include instructions, which when executed by the electronic device, cause the device to:
detect a movement of the contact across the touch-sensitive surface to a fourth location that corresponds to a second control object of the plurality of control objects; and,
in accordance with a determination that the first software application is not configured to perform a predetermined operation in response to detecting a contact at the fourth location that satisfies the first intensity criteria, forgo visually distinguishing the second control object.

26. The computer readable storage medium of claim 19, wherein the one or more programs include instructions, which when executed by the electronic device, cause the device to:
concurrently display an entirety of the user interface of the first software application with a portion of a user interface of a second software application adjacent to the user interface of the first software application;
in accordance with the determination that the contact at the first location satisfies the object selection criteria:
detect a movement of the contact across the touch-sensitive surface to a fifth location that corresponds to the displayed portion of the user interface of the second software application on the display;
move the first draggable object to the displayed portion of the user interface of the second software application in accordance with the movement of the contact across the touch-sensitive surface to the fifth location; and,
in response to a determination that the contact at the fifth location satisfies the first intensity criteria, replace a concurrent display of the entirety of the user interface of the first software application and the portion of the user interface of the second software application with a concurrent display of an entirety of the user interface of the second software application and a portion of the user interface of the first software application adjacent to the user interface of the second software application.

27. The computer readable storage medium of claim 26, wherein the one or more programs include instructions, which when executed by the electronic device, cause the device to:
- in response to a determination that the contact at the fifth location does not satisfy the first intensity criteria:
  - determine a time period during which the contact remains at the fifth location; and
  - in response to a determination that the time period satisfies time-based activation criteria, replace the concurrent display of the entirety of the user interface of the first software application and the portion of the user interface of the second software application with the concurrent display of an entirety of the user interface of the second software application and the portion of the user interface of the first software application adjacent to the user interface of the second software application.

* * * * *